US012616259B2

(12) United States Patent
Hull

(10) Patent No.: US 12,616,259 B2
(45) Date of Patent: May 5, 2026

(54) GLOVE WITH LONGITUDINAL FINGER STAYS AND TEXTURED FINGER AND THUMB CROTCHES

(71) Applicant: Summit Glove Inc., Minerva, OH (US)

(72) Inventor: James L. Hull, Malvern, OH (US)

(73) Assignee: Summit Glove Inc., Minerva, OH (US)

( * ) Notice: Subject to any disclaimer, the term of this patent is extended or adjusted under 35 U.S.C. 154(b) by 21 days.

(21) Appl. No.: 18/449,575

(22) Filed: Aug. 14, 2023

(65) Prior Publication Data

US 2024/0000174 A1 Jan. 4, 2024

Related U.S. Application Data

(63) Continuation-in-part of application No. 18/191,047, filed on Mar. 28, 2023, now Pat. No. 12,156,555, (Continued)

(51) Int. Cl.
*A41D 19/015* (2006.01)
*A41D 19/00* (2006.01)
(Continued)

(52) U.S. Cl.
CPC ..... *A41D 19/0082* (2013.01); *A41D 19/0003* (2013.01); *A41D 19/0055* (2013.01);
(Continued)

(58) Field of Classification Search
CPC .......... A41D 19/01547; A41D 19/0055; A41D 19/00; A63B 71/141
See application file for complete search history.

(56) References Cited

U.S. PATENT DOCUMENTS

| | | | |
|---|---|---|---|
| 1,097,018 A | 5/1914 | Hadfield | |
| 1,206,102 A | 11/1916 | Gibson | |

(Continued)

FOREIGN PATENT DOCUMENTS

| | | | |
|---|---|---|---|
| CA | 3005865 A1 | 5/2017 | |
| MY | PI20055937 | 2/2018 | |

(Continued)

OTHER PUBLICATIONS

Nick Gardner, Accelerator Free Fact or Fiction, Shield Scientific B.V., Health & Safety International, pp. 77-82, Oct. 2008.
(Continued)

*Primary Examiner* — Tajash D Patel
(74) *Attorney, Agent, or Firm* — Sand, Sebolt & Wernow Co., LPA

(57) ABSTRACT

A glove including a wrist region; a palm region extending outwardly from the wrist region; a plurality of digit regions extending outwardly from the palm region, wherein each digit region of the plurality of digit regions has a longitudinal axis extending along the digit region from the tip of the digit region to the palm region; an interior cavity bounded and defined by the wrist region, the palm region, and the plurality of digit regions, wherein the interior cavity is accessible via an opening defined by the wrist region. A crotch area is provided between adjacent digit regions. At least one gripping zone is provided on at least one digit region. The gripping zone is oriented substantially parallel to the longitudinal axis of the at least one digit region. An exterior surface of at least one crotch area and at least one gripping zone is textured, particularly by micro-etching.

20 Claims, 83 Drawing Sheets

Related U.S. Application Data which is a continuation-in-part of application No. 17/540,368, filed on Dec. 2, 2021, now Pat. No. 11,825,893, which is a continuation of application No. 16/787,560, filed on Feb. 11, 2020, now Pat. No. 11,197,509, which is a continuation of application No. 16/209,066, filed on Dec. 4, 2018, now Pat. No. 10,602,787, which is a continuation-in-part of application No. 15/136,191, filed on Apr. 22, 2016, now Pat. No. 10,390,575.

(60) Provisional application No. 62/152,302, filed on Apr. 24, 2015.

(51) Int. Cl.
B32B 25/08 (2006.01)
B32B 25/14 (2006.01)

(52) U.S. Cl.
CPC .......... *A41D 19/0058* (2013.01); *B32B 25/08* (2013.01); *B32B 25/14* (2013.01); *A41D 19/01547* (2013.01); *A41D 2400/80* (2013.01); *B32B 2437/02* (2013.01)

(56) References Cited

U.S. PATENT DOCUMENTS

| | | | |
|---|---|---|---|
| 1,559,114 A | 10/1925 | Maranville | |
| 1,571,860 A | 2/1926 | Meyer | |
| 1,983,963 A | 12/1934 | Belton | |
| 2,036,413 A * | 4/1936 | Herbruck | A41D 19/0062 |
| | | | 2/168 |
| 2,075,550 A | 3/1937 | Smith | |
| 2,117,417 A | 5/1938 | Hall | |
| 2,266,716 A | 12/1941 | Robertson | |
| 2,299,855 A | 10/1942 | Smith | |
| 2,335,871 A | 12/1943 | Milligan | |
| 2,348,773 A * | 5/1944 | Wyman | A61B 42/00 |
| | | | 2/21 |
| D169,047 S | 3/1953 | Sebrell | |
| 2,821,718 A | 2/1958 | Hall | |
| D188,835 S | 9/1960 | Hoffstein | |
| D191,494 S | 10/1961 | Hoffstein | |
| D200,756 S | 4/1965 | Rowley | |
| 3,197,786 A | 8/1965 | Velonis | |
| D202,329 S | 9/1965 | Swistel | |
| D205,925 S | 10/1966 | Whitcraft | |
| 3,283,338 A | 11/1966 | Landau | |
| 3,600,716 A | 8/1971 | Berry | |
| 3,602,917 A | 9/1971 | Seunevel | |
| 3,633,216 A | 1/1972 | Schonholtz | |
| 3,761,965 A | 10/1973 | Barasch | |
| 3,867,727 A | 2/1975 | Povlacs | |
| D235,175 S | 5/1975 | Berger | |
| 3,883,898 A | 5/1975 | Byrnes, Sr. | |
| 3,883,899 A | 5/1975 | Ganz | |
| 3,942,193 A | 3/1976 | Pugh | |
| 4,004,295 A | 1/1977 | Byrnes, Sr. | |
| 4,047,251 A | 9/1977 | Stockum | |
| 4,149,601 A | 4/1979 | Taylor | |
| D253,920 S | 1/1980 | Heavner, Jr. | |
| 4,329,312 A * | 5/1982 | Ganz | B29C 41/14 |
| | | | 264/306 |
| 4,388,733 A | 6/1983 | Anstett | |
| 4,399,567 A | 8/1983 | Weon Joong | |
| 4,441,213 A | 4/1984 | Trumble | |
| 4,507,807 A | 4/1985 | Karkanen | |
| 4,536,890 A | 8/1985 | Barnett | |
| 4,696,065 A | 9/1987 | Elenteny | |
| 4,742,578 A | 5/1988 | Seid | |
| 4,809,365 A | 3/1989 | Chen | |
| 4,841,653 A | 6/1989 | Negley | |
| 4,843,014 A | 6/1989 | Cukier | |
| 4,845,780 A | 7/1989 | Reimers | |

| | | | |
|---|---|---|---|
| 4,884,300 A | 12/1989 | Vistins | |
| 4,921,672 A | 5/1990 | Bock | |
| D310,133 S | 8/1990 | Chen | |
| 5,140,709 A * | 8/1992 | Cohn | A41D 19/0013 |
| | | | 2/163 |
| 5,291,394 A | 3/1994 | Chapman | |
| 5,317,760 A | 6/1994 | Best | |
| 5,323,490 A | 6/1994 | Yarbrough | |
| 5,392,320 A | 2/1995 | Chao | |
| 5,442,816 A | 8/1995 | Seketa | |
| 5,452,478 A * | 9/1995 | Rombach | A41D 19/01505 |
| | | | 2/166 |
| 5,456,354 A | 10/1995 | Wood | |
| 5,553,304 A | 9/1996 | Lipner | |
| 5,579,539 A | 12/1996 | Flick | |
| 5,649,326 A | 7/1997 | Richard, Jr. | |
| 5,685,014 A | 11/1997 | Dapsalmon | |
| 5,687,424 A | 11/1997 | Masley | |
| 5,792,531 A | 8/1998 | Littleton | |
| 5,794,266 A | 8/1998 | Han | |
| 5,907,870 A | 6/1999 | Monroe | |
| 5,924,137 A | 7/1999 | Gold | |
| 5,953,751 A | 9/1999 | Kobren | |
| 5,953,756 A | 9/1999 | Vrissimdjis | |
| 6,031,042 A | 2/2000 | Lipinski | |
| 6,032,290 A | 3/2000 | Lucas | |
| 6,041,438 A | 3/2000 | Kirkwood | |
| RE36,778 E | 7/2000 | DeLeo | |
| 6,081,928 A | 7/2000 | Bourne | |
| 6,092,238 A | 7/2000 | Fierabend, Jr. | |
| 6,249,917 B1 | 6/2001 | Vrissimdjis | |
| D459,859 S | 7/2002 | Poteat | |
| 6,451,893 B1 | 9/2002 | Tao | |
| 6,551,422 B1 | 4/2003 | O'Connor | |
| 6,591,427 B1 | 7/2003 | Bennett | |
| 6,625,816 B1 | 9/2003 | Cooke | |
| 6,643,846 B2 | 11/2003 | Turner-Antonsen | |
| 6,697,690 B2 | 2/2004 | Scholl | |
| D500,396 S | 1/2005 | Akagi | |
| D513,827 S | 1/2006 | Ward | |
| 7,079,984 B2 | 7/2006 | Eryurek | |
| D526,180 S | 8/2006 | Holden | |
| D528,703 S | 9/2006 | Smedi | |
| D567,454 S | 4/2008 | Raymond | |
| 7,356,852 B2 | 4/2008 | Thai | |
| D569,578 S | 5/2008 | Yan | |
| 7,448,091 B2 | 11/2008 | Kruss | |
| D591,481 S | 5/2009 | Raymond | |
| D602,207 S | 10/2009 | Hull | |
| D612,996 S | 3/2010 | Kishihara | |
| D612,998 S | 3/2010 | Kishihara | |
| 7,721,354 B2 | 5/2010 | Yu | |
| D618,882 S | 7/2010 | Jaeger | |
| 8,028,348 B2 | 10/2011 | Hull | |
| D652,578 S | 1/2012 | Cummings | |
| 8,104,097 B2 | 1/2012 | Hamann | |
| 8,146,174 B2 | 4/2012 | Knuth | |
| 8,170,893 B1 | 5/2012 | Rossi | |
| 8,286,264 B2 | 10/2012 | Hull | |
| 8,302,216 B2 | 11/2012 | Hull | |
| 8,365,996 B2 | 2/2013 | Sessums | |
| 8,495,764 B2 | 7/2013 | Hull | |
| D690,472 S | 9/2013 | Thompson | |
| D697,134 S | 1/2014 | Fender | |
| 8,622,015 B1 | 1/2014 | Snyder | |
| D700,403 S | 2/2014 | Gellis | |
| 8,672,372 B2 | 3/2014 | Dan | |
| 8,856,967 B2 | 10/2014 | Govindasamy | |
| 8,938,814 B2 * | 1/2015 | Tomono | A41D 19/01558 |
| | | | 2/161.8 |
| D735,968 S | 8/2015 | Furlong | |
| D736,477 S | 8/2015 | Rogers | |
| 9,179,718 B2 | 11/2015 | Anstey | |
| 9,302,171 B1 | 4/2016 | Iacono | |
| 9,380,794 B2 | 7/2016 | Hull | |
| D783,906 S | 4/2017 | Choi | |
| 9,635,891 B2 | 5/2017 | Hull | |
| 9,730,477 B2 | 8/2017 | Furlong | |
| 9,801,422 B2 | 10/2017 | Anstey | |

(56) References Cited

U.S. PATENT DOCUMENTS

| | | | |
|---|---|---|---|
| D804,103 S | 11/2017 | Wong | |
| 9,968,145 B2 | 5/2018 | Hull | |
| D819,983 S | 6/2018 | Barran | |
| 10,028,542 B2 | 7/2018 | Hull | |
| D825,136 S | 8/2018 | Takai | |
| D825,886 S | 8/2018 | Jaeger | |
| D841,281 S | 2/2019 | Safford | |
| D842,551 S | 3/2019 | Fei | |
| 10,238,159 B2 | 3/2019 | Hull | |
| D850,756 S | 6/2019 | Plant | |
| 10,390,575 B2 | 8/2019 | Hull | |
| D873,500 S | 1/2020 | Champagne | |
| 10,602,787 B2 | 3/2020 | Hull | |
| 10,602,788 B2 | 3/2020 | Hull | |
| D880,756 S | 4/2020 | Cornelissen | |
| D880,813 S | 4/2020 | Butts | |
| D886,408 S | 6/2020 | Roost | |
| D890,999 S | 7/2020 | Hull | |
| D893,129 S | 8/2020 | Hull | |
| 10,750,802 B2 | 8/2020 | Hull | |
| D894,526 S | 9/2020 | Hull | |
| D895,228 S | 9/2020 | Hull | |
| 10,806,196 B2 | 10/2020 | Hull | |
| 10,820,639 B2 | 11/2020 | Hull | |
| 10,820,640 B2 | 11/2020 | Hull | |
| 10,869,512 B2 | 12/2020 | Hull | |
| D910,930 S | 2/2021 | Hull | |
| 10,993,488 B1 | 5/2021 | Chou | |
| 11,071,338 B2 | 7/2021 | Hull | |
| D927,083 S | 8/2021 | Hull | |
| D927,792 S | 8/2021 | Hull | |
| D928,416 S | 8/2021 | Hull | |
| 11,172,714 B2 | 11/2021 | Hull | |
| D938,658 S | 12/2021 | Hull | |
| 11,197,509 B2 | 12/2021 | Hull | |
| 11,825,893 B2 | 11/2023 | Hull et al. | |
| 2001/0018095 A1 | 8/2001 | Shlenker | |
| 2002/0166156 A1 | 11/2002 | Clark | |
| 2003/0118761 A1 | 6/2003 | Triebes | |
| 2003/0118837 A1 | 6/2003 | Modha | |
| 2003/0221239 A1 | 12/2003 | Modha | |
| 2003/0226191 A1 | 12/2003 | Modha | |
| 2004/0092852 A1 | 5/2004 | Kruss | |
| 2004/0123370 A1 | 7/2004 | Polesuk | |
| 2005/0160516 A1 | 7/2005 | Price | |
| 2006/0020425 A1 | 1/2006 | Chang | |
| 2006/0041991 A1 | 3/2006 | Sim | |
| 2006/0143767 A1 | 7/2006 | Yang | |
| 2006/0150300 A1 | 7/2006 | Hassan | |
| 2006/0212991 A1 | 9/2006 | Noreen | |
| 2007/0006363 A1 | 1/2007 | Kim | |
| 2007/0245453 A1 | 10/2007 | Dolenak | |
| 2007/0277288 A1 | 12/2007 | Sing | |
| 2008/0022436 A1 | 1/2008 | Hull | |
| 2008/0022919 A1 | 1/2008 | Ohnstad | |
| 2008/0092261 A1 | 4/2008 | Yu | |
| 2008/0162382 A1 | 7/2008 | Clayton | |
| 2009/0070917 A1* | 3/2009 | Shoemaker | A41D 19/01582 2/161.1 |
| 2009/0139007 A1 | 6/2009 | Bevier | |
| 2009/0139010 A1 | 6/2009 | Bevier | |
| 2009/0281470 A1 | 11/2009 | Sandusky | |
| 2010/0024095 A1* | 2/2010 | Gellis | B29C 45/14 2/167 |
| 2010/0132087 A1 | 6/2010 | Gait | |
| 2010/0257656 A1* | 10/2010 | Hull | A41D 19/0003 2/163 |
| 2010/0257657 A1 | 10/2010 | Hamann | |
| 2011/0030121 A1 | 2/2011 | Smalls | |
| 2011/0090050 A1 | 4/2011 | Macfarland | |
| 2011/0145967 A1 | 6/2011 | Hull | |
| 2012/0005807 A1 | 1/2012 | Hull | |
| 2012/0036612 A1* | 2/2012 | Hull | A41D 19/0003 2/163 |
| 2012/0054942 A1 | 3/2012 | Kim | |
| 2012/0124714 A1 | 5/2012 | Hamann | |
| 2012/0137402 A1 | 6/2012 | Kantrowitz | |
| 2013/0025024 A1 | 1/2013 | Hull | |
| 2013/0031696 A1 | 2/2013 | Jundt | |
| 2013/0067635 A1 | 3/2013 | Lin | |
| 2013/0091618 A1 | 4/2013 | Tanaka | |
| 2013/0196066 A1 | 8/2013 | Hull | |
| 2013/0239291 A1 | 9/2013 | Harris | |
| 2013/0283497 A1* | 10/2013 | Tamaribuchi | A41D 19/01547 2/159 |
| 2013/0291282 A1 | 11/2013 | Anstey | |
| 2013/0298308 A1 | 11/2013 | George | |
| 2014/0150708 A1 | 6/2014 | Riekie | |
| 2014/0259283 A1 | 9/2014 | Govindasamy | |
| 2015/0136014 A1 | 5/2015 | Peruzzaro | |
| 2015/0150322 A1 | 6/2015 | Fraga-Rosenfeld | |
| 2015/0164160 A1 | 6/2015 | Furlong | |
| 2015/0189932 A1 | 7/2015 | Champagne et al. | |
| 2016/0120242 A1 | 5/2016 | Thompson et al. | |
| 2016/0128400 A1 | 5/2016 | Cookus | |
| 2016/0143379 A1 | 5/2016 | Hull | |
| 2017/0127739 A1 | 5/2017 | Bailey | |
| 2017/0142931 A1 | 5/2017 | Michaelson | |
| 2017/0231705 A1 | 8/2017 | Madison | |
| 2017/0295868 A1 | 10/2017 | Yahnite | |
| 2017/0318879 A1 | 11/2017 | Gleser | |
| 2017/0348065 A1 | 12/2017 | Bluecher | |
| 2018/0027902 A1 | 2/2018 | Thompson | |
| 2018/0125130 A1 | 5/2018 | Ju | |
| 2018/0125132 A1 | 5/2018 | Wong | |
| 2018/0263315 A1 | 9/2018 | Visokey | |
| 2018/0360143 A1 | 12/2018 | Williams | |
| 2019/0069618 A1 | 3/2019 | Williams | |
| 2019/0104783 A1 | 4/2019 | Hull | |
| 2019/0104784 A1 | 4/2019 | Hull et al. | |
| 2019/0183193 A1 | 6/2019 | Sorrels | |
| 2019/0191955 A1 | 6/2019 | Ji | |
| 2019/0254368 A1 | 8/2019 | Gleser | |
| 2019/0289931 A1 | 9/2019 | Chen | |
| 2019/0343200 A1 | 11/2019 | Cai | |
| 2019/0357610 A1 | 11/2019 | Hull | |
| 2019/0387820 A1 | 12/2019 | Gellis | |
| 2019/0388170 A1 | 12/2019 | Bluecher et al. | |
| 2020/0000161 A1 | 1/2020 | Rudolph | |
| 2020/0128890 A1 | 4/2020 | Fernando | |
| 2020/0138131 A1 | 5/2020 | Anstey | |
| 2020/0170320 A1 | 6/2020 | Robert | |
| 2020/0170321 A1 | 6/2020 | Hull | |
| 2020/0170322 A1 | 6/2020 | Hull | |
| 2020/0345127 A1 | 11/2020 | Brown | |
| 2020/0375285 A1* | 12/2020 | Anstey | A41D 19/002 |

FOREIGN PATENT DOCUMENTS

| | | | |
|---|---|---|---|
| WO | 199619531 A1 | 6/1996 | |
| WO | 2013186741 | 12/2013 | |
| WO | 2017187209 A2 | 11/2017 | |
| WO | 2021045971 | 3/2021 | |

OTHER PUBLICATIONS

SemperSure™ Nitrile, www.sempermedusa.com/products/sempersure, Sempermed USA, Inc., 2 pages, document is undated but was publically available as of Aug. 18, 2014.

Nitrile Accelerator-Free Micro-Touch®, www.ansell.be/medical/pdf/gloves/EN/Micro-Touch%20Nitrile%20Accelerator-Free.pdf, Ansell, 2 pages, document is undated but was publically available as of Aug. 18, 2014.

Accelerator-Free Nitrile Exam Gloves—A Better Alternative, http://hourglass-intl.com/2011/04/18/accelerator-free-nitrile-exam-gloves-a-better-alternative/, Hourglass International, 4 pages, Apr. 18, 2011.

New Glove Materials Make Nitrile Gloves Better, http://hourglass-intl.com/2011/01/24/new-glove-materials-make-nitrile-gloves-better/, Hourglass International, 2 pages, Jan. 24, 2011.

(56) References Cited

OTHER PUBLICATIONS

"BBQ Gloves—Best Heat Resistant BBQ Gloves" (HOWTOBBQRIGHT); (Online) <URL: https://howtobbqright.com/ https://www.youtube.com/watch?v=3VKpNXIK4Lo> Apr. 27, 2017 (Apr. 27, 2017) 0:00-2:01.

"BLADESTOP(TM)—Improving Bandsaw Safety for Industry Leading Meat Company" (Scott Automation + Robotics) (online) <URL: https://www.youtube.com/watch?v=53iT81Jsnho> Dec. 5, 2016 (Dec. 5, 2016) 0:00-4:39.

Salisbury Insulating Rubber Gloves (via LTL Utility Supply), available Nov. 19, 2013, [online], [site visited Sep. 23, 2015]. Available from internet, <URL: http://ltlutilitysupply.com/featured-products/salisbury-by-honeywell-insulating-rubbergloves.

Ansell Rubber Electrician Gloves, available Sep. 23, 2015, [online], [site visited Sep. 23, 2015]. Available from internet, <URL: http://industrialcatalogue.ansell.eu/electrician-class-00.

True Blues Household Gloves, available Feb. 27, 2008, [online], [site visited Sep. 23, 2015]. Available from internet, <URL: http:// www.amazon.com/Blues-Extra-Ultimate-Household-Gloves/dp/ B002BCCXZ0/ref=pd_sim_121_2?ie=UTF8&refRID= 0490X0SSAS84HC4BBCTN.

Ansell Class 00 Rubber Lineman's Gloves, available Sep. 23, 2015, [online], [site visited Sep. 23, 2015]. Available from internet, <URL: http://www.mscdirect.com/product/details/42905281.

Salisbury Insulating Rubber Gloves, available Mar. 17, 2015, [online], [site visited Sep. 23, 2015]. Available from internet, <URL: http:// legionsafety.com/salisbury-class-0-insulating-rubber-electrical-gloves-html.

http://www.skis.com/Kombi-Glove-Protector---Kids-2013/ 11302P,default,pd.html—Kombi Glove Protector—Kids (online ski shop)—date printed: Apr. 16, 2013.

Salisbury Insulating Rubber Gloves, available Mar. 17, 2015, [online], [site visited Sep. 23, 2015]. Available from internet, <URL: http:// www.legionsafety.com/salisbury-class-00-insulating-rubber-gloves. html.

* cited by examiner

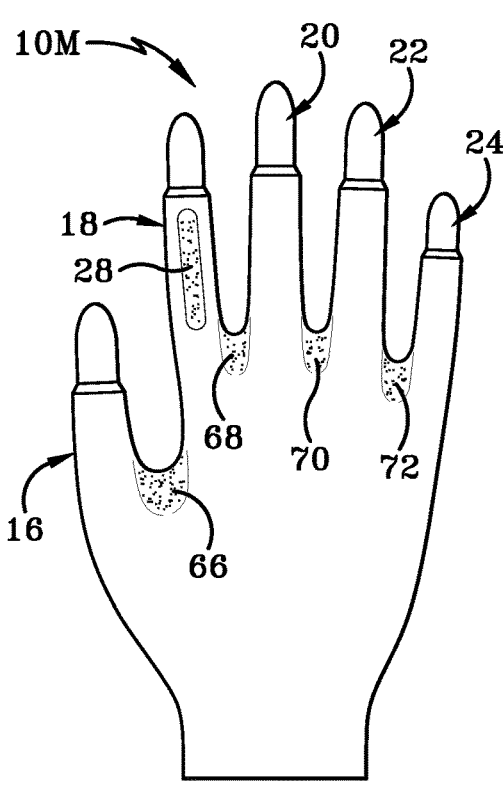
FIG.6M
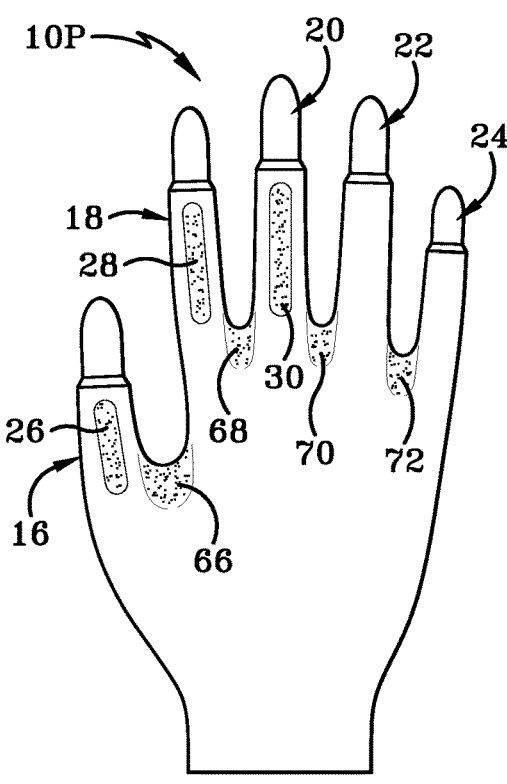
FIG.6P
FIG.6N
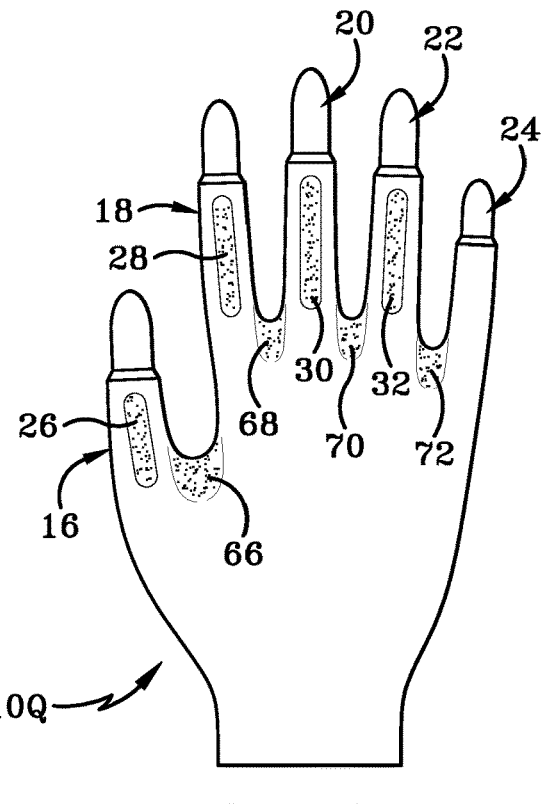
FIG.6Q

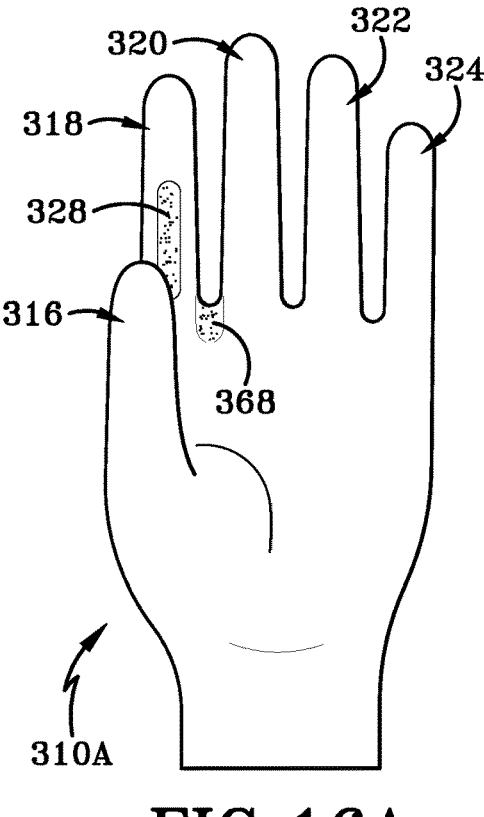
FIG.16A
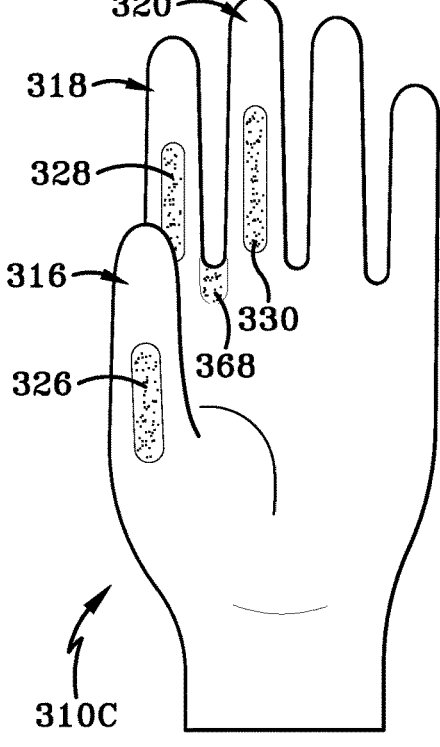
FIG.16C
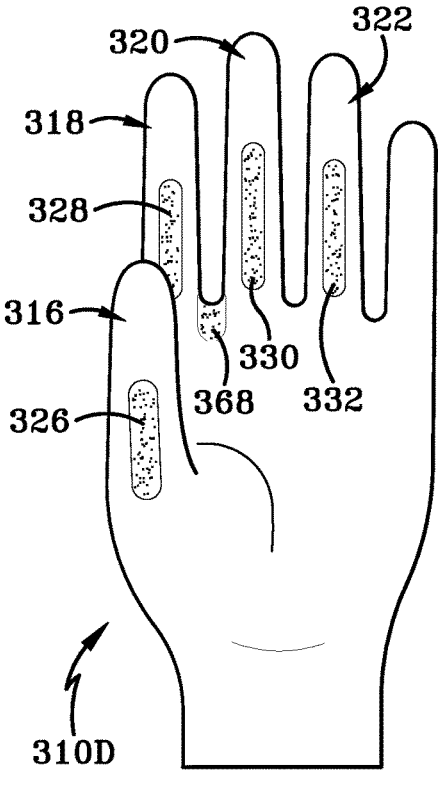
FIG.16B
FIG.16D

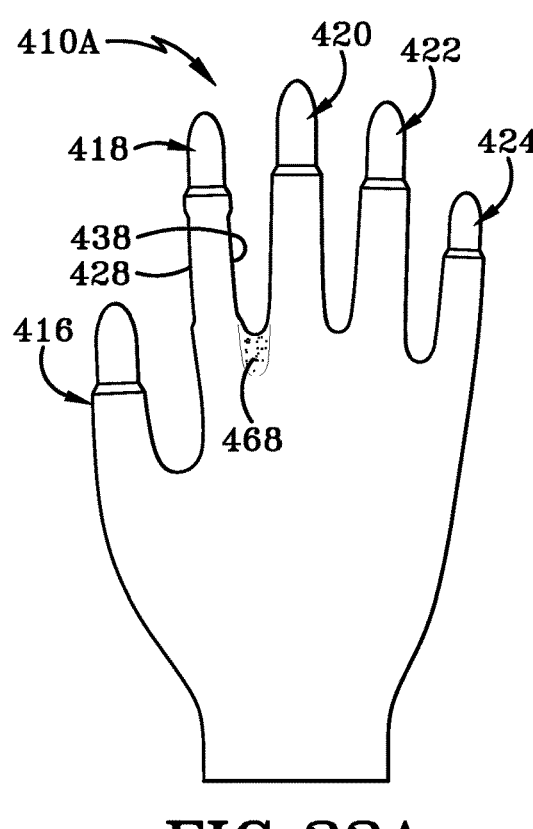
FIG.22A
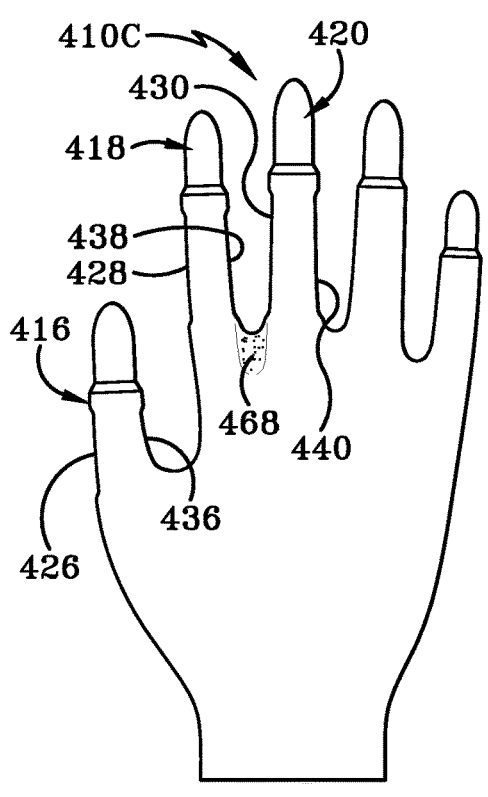
FIG.22C
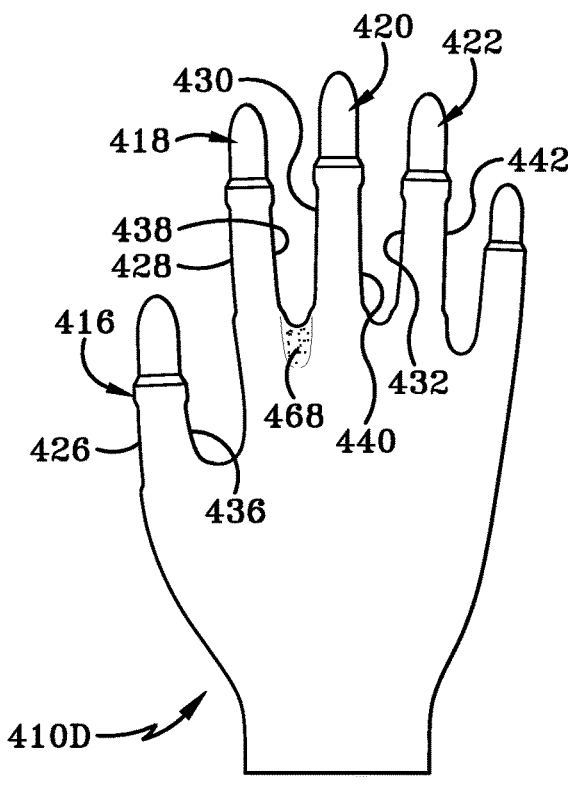
FIG.22B
FIG.22D

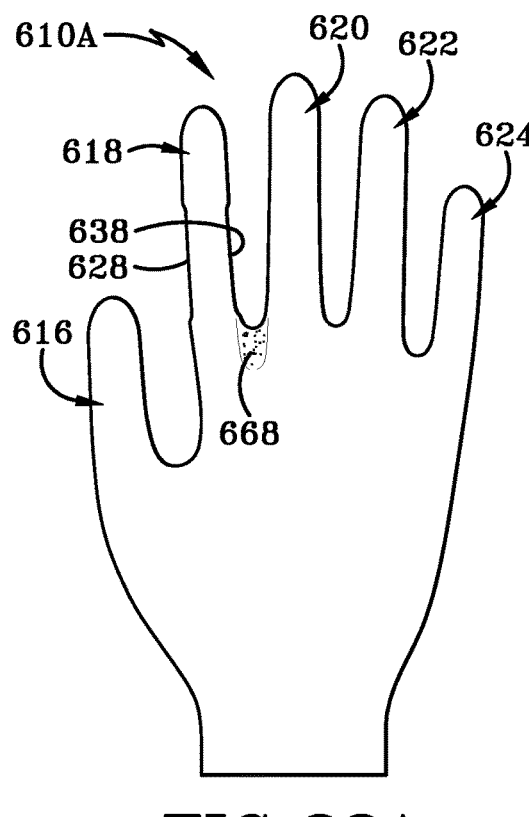
FIG.28A
FIG.28B
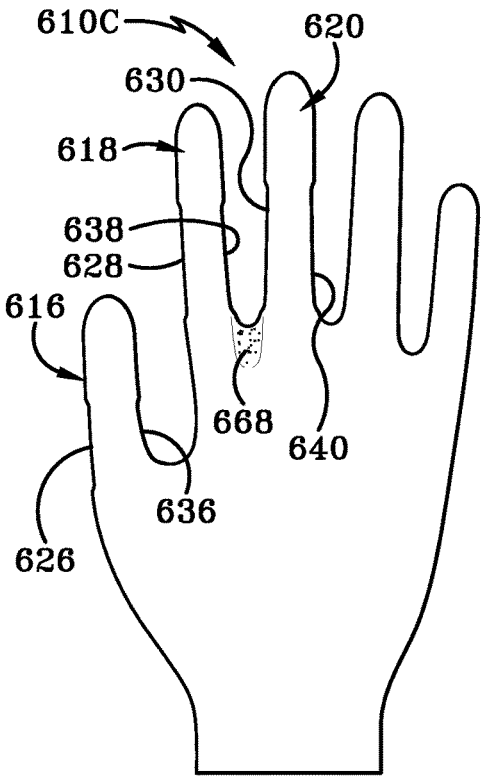
FIG.28C
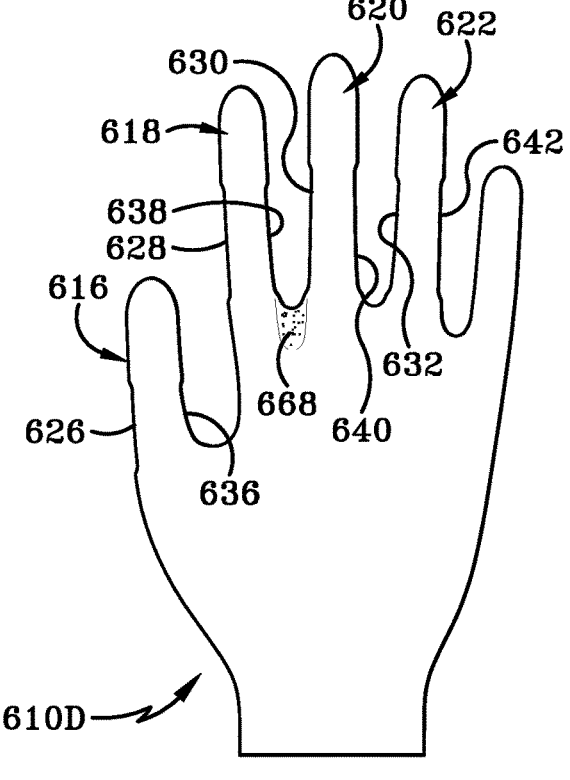
FIG.28D

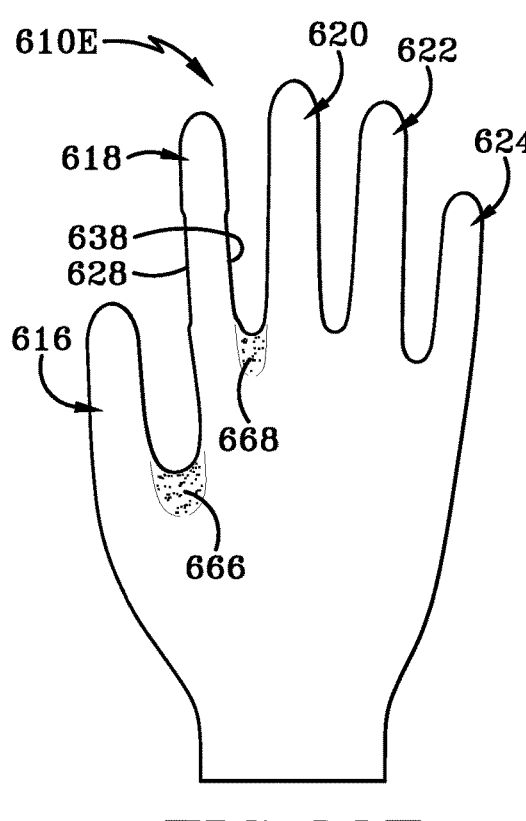
FIG.28E
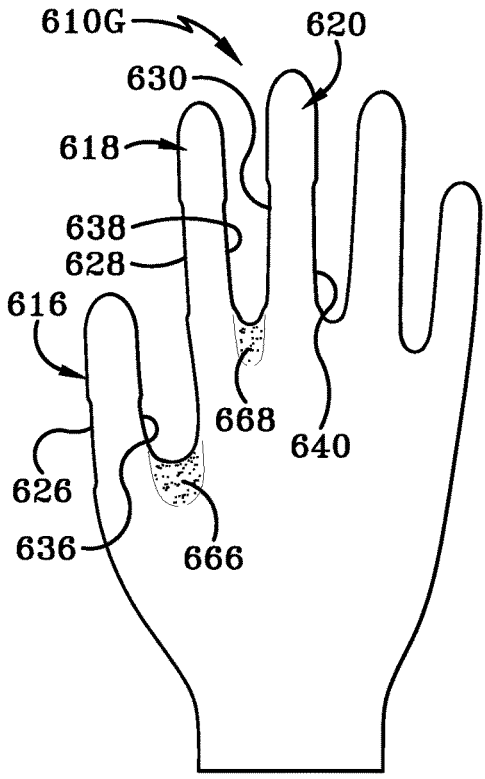
FIG.28G
FIG.28F
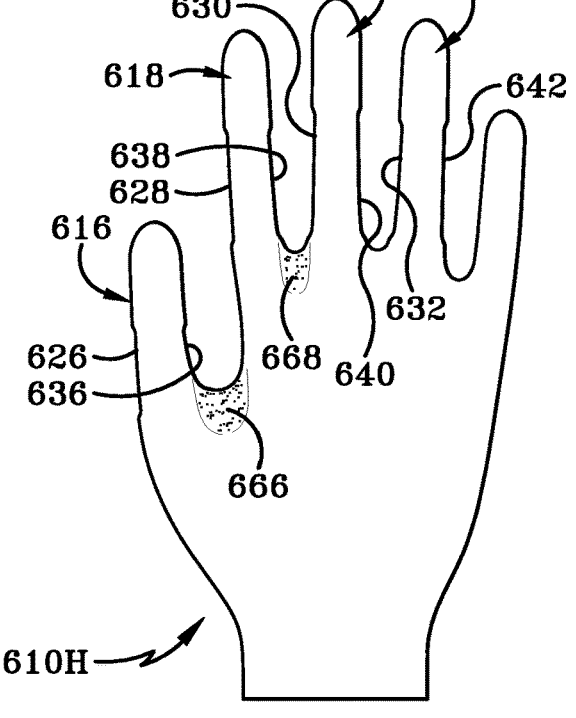
FIG.28H

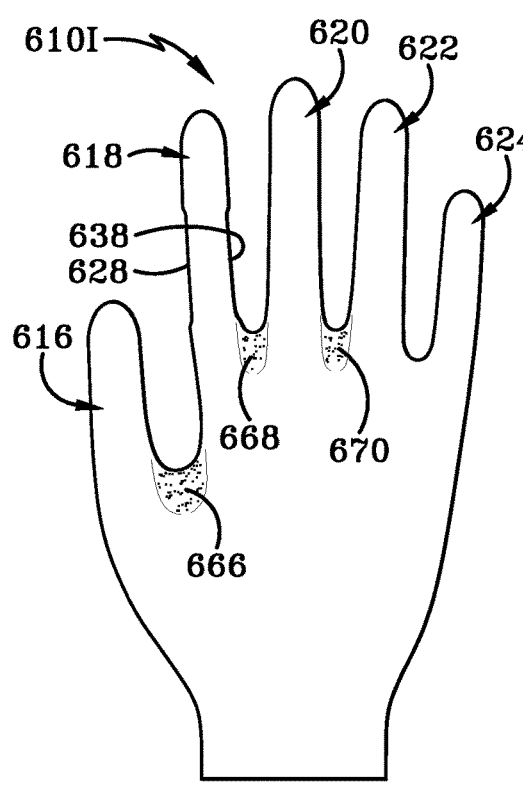
FIG.28I
FIG.28J
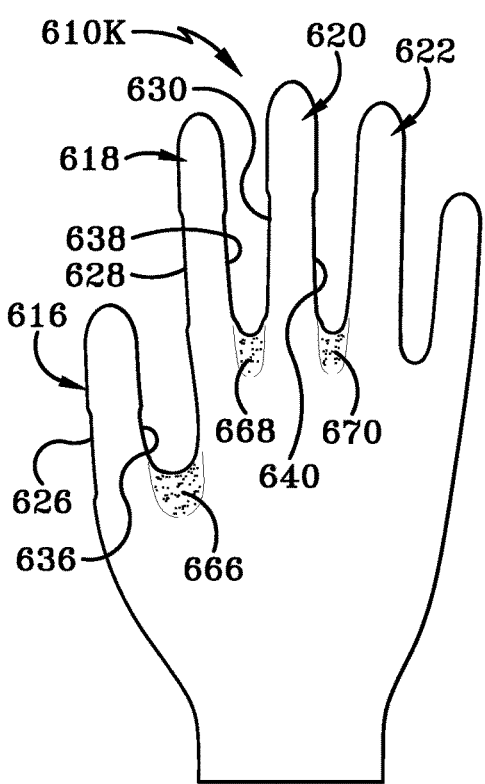
FIG.28K
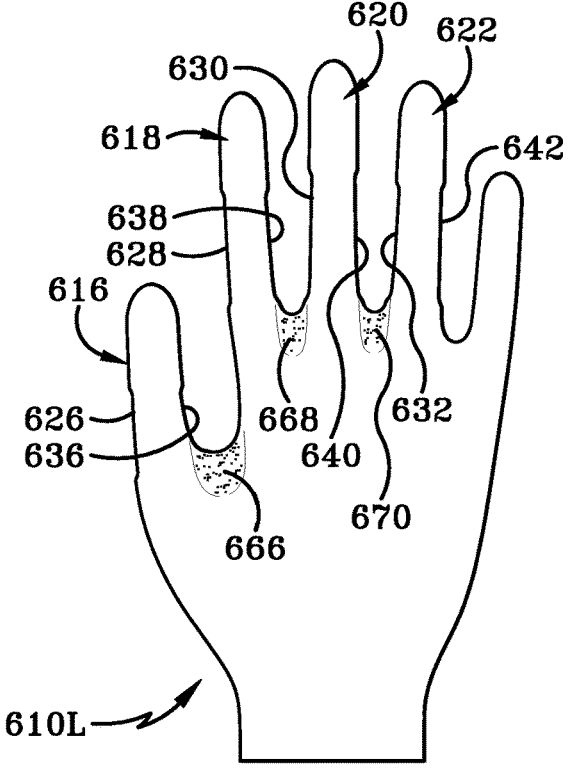
FIG.28L

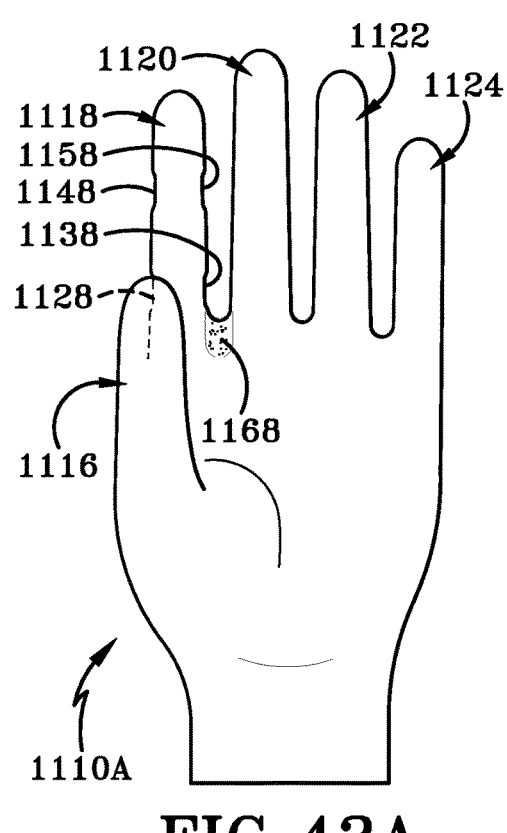
FIG.43A
FIG.43B
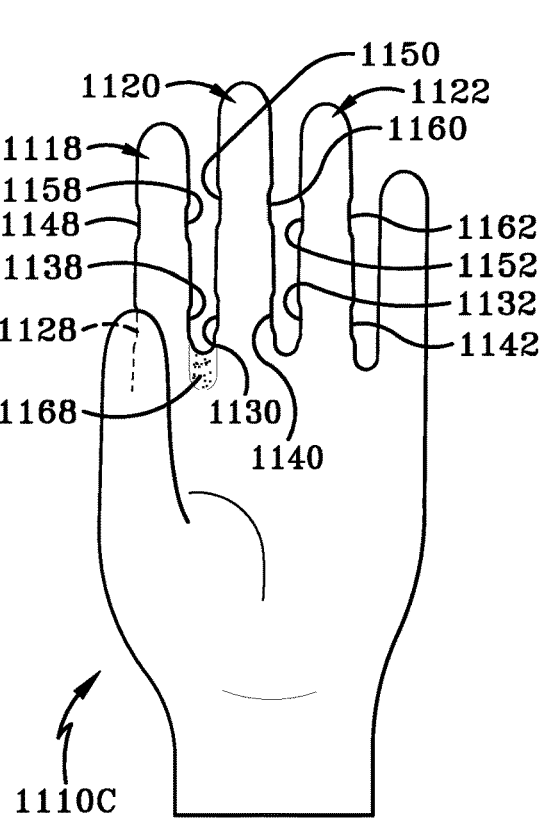
FIG.43C
FIG.43D

GLOVE WITH LONGITUDINAL FINGER STAYS AND TEXTURED FINGER AND THUMB CROTCHES

REFERENCE TO RELATED APPLICATIONS

This application is a Continuation-in-Part of U.S. application Ser. No. 18/191,047, filed Mar. 28, 2023, which is a Continuation-in-Part of U.S. application Ser. No. 17/540, 368, filed Dec. 2, 2021, which is a Continuation of U.S. application Ser. No. 16/787,560 filed Feb. 11, 2020, now U.S. Pat. No. 11,197,509, which is a Continuation of U.S. application Ser. No. 16/209,066 filed Dec. 4, 2018, now U.S. Pat. No. 10,602,787, which is a Continuation-in-Part of U.S. application Ser. No. 15/136,191 filed Apr. 22, 2016, now U.S. Pat. No. 10,390,575, which application claims the benefit of U.S. Provisional Application Ser. No. 62/152,302 filed Apr. 24, 2015. The entire disclosures of all of these applications are incorporated herein by reference in their entirety.

TECHNICAL FIELD

This disclosure is directed to gloves. More particularly, the disclosure relates to gloves for use in tasks which require dexterity and tactile sensitivity. Specifically, the present disclosure relates to a glove having at least one textured crotch area. Each textured crotch area is located between adjacent digit regions. The glove further includes at least one gripping zone in one or more digit regions of the glove. Each gripping zone locally reduces the circumference of the associated digit region such that there is direct contact between the gripping zone and the user's finger or thumb received in an interior of the digit region. During use of the glove, the frictional contact between the at least one gripping zone and the user's skin helps to prevent relative movement between the digit region and the user's finger or thumb.

BACKGROUND ART

Nitrile or nitrile rubber gloves are well known for use in the medical field. One of the problems with previously known medical gloves is that tactile sensitivity and dexterity may be reduced or lost because of the presence of glove material between the user's sensitive fingertips and the patient or equipment contacted with the user's gloved hand. If surgical gloves are worn for a long period of time there is a tendency for the glove to stretch. The stretching can result in the gloves losing their ability to cling to the user's hand and, more particularly, to the user's fingertips. When the glove material stretches and stops clinging tightly to the user thumb or fingers, the glove material can tend to slide along the length of the thumb or fingers. There is therefore a tendency for the user's tactile sensitivity and finger dexterity to deteriorate over the course of a few hours while wearing the gloves.

SUMMARY OF THE INVENTION

A glove is disclosed herein which includes a plurality of digit regions with adjacent digit regions connected to one another by arcuate crotch areas. The glove has one or more gripping zones formed in one or more of the digit regions. The gripping zones frictionally grip a user's thumb or finger when the glove is worn and as a result, the digit regions tend to remain in clinging-engagement with the user's hand during use of the glove. Tactile sensitivity and finger dexterity while wearing the glove is therefore maintained for a longer period of time relative to previously-known gloves. The glove also includes one or more crotch areas which are textured, particularly through a micro-etching process. The texturing helps to strengthen the crotch areas of the glove and thereby decreases the possibility of glove failure in the crotch regions.

The glove according to the present disclosure includes a wrist region, a palm region extending outwardly from the wrist region, and a plurality of digit regions extending outwardly from the palm region. Each digit region has a longitudinal axis extending from a tip of the digit region to the palm region of the glove. An interior cavity is bounded and defined by the wrist region, the palm region, and the plurality of digit regions. The interior cavity is accessible via an opening defined by the wrist region.

In one aspect, an exemplary embodiment of the present disclosure may provide a glove comprising a wrist region; a palm region extending outwardly from the wrist region; a plurality of digit regions extending outwardly from the palm region; at least one gripping zone provided on at least one digit region of the plurality of digit regions; and at least one crotch area defined between two adjacent digit regions of the plurality of digit regions, and wherein a texture is provided on the at least one crotch area.

In one embodiment, the texture of the at least one crotch area may be provided on an exterior of an arcuate surface extending between opposed side surfaces of the two adjacent digit regions. In one embodiment, the two adjacent digit regions includes a first digit region and a second digit region, wherein the texture of the at least one crotch area may extend along part of an exterior of a side surface of the first digit region and part of an exterior of a side surface of the second digit region. In one embodiment, the texture of the at least one crotch area may extend at least partially onto an exterior of a front of the palm region. In one embodiment, the texture of the at least one crotch area may extend at least partially onto an exterior of a back of the palm region. In one embodiment, the at least one crotch area may be textured through a micro-etching process. In one embodiment, the at least one crotch area may be textured with a pattern. In one embodiment, the pattern may be a sand pattern.

In one embodiment, the plurality of digit regions includes a thumb region, an index finger region, a middle finger region, a ring finger region, and a little finger region; and wherein the at least one crotch area comprises a first crotch area located between the thumb region and the index finger region. In one embodiment, the at least one crotch area includes a second crotch area located between the index finger region and the middle finger region. In one embodiment, the at least one crotch area includes a third crotch area located between the middle finger region and the ring finger region. In one embodiment, the at least one crotch area includes a fourth crotch area located between the ring finger region and the little finger region.

In one embodiment, the at least one gripping zone may be oriented substantially parallel to an imaginary longitudinal axis of the at least one digit region, wherein the imaginary longitudinal axis extends from a tip of the at least one digit region to the palm region. In one embodiment, the at least one gripping zone comprises a concave indentation formed in the at least one digit region. In one embodiment, the concave indentation is of a length extending parallel to the imaginary longitudinal axis and extends for a circumferential distance along a circumference of the at least one digit region, where the circumference is orthogonal to the imaginary longitudinal axis; and wherein the length of the concave indentation is greater than the circumferential distance. In one embodiment, the concave indentation projects into an interior cavity defined by the at least one digit region and is configured to frictionally engage a person's finger or thumb received within the interior cavity. In one embodiment, the at least one gripping zone is provided in one or both of a front and a back of the at least one digit region. In one embodiment, the at least one gripping zone is provided in one or both of a first side and a second side of the at least one digit region. In one embodiment, the glove may further include texturing of an exterior surface of the at least one gripping zone. In one embodiment, the texturing of the at least one gripping zone is applied through micro-etching.

In one aspect, an exemplary embodiment of the present disclosure may provide a method comprising forming a glove having a wrist region, a palm region, and a plurality of digit regions, wherein adjacent digit regions of the plurality of digit regions include a crotch area; forming an indentation in at least one digit region of the plurality of digit regions and reducing a circumference of the at least one digit region, wherein the circumference intersects the indentation; and texturing the crotch area. In one embodiment, the method may further comprise texturing an exterior surface of the glove along the indentation. In one embodiment, the method may further comprise texturing the exterior surface of the glove along the indentation and the texturing of the crotch area is accomplished through a same process.

In one aspect, an exemplary embodiment of the present disclosure may provide a glove comprising a wrist region; a palm region extending outwardly from the wrist region; a plurality of digit regions extending outwardly from the palm region; and at least one crotch area defined between two adjacent digit regions of the plurality of digit regions, and wherein a texture is provided on the at least one crotch area.

In one aspect, an exemplary embodiment of the present disclosure may provide a method comprising forming a glove having a wrist region, a palm region, and a plurality of digit regions, wherein adjacent digit regions of the plurality of digit regions include a crotch area; and texturing the crotch area. In one embodiment, texturing the crotch area may comprise micro-etching an exterior surface of the glove in the crotch area. In one embodiment, the method may further comprise forming an indentation in at least one digit region of the plurality of digit regions; and reducing a circumference in the at least one digit regions, where the circumference intersects the indentation. In one embodiment, the method may further comprise texturing an exterior surface of the glove along the indentation. In one embodiment texturing the exterior surface of the glove along the indentation and the texturing of the crotch area may be accomplished through a same process, such as by micro-etching.

BRIEF DESCRIPTION OF THE DRAWINGS

Sample embodiments of the present disclosure are set forth in the following description, are shown in the drawings and are particularly and distinctly pointed out and set forth in the appended claims.

FIG. 6E is a front elevation view of a sixth example of the first embodiment of a glove in accordance with an aspect of the present disclosure, where the glove is an ambidextrous glove having a gripping zone on only the index finger region, and having a textured first and second crotch area;

FIG. 6F is a front elevation view of a seventh example of the first embodiment, where the glove is an ambidextrous glove having a gripping zone on each of the thumb region and index finger region, and having a textured first and second crotch area;

FIG. 6G is a front elevation view of a eighth example of the first embodiment where the glove is an ambidextrous glove having a gripping zone on each of the thumb region, the index finger region and the middle finger region, and having a textured first and second crotch area;

FIG. 6H is a front elevation view of a ninth example of the first embodiment where the glove is an ambidextrous glove that has a gripping zone on each of the thumb region, the index finger region, the middle finger region, and the ring finger region, and having a textured first and second crotch area;

FIG. 6I is a front elevation view of a tenth example of the first embodiment of a glove in accordance with an aspect of the present disclosure, where the glove is an ambidextrous glove having a gripping zone on only the index finger region, and having a textured first, second, and third crotch area;

FIG. 6J is a front elevation view of an eleventh example of the first embodiment, where the glove is an ambidextrous glove having a gripping zone on each of the thumb region and index finger region, and having a textured first, second, and third crotch area;

FIG. 6K is a front elevation view of a twelfth example of the first embodiment where the glove is an ambidextrous glove having a gripping zone on each of the thumb region, the index finger region and the middle finger region, and having a textured first, second, and third crotch area;

FIG. 6L is a front elevation view of a thirteenth example of the first embodiment where the glove is an ambidextrous glove that has a gripping zone on each of the thumb region, the index finger region, the middle finger region, and the ring finger region, and having a textured first, second, and third crotch area;

FIG. 6M is a front elevation view of a fourteenth example of the first embodiment of a glove in accordance with an aspect of the present disclosure, where the glove is an ambidextrous glove having a gripping zone on only the index finger region, and having a textured first, second, third, and fourth crotch area;

FIG. 6N is a front elevation view of a fifteenth example of the first embodiment, where the glove is an ambidextrous glove having a gripping zone on each of the thumb region and index finger region, and having a textured first, second, third, and fourth crotch area;

FIG. 6P is a front elevation view of a sixteenth example of the first embodiment where the glove is an ambidextrous glove having a gripping zone on each of the thumb region, the index finger region and the middle finger region, and having a textured first, second, third, and fourth crotch area;

FIG. 6Q is a front elevation view of a seventeenth example of the first embodiment where the glove is an ambidextrous glove that has a gripping zone on each of the thumb region, the index finger region, the middle finger region, and the ring finger region, and having a textured first, second, third, and fourth crotch area;

FIG. 13A is a front elevation view of a second example of the third embodiment of a glove in accordance with an aspect of the present disclosure, where the glove is an ambidextrous glove having a gripping zone on only the index finger region, and showing a textured second crotch area;

FIG. 13B is a front elevation view of a third example of the third embodiment, where the glove is an ambidextrous glove having a gripping zone on each of the thumb region and index finger region, and showing a textured second crotch area;

FIG. 13C is a front elevation view of a fourth example of the third embodiment where the glove is an ambidextrous glove having a gripping zone on each of the thumb region, the index finger region and the middle finger region, and showing a textured second crotch area;

FIG. 13D is a front elevation view of a fifth example of the third embodiment where the glove is an ambidextrous glove that has a gripping zone on each of the thumb region, the index finger region, the middle finger region, and the ring finger region, and showing a textured second crotch area;

FIG. 13E is a front elevation view of a sixth example of the third embodiment of a glove in accordance with an aspect of the present disclosure, where the glove is an ambidextrous glove having a gripping zone on only the index finger region, and showing textured first and second crotch areas;

FIG. 13F is a front elevation view of a seventh example of the third embodiment, where the glove is an ambidextrous glove having a gripping zone on each of the thumb region and index finger region, and showing textured first and second crotch areas;

FIG. 13G is a front elevation view of an eighth example of the third embodiment where the glove is an ambidextrous glove having a gripping zone on each of the thumb region, the index finger region and the middle finger region, and showing textured first and second crotch areas;

FIG. 13H is a front elevation view of a ninth example of the third embodiment where the glove is an ambidextrous glove that has a gripping zone on each of the thumb region, the index finger region, the middle finger region, and the ring finger region, and showing textured first, second, and third crotch areas;

FIG. 13I is a front elevation view of a tenth example of the third embodiment of a glove in accordance with an aspect of the present disclosure, where the glove is an ambidextrous glove having a gripping zone on only the index finger region, and showing textured first, second, and third crotch areas;

FIG. 13J is a front elevation view of an eleventh example of the third embodiment, where the glove is an ambidextrous glove having a gripping zone on each of the thumb region and index finger region, and showing textured first, second, and third crotch areas;

FIG. 13K is a front elevation view of a twelfth example of the third embodiment where the glove is an ambidextrous glove having a gripping zone on each of the thumb region, the index finger region and the middle finger region, and showing textured first, second, and third crotch areas;

FIG. 13L is a front elevation view of a thirteenth example of the third embodiment where the glove is an ambidextrous glove that has a gripping zone on each of the thumb region, the index finger region, the middle finger region, and the ring finger region, and showing textured first, second, and third crotch areas;

FIG. 13M is a front elevation view of a fourteenth example of the third embodiment of a glove in accordance with an aspect of the present disclosure, where the glove is an ambidextrous glove having a gripping zone on only the index finger region, and showing textured first, second, third, and fourth crotch areas;

FIG. 13N is a front elevation view of a fifteenth example of the third embodiment, where the glove is an ambidextrous glove having a gripping zone on each of the thumb region and index finger region, and showing textured first, second, third, and fourth crotch areas;

FIG. 13P is a front elevation view of a sixteenth example of the third embodiment where the glove is an ambidextrous glove having a gripping zone on each of the thumb region, the index finger region and the middle finger region, and showing textured first, second, third, and fourth crotch areas;

FIG. 13Q is a front elevation view of a thirteenth example of the third embodiment where the glove is an ambidextrous glove that has a gripping zone on each of the thumb region, the index finger region, the middle finger region, and the ring finger region, and showing textured first, second, third, and fourth crotch areas;

FIG. 16A is a front elevation view of a second example of the fourth embodiment of a glove in accordance with an aspect of the present disclosure, where the glove is a hand-specific glove having a gripping zone on only the index finger region, and showing a textured second crotch area;

FIG. 16B is a front elevation view of a third example of the fourth embodiment, where the glove is a hand-specific glove having a gripping zone on each of the thumb region and index finger region, and showing a textured second crotch area;

FIG. 16C is a front elevation view of a fourth example of the fourth embodiment where the glove is a hand-specific glove having a gripping zone on each of the thumb region, the index finger region and the middle finger region, and showing a textured second crotch area;

FIG. 16D is a front elevation view of a fifth example of the fourth embodiment where the glove is a hand-specific glove that has a gripping zone on each of the thumb region, the index finger region, the middle finger region, and the ring finger region, and showing a textured second crotch area;

FIG. 22A is a front elevation view of a second example of the fifth embodiment of a glove in accordance with an aspect of the present disclosure, where the glove is an ambidextrous glove having a gripping zone on the sides of only the index finger region, and showing a textured second crotch area;

FIG. 22B is a front elevation view of a third example of the fifth embodiment, where the glove is an ambidextrous glove having a gripping zone on the sides of each of the thumb region and index finger region, and showing a textured second crotch area;

FIG. 22C is a front elevation view of a fourth example of the fifth embodiment where the glove is an ambidextrous glove having a gripping zone on each of the thumb region, the index finger region and the middle finger region, and showing a textured second crotch area;

FIG. 22D is a front elevation view of a fifth example of the fifth embodiment where the glove is an ambidextrous glove that has a gripping zone on each of the thumb region, the index finger region, the middle finger region, and the ring finger region, and showing a textured second crotch area;

FIG. 22E is a front elevation view of a sixth example of the fifth embodiment of a glove in accordance with an aspect of the present disclosure, where the glove is an ambidextrous glove having a gripping zone on the sides of only the index finger region, and showing a textured first and second crotch area;

FIG. 22F is a front elevation view of a seventh example of the fifth embodiment, where the glove is an ambidextrous glove having a gripping zone on the sides of each of the thumb region and index finger region, and showing a textured first and second crotch area;

FIG. 22G is a front elevation view of an eighth example of the fifth embodiment where the glove is an ambidextrous glove having a gripping zone on each of the thumb region, the index finger region and the middle finger region, and showing a textured first and second crotch area;

FIG. 22H is a front elevation view of a ninth example of the fifth embodiment where the glove is an ambidextrous glove that has a gripping zone on each of the thumb region, the index finger region, the middle finger region, and the ring finger region, and showing a textured first and second crotch area;

FIG. 22I is a front elevation view of a tenth example of the fifth embodiment of a glove in accordance with an aspect of the present disclosure, where the glove is an ambidextrous glove having a gripping zone on the sides of only the index finger region, and showing a textured first, second, and third crotch area;

FIG. 22J is a front elevation view of an eleventh example of the fifth embodiment, where the glove is an ambidextrous glove having a gripping zone on the sides of each of the thumb region and index finger region, and showing a textured first, second, and third crotch area;

FIG. 22K is a front elevation view of a twelfth example of the fifth embodiment where the glove is an ambidextrous glove having a gripping zone on each of the thumb region, the index finger region and the middle finger region, and showing a textured first, second, and third crotch area;

FIG. 22L is a front elevation view of a thirteenth example of the fifth embodiment where the glove is an ambidextrous glove that has a gripping zone on each of the thumb region, the index finger region, the middle finger region, and the ring finger region, and showing a textured first, second, and third crotch area;

FIG. 22M is a front elevation view of a fourteenth example of the fifth embodiment of a glove in accordance with an aspect of the present disclosure, where the glove is an ambidextrous glove having a gripping zone on the sides of only the index finger region, and showing a textured first, second, third, and fourth crotch area;

FIG. 22N is a front elevation view of a fifteenth example of the fifth embodiment, where the glove is an ambidextrous glove having a gripping zone on the sides of each of the thumb region and index finger region, and showing a textured first, second, third, and fourth crotch area;

FIG. 22P is a front elevation view of a sixteenth example of the fifth embodiment where the glove is an ambidextrous glove having a gripping zone on each of the thumb region, the index finger region and the middle finger region, and showing a textured first, second, third, and fourth crotch area;

FIG. 22Q is a front elevation view of a seventeenth example of the fifth embodiment where the glove is an ambidextrous glove that has a gripping zone on each of the thumb region, the index finger region, the middle finger region, and the ring finger region, and showing a textured first, second, third, and fourth crotch area;

FIG. 25M is a front elevation view of a fourteenth example of the sixth embodiment of a glove in accordance with an aspect of the present disclosure, where the glove is a hand-specific glove having a gripping zone on the sides of only the index finger region, and showing textured first, second, third, and fourth crotch areas;

FIG. 25N is a front elevation view of a fifteenth example of the sixth embodiment, where the glove is a hand-specific glove having a gripping zone on the sides of each of the thumb region and index finger region, and showing textured first, second, third, and fourth crotch areas;

FIG. 25P is a front elevation view of a sixteenth example of the sixth embodiment where the glove is a hand-specific glove having a gripping zone on the sides of each of the thumb region, the index finger region and the middle finger region, and showing textured first, second, third, and fourth crotch areas;

FIG. 25Q is a front elevation view of a seventeenth example of the sixth embodiment where the glove is a hand-specific glove that has a gripping zone on the sides of each of the thumb region, the index finger region, the middle finger region, and the ring finger region, and showing textured first, second, third, and fourth crotch areas;

Figure 26:
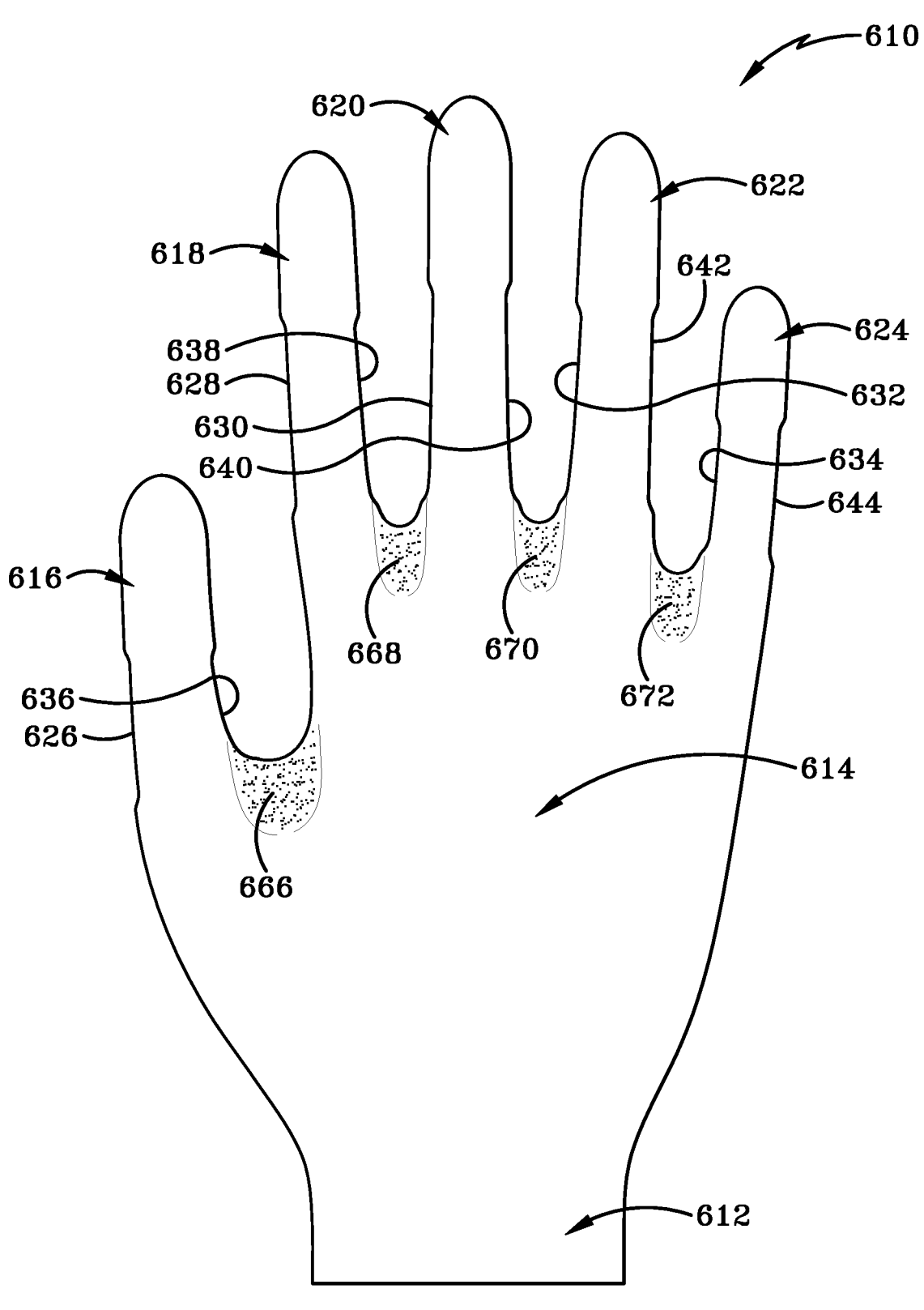
Figure 27:
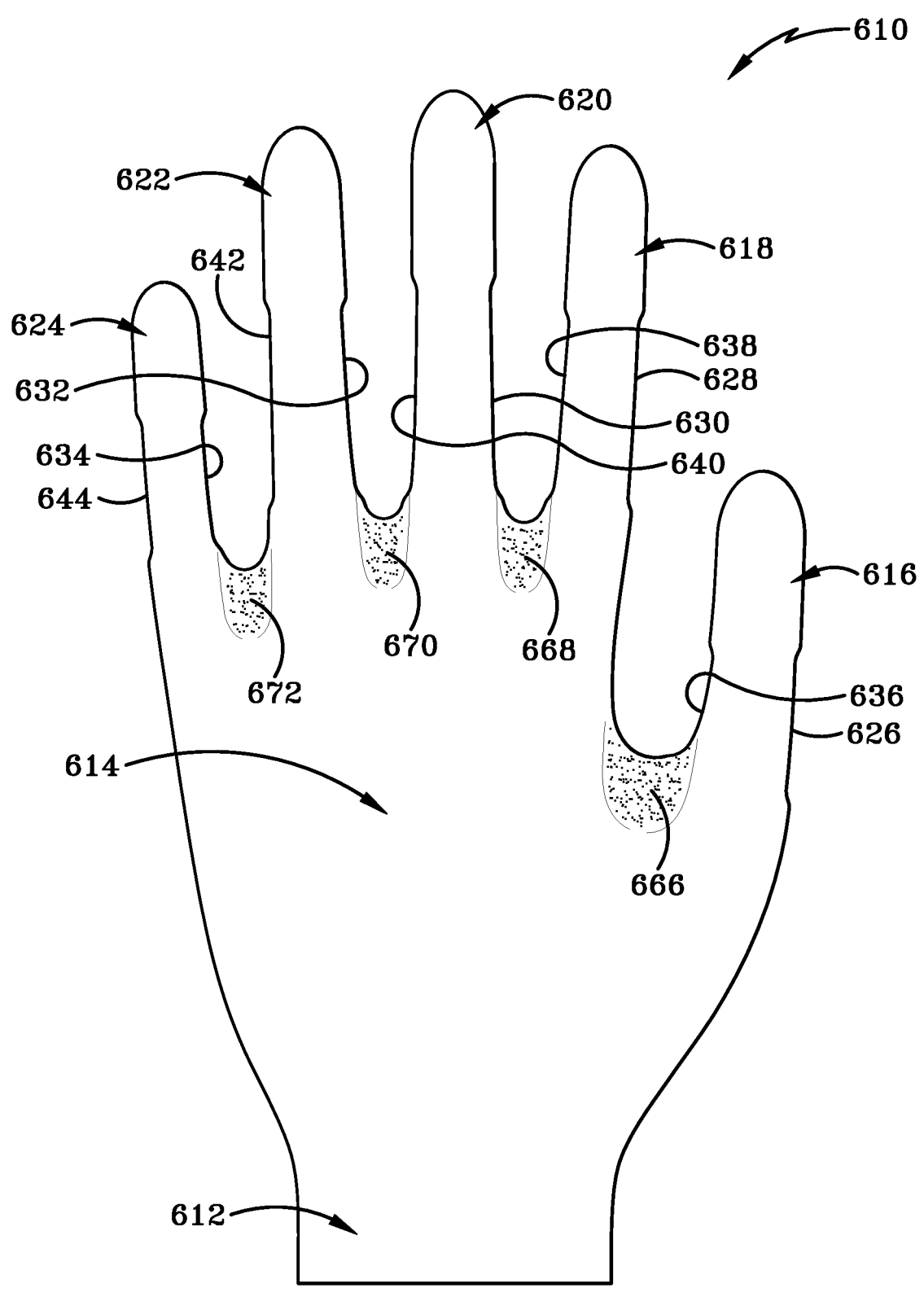
Figures 28M, 28N, 28P, 28Q:
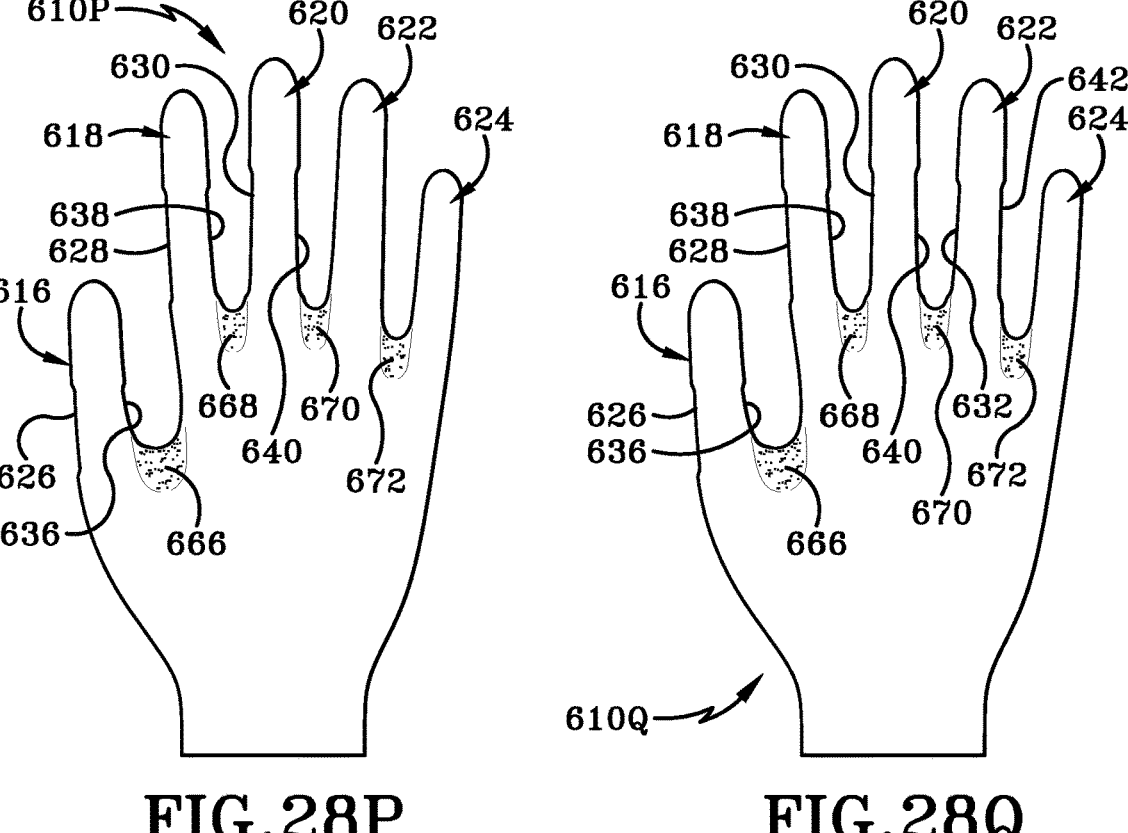
Figure 29:
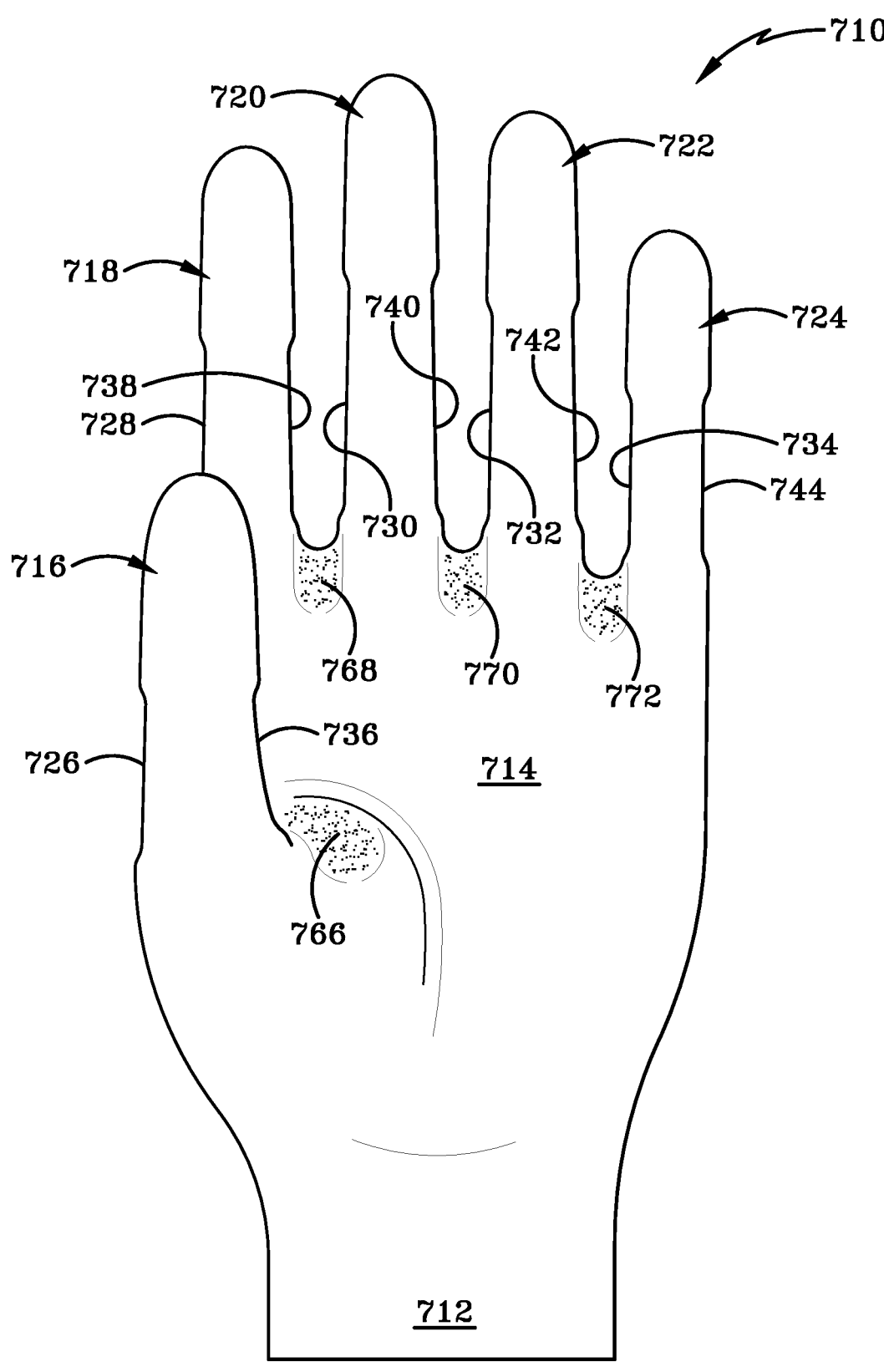
Figure 30:
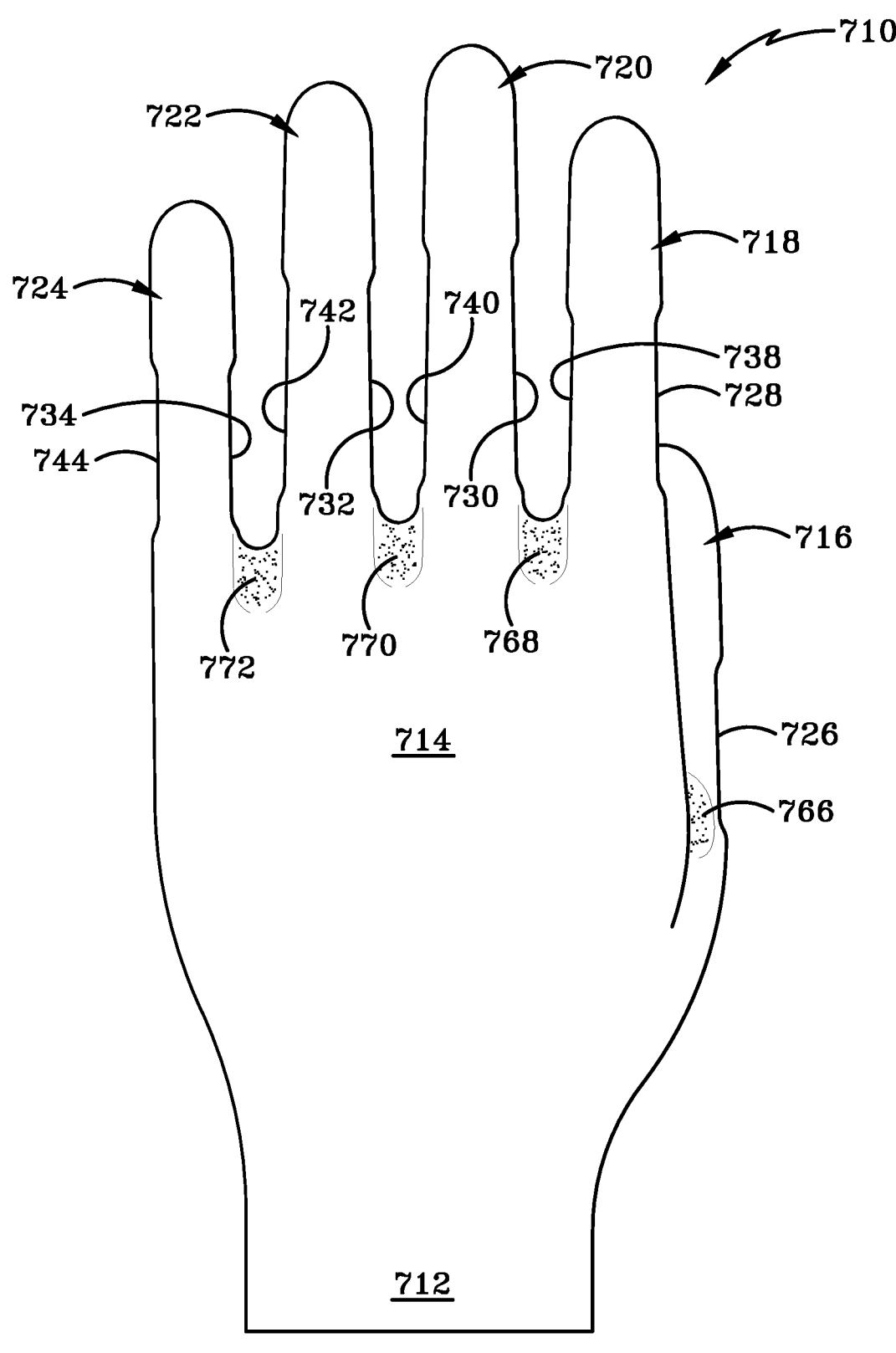
Figure 31A:
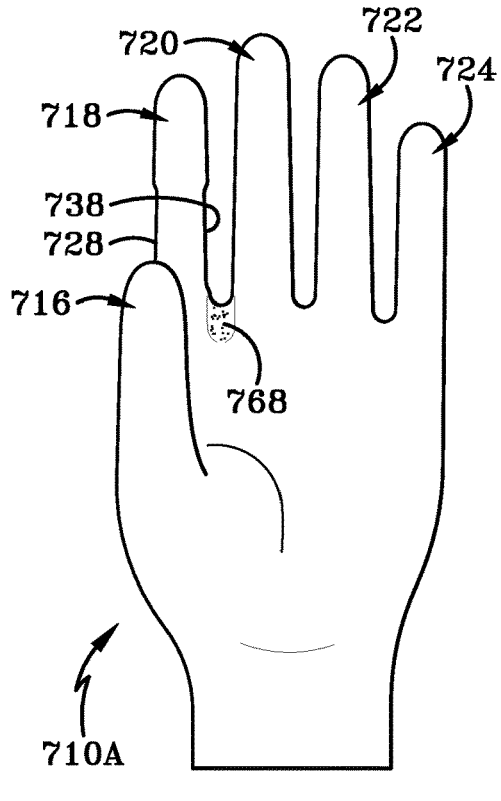
Figure 31B:
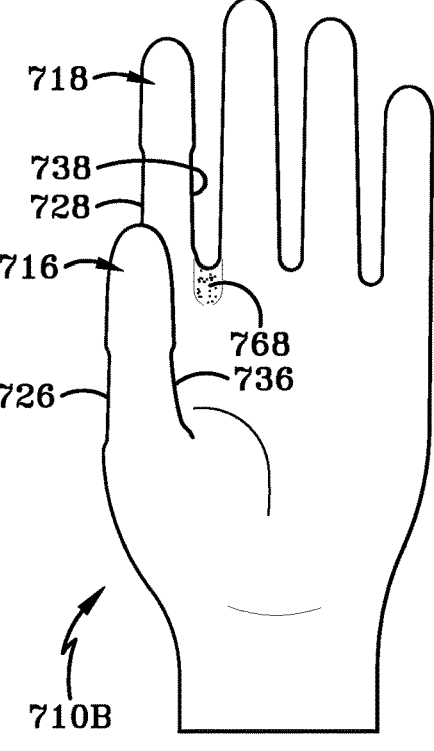
Figure 31C:
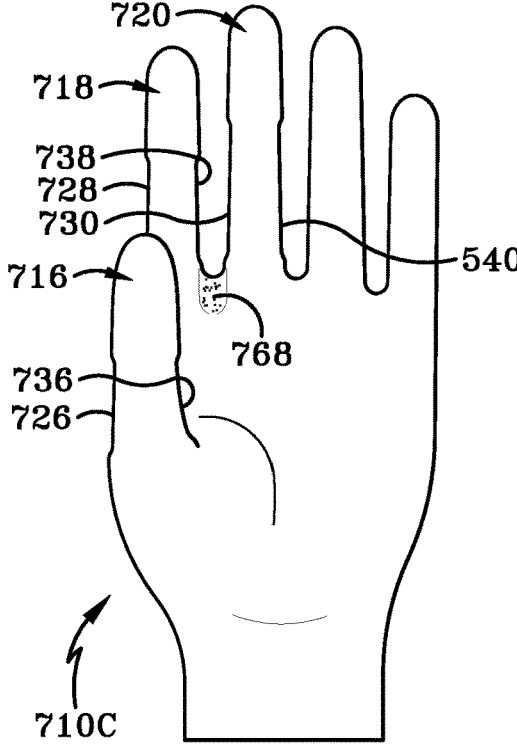
Figure 31D:
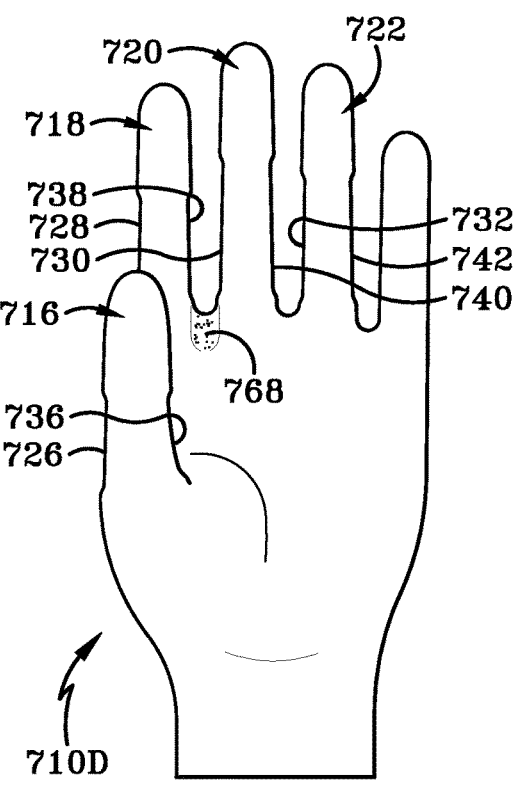
Figure 31E:
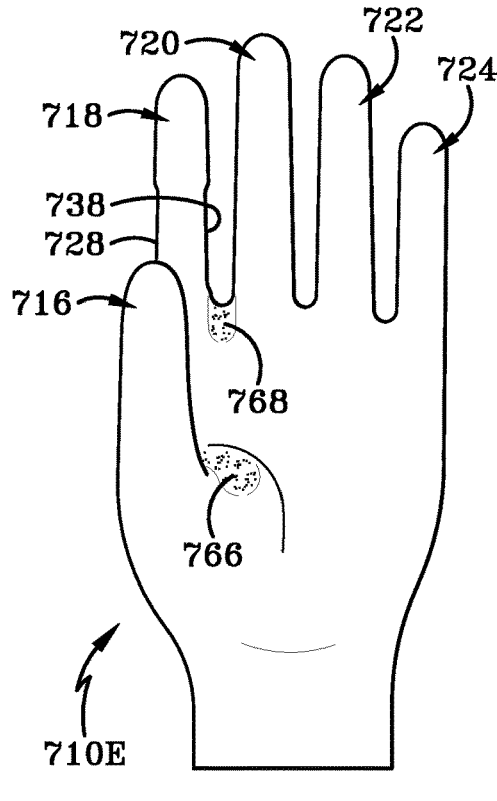
Figure 31F:
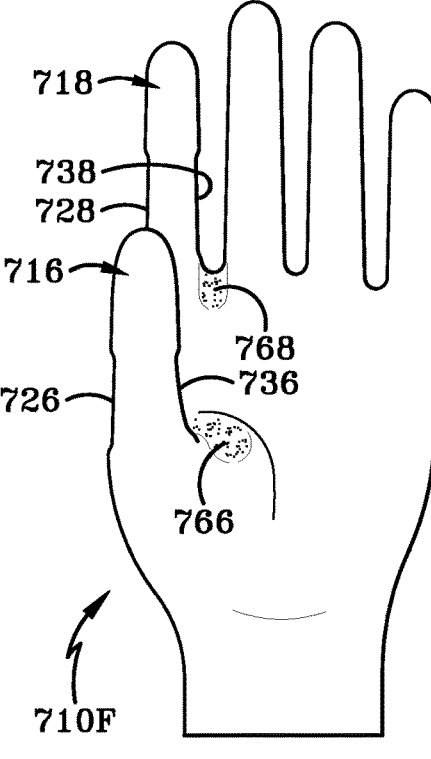
Figure 31G:
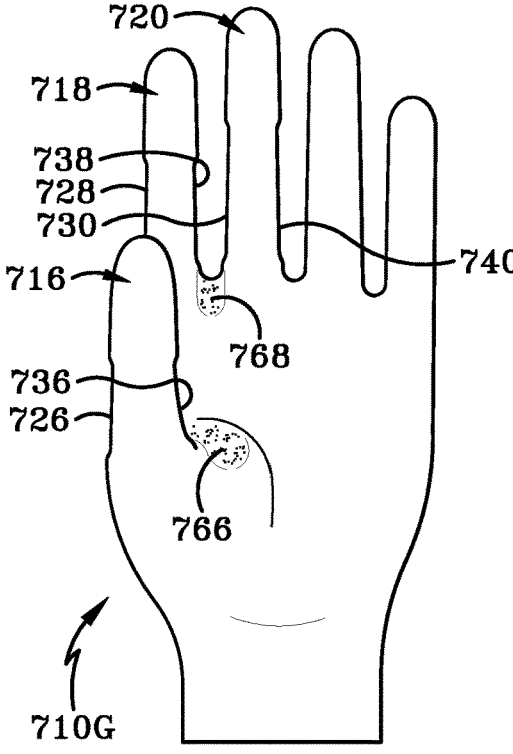
Figure 31H:
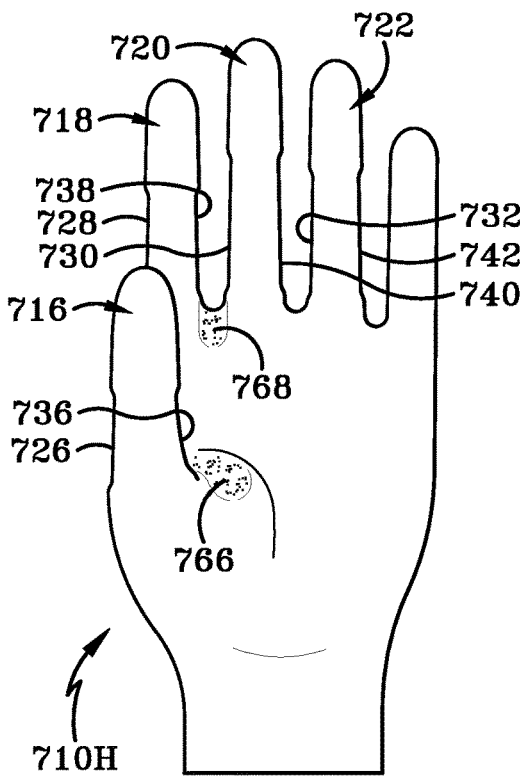
Figure 31I:
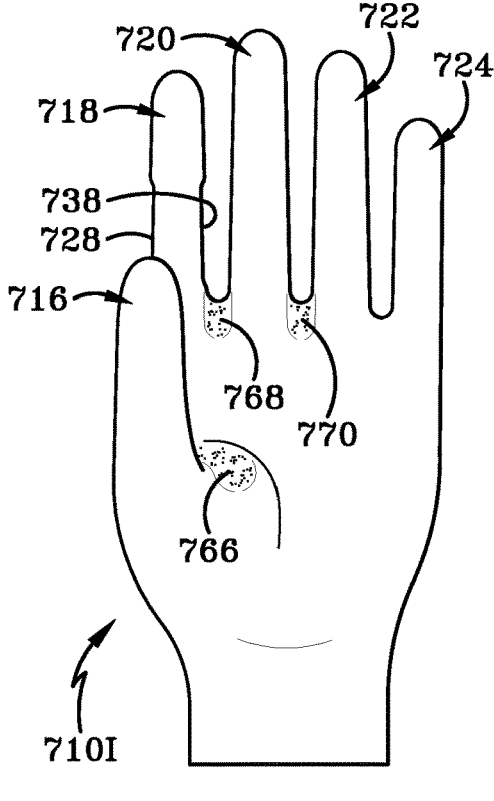
Figure 31J:
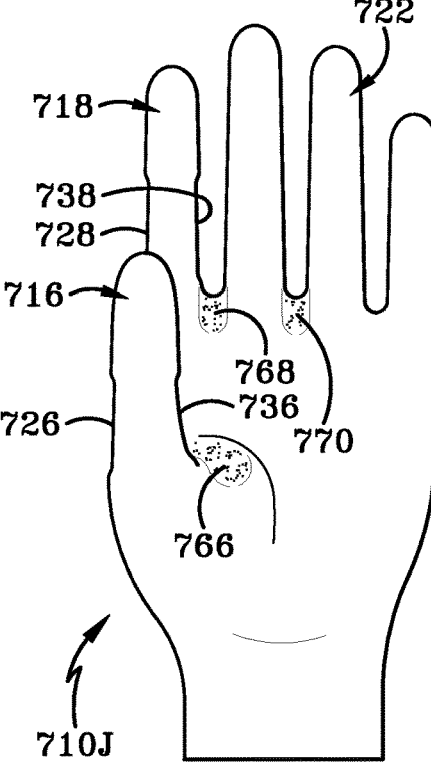
Figure 31K:
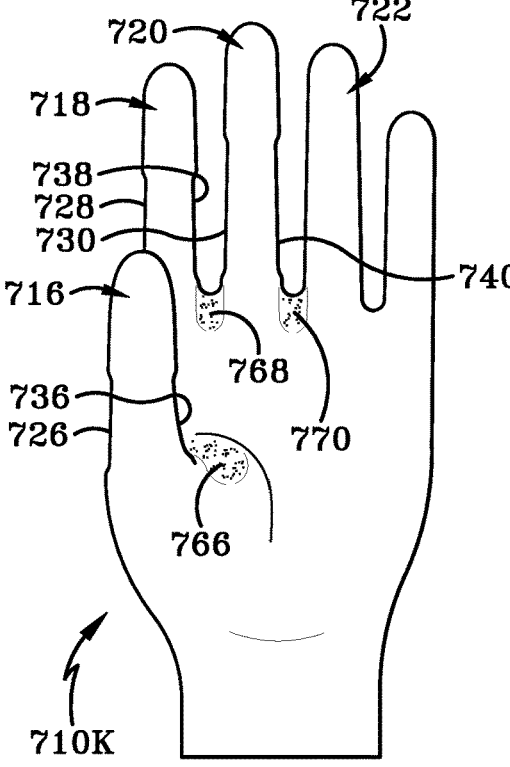
Figure 31L:
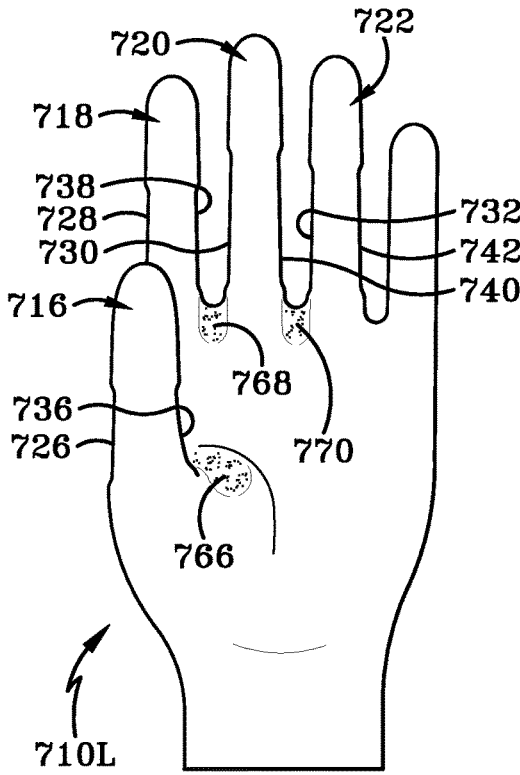
Figure 31M:
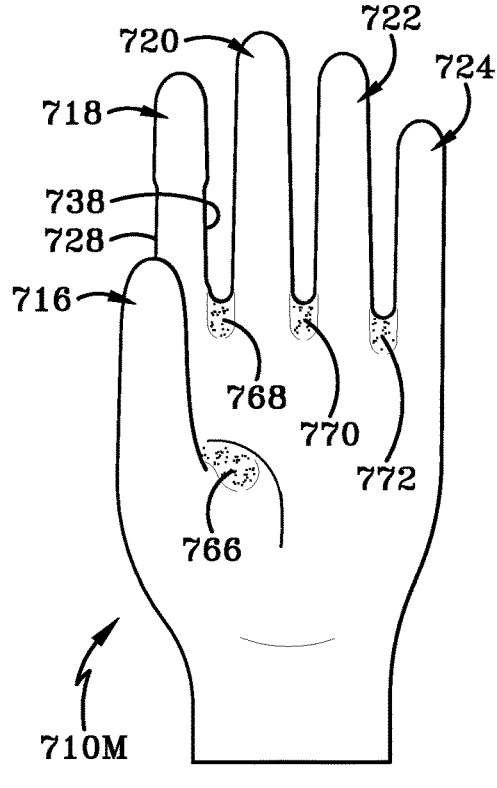
Figure 31N:
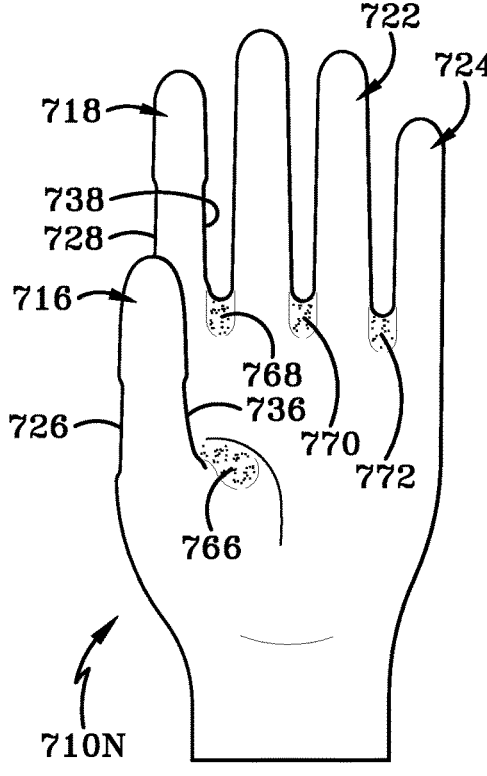
Figure 31P:
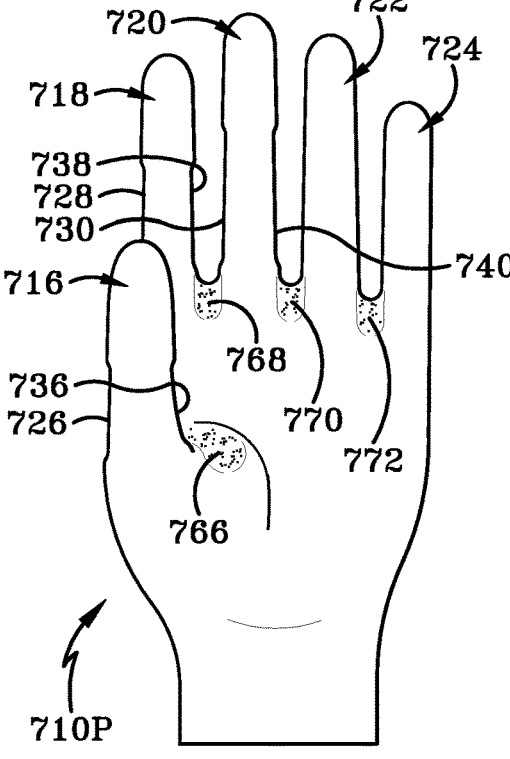
Figure 31Q:
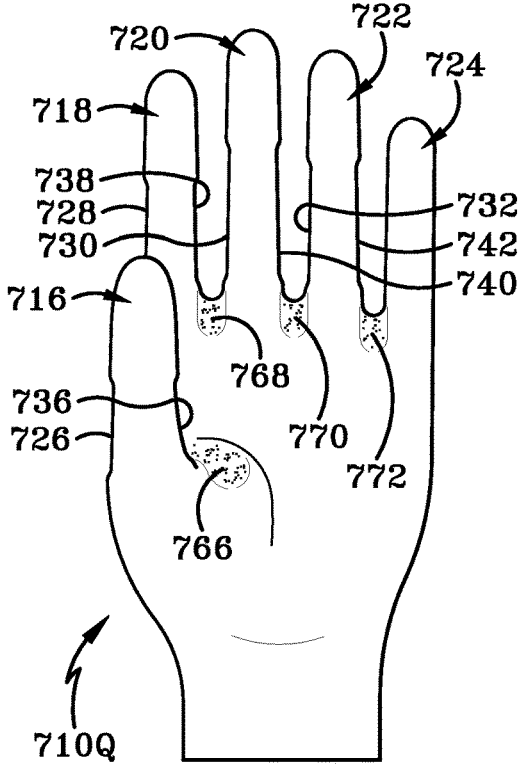
Figure 32:
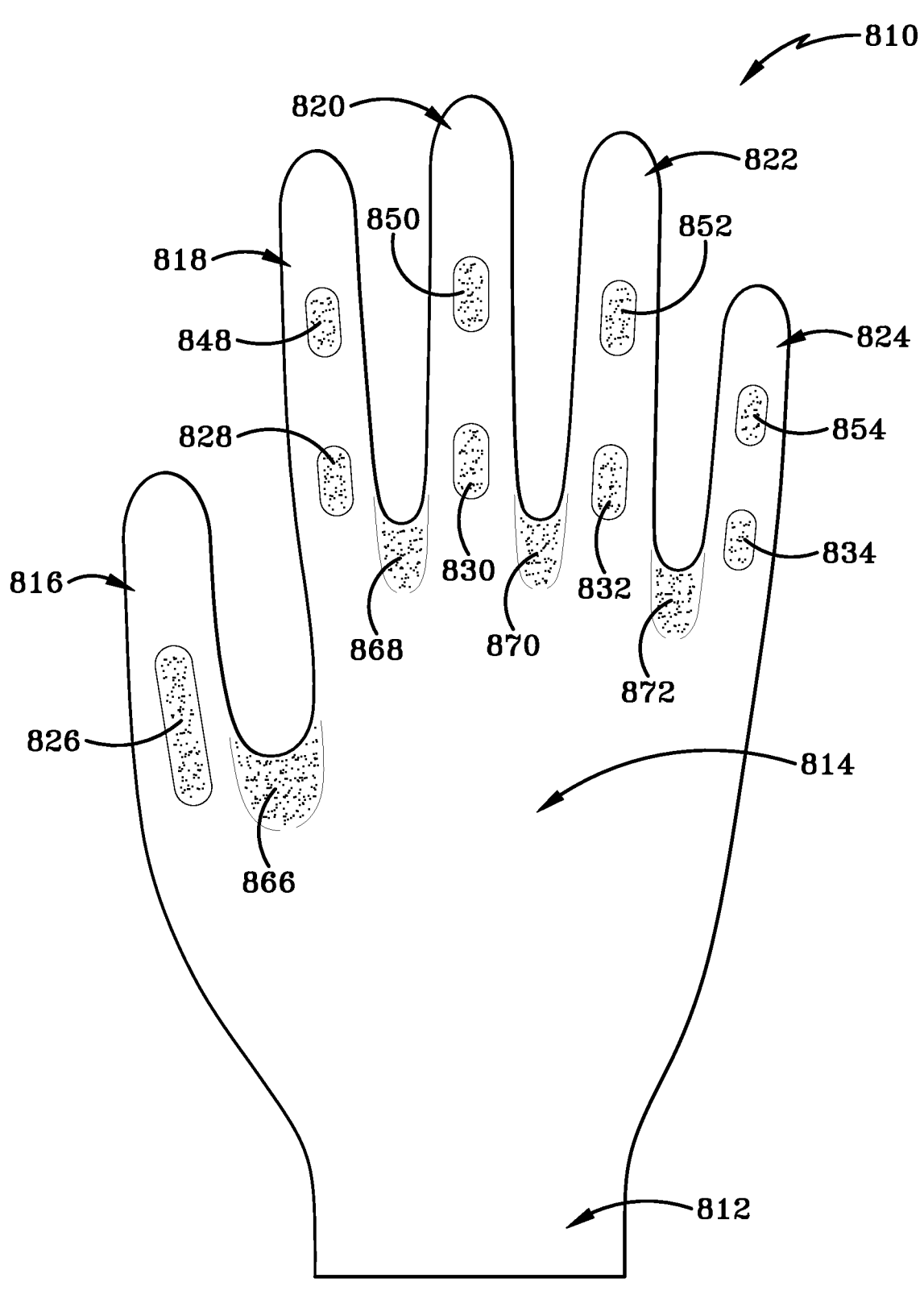
Figure 33:
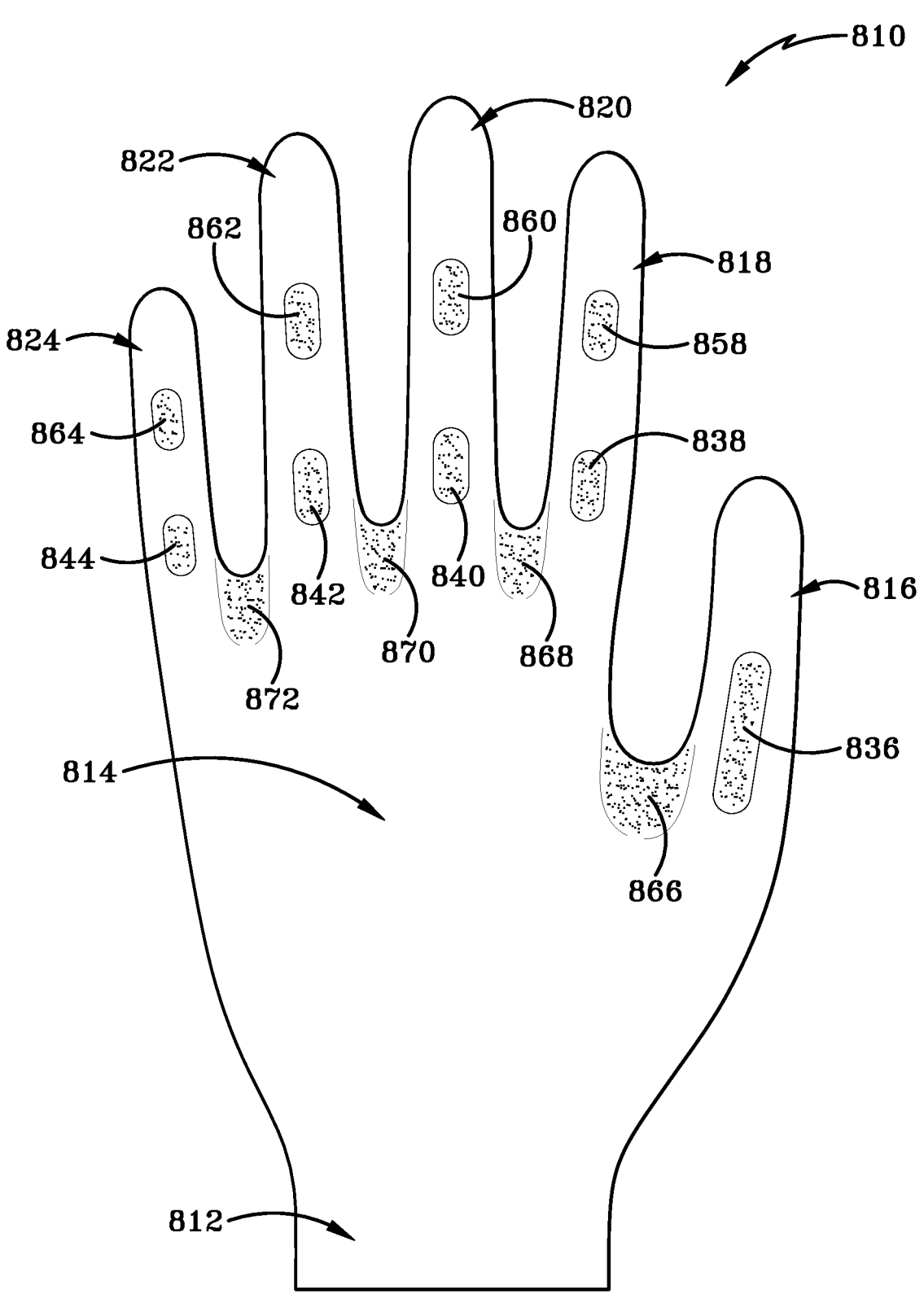
Figure 35:
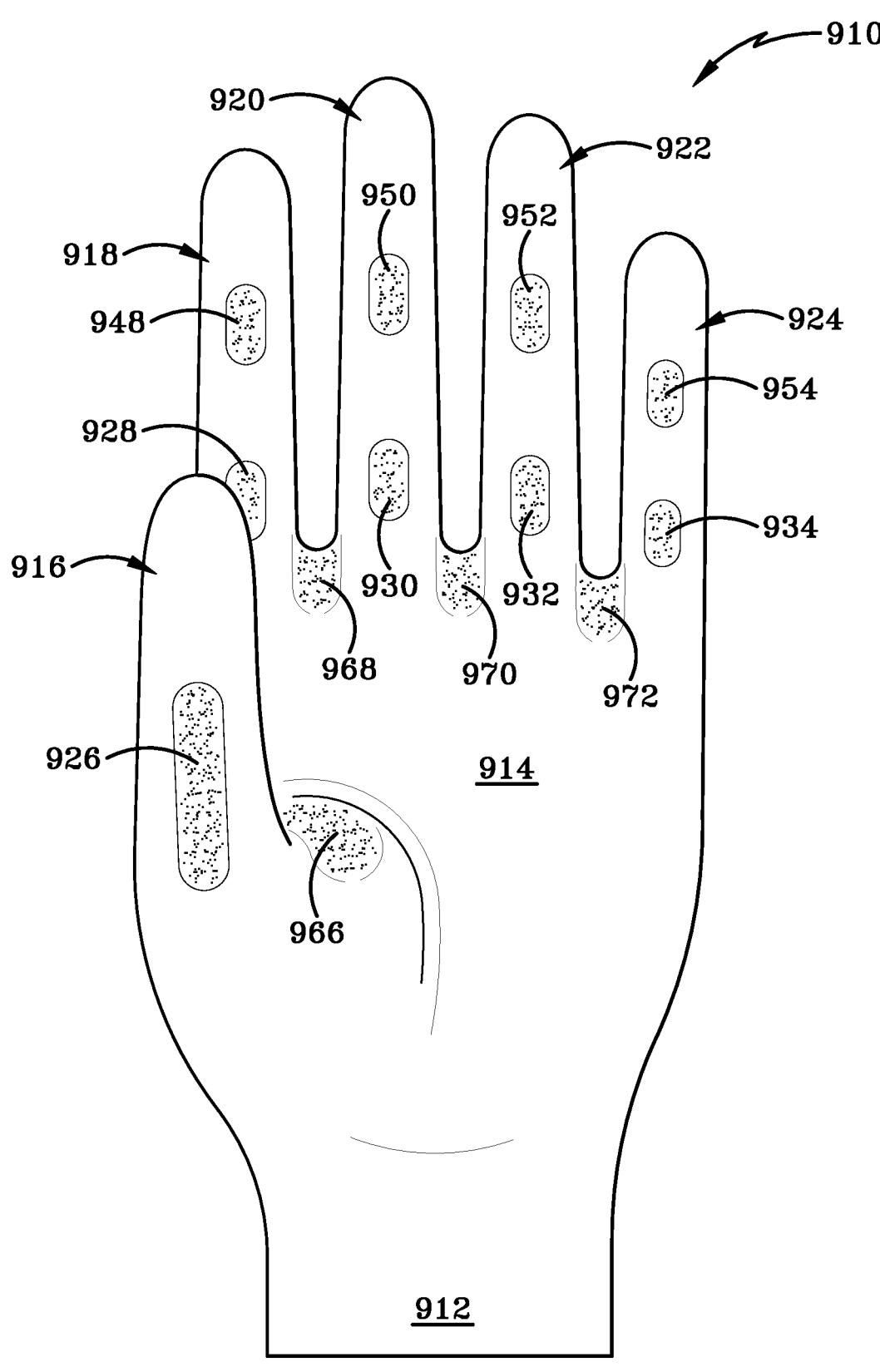
Figure 36:
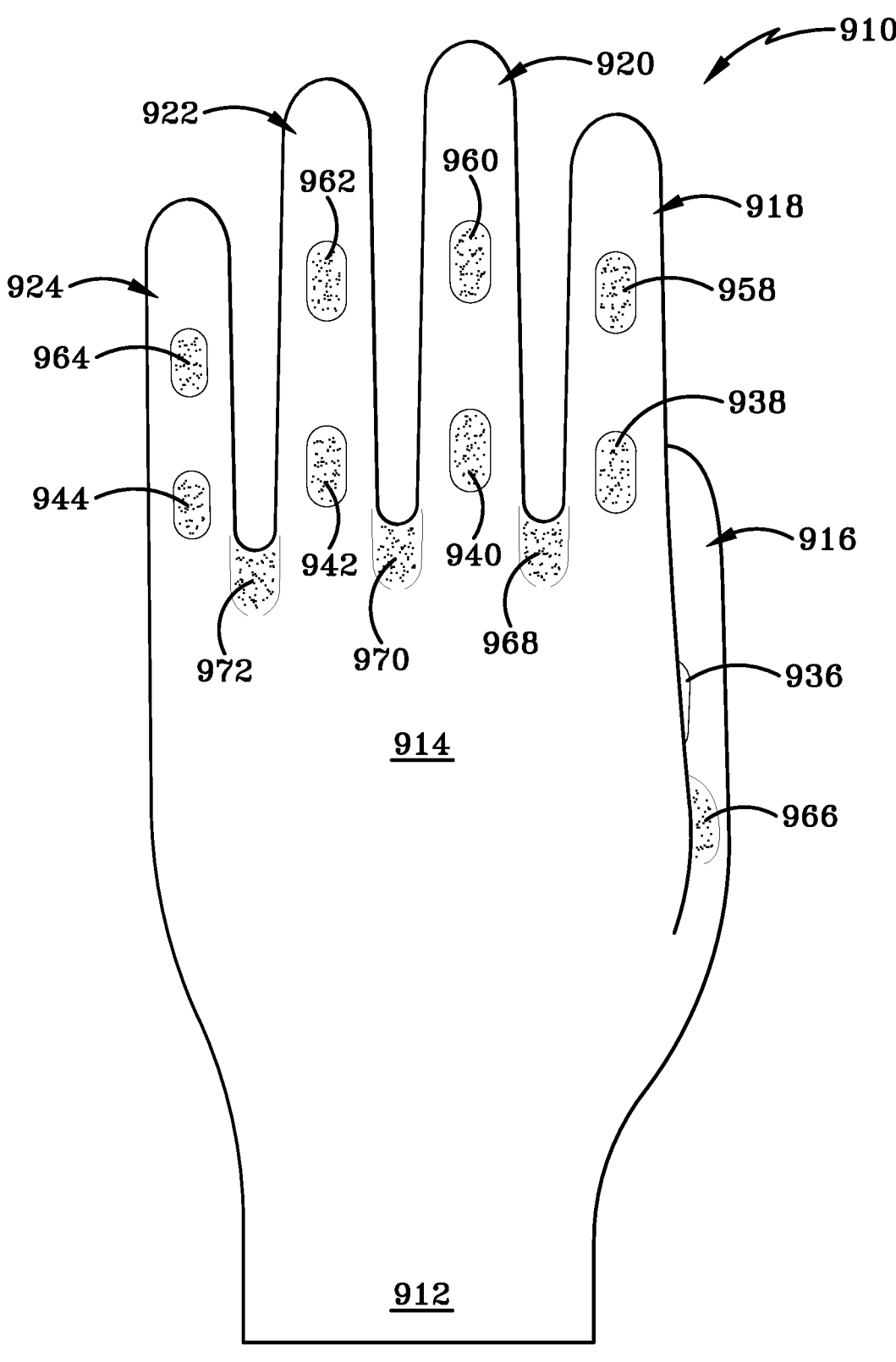
Figure 37A:
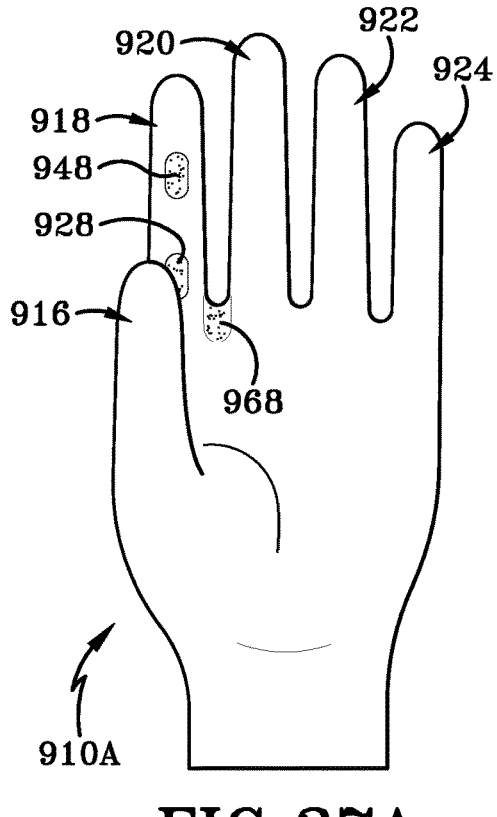
Figure 37B:
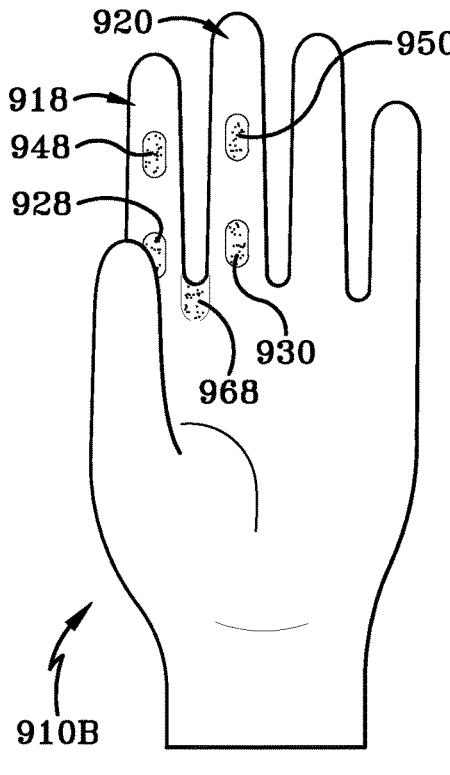
Figure 37C:
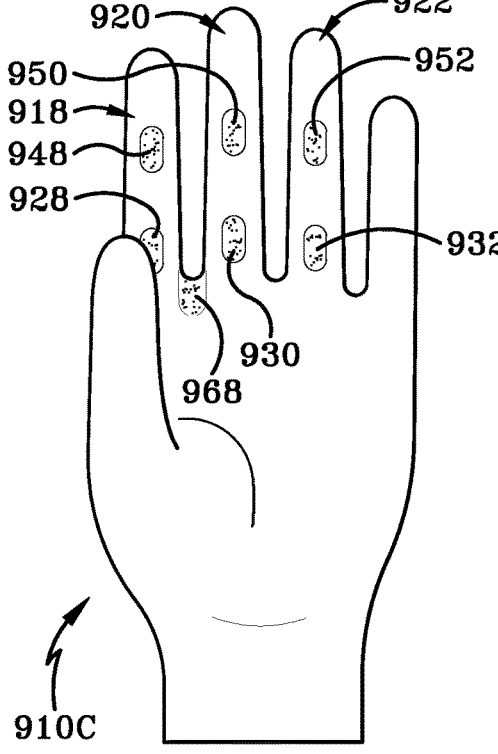
Figure 37D:
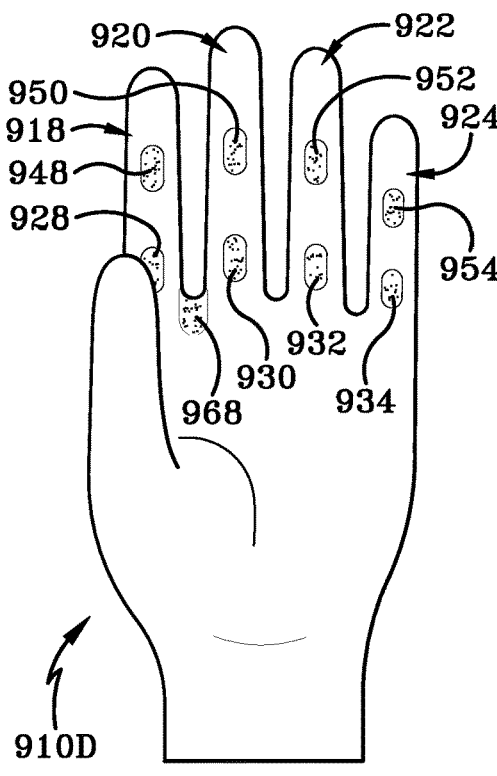
Figure 37E:
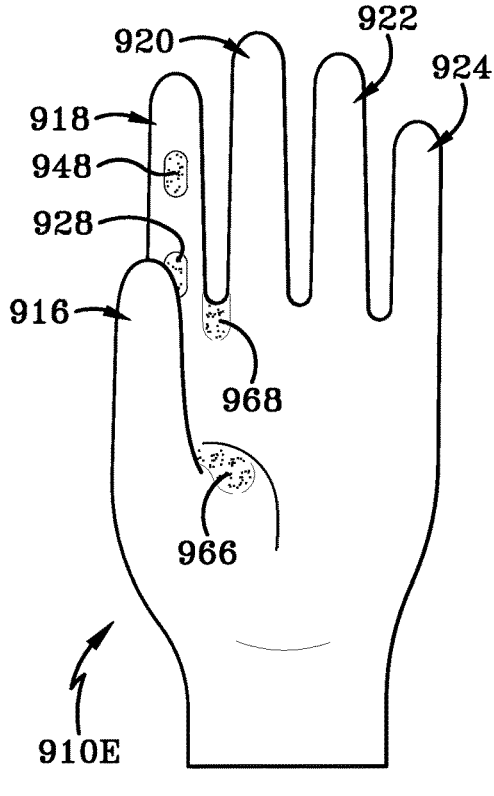
Figure 37F:
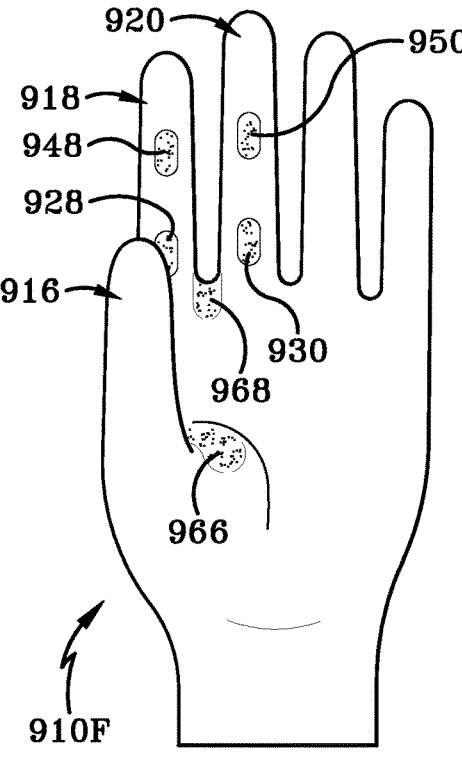
Figure 37G:
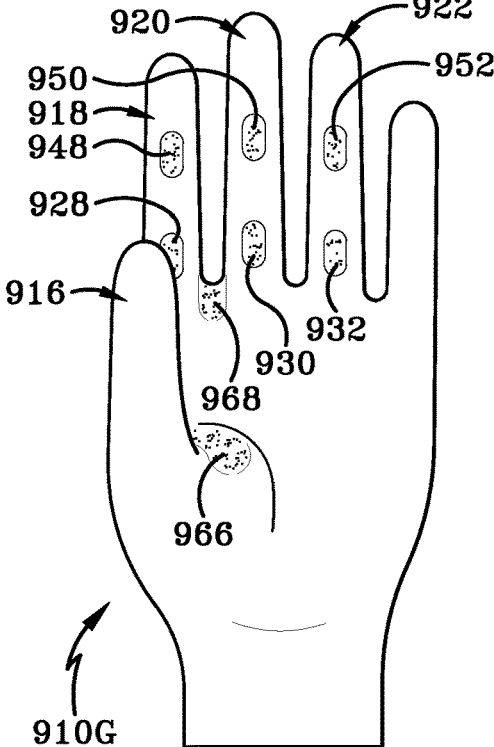
Figure 37H:
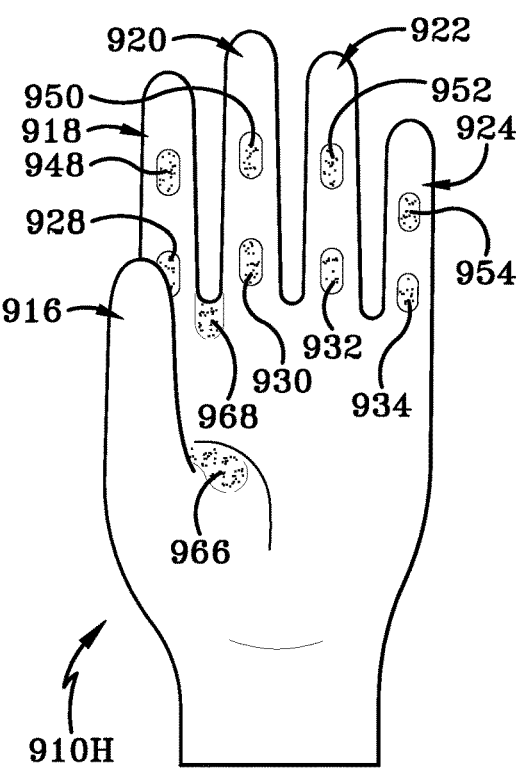
Figure 37I:
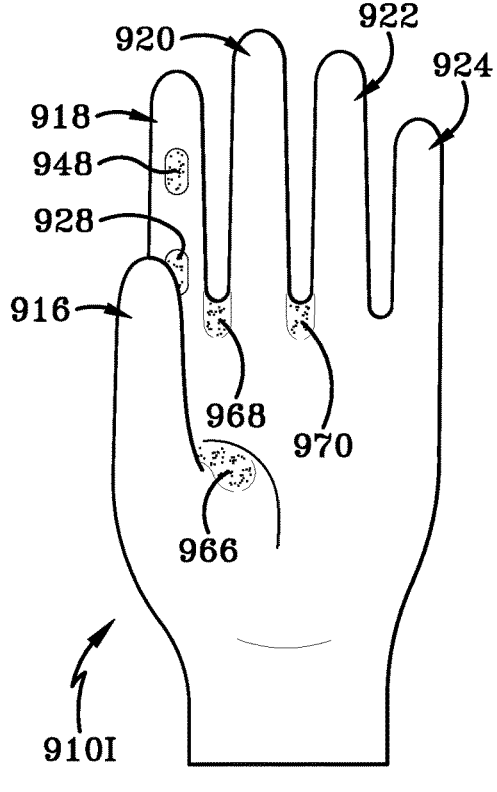
Figure 37J:
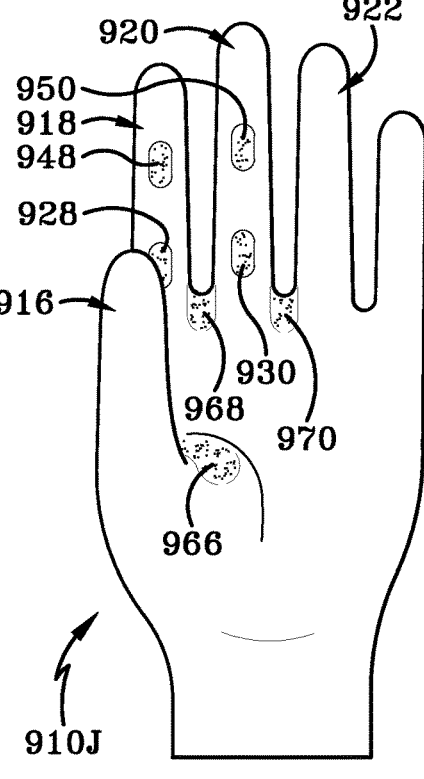
Figure 37K:
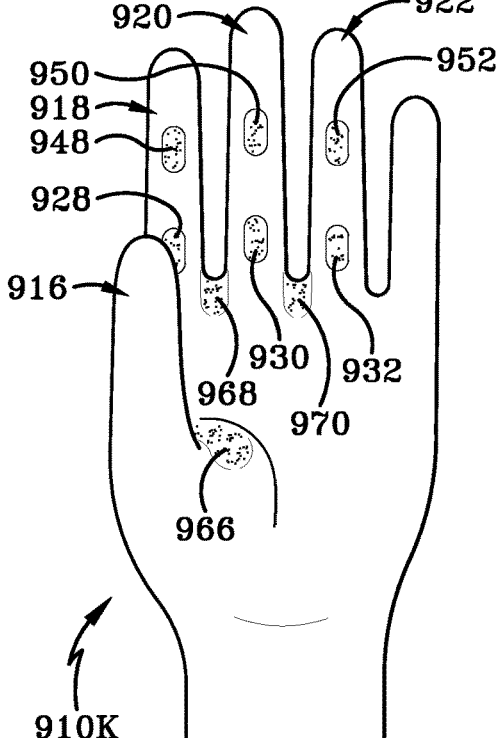
Figure 37L:
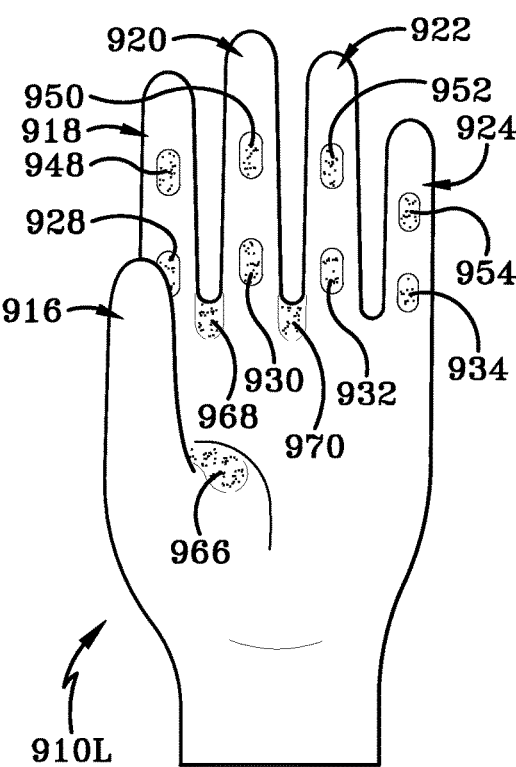
Figure 37M:
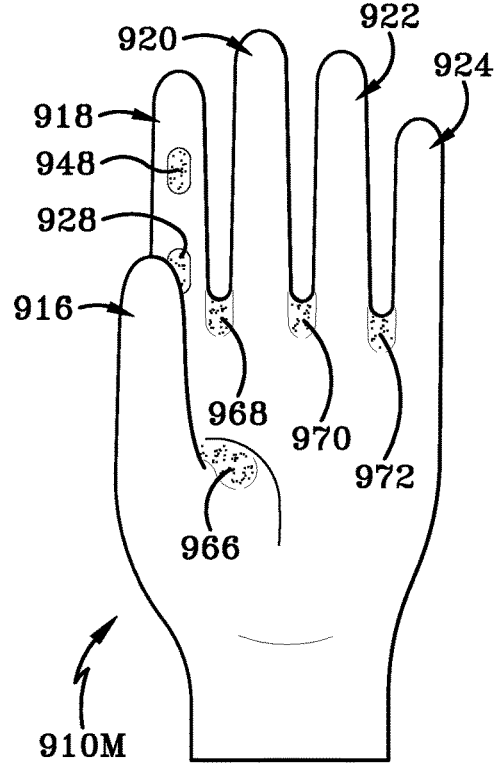
Figure 37N:
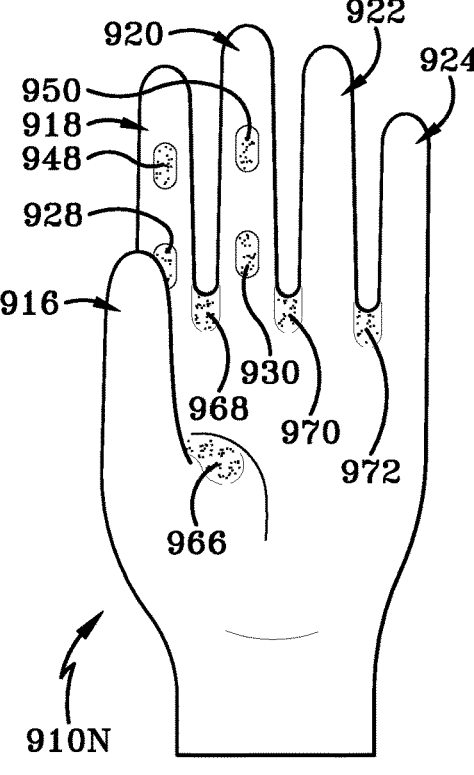
Figure 37P:
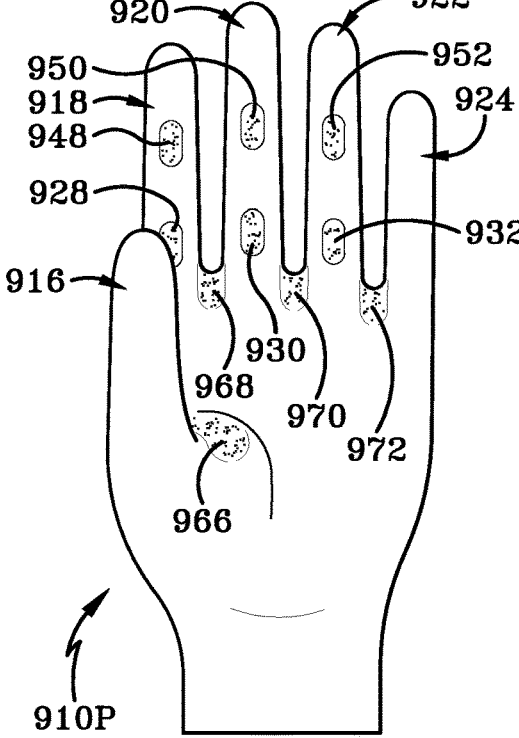
Figure 37Q:
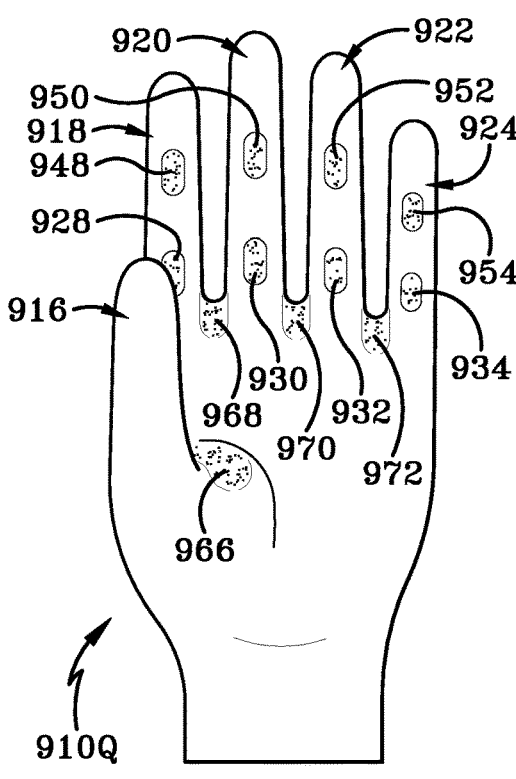
Figure 38:
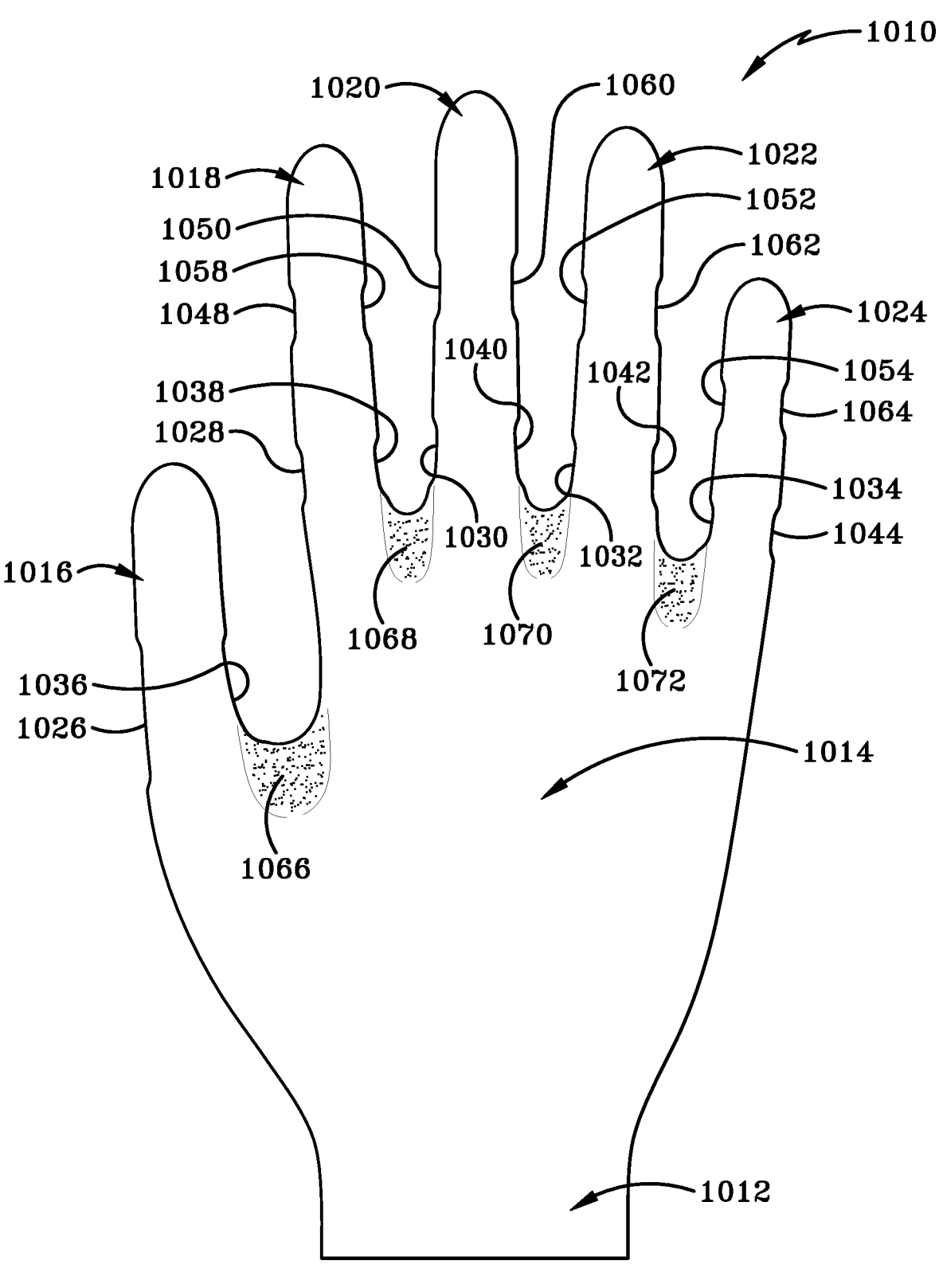
Figure 39:
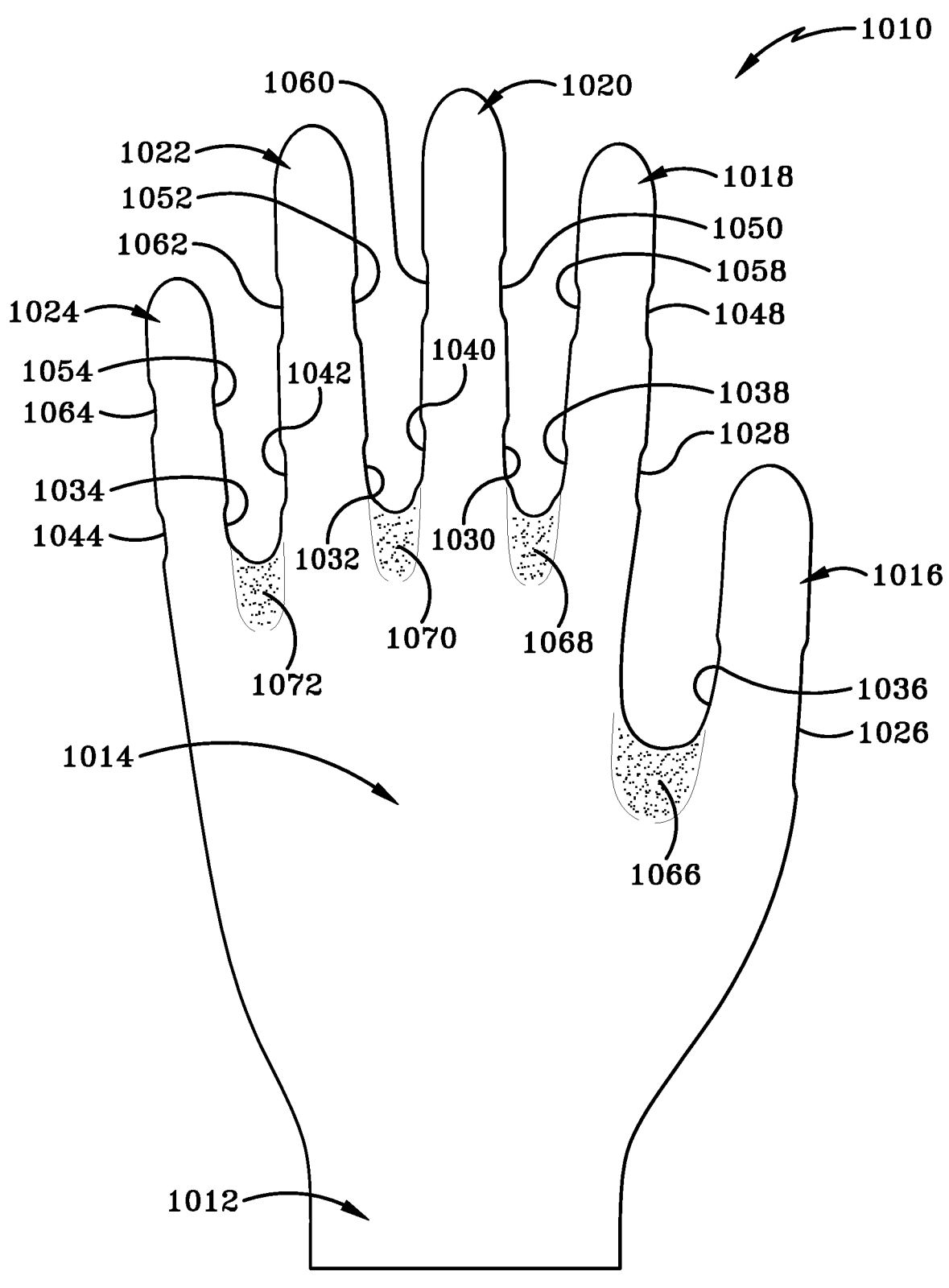
Figures 40A, 40B, 40C, 40D:
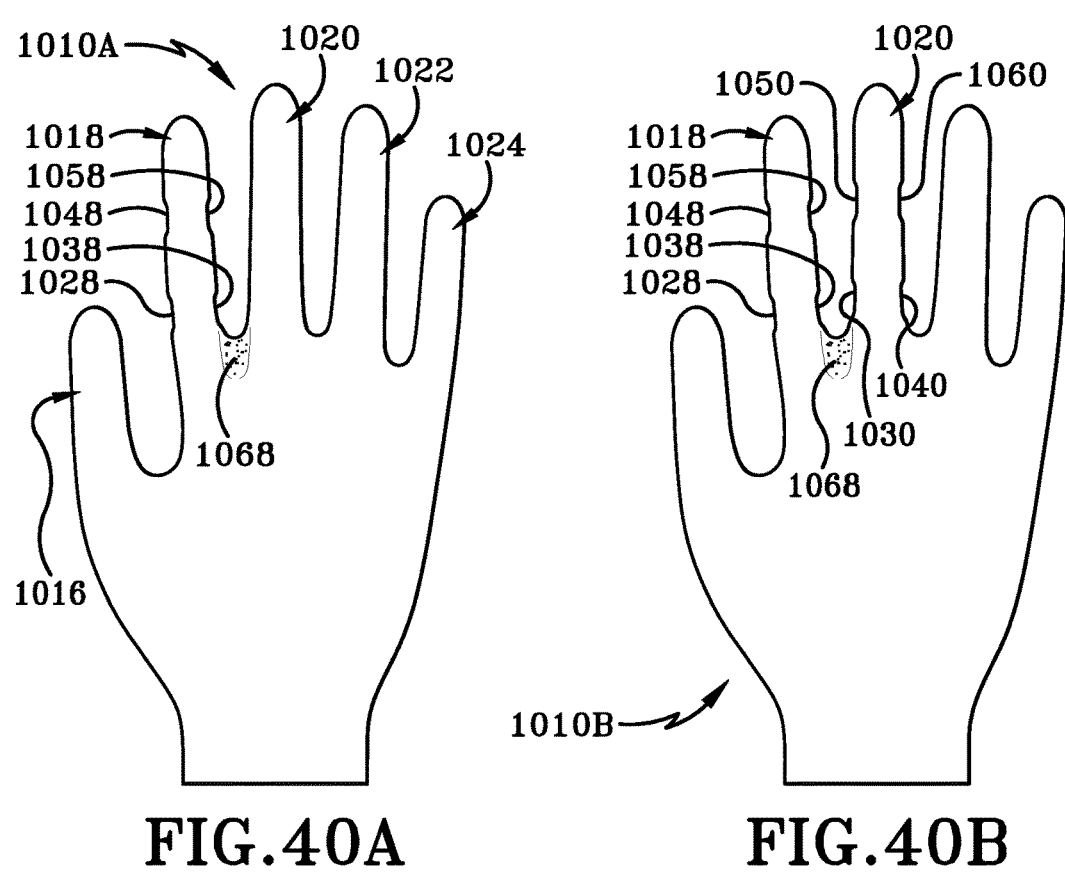
Figures 40E, 40F, 40G, 40H:
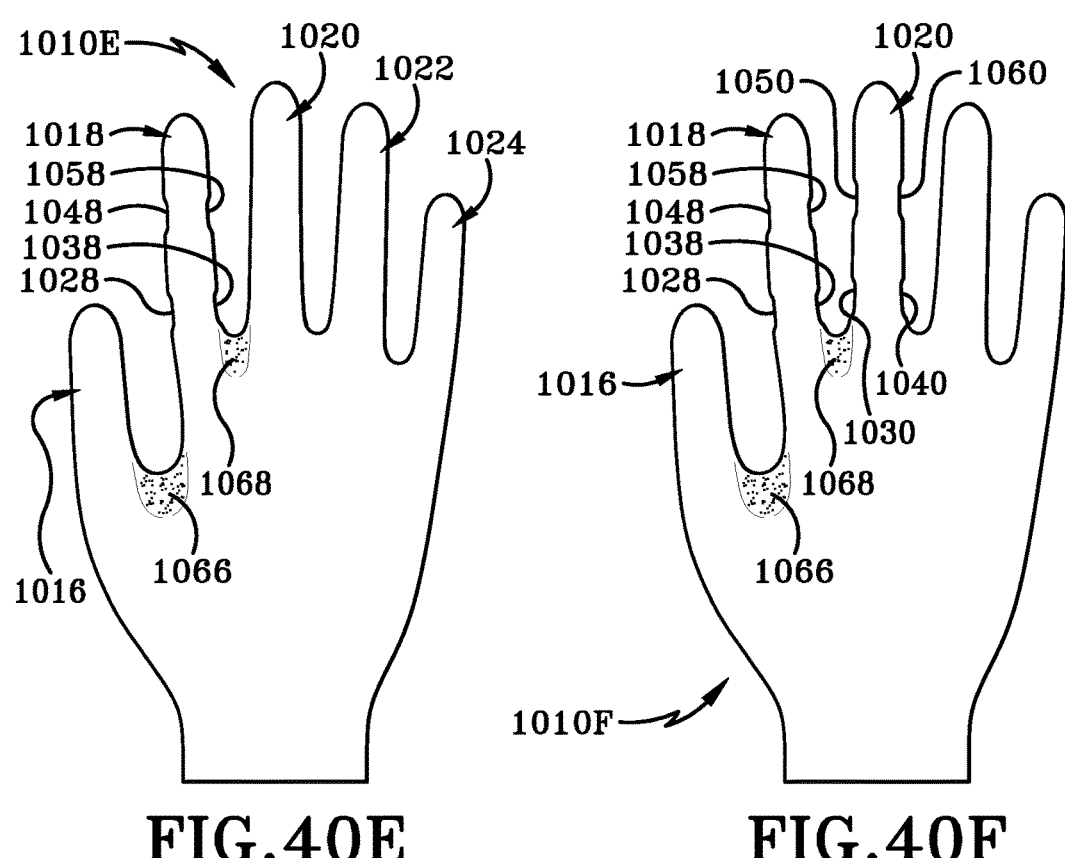
Figures 40M, 40N, 40P, 40Q:
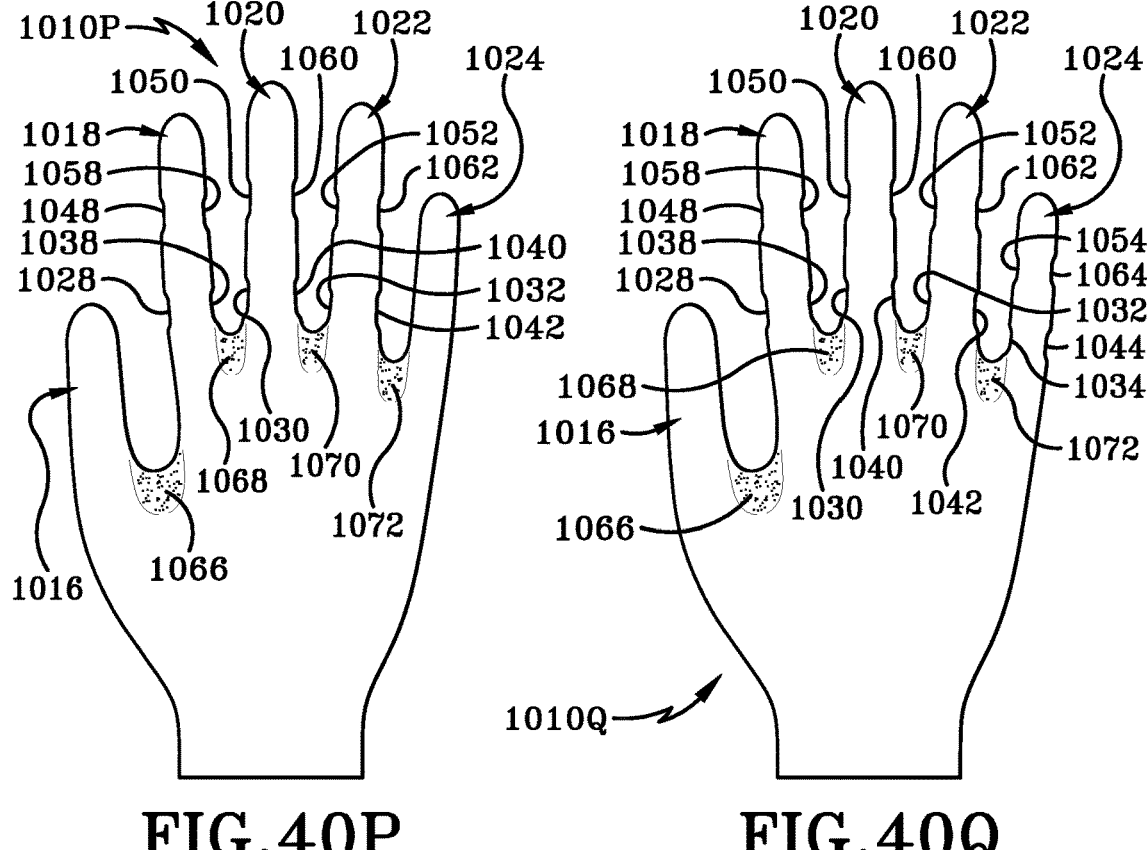
Figure 41:
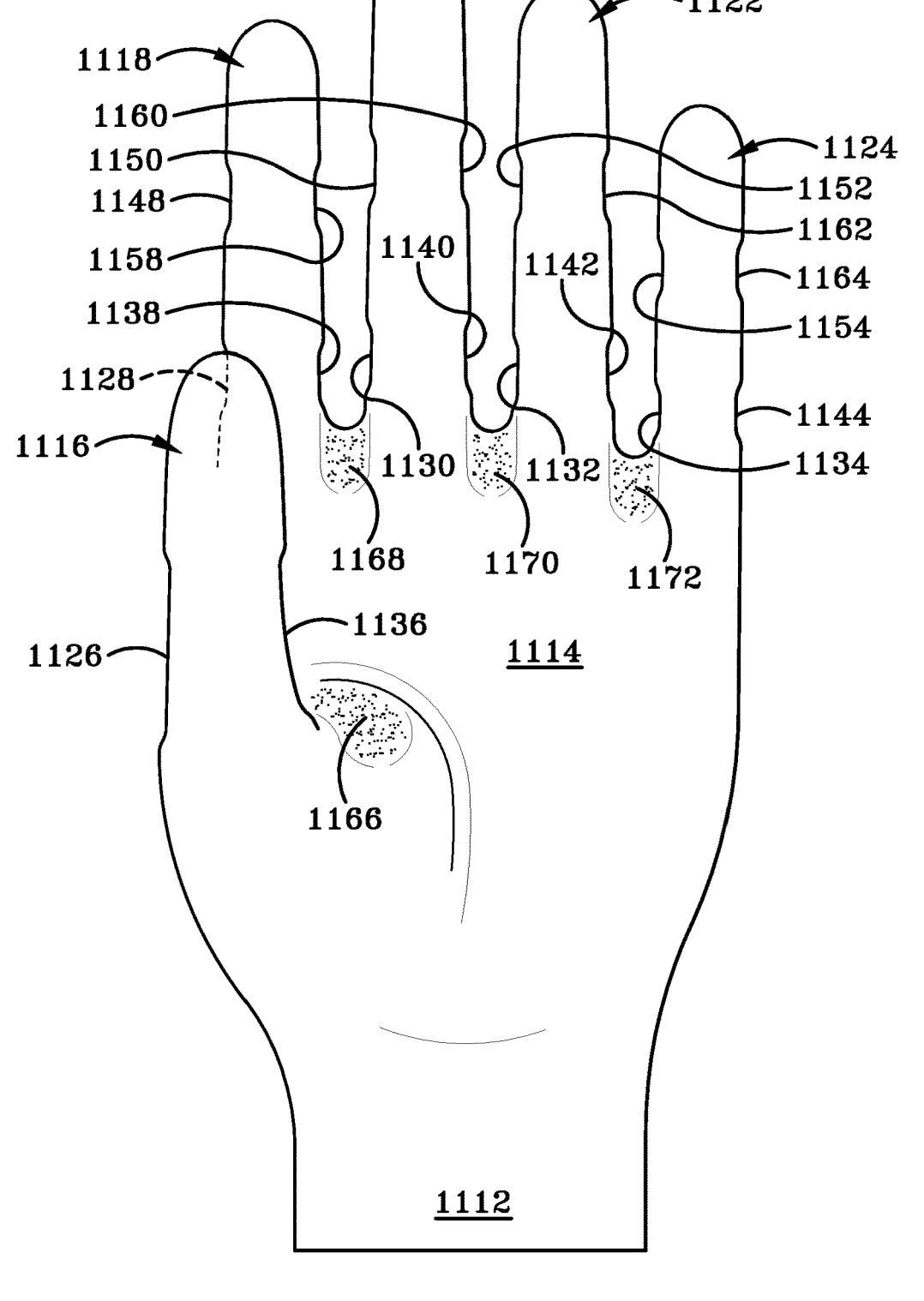
Figure 43E:
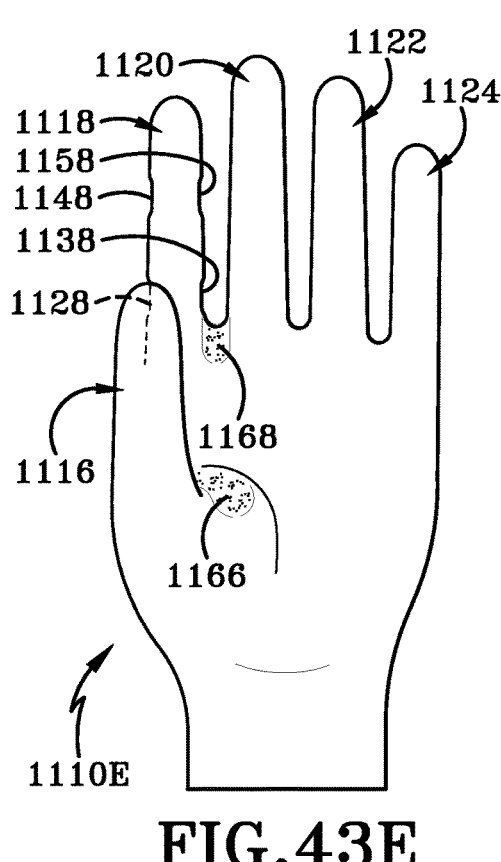
Figure 43F:
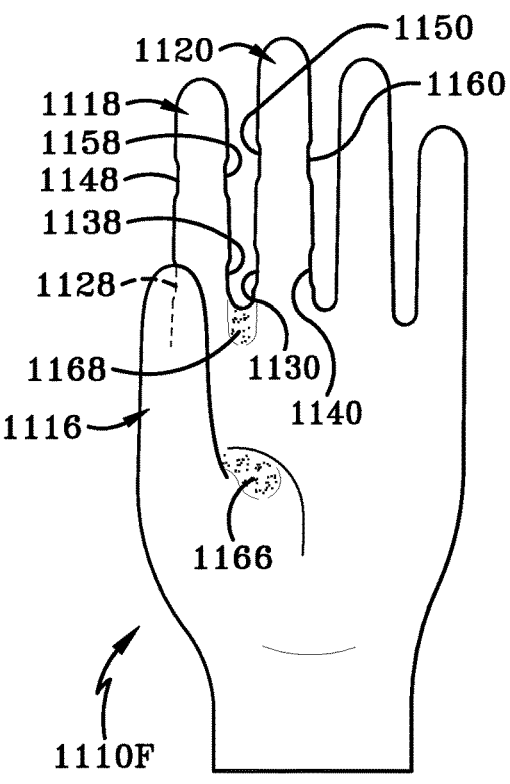
Figure 43G:
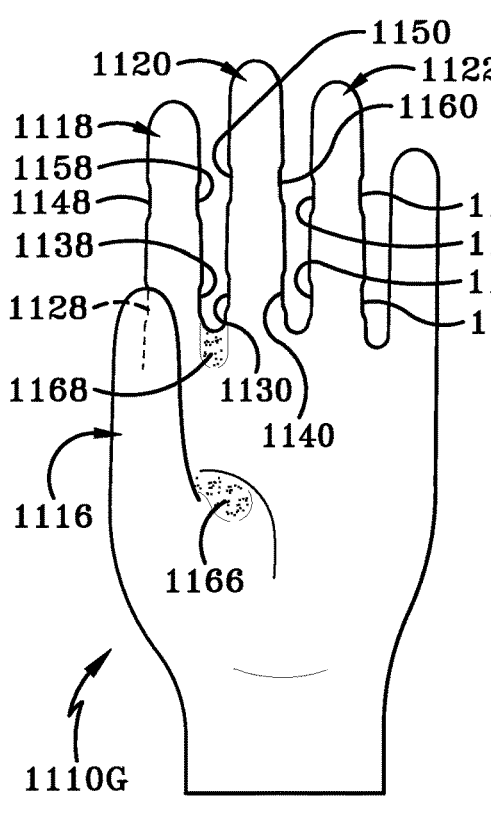
Figure 43H:
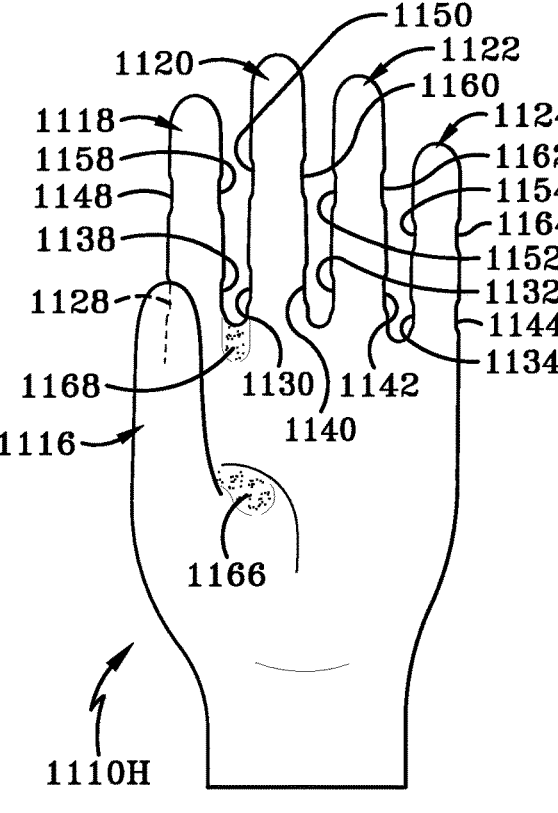
Figures 43I, 43J, 43K, 43L:
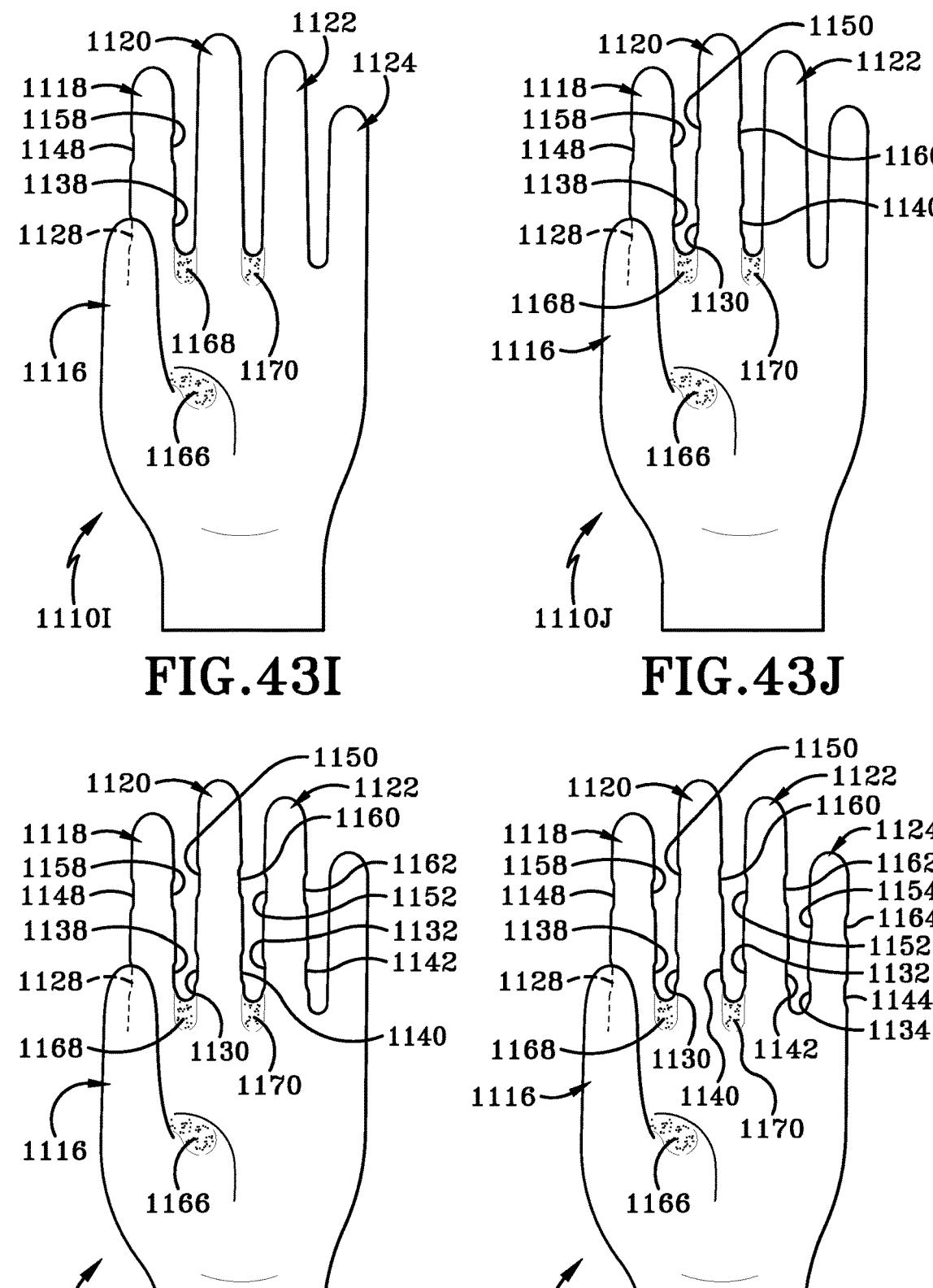
Figures 43M, 43N, 43P, 43Q:
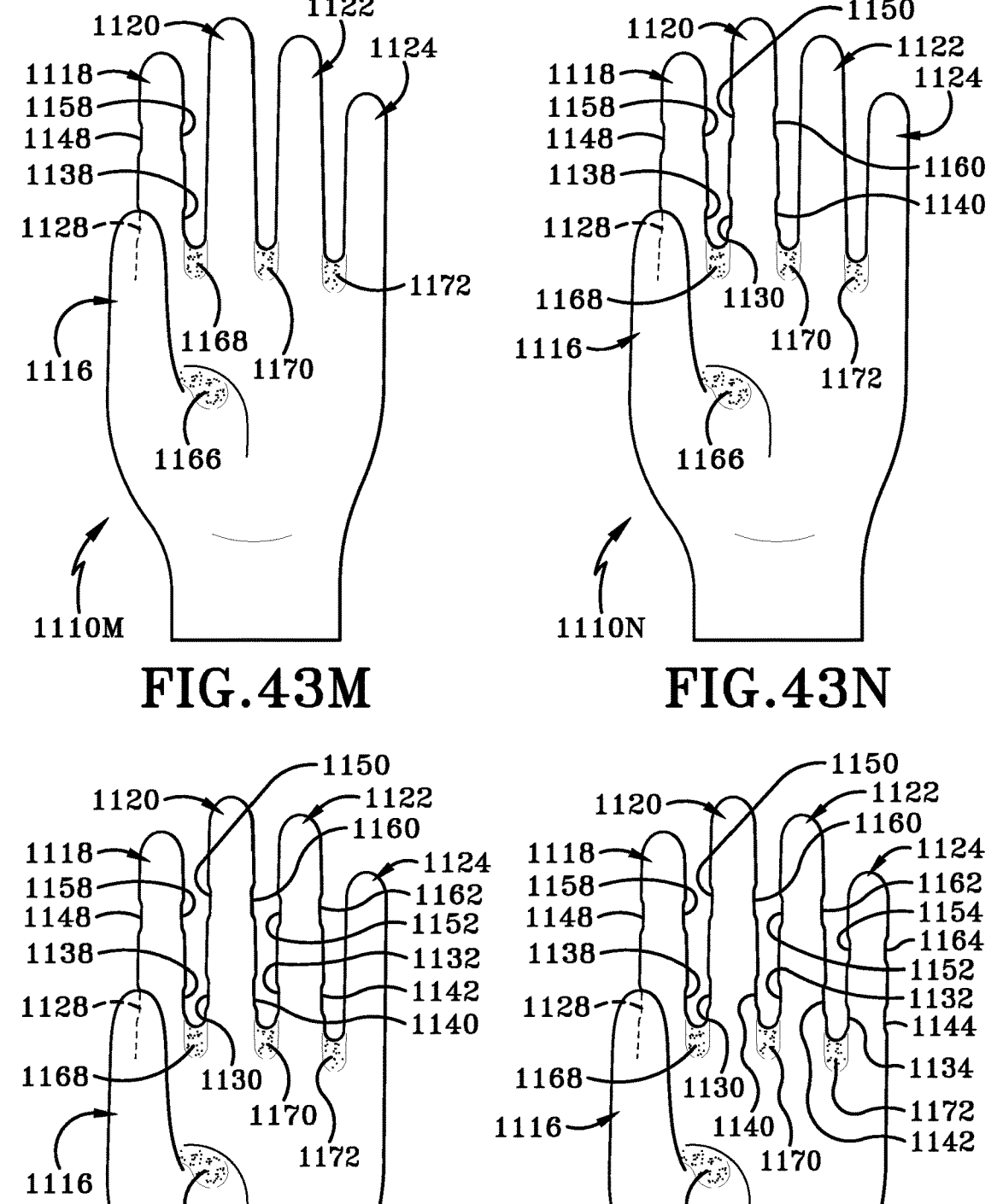

FIG. 26 is a front elevation view of a first example of a seventh embodiment of a glove in accordance with the present disclosure, wherein the first example is an ambidextrous glove shown worn on a left hand of a user, showing a fingertip region on all digits regions which is of substantially a same circumference as a remaining portion of the digit region, showing at least one gripping zone on the sides of each of the digit regions, and showing textured first, second, third, and fourth crotch areas;

FIG. 27 is a rear elevation view of the first example of the seventh embodiment of the glove illustrated in FIG. 26;

FIG. 28A is a front elevation view of a second example of the seventh embodiment of a glove in accordance with an aspect of the present disclosure, where the glove is an ambidextrous glove having a gripping zone on only the sides of the index finger region, and showing a textured second crotch area;

FIG. 28B is a front elevation view of a third example of the seventh embodiment, where the glove is an ambidextrous glove having a gripping zone on the sides of each of the thumb region and index finger region, and showing a textured second crotch area;

FIG. 28C is a front elevation view of a fourth example of the seventh embodiment where the glove is an ambidextrous glove having a gripping zone on the sides of each of the thumb region, the index finger region and the middle finger region, and showing a textured second crotch area;

FIG. 28D is a front elevation view of a fifth example of the seventh embodiment where the glove is an ambidextrous glove that has a gripping zone on the sides of each of the thumb region, the index finger region, the middle finger region, and the ring finger region, and showing a textured second crotch area;

FIG. 28E is a front elevation view of a sixth example of the seventh embodiment of a glove in accordance with an aspect of the present disclosure, where the glove is an ambidextrous glove having a gripping zone on only the sides of the index finger region, and showing textured first and second crotch areas;

FIG. 28F is a front elevation view of a seventh example of the seventh embodiment, where the glove is an ambidextrous glove having a gripping zone on the sides of each of the thumb region and index finger region, and showing textured first and second crotch areas;

FIG. 28G is a front elevation view of an eighth example of the seventh embodiment where the glove is an ambidextrous glove having a gripping zone on the sides of each of the thumb region, the index finger region and the middle finger region, and showing textured first and second crotch areas;

FIG. 28H is a front elevation view of a ninth example of the seventh embodiment where the glove is an ambidextrous glove that has a gripping zone on the sides of each of the thumb region, the index finger region, the middle finger region, and the ring finger region, and showing textured first and second crotch areas;

FIG. 28I is a front elevation view of a tenth example of the seventh embodiment of a glove in accordance with an aspect of the present disclosure, where the glove is an ambidextrous glove having a gripping zone on only the sides of the index finger region, and showing textured first, second, and third crotch areas;

FIG. 28J is a front elevation view of an eleventh example of the seventh embodiment, where the glove is an ambidextrous glove having a gripping zone on the sides of each of the thumb region and index finger region, and showing textured first, second, and third crotch areas;

FIG. 28K is a front elevation view of a twelfth example of the seventh embodiment where the glove is an ambidextrous glove having a gripping zone on the sides of each of the thumb region, the index finger region and the middle finger region, and showing textured first, second, and third crotch areas;

FIG. 28L is a front elevation view of a thirteenth example of the seventh embodiment where the glove is an ambidextrous glove that has a gripping zone on the sides of each of the thumb region, the index finger region, the middle finger region, and the ring finger region, and showing textured first, second, and third crotch areas;

FIG. 28M is a front elevation view of a fourteenth example of the seventh embodiment of a glove in accordance with an aspect of the present disclosure, where the glove is an ambidextrous glove having a gripping zone on only the sides of the index finger region, and showing textured first, second, third, and fourth crotch areas;

FIG. 28N is a front elevation view of a fifteenth example of the seventh embodiment, where the glove is an ambidextrous glove having a gripping zone on the sides of each of the thumb region and index finger region, and showing textured first, second, third, and fourth crotch areas;

FIG. 28P is a front elevation view of a sixteenth example of the seventh embodiment where the glove is an ambidextrous glove having a gripping zone on the sides of each of the thumb region, the index finger region and the middle finger region, and showing textured first, second, third, and fourth crotch areas;

FIG. 28Q is a front elevation view of a seventeenth example of the seventh embodiment where the glove is an ambidextrous glove that has a gripping zone on the sides of each of the thumb region, the index finger region, the middle finger region, and the ring finger region, and showing textured first, second, third, and fourth crotch areas;

FIG. 29 is a front elevation view of a first example of an eighth embodiment of a glove in accordance with the present disclosure, wherein the first example is a hand-specific glove shown worn on a left hand of a user, showing a fingertip region on all digits regions which is of substantially a same circumference as a remaining portion of the digit region, showing at least one gripping zone on the sides of each of the digit regions, and showing textured first, second, third, and fourth crotch areas;

FIG. 30 is a rear elevation view of the first example of the first embodiment glove illustrated in FIG. 29;

FIG. 31A is a front elevation view of a second example of the eighth embodiment of a glove in accordance with an aspect of the present disclosure, where the glove is a hand-specific glove having a gripping zone on the sides of only the index finger region, and showing a textured second crotch area;

FIG. 31B is a front elevation view of a third example of the eighth embodiment, where the glove is a hand-specific glove having a gripping zone on the sides of each of the thumb region and index finger region, and showing a textured second crotch area;

FIG. 31C is a front elevation view of a fourth example of the eighth embodiment where the glove is a hand-specific glove having a gripping zone on the sides of each of the thumb region, the index finger region and the middle finger region, and showing a textured second crotch area;

FIG. 31D is a front elevation view of a fifth example of the eighth embodiment where the glove is a hand-specific glove that has a gripping zone on the sides of each of the thumb region, the index finger region, the middle finger region, and the ring finger region, and showing a textured second crotch area;

FIG. 31E is a front elevation view of a sixth example of the eighth embodiment of a glove in accordance with an aspect of the present disclosure, where the glove is a hand-specific glove having a gripping zone on the sides of only the index finger region, and showing textured first and second crotch areas;

FIG. 31F is a front elevation view of a seventh example of the eighth embodiment, where the glove is a hand-specific glove having a gripping zone on the sides of each of the thumb region and index finger region, and showing textured first and second crotch areas;

FIG. 31G is a front elevation view of an eighth example of the eighth embodiment where the glove is a hand-specific glove having a gripping zone on the sides of each of the thumb region, the index finger region and the middle finger region, and showing textured first and second crotch areas;

FIG. 31H is a front elevation view of a ninth example of the eighth embodiment where the glove is a hand-specific glove that has a gripping zone on the sides of each of the thumb region, the index finger region, the middle finger region, and the ring finger region, and showing textured first and second crotch areas;

FIG. 31I is a front elevation view of a tenth example of the eighth embodiment of a glove in accordance with an aspect of the present disclosure, where the glove is a hand-specific glove having a gripping zone on the sides of only the index finger region, and showing textured first, second, and third crotch areas;

FIG. 31J is a front elevation view of an eleventh example of the eighth embodiment, where the glove is a hand-specific glove having a gripping zone on the sides of each of the thumb region and index finger region, and showing textured first, second, and third crotch areas;

FIG. 31K is a front elevation view of a twelfth example of the eighth embodiment where the glove is a hand-specific glove having a gripping zone on the sides of each of the thumb region, the index finger region and the middle finger region, and showing textured first, second, and third crotch areas;

FIG. 31L is a front elevation view of a thirteenth example of the eighth embodiment where the glove is a hand-specific glove that has a gripping zone on the sides of each of the thumb region, the index finger region, the middle finger region, and the ring finger region, and showing textured first, second, and third crotch areas;

FIG. 31M is a front elevation view of a fourteenth example of the eighth embodiment of a glove in accordance with an aspect of the present disclosure, where the glove is a hand-specific glove having a gripping zone on the sides of only the index finger region, and showing textured first, second, third, and fourth crotch areas;

FIG. 31N is a front elevation view of a fifteenth example of the eighth embodiment, where the glove is a hand-specific glove having a gripping zone on the sides of each of the thumb region and index finger region, and showing textured first, second, third, and fourth crotch areas;

FIG. 31P is a front elevation view of a sixteenth example of the eighth embodiment where the glove is a hand-specific glove having a gripping zone on the sides of each of the thumb region, the index finger region and the middle finger region, and showing textured first, second, third, and fourth crotch areas;

FIG. 31Q is a front elevation view of a seventeenth example of the eighth embodiment where the glove is a hand-specific glove that has a gripping zone on the sides of each of the thumb region, the index finger region, the middle finger region, and the ring finger region, and showing textured first, second, third, and fourth crotch areas;

FIG. 32 is a front elevation view of a first example of a ninth embodiment of a glove in accordance with the present disclosure, wherein the first example is an ambidextrous glove shown worn on a left hand of a user, showing a fingertip region on all digits regions which is of substantially a same circumference as a remaining portion of the digit region, showing one gripping zone on the thumb region and two gripping zones on each of the finger regions, and showing textured first, second, third, and fourth crotch areas;

FIG. 33 is a rear elevation view of the first example of the ninth embodiment of the glove illustrated in FIG. 32;

Figures 34A, 34B, 34C, 34D:
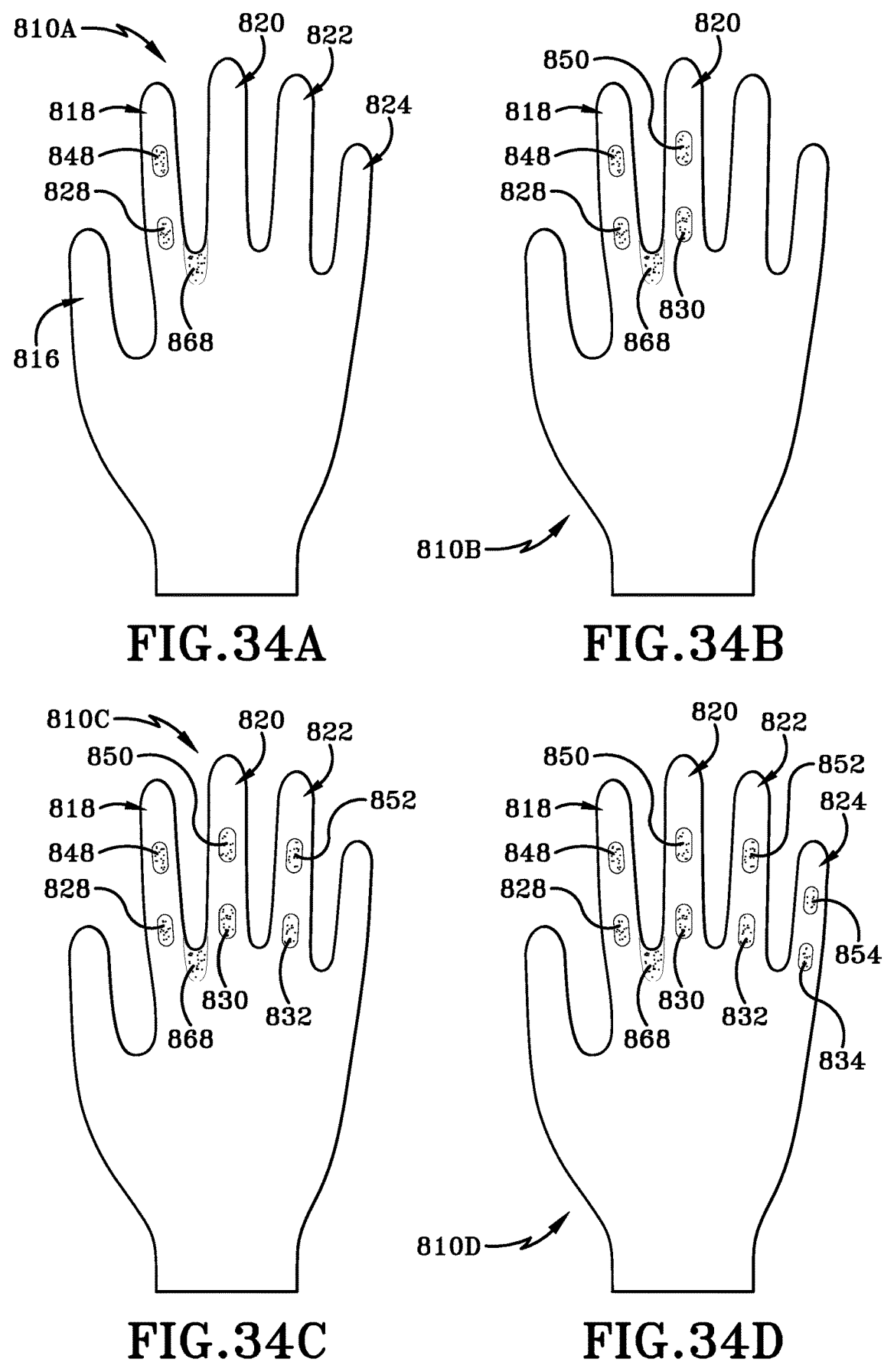
Figures 34E, 34F, 34G, 34H:
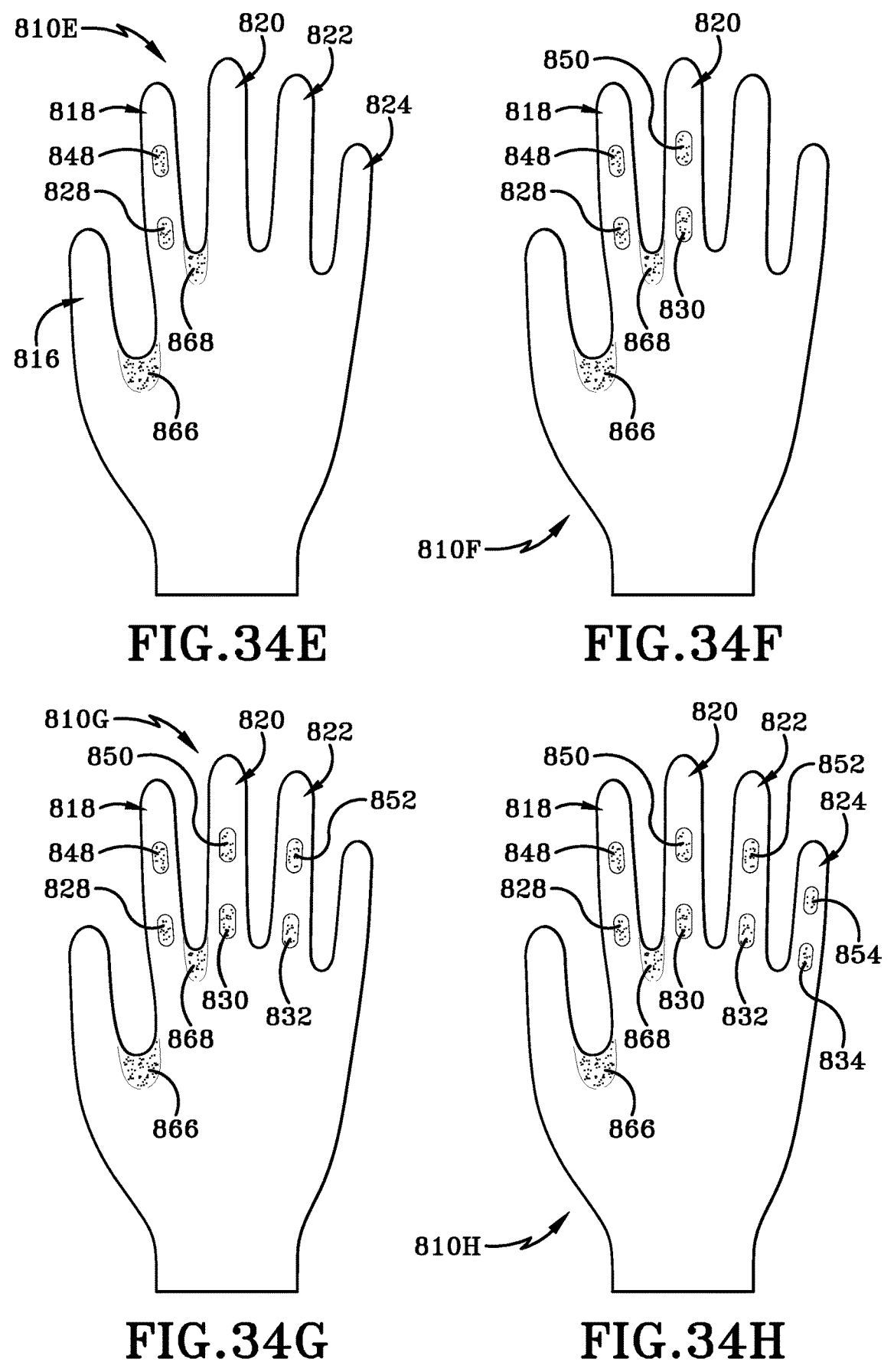
Figures 34I, 34J, 34K, 34L:
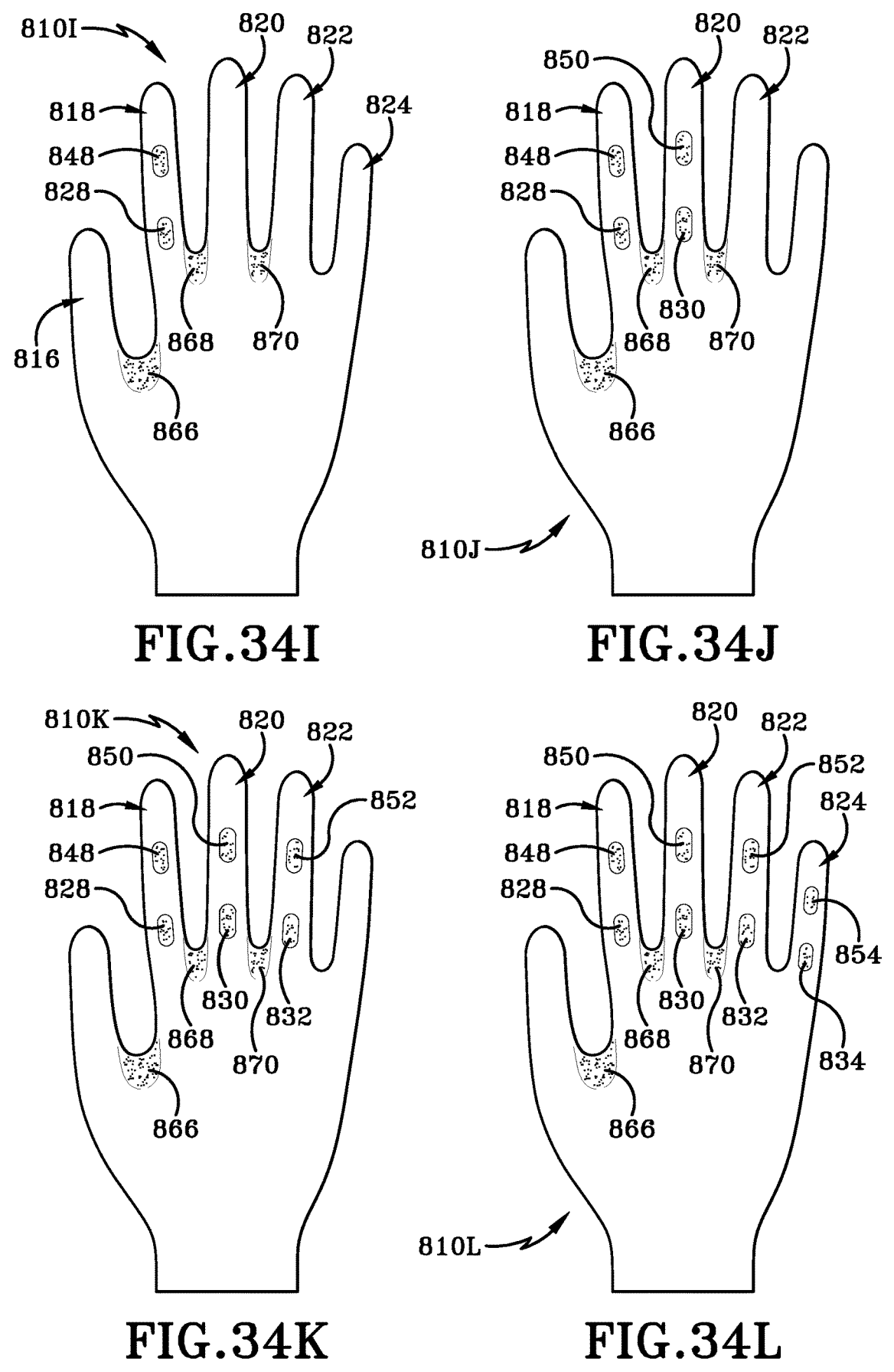
Figures 34M, 34N, 34P, 34Q:
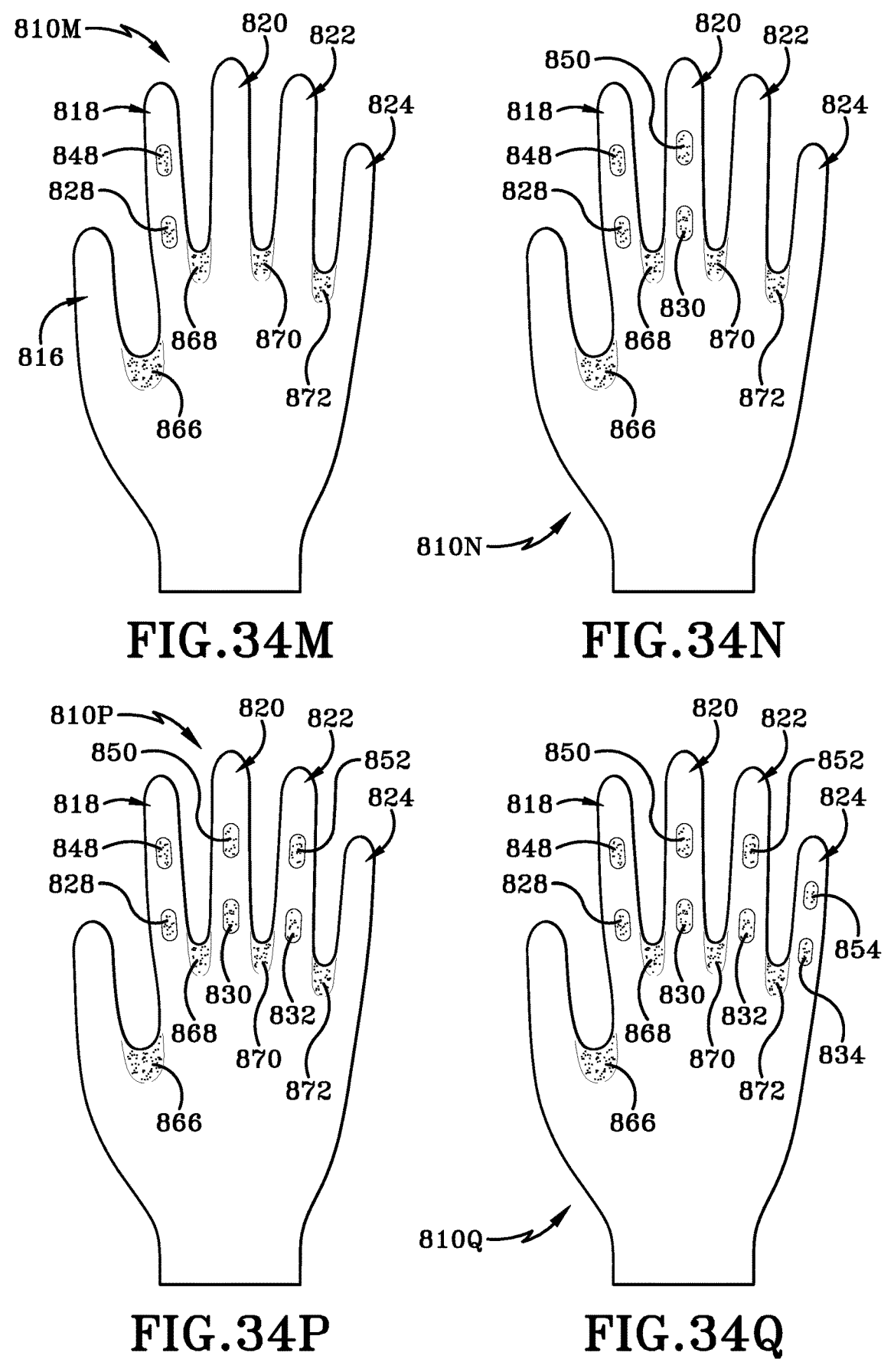

FIG. 34A is a front elevation view of a second example of the ninth embodiment of a glove in accordance with an aspect of the present disclosure, where the glove is an ambidextrous glove having two gripping zones on only the index finger region, and showing a textured second crotch area;

FIG. 34B is a front elevation view of a third example of the ninth embodiment, where the glove is an ambidextrous glove having two gripping zones on each of the index finger region and middle finger region, and showing a textured second crotch area;

FIG. 34C is a front elevation view of a fourth example of the ninth embodiment where the glove is an ambidextrous glove having two gripping zones on the index finger region, the middle finger region, and the ring finger region, and showing a textured second crotch area;

FIG. 34E is a front elevation view of a fifth example of the ninth embodiment where the glove is an ambidextrous glove having two gripping zones on the index finger region, the middle finger region, the ring finger region, and the little finger region, and showing a textured second crotch area;

FIG. 34E is a front elevation view of a sixth example of the ninth embodiment of a glove in accordance with an aspect of the present disclosure, where the glove is an ambidextrous glove having two gripping zones on only the index finger region, and showing textured first and second crotch areas;

FIG. 34F is a front elevation view of a seventh example of the ninth embodiment, where the glove is an ambidextrous glove having two gripping zones on each of the index finger region and middle finger region, and showing textured first and second crotch areas;

FIG. 34G is a front elevation view of an eighth example of the ninth embodiment where the glove is an ambidextrous glove having two gripping zones on the index finger region, the middle finger region, and the ring finger region, and showing textured first and second crotch areas;

FIG. 34H is a front elevation view of a ninth example of the ninth embodiment where the glove is an ambidextrous glove having two gripping zones on the index finger region, the middle finger region, the ring finger region, and the little finger region, and showing textured first and second crotch areas;

FIG. 34I is a front elevation view of a tenth example of the ninth embodiment of a glove in accordance with an aspect of the present disclosure, where the glove is an ambidextrous glove having two gripping zones on only the index finger region, and showing textured first, second and third crotch areas;

FIG. 34J is a front elevation view of an eleventh example of the ninth embodiment, where the glove is an ambidextrous glove having two gripping zones on each of the index finger region and middle finger region, and showing textured first, second and third crotch areas;

FIG. 34K is a front elevation view of a twelfth example of the ninth embodiment where the glove is an ambidextrous glove having two gripping zones on the index finger region, the middle finger region, and the ring finger region, and showing textured first, second and third crotch areas;

FIG. 34L is a front elevation view of a thirteenth example of the ninth embodiment where the glove is an ambidextrous glove having two gripping zones on the index finger region, the middle finger region, the ring finger region, and the little finger region, and showing textured first, second and third crotch areas;

FIG. 34M is a front elevation view of a fourteenth example of the fourteenth embodiment of a glove in accordance with an aspect of the present disclosure, where the glove is an ambidextrous glove having two gripping zones on only the index finger region, and showing textured first, second, third, and fourth crotch areas;

FIG. 34N is a front elevation view of a fifteenth example of the ninth embodiment, where the glove is an ambidextrous glove having two gripping zones on each of the index finger region and middle finger region, and showing textured first, second, third, and fourth crotch areas;

FIG. 34P is a front elevation view of a sixteenth example of the ninth embodiment where the glove is an ambidextrous glove having two gripping zones on the index finger region, the middle finger region, and the ring finger region, and showing textured first, second, third, and fourth crotch areas;

FIG. 34Q is a front elevation view of a seventeenth example of the ninth embodiment where the glove is an ambidextrous glove having two gripping zones on the index finger region, the middle finger region, the ring finger region, and the little finger region, and showing textured first, second, third, and fourth crotch areas;

FIG. 35 is a front elevation view of a first example of a tenth embodiment of a glove in accordance with the present disclosure, wherein the first example is a hand-specific glove shown worn on a left hand of a user, showing a fingertip region on all digits regions which is of substantially a same circumference as a remaining portion of the digit region, showing one gripping zone on the thumb region and two gripping zones on each of the finger regions, and showing textured first, second, third, and fourth crotch areas;

FIG. 36 is a rear elevation view of the first example of the tenth embodiment of the glove illustrated in FIG. 35;

FIG. 37A is a front elevation view of a second example of the tenth embodiment of a glove in accordance with an aspect of the present disclosure, where the glove is a hand-specific glove having two gripping zones on only the index finger region, and showing a textured second crotch area;

FIG. 37B is a front elevation view of a third example of the tenth embodiment, where the glove is a hand-specific glove having two gripping zones on the index finger region and the middle finger region, and showing a textured second crotch area;

FIG. 37C is a front elevation view of a fourth example of the tenth embodiment where the glove is a hand-specific glove having two gripping zones on the index finger region, the middle finger region, and the ring finger region, and showing a textured second crotch area;

FIG. 37D is a front elevation view of a fifth example of the tenth embodiment where the glove is a hand-specific glove that has two gripping zones on the index finger region, the middle finger region, the ring finger region, and the little finger region, and showing a textured second crotch area;

FIG. 37E is a front elevation view of a sixth example of the tenth embodiment of a glove in accordance with an aspect of the present disclosure, where the glove is a hand-specific glove having two gripping zones on only the index finger region, and showing textured first and second crotch areas;

FIG. 37F is a front elevation view of a seventh example of the tenth embodiment, where the glove is a hand-specific glove having two gripping zones on the index finger region and the middle finger region, and showing textured first and second crotch areas;

FIG. 37G is a front elevation view of an eighth example of the tenth embodiment where the glove is a hand-specific glove having two gripping zones on each of the index finger region, the middle finger region, and the ring finger region, and showing textured first and second crotch areas;

FIG. 37H is a front elevation view of a ninth example of the tenth embodiment where the glove is a hand-specific glove having two gripping zones on each of the index finger region, the middle finger region, the ring finger region, and the little finger region, and showing textured first and second crotch areas;

FIG. 37I is a front elevation view of a tenth example of the tenth embodiment of a glove in accordance with an aspect of the present disclosure, where the glove is a hand-specific glove having two gripping zones on only the index finger region, and showing textured first, second, and third crotch areas;

FIG. 37J is a front elevation view of an eleventh example of the tenth embodiment, where the glove is a hand-specific glove having two gripping zones on the index finger region and the middle finger region, and showing textured first, second, and third crotch areas;

FIG. 37K is a front elevation view of a twelfth example of the tenth embodiment where the glove is a hand-specific glove having two gripping zones on each of the index finger region, the middle finger region, and the ring finger region, and showing textured first, second, and third crotch areas;

FIG. 37L is a front elevation view of a thirteenth example of the tenth embodiment where the glove is a hand-specific glove having two gripping zones on each of the index finger region, the middle finger region, the ring finger region, and the little finger region, and showing textured first, second, and third crotch areas;

FIG. 37M is a front elevation view of a fourteenth example of the tenth embodiment of a glove in accordance with an aspect of the present disclosure, where the glove is a hand-specific glove having two gripping zones on only the index finger region, and showing textured first, second, third, and fourth crotch areas;

FIG. 37N is a front elevation view of a fifteenth example of the tenth embodiment, where the glove is a hand-specific glove having two gripping zones on the index finger region and the middle finger region, and showing textured first, second, third, and fourth crotch areas;

FIG. 37P is a front elevation view of a sixteenth example of the tenth embodiment where the glove is a hand-specific glove having two gripping zones on each of the index finger region, the middle finger region, and the ring finger region, and showing textured first, second, third, and fourth crotch areas;

FIG. 37Q is a front elevation view of a seventeenth example of the tenth embodiment where the glove is a hand-specific glove having two gripping zones on each of the index finger region, the middle finger region, the ring finger region, and the little finger region, and showing textured first, second, third, and fourth crotch areas;

FIG. 38 is a front elevation view of a first example of an eleventh embodiment of a glove in accordance with the present disclosure, wherein the first example is an ambidextrous glove shown worn on a left hand of a user, showing a fingertip region on all digits regions which is of substantially a same circumference as a remaining portion of the digit region, showing one gripping zone on the sides of the thumb region and two gripping zones on the sides of each of the finger regions, and showing textured first, second, third, and fourth crotch areas;

FIG. 39 is a rear elevation view of the first example of the eleventh embodiment of the glove illustrated in FIG. 38;

Figures 40I, 40J, 40K, 40L:
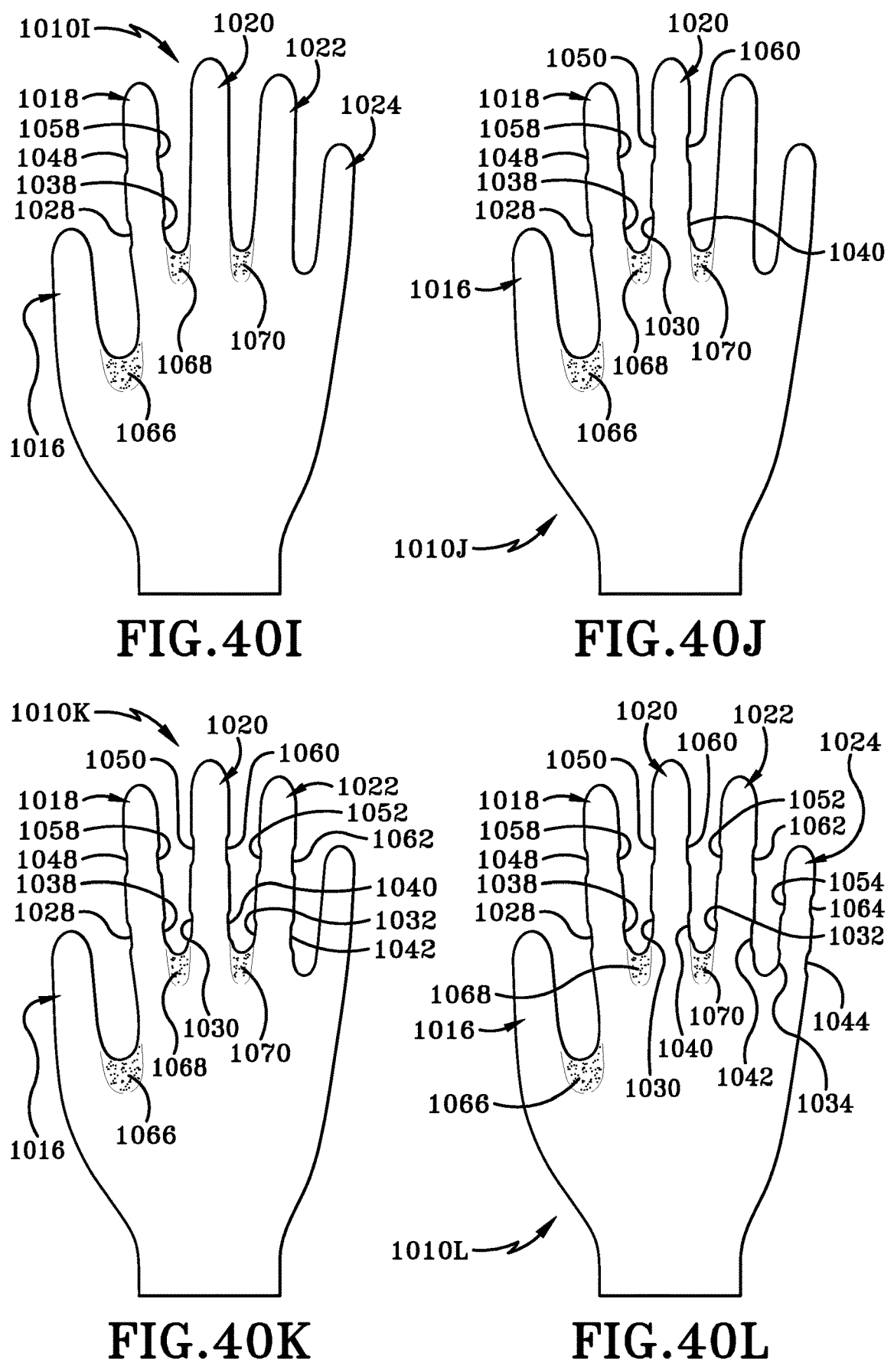

FIG. 40A is a front elevation view of a second example of the eleventh embodiment of a glove in accordance with an aspect of the present disclosure, where the glove is an ambidextrous glove having two gripping zones on the sides of only the index finger region, and showing a textured second crotch area;

FIG. 40B is a front elevation view of a third example of the eleventh embodiment, where the glove is an ambidextrous glove having two gripping zones on the sides of the index finger region and the middle finger region, and showing a textured second crotch area;

FIG. 40C is a front elevation view of a fourth example of the eleventh embodiment where the glove is an ambidextrous glove having two gripping zones on the sides of the index finger region, the middle finger region, and the ring finger region, and showing a textured second crotch area;

FIG. 40D is a front elevation view of a fifth example of the eleventh embodiment where the glove is an ambidextrous glove that has two gripping zones on the sides of each of the index finger region, the middle finger region, the ring finger region, and the little finger region, and showing a textured second crotch area;

FIG. 40E is a front elevation view of a sixth example of the eleventh embodiment of a glove in accordance with an aspect of the present disclosure, where the glove is an ambidextrous glove having two gripping zones on the sides of only the index finger region, and showing textured first and second crotch areas;

FIG. 40F is a front elevation view of a seventh example of the eleventh embodiment, where the glove is an ambidextrous glove having two gripping zones on the sides of the index finger region and the middle finger region, and showing textured first and second crotch areas;

FIG. 40G is a front elevation view of an eighth example of the eleventh embodiment where the glove is an ambidextrous glove having two gripping zones on the sides of the index finger region, the middle finger region, and the ring finger region, and showing textured first and second crotch areas;

FIG. 40H is a front elevation view of a ninth example of the eleventh embodiment where the glove is an ambidextrous glove that has two gripping zones on the sides of each of the index finger region, the middle finger region, the ring finger region, and the little finger region, and showing textured first and second crotch areas;

FIG. 40I is a front elevation view of a tenth example of the eleventh embodiment of a glove in accordance with an aspect of the present disclosure, where the glove is an ambidextrous glove having two gripping zones on the sides of only the index finger region, and showing textured first, second, and third crotch areas;

FIG. 40J is a front elevation view of an eleventh example of the eleventh embodiment, where the glove is an ambidextrous glove having two gripping zones on the sides of the index finger region and the middle finger region, and showing textured first, second, and third crotch areas;

FIG. 40K is a front elevation view of a twelfth example of the eleventh embodiment where the glove is an ambidextrous glove having two gripping zones on the sides of the index finger region, the middle finger region, and the ring finger region, and showing textured first, second, and third crotch areas;

FIG. 40L is a front elevation view of a thirteenth example of the eleventh embodiment where the glove is an ambidextrous glove that has two gripping zones on the sides of each of the index finger region, the middle finger region, the ring finger region, and the little finger region, and showing textured first, second, and third crotch areas;

FIG. 40M is a front elevation view of a fourteenth example of the eleventh embodiment of a glove in accordance with an aspect of the present disclosure, where the glove is an ambidextrous glove having two gripping zones on the sides of only the index finger region, and showing textured first, second, third, and fourth crotch areas;

FIG. 40N is a front elevation view of a fifteenth example of the eleventh embodiment, where the glove is an ambidextrous glove having two gripping zones on the sides of the index finger region and the middle finger region, and showing textured first, second, third, and fourth crotch areas;

FIG. 40P is a front elevation view of a sixteenth example of the eleventh embodiment where the glove is an ambidextrous glove having two gripping zones on the sides of the index finger region, the middle finger region, and the ring finger region, and showing textured first, second, third, and fourth crotch areas;

FIG. 40Q is a front elevation view of a seventeenth example of the eleventh embodiment where the glove is an ambidextrous glove that has two gripping zones on the sides of each of the index finger region, the middle finger region, the ring finger region, and the little finger region, and showing textured first, second, third, and fourth crotch areas;

FIG. 41 is a front elevation view of a first example of a twelfth embodiment of a glove in accordance with the present disclosure, wherein the first example is a hand-specific glove shown worn on a left hand of a user, showing a fingertip region on all digits regions which is of substantially a same circumference as a remaining portion of the digit region, showing one gripping zone on the sides of the thumb region and two gripping zones on the sides of each of the finger regions, and showing textured first, second, third, and fourth crotch areas;

Figure 42:
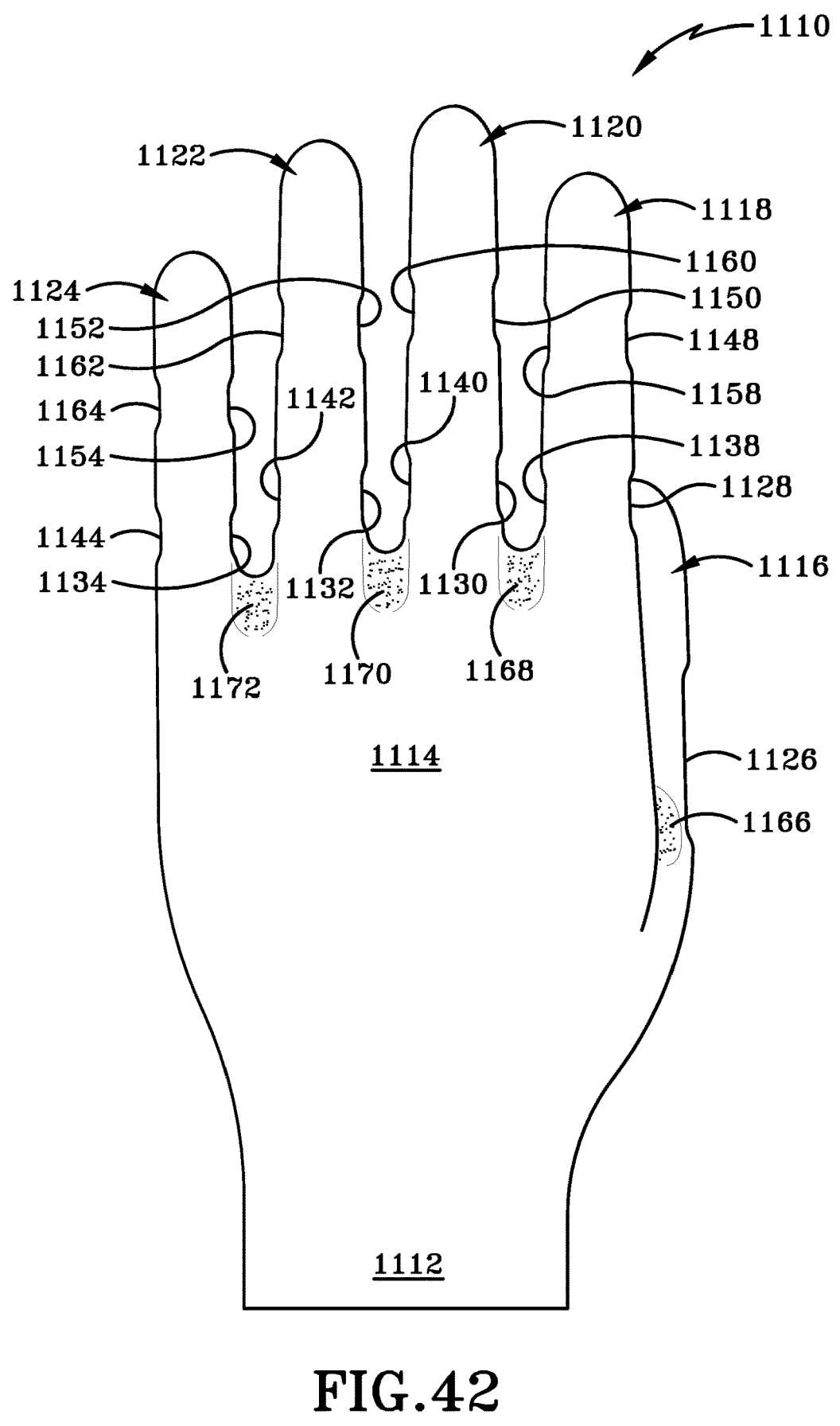

FIG. 42 is a rear elevation view of the first example of the twelfth embodiment of the glove illustrated in FIG. 41;

FIG. 43A is a front elevation view of a second example of the twelfth embodiment of a glove in accordance with an aspect of the present disclosure, where the glove is a hand-specific glove having two gripping zones on the sides of only the index finger region, and showing a textured second crotch area;

FIG. 43B is a front elevation view of a third example of the twelfth embodiment, where the glove is a hand-specific glove having two gripping zones on the sides of the index finger region and the middle finger region, and showing a textured second crotch area;

FIG. 43C is a front elevation view of a fourth example of the twelfth embodiment where the glove is a hand-specific glove having two gripping zones on the sides of the index finger region, the middle finger region, and the ring finger region, and showing a textured second crotch area;

FIG. 43D is a front elevation view of a fifth example of the twelfth embodiment where the glove is a hand-specific glove having two gripping zones on the sides of each of the index finger region, the middle finger region, the ring finger region, and the little finger region, and showing a textured second crotch area;

FIG. 43E is a front elevation view of a sixth example of the twelfth embodiment of a glove in accordance with an aspect of the present disclosure, where the glove is a hand-specific glove having two gripping zones on the sides of only the index finger region, and showing textured first and second crotch areas;

FIG. 43F is a front elevation view of a seventh example of the twelfth embodiment, where the glove is a hand-specific glove having two gripping zones on the sides of the index finger region and the middle finger region, and showing textured first and second crotch areas;

FIG. 43G is a front elevation view of an eighth example of the twelfth embodiment where the glove is a hand-specific glove having two gripping zones on the sides of the index finger region, the middle finger region, and the ring finger region, and showing textured first and second crotch areas;

FIG. 43H is a front elevation view of a ninth example of the twelfth embodiment where the glove is a hand-specific glove having two gripping zones on the sides of each of the index finger region, the middle finger region, the ring finger region, and the little finger region, and showing textured first and second crotch areas;

FIG. 43I is a front elevation view of a tenth example of the twelfth embodiment of a glove in accordance with an aspect of the present disclosure, where the glove is a hand-specific glove having two gripping zones on the sides of only the index finger region, and showing textured first, second, and third crotch areas;

FIG. 43J is a front elevation view of an eleventh example of the twelfth embodiment, where the glove is a hand-specific glove having two gripping zones on the sides of the index finger region and the middle finger region, and showing textured first, second, and third crotch areas;

FIG. 43K is a front elevation view of a twelfth example of the twelfth embodiment where the glove is a hand-specific glove having two gripping zones on the sides of the index finger region, the middle finger region, and the ring finger region, and showing textured first, second, and third crotch areas;

FIG. 43L is a front elevation view of a thirteenth example of the twelfth embodiment where the glove is a hand-specific glove having two gripping zones on the sides of each of the index finger region, the middle finger region, the ring finger region, and the little finger region, and showing textured first, second, and third crotch areas;

FIG. 43M is a front elevation view of a fourteenth example of the twelfth embodiment of a glove in accordance with an aspect of the present disclosure, where the glove is a hand-specific glove having two gripping zones on the sides of only the index finger region, and showing textured first, second, third, and fourth crotch areas;

FIG. 43N is a front elevation view of a fifteenth example of the twelfth embodiment, where the glove is a hand-specific glove having two gripping zones on the sides of the index finger region and the middle finger region, and showing textured first, second, third, and fourth crotch areas;

FIG. 43P is a front elevation view of a sixteenth example of the twelfth embodiment where the glove is a hand-specific glove having two gripping zones on the sides of the index finger region, the middle finger region, and the ring finger region, and showing textured first, second, third, and fourth crotch areas;

FIG. 43Q is a front elevation view of a seventeenth example of the twelfth embodiment where the glove is a hand-specific glove having two gripping zones on the sides of each of the index finger region, the middle finger region, the ring finger region, and the little finger region, and showing textured first, second, third, and fourth crotch areas.

Similar numbers refer to similar parts throughout the drawings.

DETAILED DESCRIPTION

Referring now to FIGS. 1-5E there is shown a first example of a first embodiment of a glove in accordance with the present disclosure, generally indicated at 10. Glove 10 comprises a wrist region 12, a palm region 14, a thumb region 16, an index finger region 18, a middle finger region 20, a ring finger region 22, and a little finger region 24. Glove 10 defines an interior cavity 10a which is configured to receive a hand of a person therein. Thumb region 16, index finger region 18, middle finger region 20, ring finger region 22, and little finger region 24 comprise digit regions which are configured to receive an associated one of a thumb, an index finger, a middle finger, a ring finger, and a little finger of the person's hand, respectively. FIG. 5D, for example shows a person's middle finger "MF" received within a portion of the interior cavity 10a defined by middle finger region 20.

Figure 1:
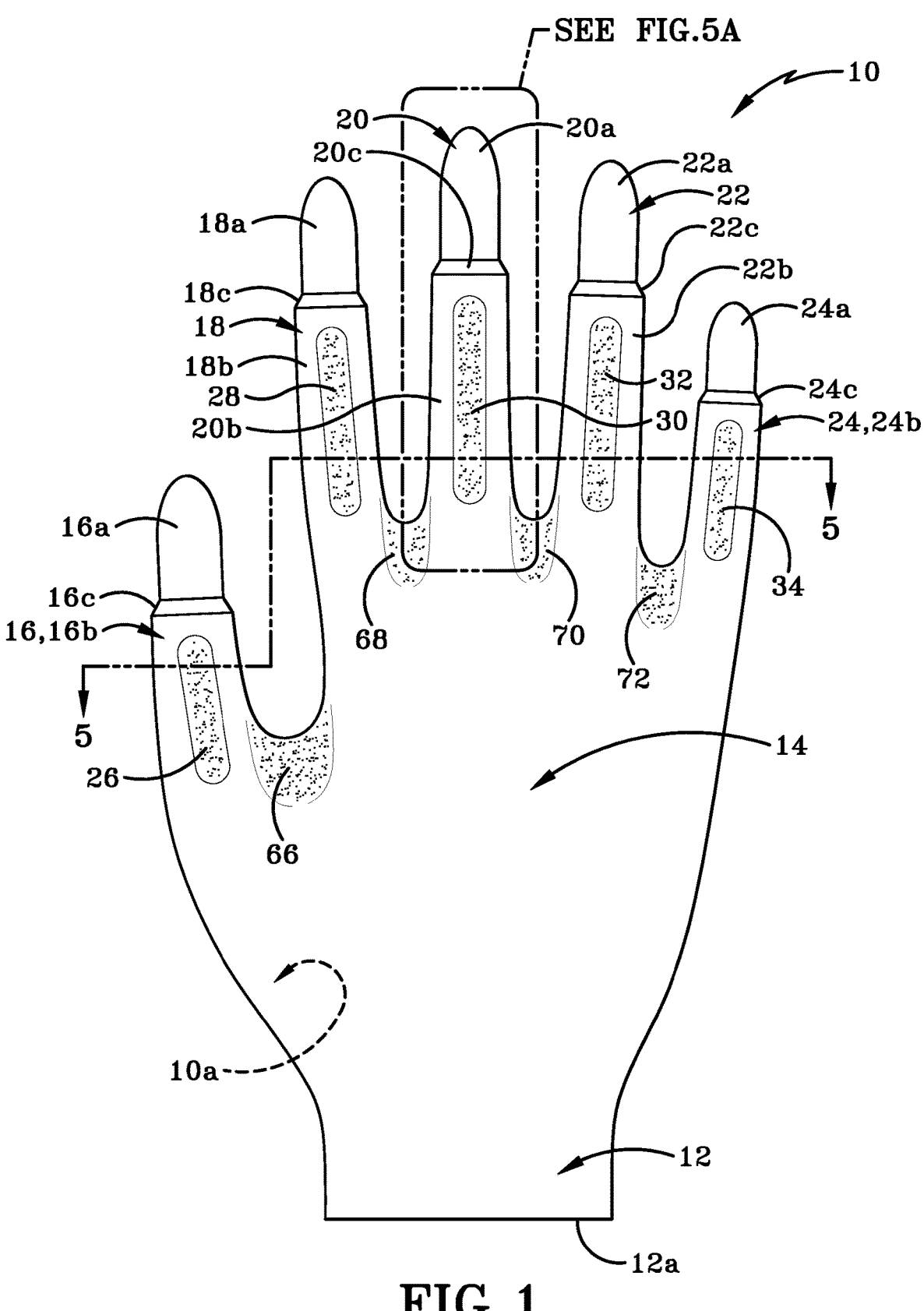
FIG. 1 is a front elevation view of a first example of a first embodiment of a glove in accordance with the present disclosure, wherein the first example is an ambidextrous glove shown worn on a left hand of a user, showing a reduced-circumference fingertip region on all digits regions, showing at least one gripping zone on each of the digit regions, and showing textured first, second, third, and fourth crotch areas.
Figure 2:
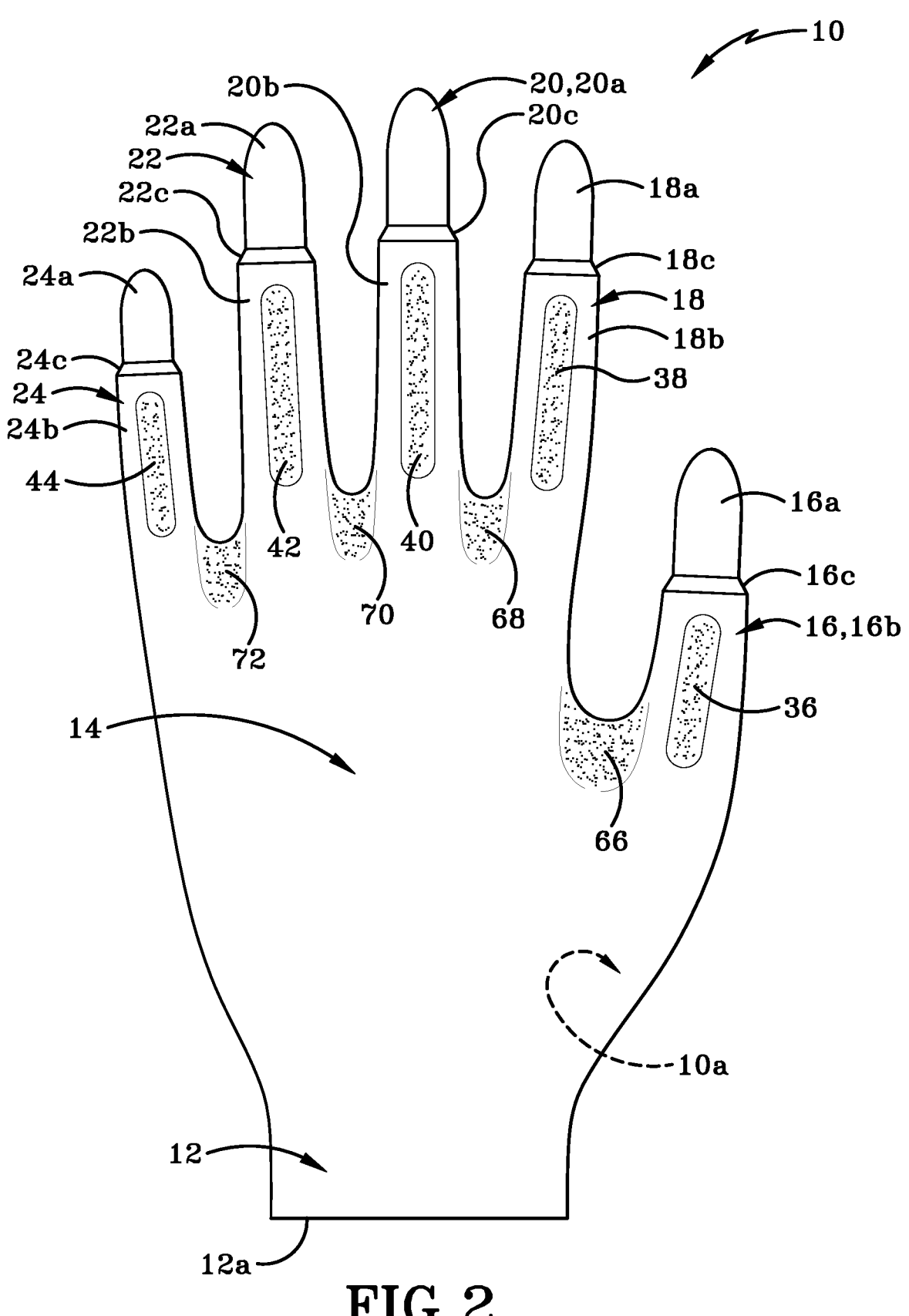
FIG. 2 is a rear elevation view of the glove illustrated in FIG. 1.
Figure 3:
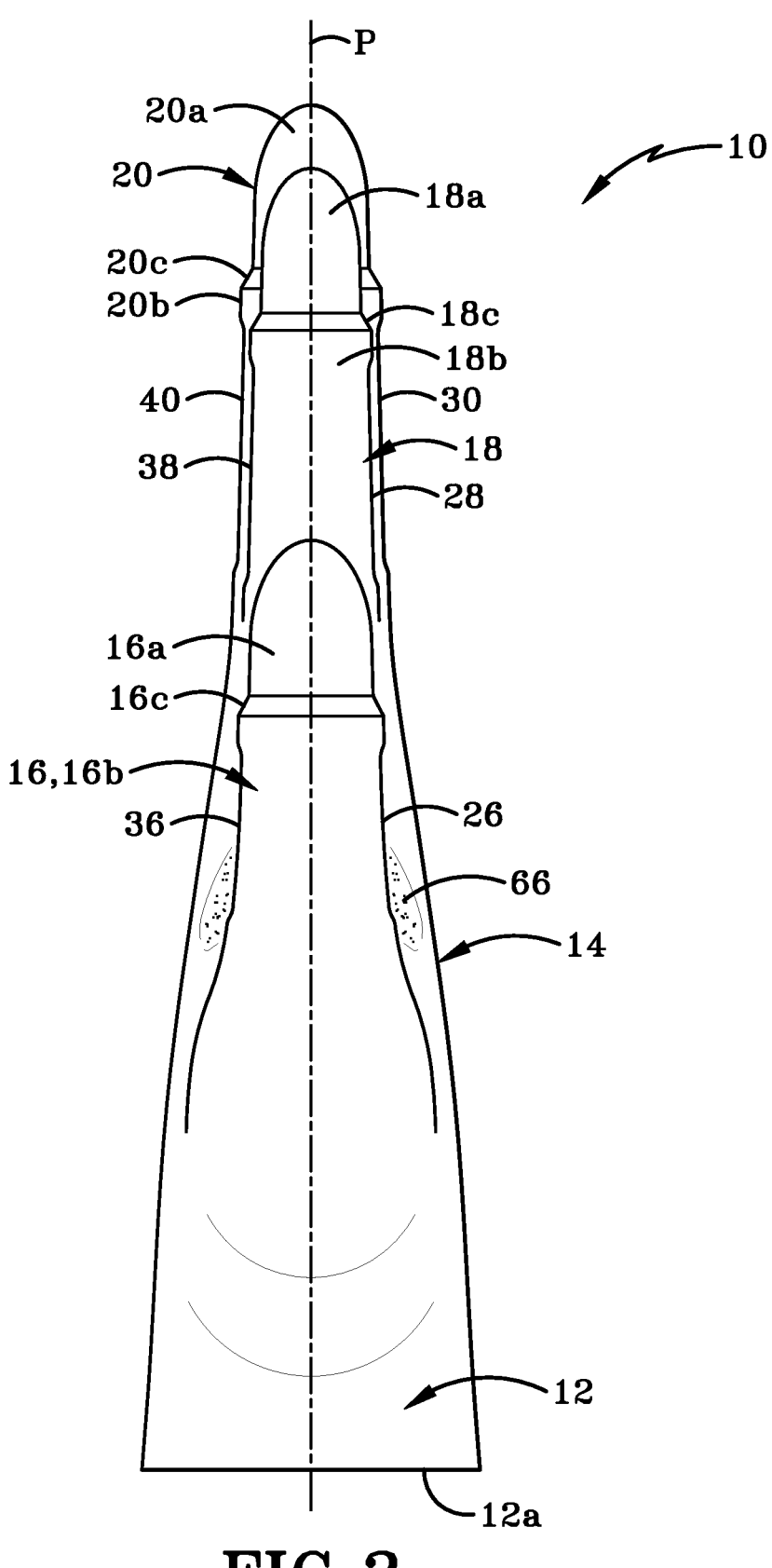
FIG. 3 is a first side elevation view of the glove of FIG. 1.
Figure 4:
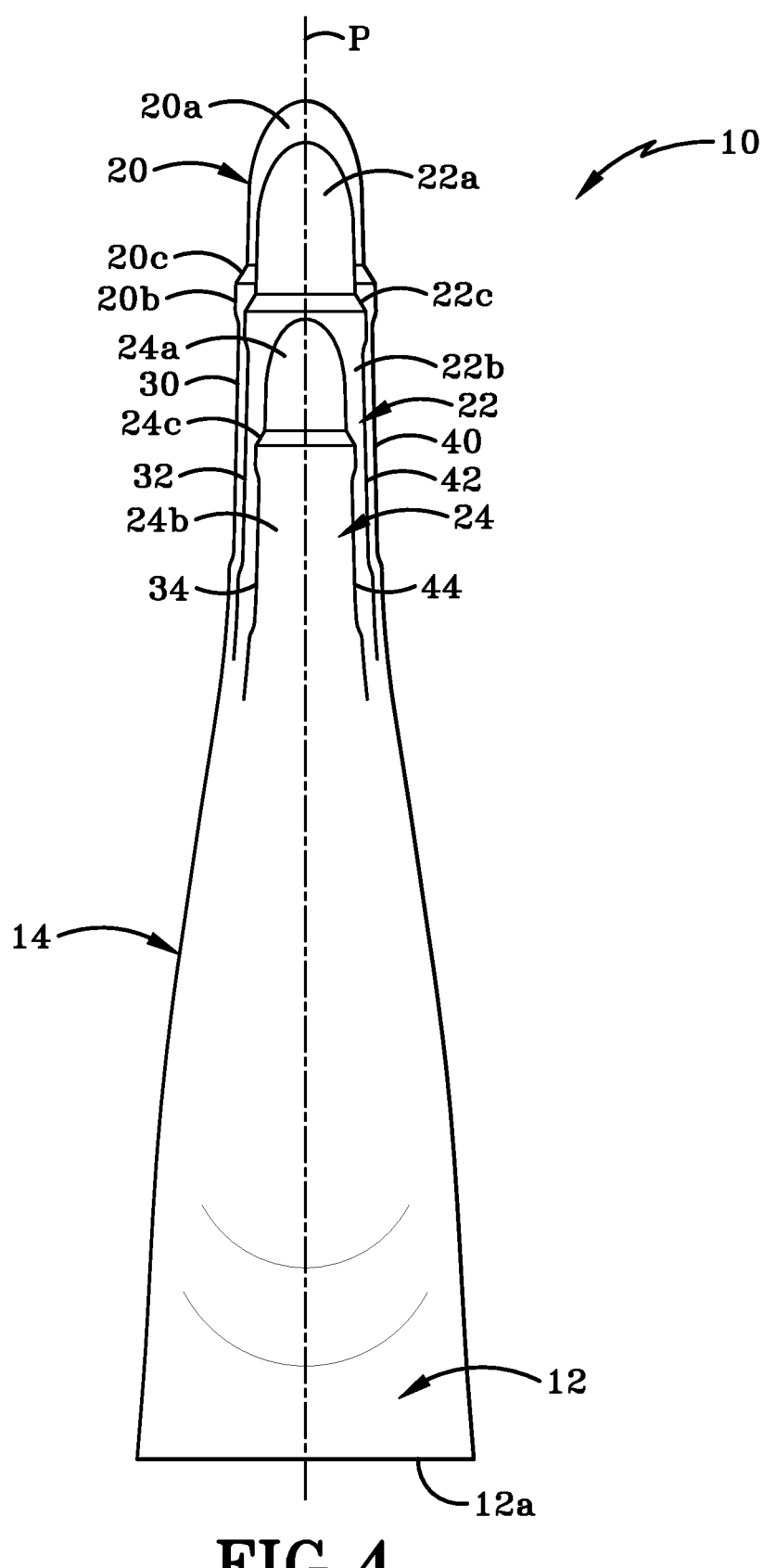
FIG. 4 is a second side elevation view of the glove of FIG. 1.

Glove 10 as illustrated in FIGS. 1-5E is an ambidextrous glove which is capable of being worn on either of a left hand or a right hand of the person. In the ambidextrous glove 10, each of the thumb region 16, index finger region 18, middle finger region 20, ring finger region 22, and little finger region 24 are aligned along a common plane "P" (FIG. 3).

Glove 10 may be fabricated from any suitable material such as nitrile, nitrile rubber, or natural rubber. The glove material preferably is free of or essentially free of zinc and/or sulfur and/or fluoride, and/or cross-links, and/or accelerators and/or accelerants. Some accelerators/accelerants that the glove's material may be free of or essentially free of may include carbonates or thiurams. The glove material which is free of or essentially free of zinc and/or sulfur and/or fluoride, and/or cross-links, and/or accelerators and/or accelerants will at least comprise a portion of the glove which will contact the user's skin when the glove is worn. The glove material preferably is also formulated to be resistant to a variety of toxic or corrosive compounds or chemicals including but not limited to opioids, particularly fentanyl and carfentanil. The composition of the material of the disclosed glove may tend to reduce hypersensitivity or allergic reactions in populations which may be required to frequently wear protective gloves, such as medical practitioners.

Glove 10 may be fabricated in a material having an exterior surface of one color and an interior surface of another color, particularly a strongly contrasting color. This difference in color between the interior and exterior surfaces of glove 10 may act as a tear or cut indicator since, if the interior color is visible on the exterior of glove 10, the person wearing the glove will realize that the exterior surface has been compromised in some way.

As illustrated in each of FIGS. 1-5E, each digit region of glove 10 includes sections which are referred to herein as a "fingertip region", a "remaining portion", and a "transition portion". The fingertip region originates in a tip of the respective digit region and extends downwardly for a distance towards palm region 14. The distance is of a length such that a lower region of the fingertip region will generally be located adjacent to or near where a first knuckle of the person's associated thumb or finger will be positioned when glove 10 is worn. The remaining portion extends between the fingertip region and the palm region 14. This arrangement can be seen in FIG. 5D, for example, where a fingertip region 20a of the middle finger region 20 originates at the tip of the middle finger region 20 and extends for a distance "D1" from the tip, terminating at a location which will be adjacent to or near where a first knuckle "K1" of the middle finger "MF" is located when the glove is worn (see FIG. 5E). A remaining portion 20b of middle finger region 20 extends between fingertip region 20a and palm region 14. Remaining portion 20b extends for a distance "D2" (FIG. 5D) between fingertip region 20a and palm region 14. As will be described later herein, fingertip region 20a is of a reduced circumference relative to remaining portion 20b. The remaining portion 20b includes a transition portion 20c which tapers in circumference moving in a direction from the remaining portion 20b towards the fingertip region 20a.

As illustrated in FIG. 1, thumb region 16 includes a fingertip region 16a, a remaining portion 16b, and a transition portion 16c. Index finger region 18 includes a fingertip region 18a, a remaining portion 18b, and a transition portion 18c. As discussed above, middle finger region 20 includes fingertip region 20a, remaining portion 20b, and transition portion 20c. Ring finger region 22 includes a fingertip region 22a, a remaining portion 22b, and a transition portion 22c. Little finger region 24 includes a fingertip region 24a, a remaining portion 24b, and a transition portion 24c.

FIGS. 1-5E show each of the fingertip regions 16a, 18a, 20a, 22a, and 24a are of a reduced circumference relative to the associated remaining portions 16b, 18b, 20b, 22b, and 24b. Most particularly, the fingertip regions 16a, 18a, 20a, 22a, and 24a are each of a "bullet-tip" shape but it will be understood that other reduced-circumference configurations may be provided on the digit regions of glove 10 instead. The bullet-tip shaped fingertip region provided on a glove is described in detail in U.S. Pat. No. 10,602,788 (Hull), which patent is incorporated herein by reference.

When glove 10 is worn on the left hand as illustrated in FIG. 1, the surface of the glove facing the viewer may be considered to be the "front" of the glove 10. The front of glove 10 is that part of the glove which will contact an object held in the left hand of the person wearing glove 10. Because FIG. 1 shows a "front" view of glove 10, the surfaces of the wrist region 12, palm region 14, and digit regions facing the viewer of FIG. 1 are considered to be the "front" surfaces of the wrist region 12, palm region 14, and digit regions 16, 18, 20, 22, and 24. In view of this, FIG. 2 then illustrates a "back" of glove 10 and therefore the surfaces of the wrist region 12, palm region 14, and digit regions facing the viewer of FIG. 2 are considered to be the "back" surfaces of the wrist region 12, palm region 14, and digit regions 16, 18, 20, 22, and 24.

Using middle finger region 20 of FIGS. 5A-5E as an exemplary digit region, the front of middle finger region 20 is designated by the reference number 20d. The front 20d extends from the tip of the middle finger region through to the palm region 14. Similarly the back of middle finger region 20 is designated by the reference number 20e, a first side of middle finger region 20 is designated by the reference number 20f, and a second side of middle finger region is designated by the reference number 20g. Each of back 20e, first side 20f, and second side 20g extends from the tip of middle finger region 20 to palm region 14. Together the front 20d, back 20e, first side 20f, and second side 20g form an exterior perimeter of middle finger region 20 which bounds and defines an interior cavity of the middle finger region 20. The interior cavity of the middle finger region 20 forms part of the interior cavity 10a of glove 10.

It should be noted that the terms "front", "back", "left", and "right" are used for ease of description and particularly describe the specific orientation of the glove 10 illustrated in FIGS. 1 and 2. The terms "front", "back", "left", and "right" should therefore not be narrowly construed to necessarily describe the orientation of the glove 10 during use, particularly since glove 10 is an ambidextrous glove and can be worn on either of the left hand or right hand of a user.

Figure 5:
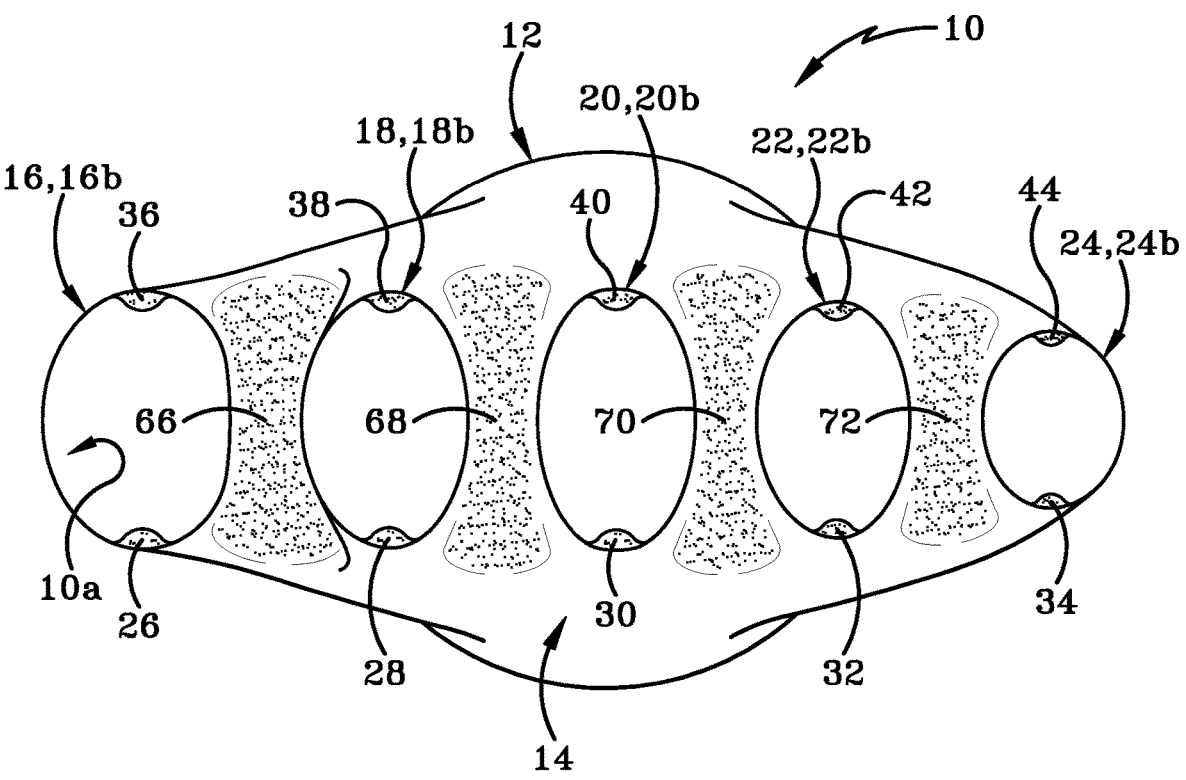
FIG. 5 is a top plan view of the glove taken along line 5-5 of FIG. 1.
Figures 5A, 5B, 5C:
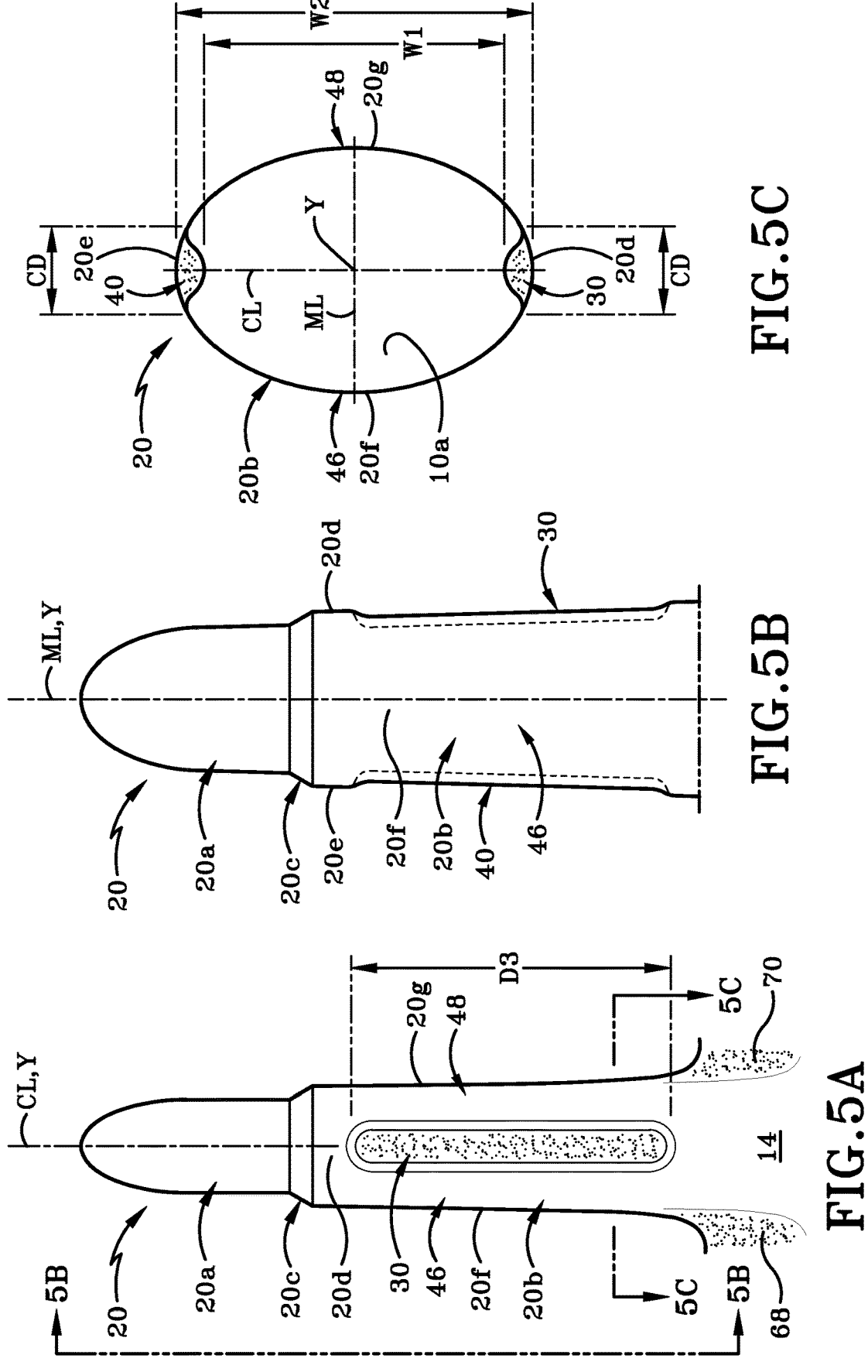
FIG. 5A is a front elevation view of the highlighted middle finger region shown in FIG. 1.
FIG. 5B is a first side elevation view of the middle finger region taken along line 5B-5B of FIG. 5A.
FIG. 5C is a cross-section view of the middle finger region taken along line 5C-5C of FIG. 5A.

FIG. 5A shows that middle finger region 20 has an imaginary centerline "CL" which is located midway between first side 20f and second side 20g and extends along an imaginary longitudinal axis "Y" of middle finger region 20. FIG. 5B shows that middle finger region also has an imaginary midline "ML" located midway between front 20d and back 20e. The imaginary midline "ML" also extends along the imaginary longitudinal axis "Y". FIG. 5C shows that centerline "CL" and midline "ML" are oriented orthogonal to one another and intersect one another along imaginary longitudinal axis "Y" of middle finger region 20. The imaginary longitudinal axis "Y" extends along a length of middle finger region 20 from the tip thereof to the palm region 14.

Although not specifically called out in the attached drawings, it will be understood that each of the thumb region 16, index finger region 18, ring finger region 22, and little finger region 24 has a front substantially similar to front 20d, a back substantially similar to back 20e, a first side substantially similar to first side 20f, and second side substantially similar to second side 20g. Additionally, each of the thumb region 16, index finger region 18, ring finger region 22, and little finger region 24 has a centerline substantially similar to centerline "CL" of middle finger region 20, a midline substantially similar to midline "ML" of middle finger region 20, and an imaginary longitudinal axis substantially identical to imaginary longitudinal axis "Y". The reason the various surfaces are substantially similar to those of middle finger region 20 instead of being substantially identical is, of course, that the various digit regions are of different lengths, widths, and circumferences relative to one another in order to accommodate different fingers and the thumb of a person's hand.

In accordance with an aspect of the present disclosure and as will be discussed in greater detail later herein, glove 10 is provided with at least one gripping zone provided on at least one digit region of glove 10, i.e., on at least one of the thumb region 16, index finger region 18, middle finger region 20, ring finger region 22, and little finger region 24. The at least one gripping zone is oriented substantially parallel to the imaginary longitudinal axis "Y" (FIG. 5A) of the respective at least one digit region. FIG. 1 shows that glove 10 includes at least one gripping zone provided on each of the digit regions of glove. The at least one gripping zone is provided as a first stay 26 provided on thumb region 16, a first stay 28 provided on index finger region 18, a first stay 30 provided on middle finger region 20, a first stay 32 provided on ring finger region 22, and a first stay 34 provided on little finger region 24. The stays will be described hereafter with reference to FIG. 5D which shows an enlarged middle finger region 20 as an exemplary digit region of glove 10. It will be understood that the following description directed to middle finger region 20 applies equally to each of the thumb region 16, index finger region 18, ring finger region 22, and little finger region 24.

Figures 5D, 5E:
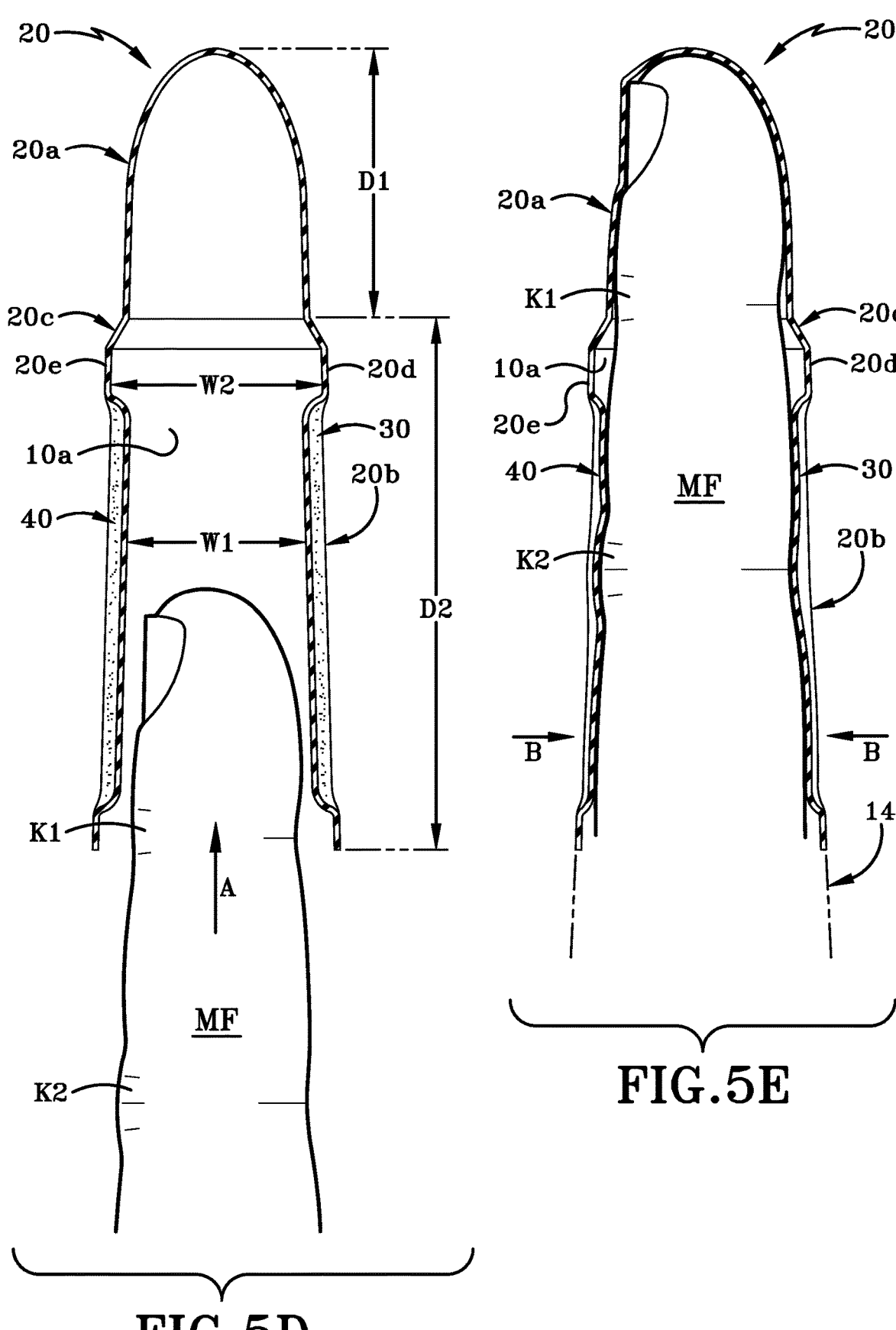
FIG. 5D is an enlarged longitudinal cross-section of the middle finger region showing a person's middle finger being inserted into the interior cavity defined by the middle finger region.
FIG. 5E is an enlarged longitudinal cross-section of the middle finger region similar to FIG. 5D, showing the person's middle finger fully inserted in the interior cavity of the middle finger region and showing the gripping zones contacting the front and back surfaces of the person's middle finger.

Middle finger region 20 is a tubular member which, as described above, has a front 20d, a back 20e, a first side 20e, and a second side 20f. As is evident from FIGS. 5A through 5E, the first stay 30 is formed in the front 20d of middle finger region 20. First stay 30 is an arcuate concave indentation which is formed in a section of the front 20d located in remaining portion 20b. The concave indentation forms a projection which extends into the portion of interior cavity 10a defined by middle finger region 20. This can particularly be seen in FIG. 5D. FIGS. 5B and 5D shows that first stay 30 originates a distance downwardly from the transition portion 20c of middle finger region 20 and terminates a short distance upwardly from palm region 14. FIG. 5A shows that first stay 30 is of a length "D3" which is shorter than the length "D2" of remaining portion 20b. The length "D3" is greater than half of a total length of middle finger region 20 (where the total length is equal to the distance "D1" plus the distance "D2", i.e., from a tip of the middle finger region 20 to the palm region 14). "D3" is less than three quarters of the total length of middle finger region 20. First stay 30 is located entirely within remaining portion 20b in a position that, when glove 10 is worn, will fall below the first knuckle "K1" (FIG. 5E) of the person's middle finger "MF" and above the finger crotch located between the person's index finger and middle finger "MF" and/or the finger crotch between the person's middle finger "MF" and their ring finger. In other words, the first stay 30 will extend over the second knuckle "K2" of the person's middle finger 30. It will be understood that in the thumb region 16 of glove 10, the first stay 26 will extend over the first knuckle "L1" of the person' thumb.

The concave indentation which constitutes the first stay 30 only extends around part of a total circumference of remaining portion 20b of middle finger region 20. The circumference is oriented at ninety degrees relative to the imaginary longitudinal axis "Y" (FIG. 5C). As illustrated, the first stay 30 does not extend circumferentially across the entire width of the front 20d of middle finger region 20 but terminates a distance circumferentially inwardly from each of the first side 20f and second side 20g. The first stay 30 therefore extends for less than a quarter of the total circumference of the remaining portion 20b of middle finger region 20 as can be seen in FIG. 5C. It will be understood that the first stay 30 does not even extend for one quarter of the total circumference of middle finger region 20, as is further evident from FIG. 5C.

In accordance with an aspect of the present disclosure, a second stay is provided in each of the digit regions of glove 10. FIG. 2 shows a second stay 36 provided in thumb region 16, a second stay 38 provided in index finger region 18, a second stay 40 provided in middle finger region 20, a second stay 42 provided in ring finger region 22, and a second stay 44 provided in little finger region 24 and extending substantially parallel to the longitudinal axis of the associate digit region. Each second stay 36, 38, 40, 42, 44 comprises a concave indentation in the back of the associated one of the thumb region 16, index finger region 18, middle finger region 20, ring finger region 22, and little finger region 24. FIGS. 5B and 5D show that first stay 30 is located opposite to and laterally aligned with second stay 40 in middle finger region 20, and is oriented substantially parallel to the imaginary longitudinal axis "Y" of middle finger region 20. Similarly, first stay 26 and second stay 36 are located opposite to and laterally aligned with one another, and are oriented substantially parallel to the longitudinal axis of thumb region 16; first stay 28 and second stay 38 are located opposite to and laterally aligned with one another, and are oriented substantially parallel to the longitudinal axis of index finger region 18; first stay 32 and second stay 42 are located opposite to and laterally aligned with one another, and are oriented substantially parallel to the longitudinal axis of ring finger region 22; and first stay 34 and second stay 44 are located opposite to and laterally aligned with one another, and are oriented substantially parallel to the longitudinal axis of little finger region 24. The concavity of the first and second stays of any one of the digit regions is such that the stays open away from one another and the width W1" (FIGS. 5C and 5D) between the opposed interior surfaces of the stays (such as first stay 30 and second stay 40) is reduced relative to the width "W2" between opposing interior surfaces of the rest of the remaining portion. The width "W3" of middle finger region 20 is not affected by the opposed first stay 30 and second stay 40.

Referring now to FIGS. 5A through 5E, the concave indentation which constitutes each of first stay 30 and second stay 40 extends around less than a quarter of the total circumference of the middle finger region 20. As a consequence, an "un-indented" section of middle finger region 20 is located between the lateral ends of first stay 30 and second stay 40 on each of the first side 20f and second side 20g of middle finger region 20. The "un-indented" regions are indicated by the reference characters 46 and 48 in FIGS. 5B and 5C.

In accordance with another aspect of the present disclosure, an exterior surface of glove 10 along first stays 26, 28, 30, 32, and 34, and along second stays 36, 38, 40, 42, and 44 is textured. In one embodiment the exterior surface of the glove along the stays is micro-etched to create the texturing. The micro-etching is accomplished through any process known in the art. In one embodiment, the micro-etching creates a sand pattern texture that occurs only on the first stays 26, 28, 30, 32, and 34 and second stays 36, 38, 40, 42, and 44. It will be understood that in other embodiments, other patterns, such as a diamond pattern or a herringbone pattern, or any other desired pattern, may be provided on the first stays and second stays by any other process.

As indicated earlier herein, the at least one gripping zone provided on at least one digit region comprises a stay which is oriented substantially parallel to the imaginary longitudinal axis "Y" (FIG. 5A) of the respective digit region. The at least one gripping zone is of a length "D3" shown in FIG. 5A and is of a circumferential distance "CD" shown in FIG. 5C. The circumferential distance "CD" is the distance that the concave indentation of the stay runs along the circumference of the associated digit region. (The circumference of the associated digit region is arranged orthogonal to the imaginary longitudinal axis.) It should be noted by comparing FIGS. 5A and 5C that the length "D3" of the stay is substantially greater than the circumferential distance "CD"

of the stay. It should further be noted that all stays discussed herein with respect to all embodiments of the glove in accordance with the present disclosure have this same relationship between the length "D3" of the stay and the circumferential distance "CD" of the stay.

In accordance with another aspect of the present disclosure a textured first crotch area 66 is defined between thumb region 16 and index finger region 18; a textured second crotch area 68 is defined between index finger region 18 and middle finger region 20; a textured third crotch area 70 is defined between middle finger region 20 and ring finger region 22, and a textured fourth crotch area 72 is defined between ring finger region 22 and little finger region 24. Each of the crotch areas 66-72 is curved or arcuate surface which extends between opposed side surfaces of the two adjacent digit regions and between areas of the front and back of the palm region. When glove 10 is worn, each crotch area extends between the curved portions of the hand which extend between adjacent digits on the person's hand. For each pair of adjacent digit regions on glove 10 there is a first digit region and a second digit region where the sides of the first and second digit regions are adjacent and opposite one another (such as the side of the middle finger region which is adjacent and opposite the side of the ring finger region). As shown in FIGS. 1-5E, the exterior surface of glove 10 along the crotch areas 66-72 is textured, particularly through micro-etching. The micro-etching is accomplished through any process known in the art. In one embodiment, the micro-etching creates a sand pattern texture that is formed partially on part of the front of palm region 14 of glove 10 (shown in FIG. 1), partially on part of the back of palm region 14 (shown in FIG. 2), part of the exterior surface of the opposed sides of the adjacent digit regions, and the curved exterior surface which extends between the opposed sides. The texturing on the front and back of palm region 14 with respect to first crotch area 66 is also illustrated in FIG. 3. Texturing also occurs on the top curved surface of the respective crotch area 66-72, as can be seen in FIG. 5 and the texturing may further extends for a short distance along each of the side surfaces of the two digit regions which flank the first crotch area 66.

The attached figures illustrate a sand pattern texture formed on the exterior surface of the glove material through a micro-etching process. It will be understood that in other embodiments, other patterns, such as a diamond pattern or a herringbone pattern, or any other desired pattern of texturing, may be produced on crotch areas 66-72. The texturing of crotch areas 66-72 strengthens the glove material in the crotch areas 66-72. As illustrated in the attached figures, the exterior surface of the glove 10 other than the stays and crotch areas is free of texturing and is therefore smooth to the touch. It will be understood, however, that in other embodiments, the exterior surface of the glove 10 may be textured. In some embodiments, the texturing may be different to the texturing provided on the stays and crotch areas as described previously herein.

Referring now to FIGS. 1, 5D and 5E in particular, glove 10 is used in the following manner. Wrist region 12 of glove 10 has an end 12a which bounds and defines an opening (not shown) to interior cavity 10a. When a person wishes to don glove 10, he or she will insert their hand into interior cavity 10a through this opening and will slide each of their fingers and thumb into the appropriate one of the digit regions of glove 10. Preferably, glove 10 will be slid downwardly along the person's hand until the crotch areas 66-72 are approximately located above or in contact with the finger crotches on the person's hand. FIG. 5D shows middle finger "MF" sliding into the portion of interior cavity 10a defined by middle finger region 20 in the direction indicated by arrow "A". Middle finger "MF" slides all the way into the interior cavity of middle finger region 20 until the tip of the person's middle finger contacts the interior surface at the tip of the middle finger region 20.

Fingertip region 20a of middle finger region 20 is of a circumference that is slightly smaller than the circumference of the fingertip of the person's middle finger "MF". The material of the fingertip region 20a is therefore pulled tautly around the fingertip of the middle finger "MF". The wall thickness of the material of the fingertip region 20a may actually be pulled taut enough to thin slightly relative to the thickness of the wall of the remaining portion 20b of middle finger region 20. FIG. 5E shows that the fingertip region 20a is snugly received around the fingertip of middle finger "MF" such that there is direct contact between the pad on the middle finger "MF" and the interior surface of the front 20d of fingertip region 20b. This snug-fitting engagement between fingertip region 20a and the fingertip of the middle finger "MF" ensures that the person's finger has substantially the same tactile sensitivity and dexterity as would be the case if the glove 10 had not been donned.

FIG. 5E shows that the person's first knuckle "K1" is located adjacent or near the transition portion 20c of middle finger region 20. First and second stays 30, 40 originate a short distance downwardly from transition portion 20c, extend across the second knuckle "K2" and terminate a short distance above the palm region 14 (FIG. 1). The circumference of the remaining portion 20b of middle finger region 20 is such that, after some time of wearing glove 10, there may not be much direct contact between the exterior surface of the person's middle finger "MF" and the interior surface of the remaining portion 20b of middle finger region 20. However, the concave indentations of first stay 30 and second stay 40 project for a distance into the portion of interior cavity 10a defined by middle finger region 20 and will contact the skin on the front and back of the middle finger "MF". Because of this direct physical contact between the exterior surface of middle finger "MF" and the interior surfaces of first stay 30 and second stay 40 the first stay 30 and second stay 40 frictionally engage the middle finger "MF" as indicated by arrows "B" in FIG. 5E. This frictional contact helps first stay 30 and second stay 40 to grippingly engage the person's middle finger "MF" and thereby to aid middle finger region 20 in resisting the tendency to slide along the length of the person's middle finger "MF" during use of glove 10. The first and second stays 30, 40 therefore help to ensure that the glove material in the fingertip region 20a remains taut around the tip of the person's middle finger "MF" and thereby helps to maintain tactile sensitivity and finger dexterity of the middle finger "MF", even when the glove 10 is used for a period of time. The texturing in crotch areas 66-72 helps glove 10 to maintain its integrity on the hand during use and the strengthening of the glove material afforded by crotch areas 66-72 helps to ensure those areas of the glove will tend to resist damage and remain intact during use.

Figure 6A:
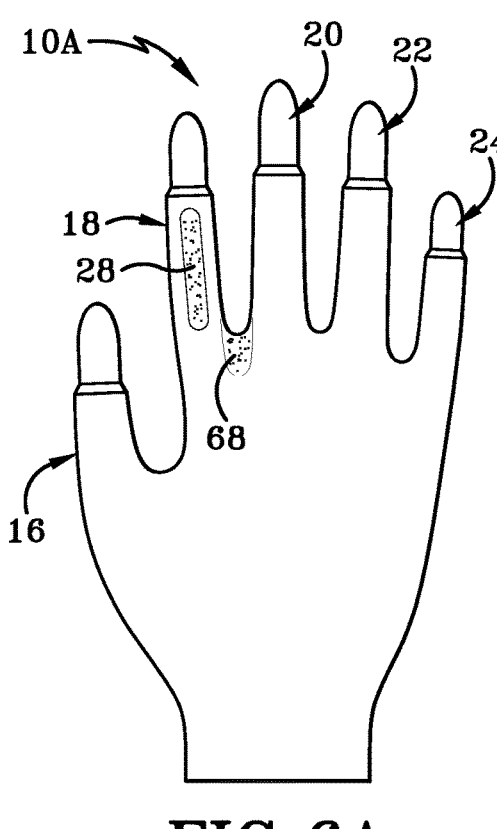
FIG. 6A is a front elevation view of a second example of the first embodiment of a glove in accordance with an aspect of the present disclosure, where the glove is an ambidextrous glove having a gripping zone on only the index finger region, and having a textured second crotch area.

Referring now to FIGS. 6A to 6Q there are shown a number of different examples of the first embodiment of glove 10 illustrated in FIGS. 1-5E. It should be understood that the set of illustrated examples is not exhaustive, i.e., configurations of the first embodiment of the glove 10 other than those illustrated are also possible.

FIG. 6A shows a second example of the first embodiment of the glove, generally indicated as glove 10A. Glove 10A is identical to glove 10 in all aspects except that instead of all five of the thumb region 16, index finger region 18, middle finger region 20, ring finger region 22, and little finger region 24 including at least one gripping zone in the form of first stays 26, 28, 30, 32, 34 and second stays 36, 38, 40, 42, and 44; only one of the digit regions includes at least one gripping zone. By way of illustration only, index finger region 18 has a first stay 28 formed in the front thereof. In some embodiments, a second stay (identical to second stay 38 (FIG. 2) is formed in the back of index finger region. The first stay 28 and the second stay (not shown in FIG. 6A) are opposed to and laterally aligned with one another. It will be understood that instead of the at least one stay being provided in the front or back of index finger region 18, the at least one stay may, instead, be provided in the front or back of any of the thumb region 16, middle finger region 20, ring finger region 22, and little finger region 24. An opposing other stay may be provided in the other of the front or back of the same one of the thumb region 16, middle finger region 20, ring finger region 22, and little finger region 24. The provided gripping zones in the form of the first stay and/or the second stay include texturing on an exterior surface of the glove 10 in the region of the first stay and/or the second stay. In one embodiment, the texturing is produced on the exterior surface of the glove by micro-etching the same. In one embodiment, the micro-etching creates a sand pattern on the exterior surface of the first stay and/or the second stay. Glove 10A also includes only one textured crotch area. In particular, glove 10A is illustrated as including the textured second crotch area 68. It will be understood, however, that any other of the first crotch area 66, third crotch area 70, and fourth crotch area 72 may be provided in glove 10A.

Figure 6B:
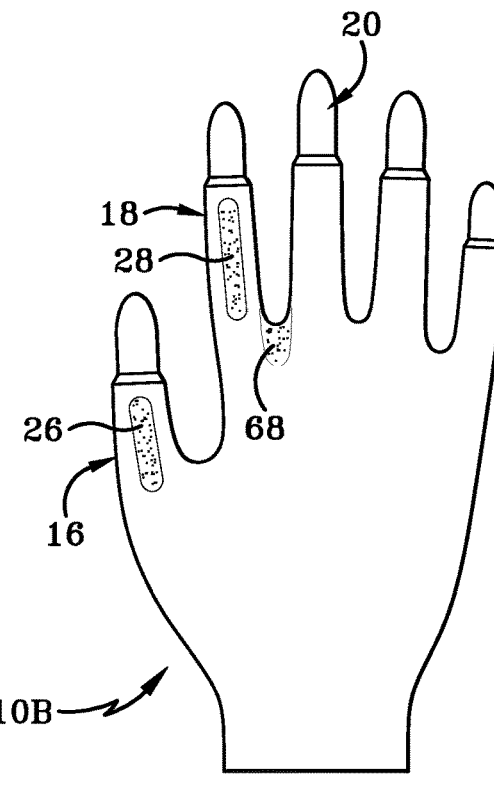
FIG. 6B is a front elevation view of a third example of the first embodiment, where the glove is an ambidextrous glove having a gripping zone on each of the thumb region and index finger region, and having a textured second crotch area.

FIG. 6B shows a third example of the first embodiment of the glove, generally indicated as glove 10B. Glove 10B is identical to glove 10 in all aspects except that instead of all five of thumb region 16, index finger region 18, middle finger region 20, ring finger region 22, and little finger region 24 including at least one gripping zone in the form of first stays 26, 28, 30, 32, 34 and second stays 36, 38, 40, 42, and 44; only two of the digit regions include at least one gripping zone. By way of illustration only thumb region 16 and index finger region 18 are each provided with at least one stay formed in the front thereof. First stay 26 is provided in the front of thumb region 16 and first stay 28 is provided in the front of index finger region 18. In some embodiments, a second stay is formed in the back of each of thumb region 16 and index finger region 18. In particular, second stay 36 is formed in the back of thumb region 16 and second stay 38 is formed in the back of index finger region 18. First stay 26 and second stay 36 are opposed to and laterally aligned with one another; and first stay 28 and second stay 38 are opposed to and laterally aligned with one another. It will be understood that instead of the at least one stay being provided in thumb region 16 and index finger region 18, the at least one stay may be provided in the front or back of any two of the thumb region 16, index finger region 18, middle finger region 20, ring finger region 22, and little finger region 24. An opposing other stay may be provided in the other of the front or back of the same two of the thumb region 16, index finger region, middle finger region 20, ring finger region 22, and little finger region 24. The provided gripping zones in the form of the first stay and/or the second stay will include texture on the exterior surface of the glove. In particular the texture is formed by micro-etching of the exterior surface of the first stay and/or the second stay. In one embodiment, the micro-etching creates a sand texture on the exterior surface of the first stay or the second stay. Glove 10B includes only one textured crotch area. In particular, glove 10B is illustrated as including the textured second crotch area 68. It will be understood, however, that any other of the first crotch area 66, third crotch area 70, and fourth crotch area 72 may be provided in glove 10B.

Figure 6C:
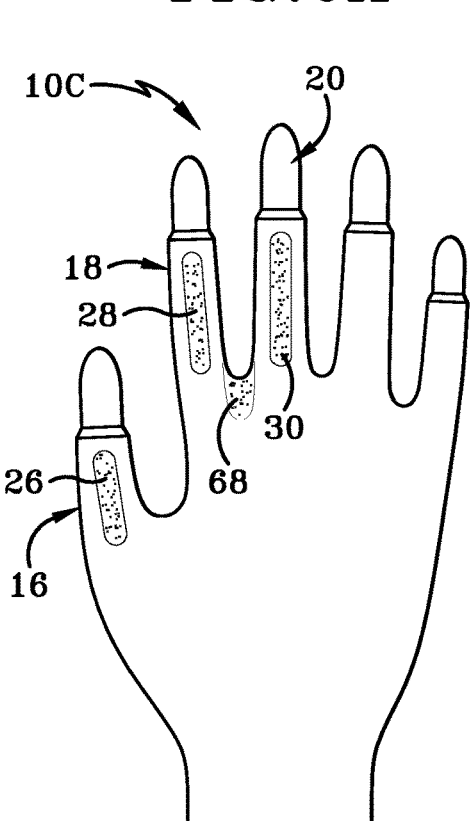
FIG. 6C is a front elevation view of a fourth example of the first embodiment where the glove is an ambidextrous glove having a gripping zone on each of the thumb region, the index finger region and the middle finger region, and having a textured second crotch area.

FIG. 6C shows a fourth example of the first embodiment of the glove, generally indicated as glove 10C. Glove 10C is identical to glove 10 in all aspects except that instead of all five of thumb region 16, index finger region 18, middle finger region 20, ring finger region 22, and little finger region 24 including at least one gripping zone in the form of first stays 26, 28, 30, 32, 34 and second stays 36, 38, 40, 42, and 44; only three of the digit regions include at least one gripping zone. By way of illustration only thumb region 16, index finger region 18, and middle finger region 20 are each provided with at least one stay formed in the front thereof. First stay 26 is provided in thumb region 16, first stay 28 is provided in index finger region 18, and first stay 30 is provided in middle finger region 20. In some embodiments, a second stay is formed in the back of each of thumb region 16, index finger region 18, and middle finger region 20. In particular, second stay (not shown in FIG. 6C) is formed in the back of thumb region 16, a second stay is formed in the back of index finger region 18, and a second stay is formed in the back of middle finger region 20. First stay 26 and the second stay in thumb region 16 are opposed to and laterally aligned with one another; first stay 28 and the second stay in index finger region 18 are opposed to and laterally aligned with one another; and first stay 30 and the second stay in the middle finger region 20 are opposed to and laterally aligned with one another. It will be understood that instead of the at least one stay being provided in one of the front and back of thumb region 16, index finger region 18, and middle finger region 20, the at least one stay may, instead, be provided in any three of the thumb region 16, index finger region 18, middle finger region 20, ring finger region 22, and little finger region 24. An opposing other stay may be provided in the other of the front and back of the same three of the thumb region 16, index finger region, middle finger region 20, ring finger region 22, and little finger region 24. The provided gripping zones in the form of the first stay and/or the second stay will include texture on the exterior surface of the glove. In particular the texture is formed by micro-etching of the exterior surface of the first stay and/or the second stay. In one embodiment, the micro-etching creates a sand texture on the exterior surface of the first stay or the second stay. Glove 10C also includes only one textured crotch area. In particular, glove 10C is illustrated as including the textured second crotch area 68. It will be understood, however, that any other of the first crotch area 66, third crotch area 70, and fourth crotch area 72 may be provided in glove 10C.

Figure 6D:
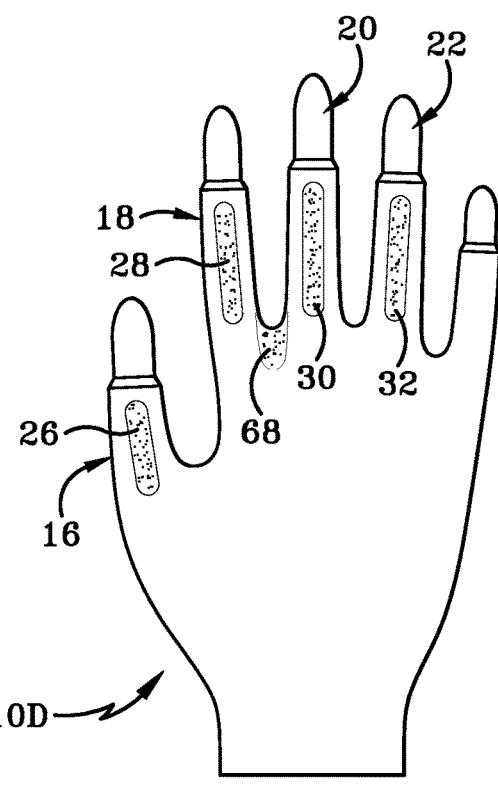
FIG. 6D is a front elevation view of a fifth example of the first embodiment where the glove is an ambidextrous glove that has a gripping zone on each of the thumb region, the index finger region, the middle finger region, and the ring finger region, and having a textured second crotch area.

FIG. 6D shows a fifth example of the first embodiment of the glove, generally indicated as glove 10D. Glove 10D is identical to glove 10 in all aspects except that instead of all five of thumb region 16, index finger region 18, middle finger region 20, ring finger region 22, and little finger region 24 including at least one gripping zone in the form of first stays 26, 28, 30, 32, 34 and/or second stays 36, 38, 40, 42, and 44; only four of the digit regions include the at least one gripping zone. By way of illustration only thumb region 16, index finger region 18, middle finger region 20, and ring finger region 22 are each provided with at least one stay formed in the front thereof. First stay 26 is provided in thumb region 16, first stay 28 is provided in index finger region 18, first stay 30 is provided in middle finger region 20, and first stay 32 is provided in ring finger region 22. In some embodiments, a second stay is formed in the back of each of thumb region 16, index finger region 18, middle finger region 20, and ring finger region 22. In particular, a second stay is formed in the back of thumb region 16, a second stay is formed in the back of index finger region 18, a second stay is formed in the back of middle finger region 20, and a second stay is formed in the back of ring finger region 22. First stay 26 and the second stay in thumb region 16 are opposed to and laterally aligned with one another; first stay 28 and the second stay in index finger region 18 are opposed to and laterally aligned with one another; first stay 30 and the second stay in middle finger region 20 are opposed to and laterally aligned with one another, and first stay 32 and the second stay in the ring finger region 22 are opposed to and laterally aligned with one another. It will be understood that instead of the at least one stay being provided in thumb region 16, index finger region 18, middle finger region 20, and ring finger region 22, the at least one stay may be provided in the front or back any four of the thumb region 16, index finger region 18, middle finger region 20, ring finger region 22, and little finger region 24. An opposing other stay may be provided in the other of the front or back of the same four of the thumb region 16, index finger region, middle finger region 20, ring finger region 22, and little finger region 24. The provided gripping zones in the form of the first stay and/or the second stay will include texture on the exterior surface of the glove. In particular the texture is formed by micro-etching of the exterior surface in the region of the first stay and/or the second stay. In one embodiment, the micro-etching creates a sand texture on the exterior surface of the first stay or the second stay. Glove 10D also includes only one textured crotch area. In particular, glove 10D is illustrated as including the textured second crotch area 68. It will be understood, however, that any other of the first crotch area 66, third crotch area 70, and fourth crotch area 72 may be provided in glove 10D.

Figures 6E, 6F, 6G, 6H:
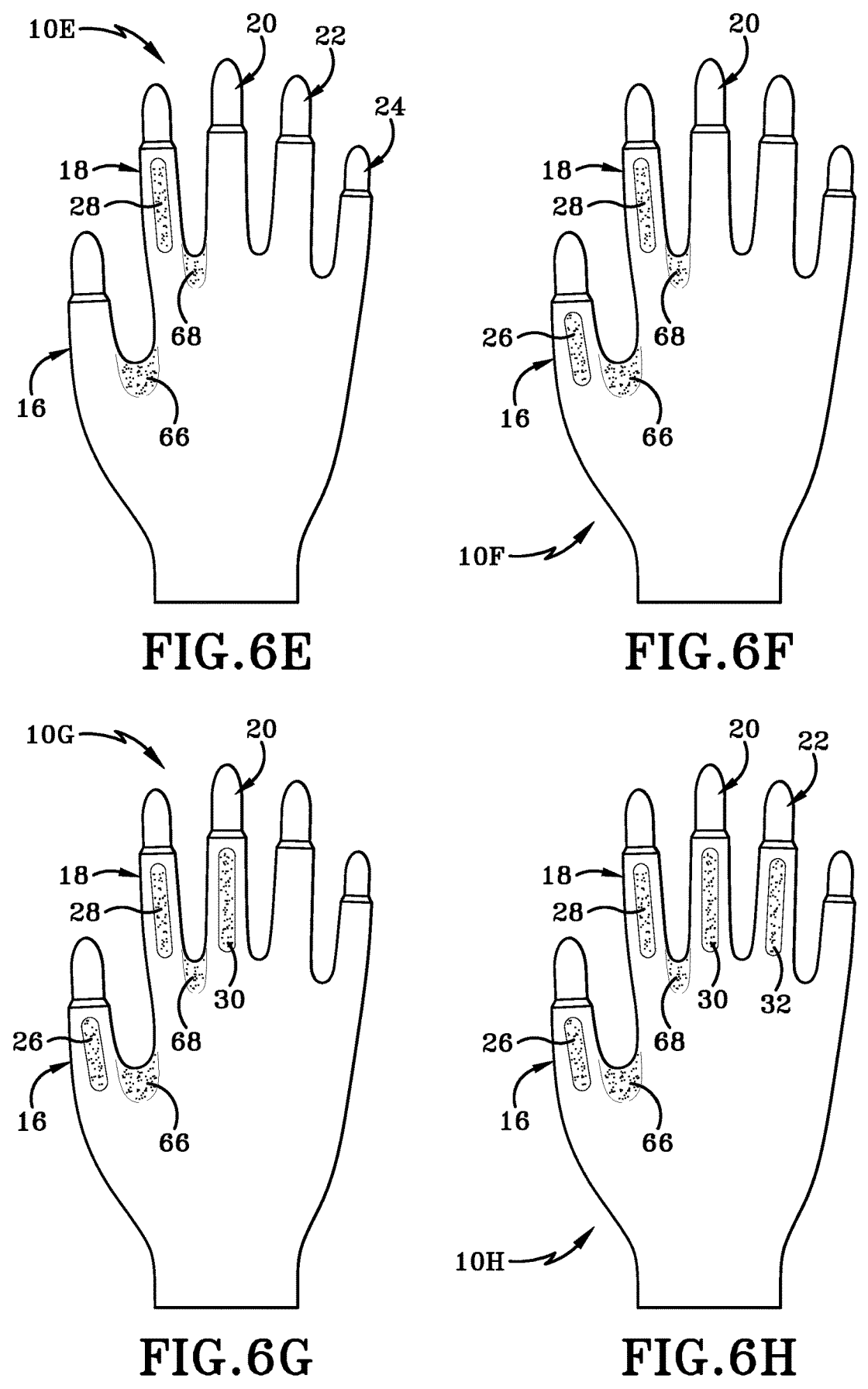

FIG. 6E shows a fifth example of the first embodiment of the glove, generally indicated as glove 10E. Glove 10EA is identical to glove 10 in all aspects except that instead of all five of the thumb region 16, index finger region 18, middle finger region 20, ring finger region 22, and little finger region 24 including at least one gripping zone in the form of first stays 26, 28, 30, 32, 34 and second stays 36, 38, 40, 42, and 44; only one of the digit regions includes at least one gripping zone. By way of illustration only, index finger region 18 has a first stay 28 formed in the front thereof. In some embodiments, a second stay (identical to second stay 38 (FIG. 2) is formed in the back of index finger region. The first stay 28 and the second stay (not shown in FIG. 6A) are opposed to and laterally aligned with one another. It will be understood that instead of the at least one stay being provided in the front or back of index finger region 18, the at least one stay may, instead, be provided in the front or back of any of the thumb region 16, middle finger region 20, ring finger region 22, and little finger region 24. An opposing other stay may be provided in the other of the front or back of the same one of the thumb region 16, middle finger region 20, ring finger region 22, and little finger region 24. The provided gripping zones in the form of the first stay and/or the second stay include texturing on an exterior surface of the glove 10 in the region of the first stay and/or the second stay. In one embodiment, the texturing is produced on the exterior surface of the glove by micro-etching the same. In one embodiment, the micro-etching creates a sand pattern on the exterior surface of the first stay and/or the second stay. Glove 10E includes only two textured crotch areas. In particular, glove 10E is illustrated as including the textured first crotch area 66 and second crotch area 68. It will be understood, however, that any combination of two of the crotch areas 66-72 may be provided in glove 10E.

FIG. 6F shows a seventh example of the first embodiment of the glove, generally indicated as glove 10F. Glove 10F is identical to glove 10 in all aspects except that instead of all five of thumb region 16, index finger region 18, middle finger region 20, ring finger region 22, and little finger region 24 including at least one gripping zone in the form of first stays 26, 28, 30, 32, 34 and second stays 36, 38, 40, 42, and 44; only two of the digit regions include at least one gripping zone. By way of illustration only thumb region 16 and index finger region 18 are each provided with at least one stay formed in the front thereof. First stay 26 is provided in the front of thumb region 16 and first stay 28 is provided in the front of index finger region 18. In some embodiments, a second stay is formed in the back of each of thumb region 16 and index finger region 18. In particular, second stay 36 is formed in the back of thumb region 16 and second stay 38 is formed in the back of index finger region 18. First stay 26 and second stay 36 are opposed to and laterally aligned with one another; and first stay 28 and second stay 38 are opposed to and laterally aligned with one another. It will be understood that instead of the at least one stay being provided in thumb region 16 and index finger region 18, the at least one stay may be provided in the front or back of any two of the thumb region 16, index finger region 18, middle finger region 20, ring finger region 22, and little finger region 24. An opposing other stay may be provided in the other of the front or back of the same two of the thumb region 16, index finger region, middle finger region 20, ring finger region 22, and little finger region 24. The provided gripping zones in the form of the first stay and/or the second stay will include texture on the exterior surface of the glove. In particular the texture is formed by micro-etching of the exterior surface of the first stay and/or the second stay. In one embodiment, the micro-etching creates a sand texture on the exterior surface of the first stay or the second stay. Glove 10F includes only two textured crotch areas. In particular, glove 10F is illustrated as including the textured first crotch area 66 and second crotch area 68. It will be understood, however, that any combination of two of the crotch areas 66-72 may be provided in glove 10F.

FIG. 6G shows an eighth example of the first embodiment of the glove, generally indicated as glove 10G. Glove 10G is identical to glove 10 in all aspects except that instead of all five of thumb region 16, index finger region 18, middle finger region 20, ring finger region 22, and little finger region 24 including at least one gripping zone in the form of first stays 26, 28, 30, 32, 34 and second stays 36, 38, 40, 42, and 44; only three of the digit regions include at least one gripping zone. By way of illustration only thumb region 16, index finger region 18, and middle finger region 20 are each provided with at least one stay formed in the front thereof. First stay 26 is provided in thumb region 16, first stay 28 is provided in index finger region 18, and first stay 30 is provided in middle finger region 20. In some embodiments, a second stay is formed in the back of each of thumb region 16, index finger region 18, and middle finger region 20. In particular, second stay (not shown in FIG. 6C) is formed in the back of thumb region 16, a second stay is formed in the back of index finger region 18, and a second stay is formed in the back of middle finger region 20. First stay 26 and the second stay in thumb region 16 are opposed to and laterally aligned with one another; first stay 28 and the second stay in index finger region 18 are opposed to and laterally aligned with one another; and first stay 30 and the second stay in the middle finger region 20 are opposed to and laterally aligned with one another. It will be understood that instead of the at least one stay being provided in one of the front and back of thumb region 16, index finger region 18, and middle finger region 20, the at least one stay may, instead, be provided in any three of the thumb region 16, index finger region 18, middle finger region 20, ring finger region 22, and little finger region 24. An opposing other stay may be provided in the other of the front and back of the same three of the thumb region 16, index finger region, middle finger region 20, ring finger region 22, and little finger region 24. The provided gripping zones in the form of the first stay and/or the second stay will include texture on the exterior surface of the glove. In particular the texture is formed by micro-etching of the exterior surface of the first stay and/or the second stay. In one embodiment, the micro-etching creates a sand texture on the exterior surface of the first stay or the second stay. Glove 10G includes only two textured crotch areas. In particular, glove 10G is illustrated as including the textured first crotch area 66 and second crotch area 68. It will be understood, however, that any combination of two of the crotch areas 66-72 may be provided in glove 10G.

FIG. 6H shows a ninth example of the first embodiment of the glove, generally indicated as glove 10H. Glove 10H is identical to glove 10 in all aspects except that instead of all five of thumb region 16, index finger region 18, middle finger region 20, ring finger region 22, and little finger region 24 including at least one gripping zone in the form of first stays 26, 28, 30, 32, 34 and/or second stays 36, 38, 40, 42, and 44; only four of the digit regions include the at least one gripping zone. By way of illustration only thumb region 16, index finger region 18, middle finger region 20, and ring finger region 22 are each provided with at least one stay formed in the front thereof. First stay 26 is provided in thumb region 16, first stay 28 is provided in index finger region 18, first stay 30 is provided in middle finger region 20, and first stay 32 is provided in ring finger region 22. In some embodiments, a second stay is formed in the back of each of thumb region 16, index finger region 18, middle finger region 20, and ring finger region 22. In particular, a second stay is formed in the back of thumb region 16, a second stay is formed in the back of index finger region 18, a second stay is formed in the back of middle finger region 20, and a second stay is formed in the back of ring finger region 22. First stay 26 and the second stay in thumb region 16 are opposed to and laterally aligned with one another; first stay 28 and the second stay in index finger region 18 are opposed to and laterally aligned with one another; first stay 30 and the second stay in middle finger region 20 are opposed to and laterally aligned with one another, and first stay 32 and the second stay in the ring finger region 22 are opposed to and laterally aligned with one another. It will be understood that instead of the at least one stay being provided in thumb region 16, index finger region 18, middle finger region 20, and ring finger region 22, the at least one stay may be provided in the front or back any four of the thumb region 16, index finger region 18, middle finger region 20, ring finger region 22, and little finger region 24. An opposing other stay may be provided in the other of the front or back of the same four of the thumb region 16, index finger region, middle finger region 20, ring finger region 22, and little finger region 24. The provided gripping zones in the form of the first stay and/or the second stay will include texture on the exterior surface of the glove. In particular the texture is formed by micro-etching of the exterior surface in the region of the first stay and/or the second stay. In one embodiment, the micro-etching creates a sand texture on the exterior surface of the first stay or the second stay. Glove

10H includes only two textured crotch areas. In particular, glove 10H is illustrated as including the textured first crotch area 66 and second crotch area 68. It will be understood, however, that any combination of two of the crotch areas 66-72 may be provided in glove 10H.

Figures 6I, 6J, 6K, 6L:
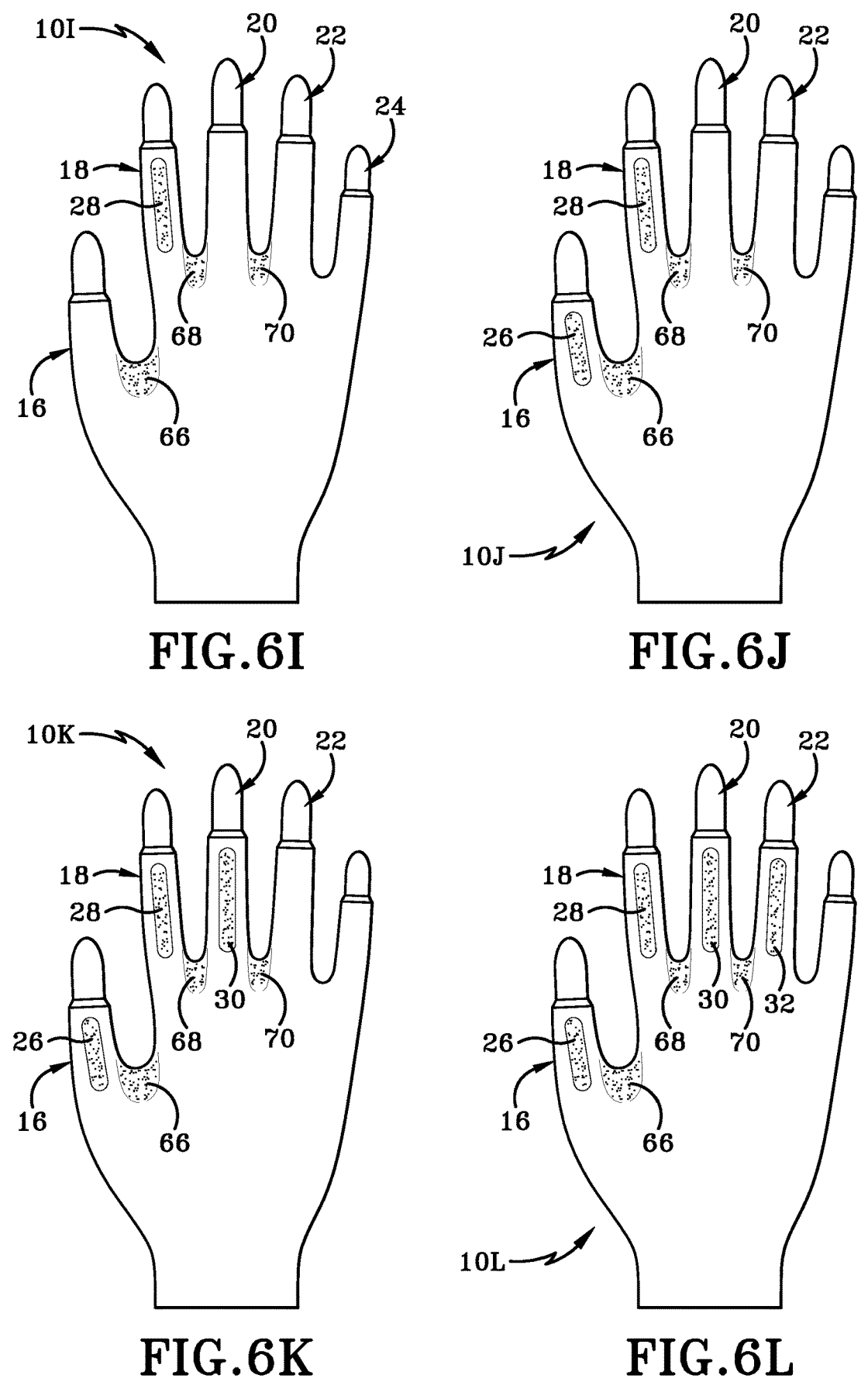

Referring to FIGS. 6I through 6L, there are illustrated additional examples of the first embodiment of the glove, each of which includes a textured first crotch area 66, second crotch area 68, and third crotch area 70. It will be understood, however, that the combination of any three of the crotch areas 66-72 may be utilized in these exemplary gloves. FIG. 6I illustrates a tenth example of the first embodiment of the glove, generally indicated as glove 10I; FIG. 6J illustrates an eleventh example of the first embodiment of the glove, generally indicated as glove 10J; FIG. 6K illustrates a twelfth example of the first embodiment of the glove, generally indicated as glove 10K; and FIG. 6L illustrates a thirteenth example of the first embodiment of the glove, generally indicated as glove 10L.

Each of the gloves 10I, 10J, 10K, and 10L, also includes longitudinally oriented stays in one or more of the digit regions, identically following the pattern of stays illustrated in FIGS. 6A-6D and in FIGS. 6E-6H, i.e., in the glove 10I, stays are only on index finger region 18, in glove 10J, stays are on index finger region 18 and thumb region 16; in glove 10K, stays are on index finger region 18, thumb region 16, and middle finger region 20; and in glove 10K, stays are on thumb region 16, index finger region 18, middle finger region 20, and ring finger region 22. As described with reference to the previous examples of the first embodiment of the glove, any single digit region in glove 10I may include stays; any combination of two digit regions in glove 10J may include stays; any combination of three digit regions in glove 1 OK may include stays; and any combination of four digit regions in glove 10L may include stays.

Referring to FIG. 6M through FIG. 6Q, there are illustrated additional examples of the first embodiment of the glove, each of which includes a textured first crotch area 66, second crotch area 68, third crotch area 70, and fourth crotch area 72. FIG. 6M illustrates a fourteenth example of the first embodiment of the glove, generally indicated as glove 10M; FIG. 6N illustrates a fifteenth example of the first embodiment of the glove, generally indicated as glove 10N; FIG. 6P illustrates a sixteenth example of the first embodiment of the glove, generally indicated as glove 10P; and FIG. 6Q illustrates a seventeenth example of the first embodiment of the glove, generally indicated as glove 10Q.

Each of the gloves 10M, 10N, 10P and 10Q, also includes longitudinally oriented stays in one or more of the digit regions, identically following the pattern of stays illustrated in FIGS. 6A-6D, FIGS. 6E-6H, and FIGS. 6I through 6L, i.e., in the glove 10M, stays are only on index finger region 18, in glove 10N, stays are on index finger region 18 and thumb region 16; in glove 10P, stays are on index finger region 18, thumb region 16, and middle finger region 20; and in glove 10Q, stays are on thumb region 16, index finger region 18, middle finger region 20, and ring finger region 22. As described with reference to the previous examples of the first embodiment of the glove, any single digit region in glove 10M may include stays; any combination of two digit regions in glove 10N may include stays; any combination of three digit regions in glove 10P may include stays; and any combination of four digit regions in glove 10Q may include stays.

Figure 7:
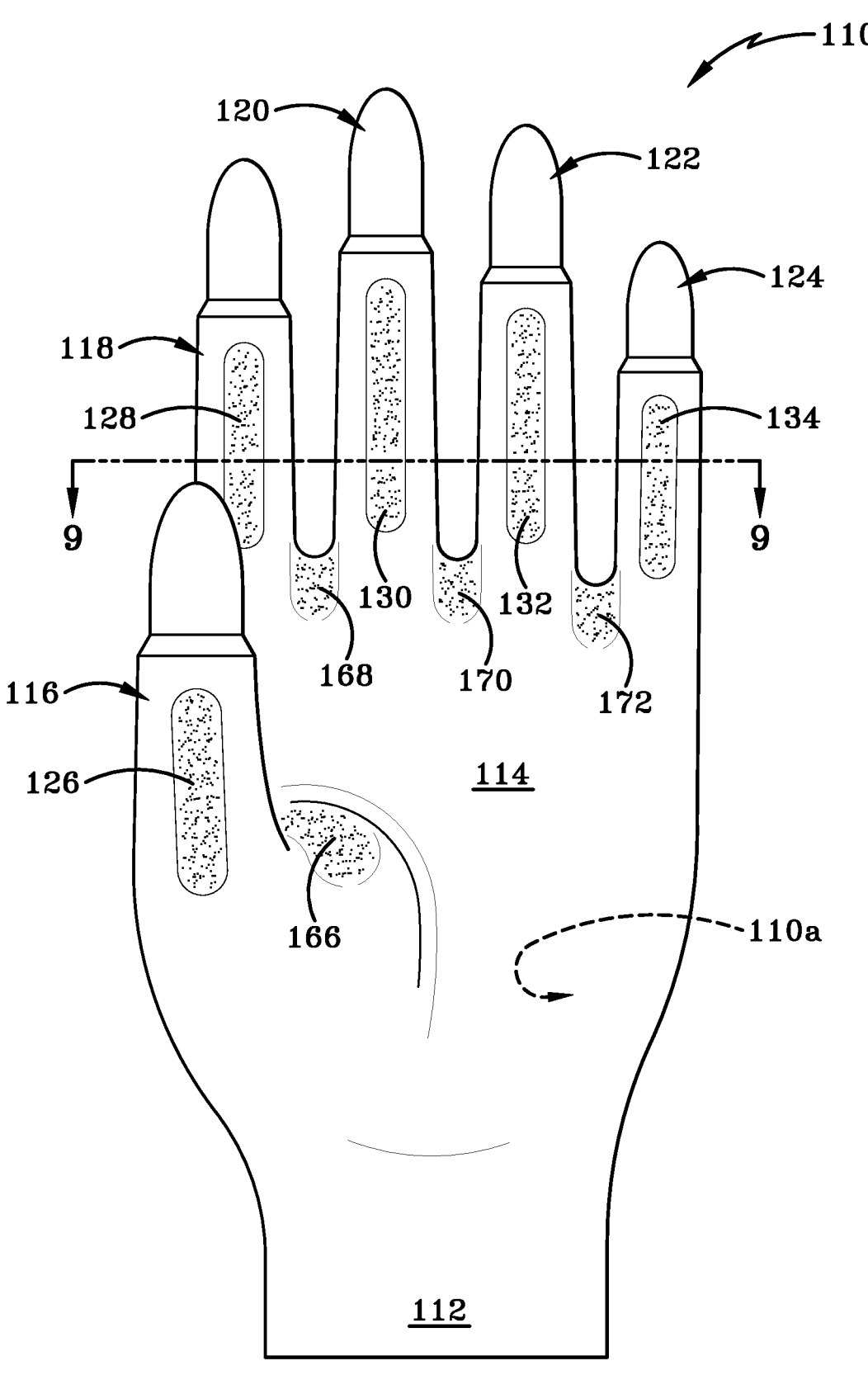
FIG. 7 is a front elevation view of a first example of a second embodiment of a glove in accordance with the present disclosure, wherein the first example is a hand-specific glove shown worn on a left hand of a user, showing a reduced-circumference fingertip region on all digits regions, showing at least one gripping zone on each of the digit regions, and showing textured first, second, third, and fourth crotch areas.

Referring now to FIG. 7 through FIG. 10Q, there is shown a second embodiment of a glove in accordance with the present disclosure. FIG. 7 shows a first example of the second embodiment of the glove in accordance with the present disclosure, generally indicated at 110. Glove 110 includes a wrist region 112, a palm region 114, and digit regions which extend outwardly from the palm region 114. The digit regions include a thumb region 116, an index finger region 118, a middle finger region 120, a ring finger region 122, and a little finger region 124.

Glove 110 differs from glove 10 in that glove 110 is a hand-specific glove configured to be worn on a left hand of a person, while glove 10 is an ambidextrous glove. In the hand-specific glove 110 the index finger region 118, middle finger region 120, ring finger region 122, and little finger region 124 are aligned along a common plane but the thumb region 116 is in a different plane. Apart from the glove 110 being a hand-specific glove, all of the component parts of the glove are substantially identical in structure and function to glove 10. In particular, thumb region 116 is identical to thumb region 16; index finger region 118 is identical to index finger region 18, middle finger region 120 is identical to middle finger region 20, ring finger region 122 is identical to ring finger region 22, and little finger region 124 is identical to little finger region 24. Although not numbered in FIGS. 7-10P, each of these digit regions includes a fingertip region that is identical in structure and function to the associated fingertip region 16*a*, 18*a*, 20*a*, 22*a*, and 24*a*. Each of these digit regions includes a remaining portion that is identical in structure and function to the associated remaining portion 16*b*, 18*b*, 20*b*, 22*b*, and 24*b*. Each of these digit regions includes a transition portion that is identical in structure and function to the associated transition portion 16*c*, 18*c*, 20*c*, 22*c*, and 22*d*.

Figure 8:
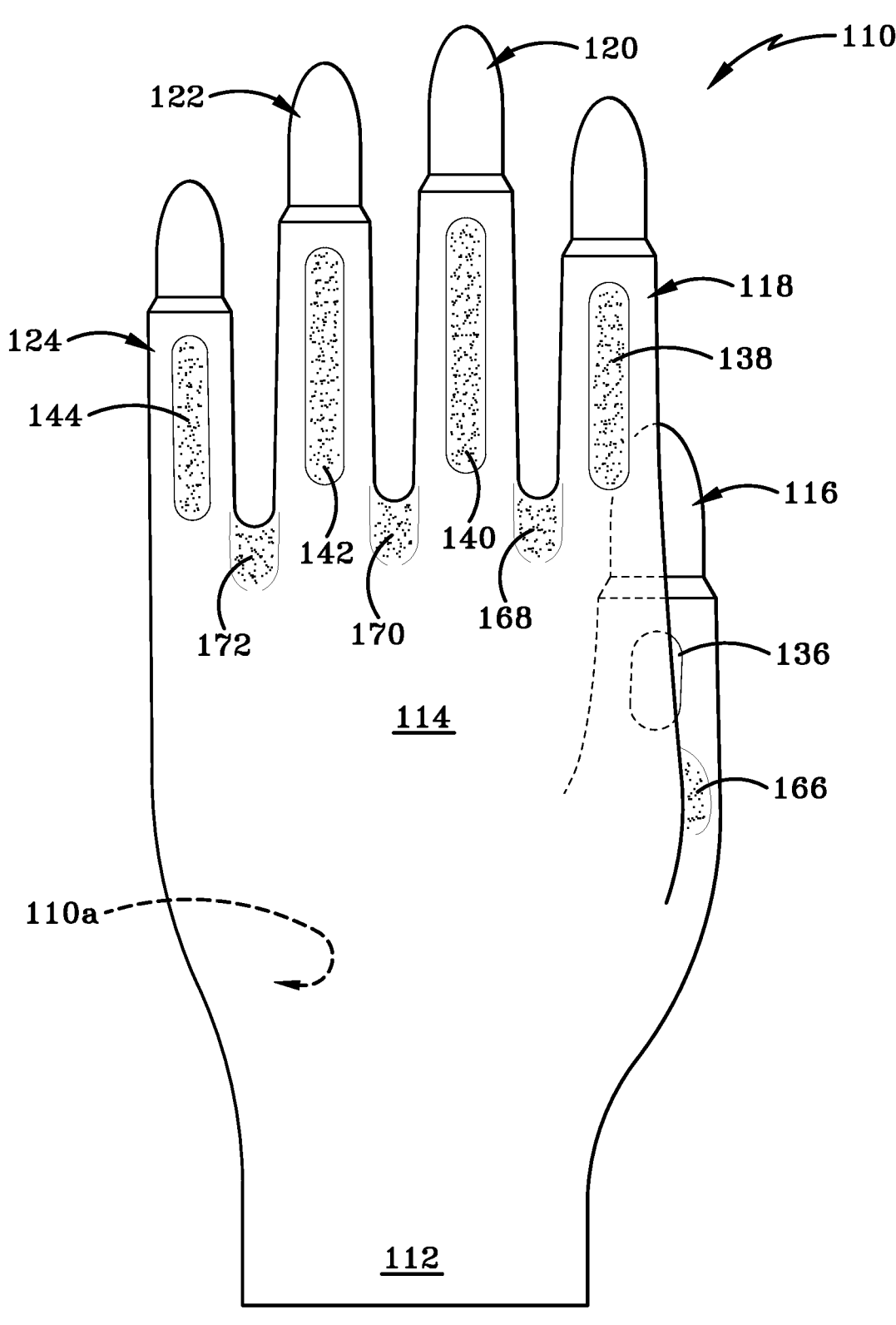
FIG. 8 is a rear elevation view of the glove of FIG. 7.

In accordance with an aspect of the present disclosure each of the thumb region 116, index finger region 118, middle finger region 120, ring finger region 122, and little finger region includes at least one gripping zone. The at least one gripping zone comprises at least a first stay. The at least one gripping zone may further include a second stay. As shown in FIGS. 7 and 8, thumb region 116 includes a first stay 126 and a second stay 136; index finger region 118 includes a first stay 128 and a second stay 138; middle finger region 120 includes a first stay 130 and a second stay 140; ring finger region 122 includes a first stay 132 and a second stay 142; and little finger region 124 includes a first stay 134 and a second stay 142. First stays 126, 128, 130, 132, and 134 are identical in structure and function to first stays 26, 28, 30, 32, and 34. Second stays 136, 138, 140, 142, and 144 are identical in structure and function to second stays 36, 38, 40, 42, and 44. Each stay is provided with texturing, particularly via micro-etching. In one embodiment, the micro-etching will produce a sand pattern of texturing.

The use of glove 110 is substantially identical to glove 10 except the glove illustrated in FIGS. 7 and 8 can only be worn on a left hand while the glove 10 can be worn on either of the left hand or the right hand. (It will be understood that a glove for the right hand will be a mirror image of the glove 110.)

Figure 9:
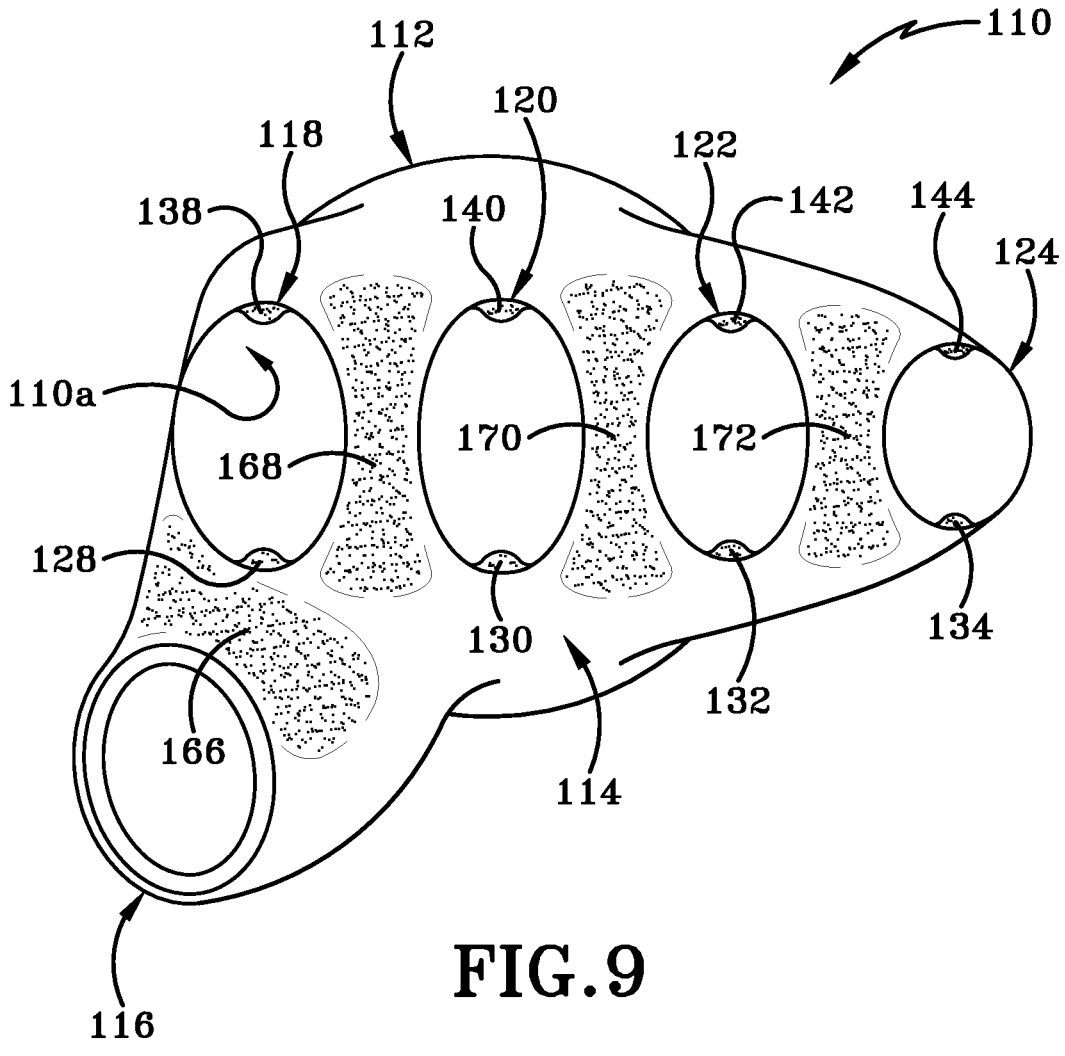
FIG. 9 is a top plan view of the glove taken along line 9-9 of FIG. 7.

FIGS. 7-9 illustrate a further aspect of glove 110 and that is the provision of a textured first crotch area 166 defined between thumb region 116 and index finger region 118; a second crotch area 168 defined between index finger region 118 and middle finger region 120; a third crotch area 170 defined between middle finger region 120 and ring finger region 122, and a fourth crotch area 172 defined between ring finger region 122 and little finger region 124. Each of the crotch areas is curved and configured so that when glove 110 is worn, the crotch regions extending between adjacent digits on a person's hand are located proximate the crotch areas 166-172. In one embodiment the exterior surface of glove 110 along the crotch areas 166-172 is micro-etched to create the texturing. The micro-etching is accomplished through any process known in the art. In one embodiment, the micro-etching creates a sand pattern texture that is made on part of the front of palm region 114 (shown in FIG. 7) and on part of the back of palm region 114 (shown in FIG. 8). Texturing also occurs on the top surface of the respective crotch area 166-172, as can be seen in FIG. 9. The attached figures illustrate a sand pattern texture formed on the exterior surface of the glove material through a micro-etching process. It will be understood that in other embodiments, other patterns, such as a diamond pattern or a herringbone pattern, or any other desired pattern of texturing, may be produced on crotch areas 166-172. The texturing of crotch areas 166-172 strengthens the glove material in the crotch areas 166-172. As illustrated in the attached figures, the exterior surface of the glove 110 other than the stays and crotch areas is free of texturing and is therefore smooth to the touch. It will be understood, however, that in other embodiments, the exterior surface of the glove 110 may be textured. In some embodiments, the texturing may be different to the texturing provided on the stays and crotch areas as described previously herein.

Figure 10A:
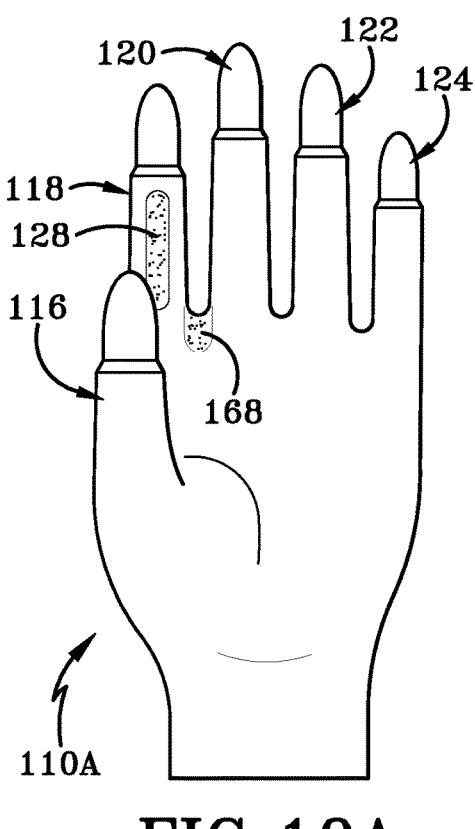
FIG. 10A is a front elevation view of a second example of the second embodiment of a glove in accordance with an aspect of the present disclosure, where the glove is a hand-specific glove having a gripping zone on only the index finger region, and showing a textured second crotch area.
Figure 10B:
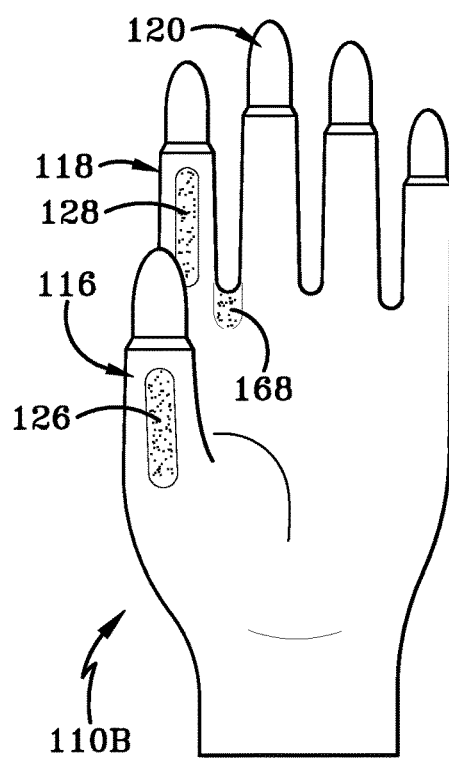
FIG. 10B is a front elevation view of a third example of the second embodiment, where the glove is a hand-specific glove having a gripping zone on each of the thumb region and index finger region and showing a textured second crotch area.
Figure 10C:
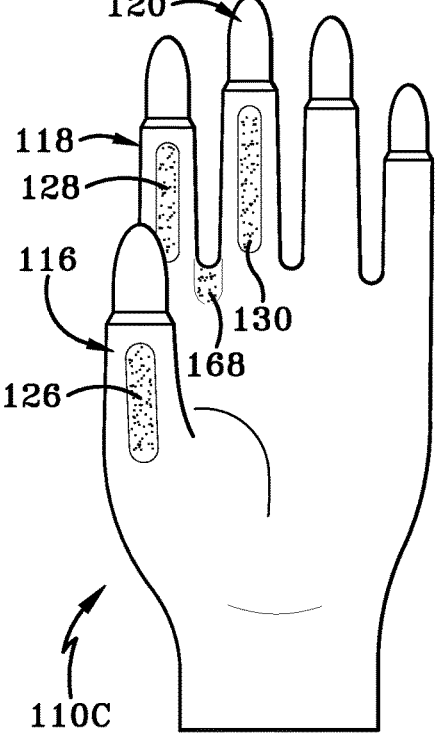
FIG. 10C is a front elevation view of a fourth example of the second embodiment where the glove is a hand-specific glove having a gripping zone on each of the thumb region, the index finger region and the middle finger region and showing a textured second crotch area.
Figure 10D:
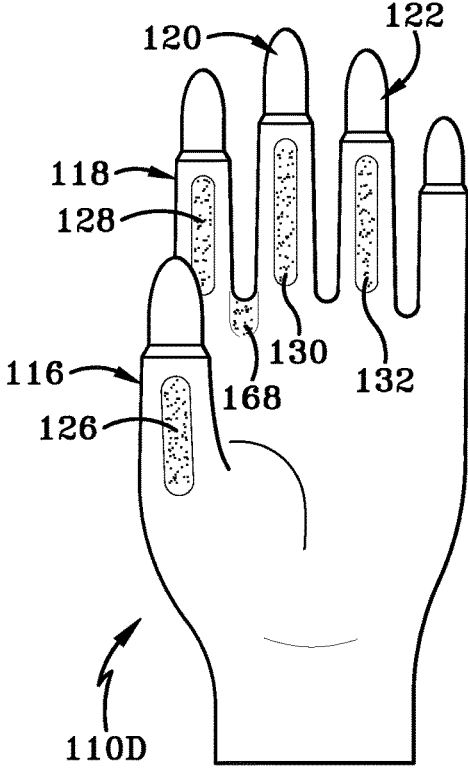
FIG. 10D is a front elevation view of a fifth example of the second embodiment where the glove is a hand-specific glove that has a gripping zone on each of the thumb region, the index finger region, the middle finger region, and the ring finger region and showing a textured second crotch area.
Figure 10E:
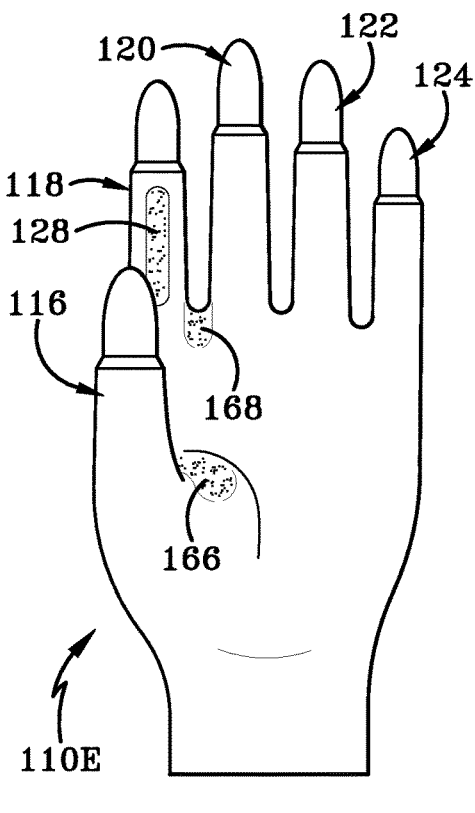
FIG. 10E is a front elevation view of a sixth example of the second embodiment of a glove in accordance with an aspect of the present disclosure, where the glove is a hand-specific glove having a gripping zone on only the index finger region, and showing a textured first and second crotch area.
Figure 10F:
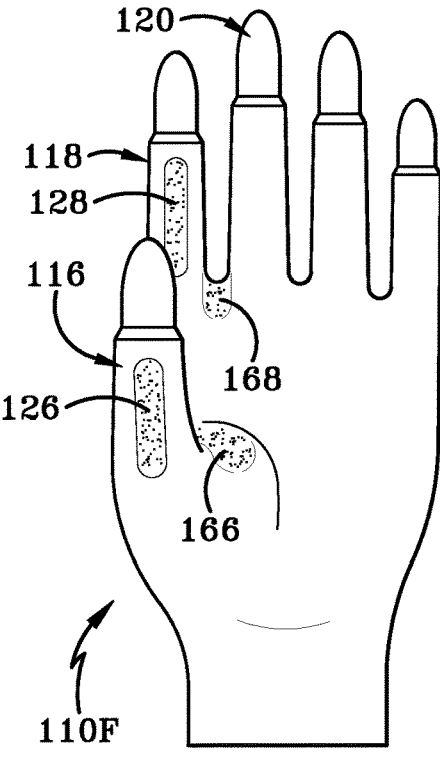
FIG. 10F is a front elevation view of a seventh example of the second embodiment, where the glove is a hand-specific glove having a gripping zone on each of the thumb region and index finger region and showing a textured first and second crotch area.
Figure 10G:
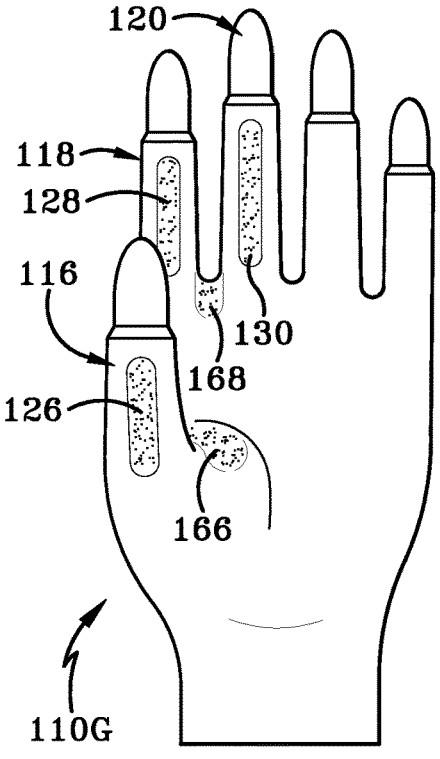
FIG. 10G is a front elevation view of an eighth example of the second embodiment where the glove is a hand-specific glove having a gripping zone on each of the thumb region, the index finger region and the middle finger region and showing a textured first and second crotch area.
Figure 10H:
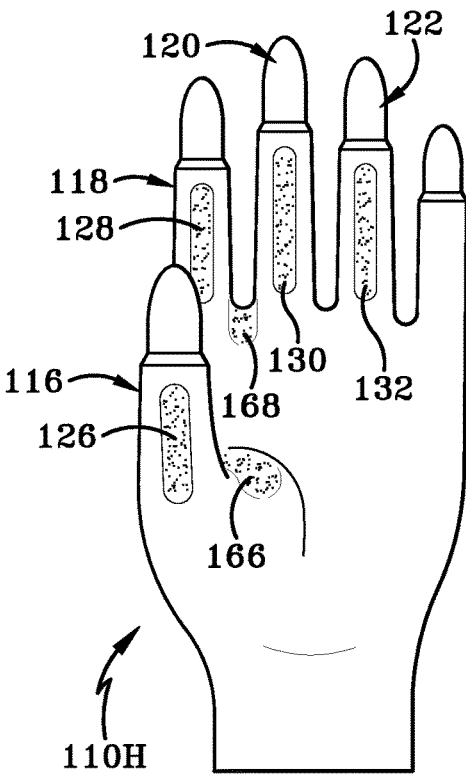
FIG. 10H is a front elevation view of a ninth example of the second embodiment where the glove is a hand-specific glove that has a gripping zone on each of the thumb region, the index finger region, the middle finger region, and the ring finger region and showing a textured first and second crotch area.
Figure 10I:
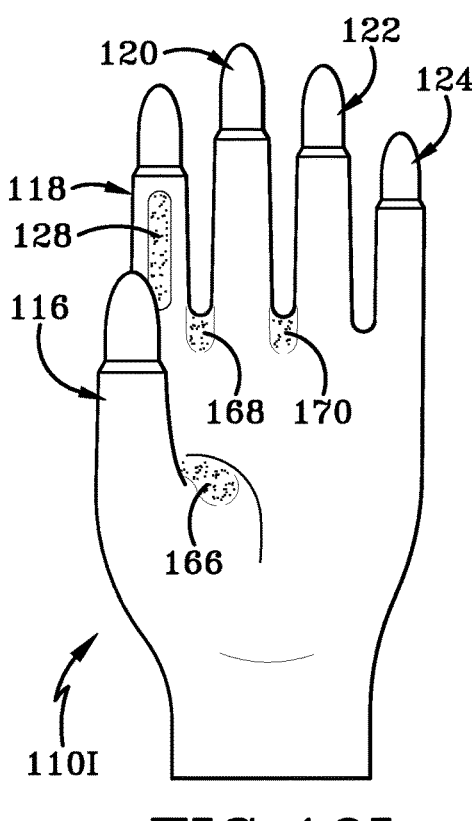
FIG. 10I is a front elevation view of a tenth example of the second embodiment of a glove in accordance with an aspect of the present disclosure, where the glove is a hand-specific glove having a gripping zone on only the index finger region, and showing a textured first, second, and third crotch area.
Figure 10J:
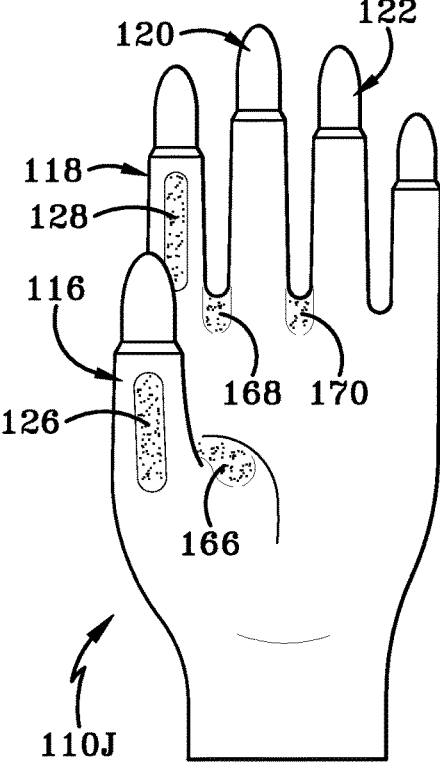
FIG. 10J is a front elevation view of an eleventh example of the second embodiment, where the glove is a hand-specific glove having a gripping zone on each of the thumb region and index finger region and showing a textured first, second, and third crotch area.
Figure 10K:
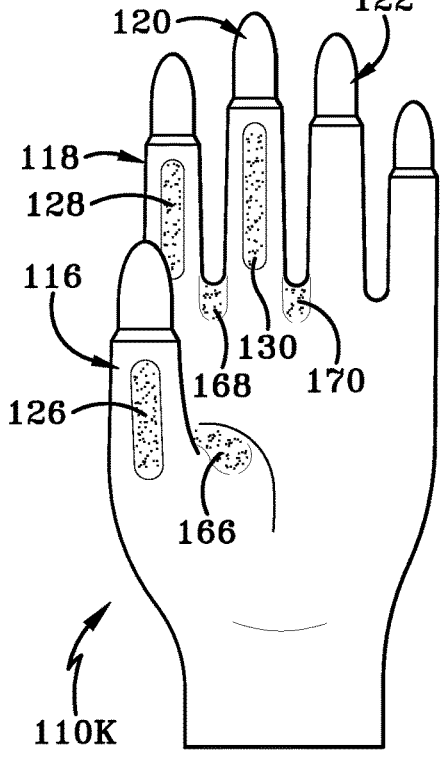
FIG. 10K is a front elevation view of a twelfth example of the second embodiment where the glove is a hand-specific glove having a gripping zone on each of the thumb region, the index finger region and the middle finger region and showing a textured first, second, and third crotch area.
Figure 10L:
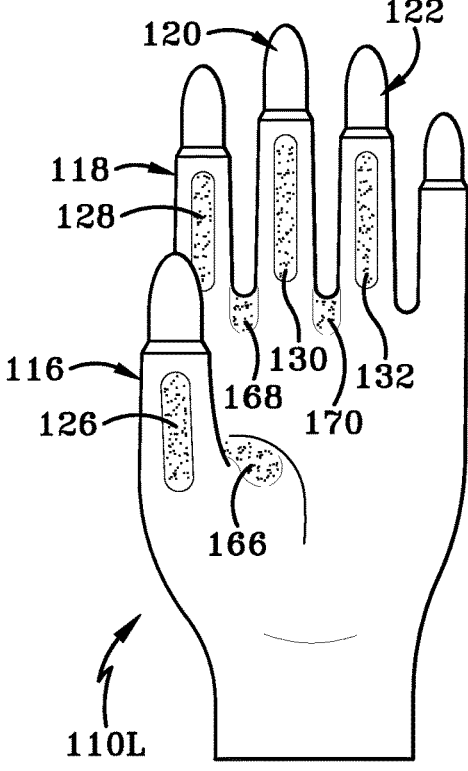
FIG. 10L is a front elevation view of a thirteenth example of the second embodiment where the glove is a hand-specific glove that has a gripping zone on each of the thumb region, the index finger region, the middle finger region, and the ring finger region and showing a textured first, second, and third crotch area.
Figure 10M:
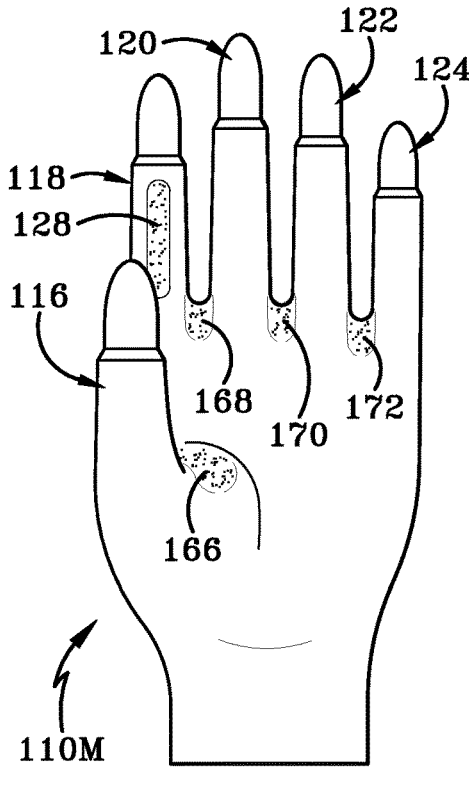
FIG. 10M is a front elevation view of a fourteenth example of the second embodiment of a glove in accordance with an aspect of the present disclosure, where the glove is a hand-specific glove having a gripping zone on only the index finger region, and showing a textured first, second, third, and fourth crotch area.
Figure 10N:
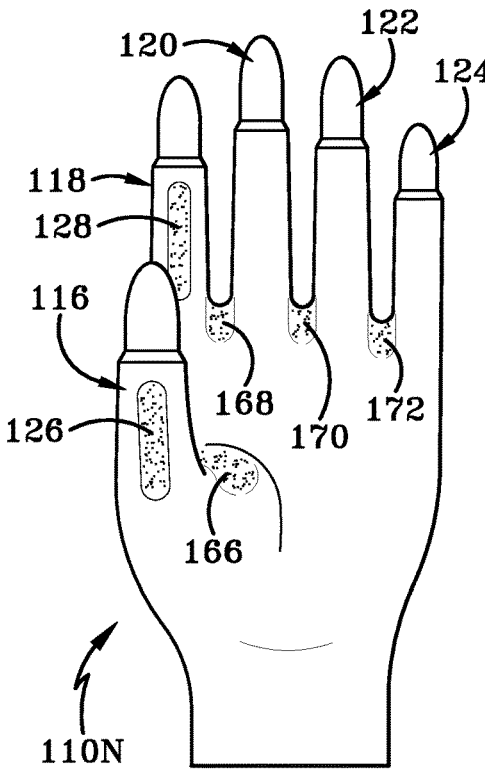
FIG. 10N is a front elevation view of a fifteenth example of the second embodiment, where the glove is a hand-specific glove having a gripping zone on each of the thumb region and index finger region and showing a textured first, second, third, and fourth crotch area.
Figure 10P:
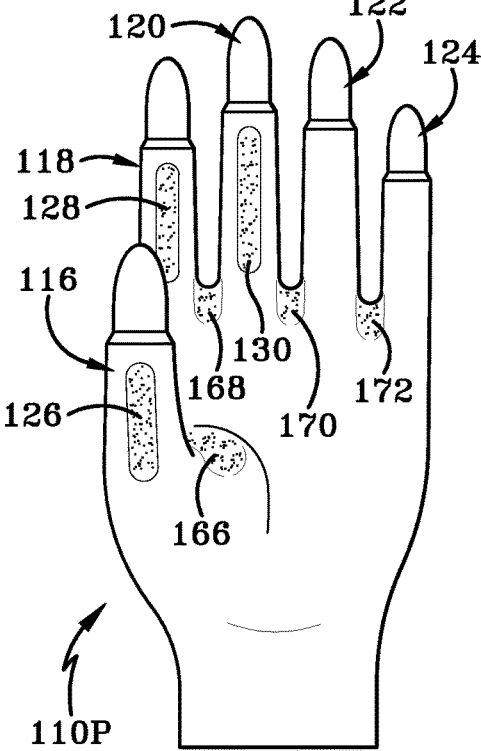
FIG. 10P is a front elevation view of a sixteenth example of the second embodiment where the glove is a hand-specific glove having a gripping zone on each of the thumb region, the index finger region and the middle finger region and showing a textured first, second, third, and fourth crotch area.
Figure 10Q:
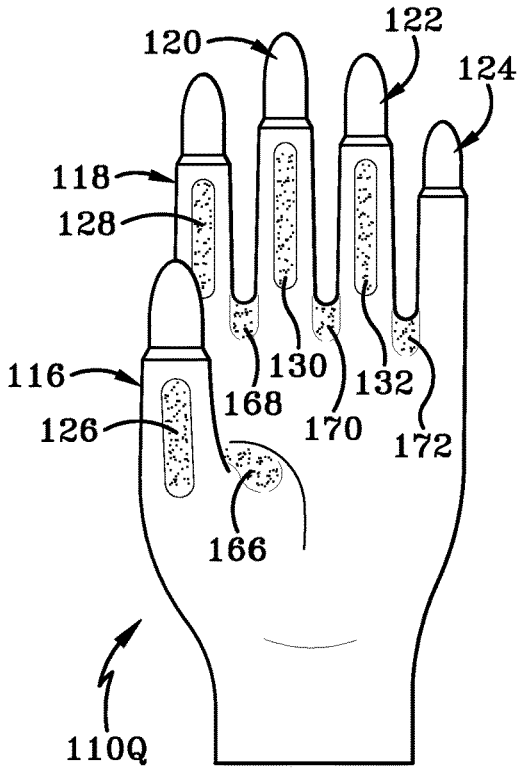
FIG. 10Q is a front elevation view of an eighteenth example of the second embodiment where the glove is a hand-specific glove that has a gripping zone on each of the thumb region, the index finger region, the middle finger region, and the ring finger region and showing a textured first, second, third, and fourth crotch area.

Referring now to FIGS. 10A to FIG. 10Q there are shown additional examples of the second embodiment of glove 110. FIG. 10A shows a second example of the second embodiment of the glove, generally indicated as glove 110A. Glove 110A is identical to glove 110 in all aspects except that instead of all five of the thumb region 116, index finger region 118, middle finger region 120, ring finger region 122, and little finger region 124 including at least one gripping zone in the form of first stays 126, 128, 130, 132, 134 and second stays 136, 138, 140, 142, and 144; only one of the digit regions includes at least one gripping zone. By way of illustration only index finger region 118 has a first stay 128 formed in the front thereof. In some embodiments, a second stay (identical to second stay 138 (FIG. 8B) is formed in the back of index finger region 118. First stay 128 and the second stay are opposed to and laterally aligned with one another. It will be understood that instead of the at least one stay being provided in index finger region 118, the at least one stay may be provided in any of thumb region 116, middle finger region 120, ring finger region 122, and little finger region 124. An opposing other stay may be provided in the same one of the thumb region 116, middle finger region 120, ring finger region 122, and little finger region 124. The provided gripping zones in the form of the first stay and/or the second stay will be textured, particularly via micro-etching. In one embodiment, the micro-etching will produce a sand pattern on the first stay and/or the second stay.

Glove 110A also differs from glove 110 in that only a single crotch area is provided with a texture. In particular, glove 110A is illustrated as including the second crotch area 168. It will be understood that in other embodiments any of the other crotch areas 166, 170, 172 may be provided in glove 110A instead of second crotch area 168.

FIG. 10B shows a third example of the second embodiment of the glove, generally indicated as glove 110B. Glove 110B is identical to glove 110 in all aspects except that instead of all five of thumb region 116, index finger region 118, middle finger region 120, ring finger region 122, and little finger region 124 including at least one gripping zone in the form of first stays 126, 128, 130, 132, 134 and second stays 136, 138, 140, 142, and 144; only two of the digit regions include the at least one gripping zone. By way of illustration only, thumb region 116 and index finger region 118 are each provided with at least one stay formed in the front thereof. First stay 126 is provided in thumb region 116 and first stay 128 is provided in index finger region 118. In some embodiments, a second stay is formed in the back of each of thumb region 116 and index finger region 118. In particular, a second stay is formed in the back of thumb region 116 and a second stay is formed in the back of index finger region 118. First stay 126 and the second stay in thumb region 116 are opposed to and laterally aligned with one another; and first stay 128 and the second stay in the index finger region 118 are opposed to and laterally aligned with one another. It will be understood that instead of the at least one stay being provided in thumb region 116 and index finger region 118, the at least one stay may be provided in the front or back of any two of the thumb region 116, index finger region 118, middle finger region 120, ring finger region 122, and little finger region 124. An opposing other stay may be provided in the other of the front or back of the same two of the thumb region 116, index finger region 118, middle finger region 120, ring finger region 122, and little finger region 124. The provided gripping zones in the form of the first stay and/or the second stay will be textured, particularly via micro-etching. In one embodiment, the micro-etching will produce a sand pattern on the first stay and/or the second stay.

Glove 110B also differs from glove 110 in that only a single textured crotch area is provided on the glove. FIG. 10B illustrates the textured second crotch area 168 is provided on glove 110B but it will be understood that any other single textured crotch area may be provided in other instances.

FIG. 10C shows a fourth example of the second embodiment of the glove, generally indicated as glove 110C. Glove 110C is identical to glove 110 in all aspects except that instead of all five of thumb region 116, index finger region 118, middle finger region 120, ring finger region 122, and little finger region 124 including at least one gripping zone in the form of first stays 126, 128, 130, 132, 134 and second stays 136, 138, 140, 142, and 144; only three of the digit regions include at least one gripping zone. By way of illustration only thumb region 116, index finger region 118, and middle finger region 120 are each provided with at least one stay formed in the front thereof. First stay 126 is provided in thumb region 116, first stay 128 is provided in index finger region 118, and first stay 130 is provided in middle finger region 120. In some embodiments, a second stay is formed in the back of each of thumb region 116, index finger region 118, and middle finger region 120. In particular, a second stay is formed in the back of thumb region 116, a second stay is formed in the back of index finger region 118, and a second stay is formed in the back of middle finger region 120. First stay 126 and the second stay in thumb region 116 are opposed to and laterally aligned with one another; first stay 128 and the second stay in index finger region 118 are opposed to and laterally aligned with one another; and first stay 130 and the second stay in middle finger region 120 are opposed to and laterally aligned with one another. It will be understood that instead of the at least one stay being provided in thumb region 116, index finger region 118, and middle finger region 120, the at least one stay may be provided in the front or back of any three of the thumb region 116, index finger region 118, middle finger region 120, ring finger region 122, and little finger region 124. An opposing other stay may be provided in the other of the front or back of the same three of the thumb region 116, index finger region, middle finger region 120, ring finger region 122, and little finger region 124. The provided gripping zones in the form of the first stay and/or the second stay will be textured, particularly via micro-etching. In one embodiment, the micro-etching will produce a sand pattern on the first stay and/or the second stay. It will be understood that any other texturing configuration may be provided on any of the stays of glove 110, with that texturing being produced in any suitable manner thereon. Glove 110C also differs from glove 110 in that only a single textured crotch area is provided on the glove. FIG. 10C illustrates the textured second crotch area 168 is provided on glove 110C but it will be understood that any other single textured crotch area may be provided in other instances.

FIG. 10D shows a fifth example of the second embodiment of the glove, generally indicated as glove 110D. Glove 110D is identical to glove 110 in all aspects except that instead of all five of thumb region 116, index finger region 118, middle finger region 120, ring finger region 122, and little finger region 124 including at least one gripping zone in the form of first stays 126, 128, 130, 132, 134 and/or second stays 136, 138, 140, 142, and 144; only four of the digit regions include the at least one gripping zone. By way of illustration only thumb region 116, index finger region 118, middle finger region 120, and ring finger region 122 are each provided with at least one stay formed therein. First stay 126 is provided in the front of thumb region 116, first stay 128 is provided in the front of index finger region 118, first stay 130 is provided in the front of middle finger region 120, and first stay 132 is provided in the front of ring finger region 122. In some embodiments, a second stay is formed in the back of each of thumb region 116, index finger region 118, middle finger region 120, and ring finger region 122. In particular, a second stay is formed in the back of thumb region 116, a second stay is formed in the back of index finger region 118, a second stay is formed in the back of middle finger region 120, and a second stay is formed in the back of ring finger region 122. First stay 126 and the second stay in index finger region 116 are opposed to and laterally aligned with one another; first stay 128 and the second stay in index finger region 118 are opposed to and laterally aligned with one another; first stay 130 and the second stay in middle finger region 120 are opposed to and laterally aligned with one another, and first stay 132 and the second stay in ring finger region 122 are opposed to and laterally aligned with one another. It will be understood that instead of the at least one stay being provided in thumb region 116, index finger region 118, middle finger region 120, and ring finger region 122, the at least one stay may be provided in a front or back of any four of the thumb region 116, index finger region 118, middle finger region 120, ring finger region 122, and little finger region 124. An opposing other stay may be provided in the other of the front or back of the same four of the thumb region 116, index finger region, middle finger region 120, ring finger region 122, and little finger region 124. The provided gripping zones in the form of the first stay and/or the second stay will be textured, particularly via a micro-etching procedure. In one embodiment, the micro-etching will produce a sand pattern on the first stay and/or the second stay. It will be understood that any other texturing configuration may be provided on any of the stays of glove 210 through 210D, with that texture being produced in any suitable manner thereon. Glove 110D also differs from glove 110 in that only a single textured crotch area is provided on the glove. FIG. 10D illustrates the textured second crotch area 168 is provided on glove 110D but it will be understood that any other single textured crotch area may be provided in other instances.

FIGS. 10E through 10H show additional examples of the first embodiment of the glove which differ in some aspects to glove 110. FIG. 10E shows a sixth example glove 110E, FIG. 10F shows a seventh example glove 110F, FIG. 10G shows an eighth example glove 110G, and FIG. 10H shows a ninth example glove 110H. Each of the gloves 110E, 110F, 110G, and 110H is identical in every aspect to glove 110 except in the number of longitudinal stays and the number of textured crotch areas provided on the gloves. Each glove 110E, 110F, 110G, and 110H has only two textured crotch areas, namely, first crotch area 166 and second crotch area 168. (It will be understood that any combination of two textured crotch areas may be provided on these gloves 110E through 110H.) Furthermore, glove 110E only has stays on one digit region; glove 110F only has stays on two digit regions; glove 110G only has stays on three digit regions, and glove 110H only has stays on four digit regions. As has been discussed with respect to the examples of glove 10, the example gloves 110E through 110H may have stays on digit regions other than those illustrated in FIGS. 10E-10H without departing from the scope and intent of the present disclosure.

FIGS. 10I through 10L show additional examples of the first embodiment of the glove which differ in some aspects to glove 110. FIG. 10I shows a tenth example glove 110I, FIG. 10J shows an eleventh example glove 110J, FIG. 10K shows a twelfth example glove 110K, and FIG. 10L shows a thirteenth example glove 110L. Each of the gloves 110I, 110J, 110K, and 110LH is identical in every aspect to glove 110 except in the number of longitudinal stays and the number of textured crotch areas provided on the gloves. Each glove 110I, 110J, 110K, and 110L has only three textured crotch areas, namely, first crotch area 166, second crotch area 168, and third crotch area 170. (It will be understood that any combination of three textured crotch areas may be provided on these gloves 110I through 110L.) Furthermore, glove 110I only has stays on one digit region; glove 110J only has stays on two digit regions; glove 110K only has stays on three digit regions, and glove 110L only has stays on four digit regions. As has been discussed with respect to the examples of glove 10, the example gloves 110I through 110L may have stays on digit regions other than those illustrated in FIGS. 10I-10L without departing from the scope and intent of the present disclosure.

FIG. 10M through FIG. 10Q show additional examples of the first embodiment of the glove which differ in some aspects to glove 110. FIG. 10M shows a fourteenth example glove 110M, FIG. 10N shows a fifteenth example glove 110N, FIG. 10P shows a sixteenth example glove 110P, and FIG. 10Q shows a seventeenth example glove 110Q. Each of the gloves 110M, 110N, 110P, and 110Q is identical in every aspect to glove 110 except in the number of longitudinal stays provided on the gloves. Glove 110M only has stays on one digit region; glove 110N only has stays on two digit regions; glove 110P only has stays on three digit regions, and glove 110Q only has stays on four digit regions. As has been discussed with respect to the examples of glove 10, the example gloves 110M through 110Q may have stays on digit regions other than those illustrated in FIG. 10M to FIG. 10Q without departing from the scope and intent of the present disclosure.

Referring now to FIG. 11 to FIG. 13Q there is shown a third embodiment of a glove in accordance with the present disclosure, generally indicated at 210. Glove 210 is substantially identical in structure and function to glove 10 except as shall be described hereafter.

Glove 210 comprises a wrist region 212, a palm region 214, a thumb region 216, an index finger region 218, a middle finger region 220, a ring finger region 222, and a little finger region 224. Glove 210 defines an interior cavity 210a which is configured to receive a hand of a person therein. Thumb region 216, index finger region 218, middle finger region 220, ring finger region 222, and little finger region 224 comprise digit regions which are configured to receive an associated one of a thumb, an index finger, a middle finger, a ring finger, and a little finger of the person's hand, respectively.

Glove 210 is an ambidextrous glove which is capable of being worn on either of a left hand or a right hand of the person. In the ambidextrous glove 210 each of the thumb region 216, index finger region 218, middle finger region 220, ring finger region 222, and little finger region 224 are aligned along a common plane identical to plane "P" shown in FIG. 3.

Figure 11:
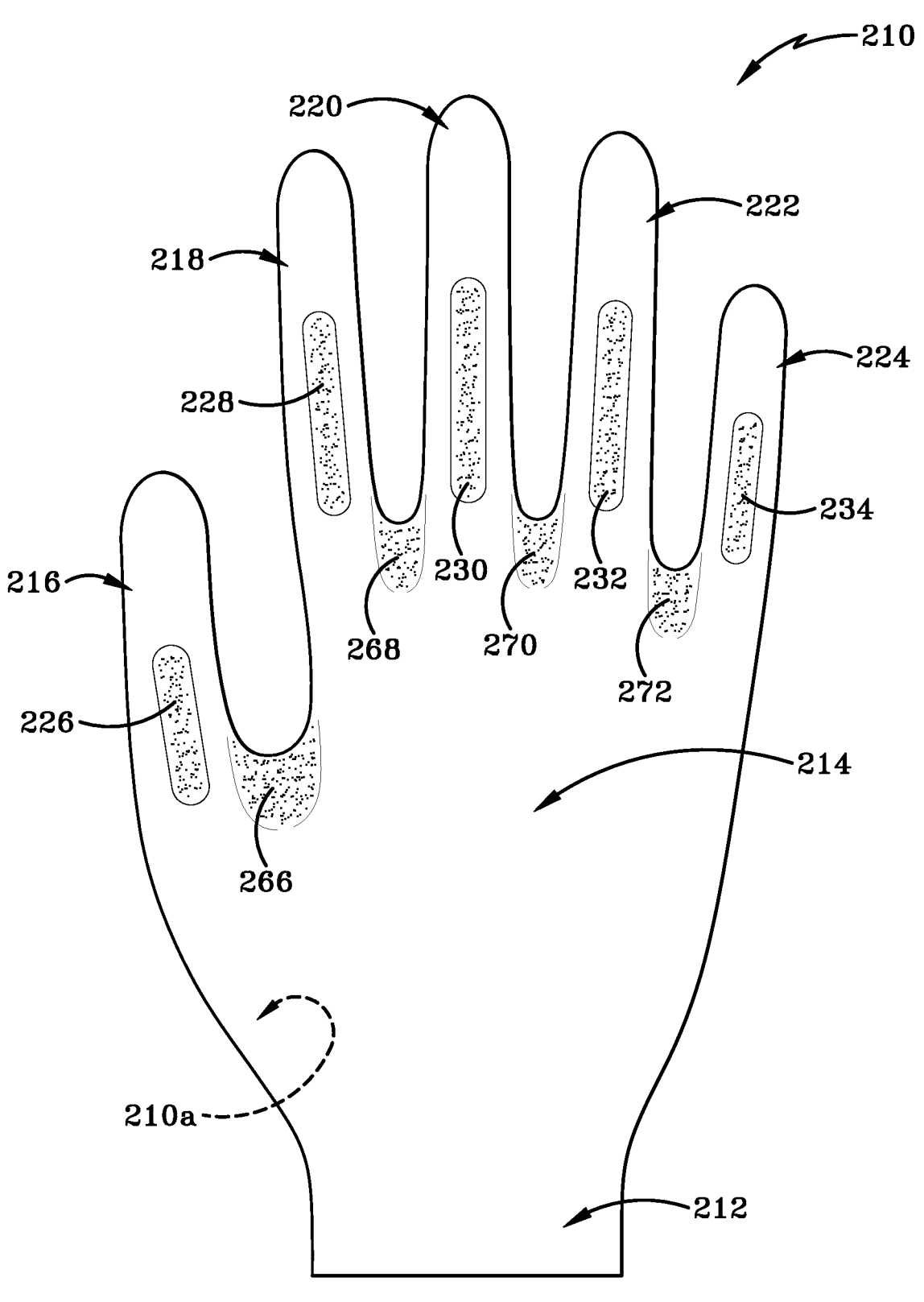
FIG. 11 is a front elevation view of a first example of a third embodiment of a glove in accordance with the present disclosure, wherein the first example is an ambidextrous glove shown worn on a left hand of a user, showing a fingertip region on all digits regions which is of substantially a same circumference as a remaining portion of the digit region, showing at least one gripping zone on each of the digit regions, and showing textured first, second, third, and fourth crotch areas.
Figure 12:
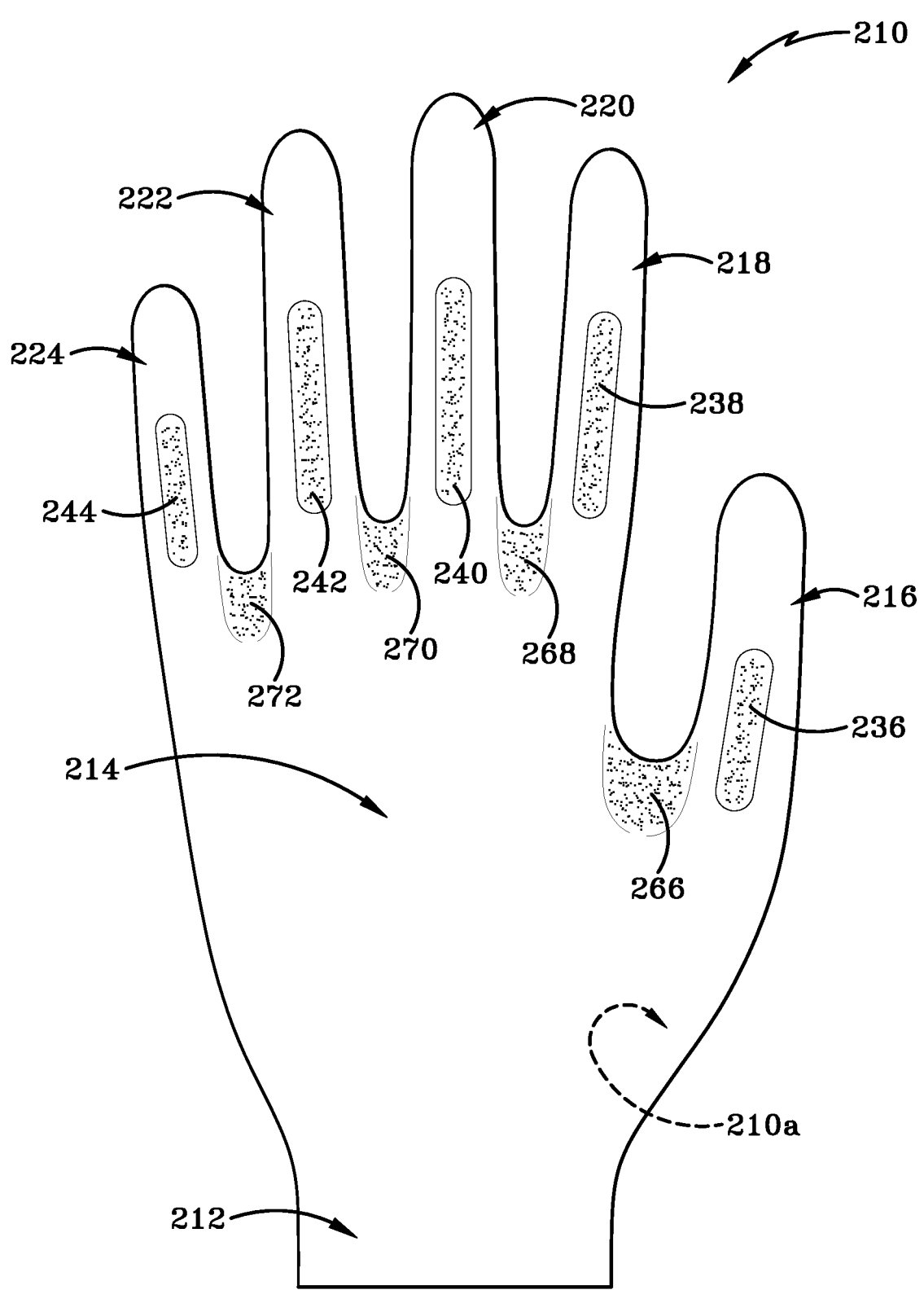
FIG. 12 is a rear elevation view of the first example of the third embodiment of the glove shown in FIG. 11.

In accordance with an aspect of the present disclosure, glove 210 is provided with at least one stay in at least one of the digit regions. FIG. 11 shows a first stay 226 provided in the front of thumb region 216, a first stay 228 provided in the front of index finger region 218, a first stay 230 provided in the front of middle finger region 220, a first stay 232 provided in the front of ring finger region 222, and a first stay 234 provided in the front of little finger region 224. First stay 226 is substantially identical in structure and function to first stay 26. Similarly, first stay 228 is substantially identical to first stay 28; first stay 230 is substantially identical to first stay 30; first stay 232 is substantially identical to first stay 32; and first stay 234 is substantially identical to first stay 34. FIG. 12 shows a second stay 236 provided in the back of thumb region 216, a second stay 238 provided in the back of index finger region 218, a second stay 240 provided in the back of middle finger region 220, a second stay 242 provided in the back of ring finger region 222, and a second stay 244 provided in the back of little finger region 224. Each of the second stays 236, 238, 240, 242, and 244, is substantially identical in structure and function to second stays 36, 38, 40, 42, and 44.

Glove 210 includes a textured first crotch area 266, a textured second crotch area 268, a textured third crotch area 270, and a textured fourth crotch area 272. The first, second, third and fourth crotch areas 266-272 are substantially identical in structure and function to first, second, third, and fourth crotch areas 66-72, respectively, and therefore will not be discussed in any further detail herein.

Figure 12A:
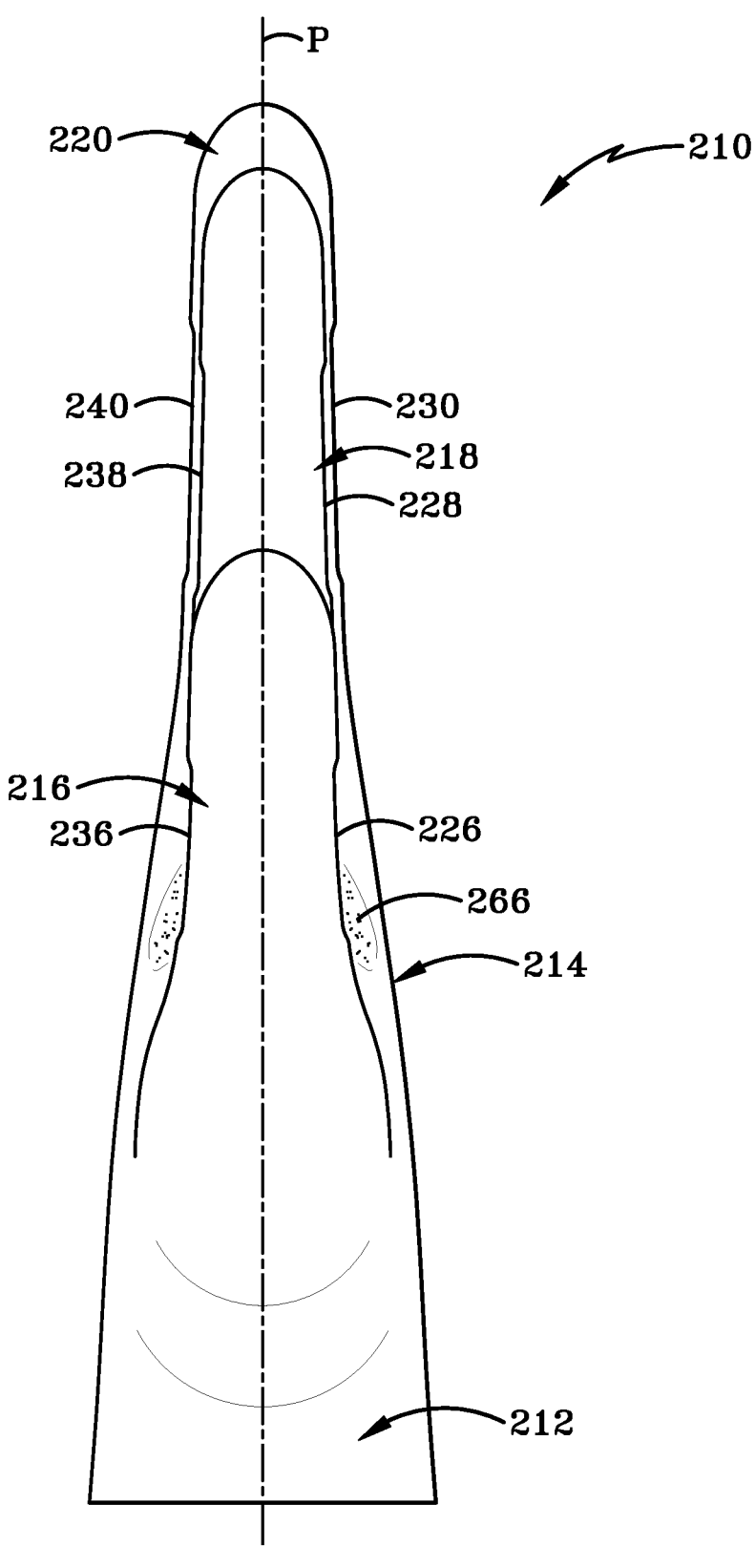
FIG. 12A is a first side elevation view of the glove of FIG. 11.
Figure 12B:
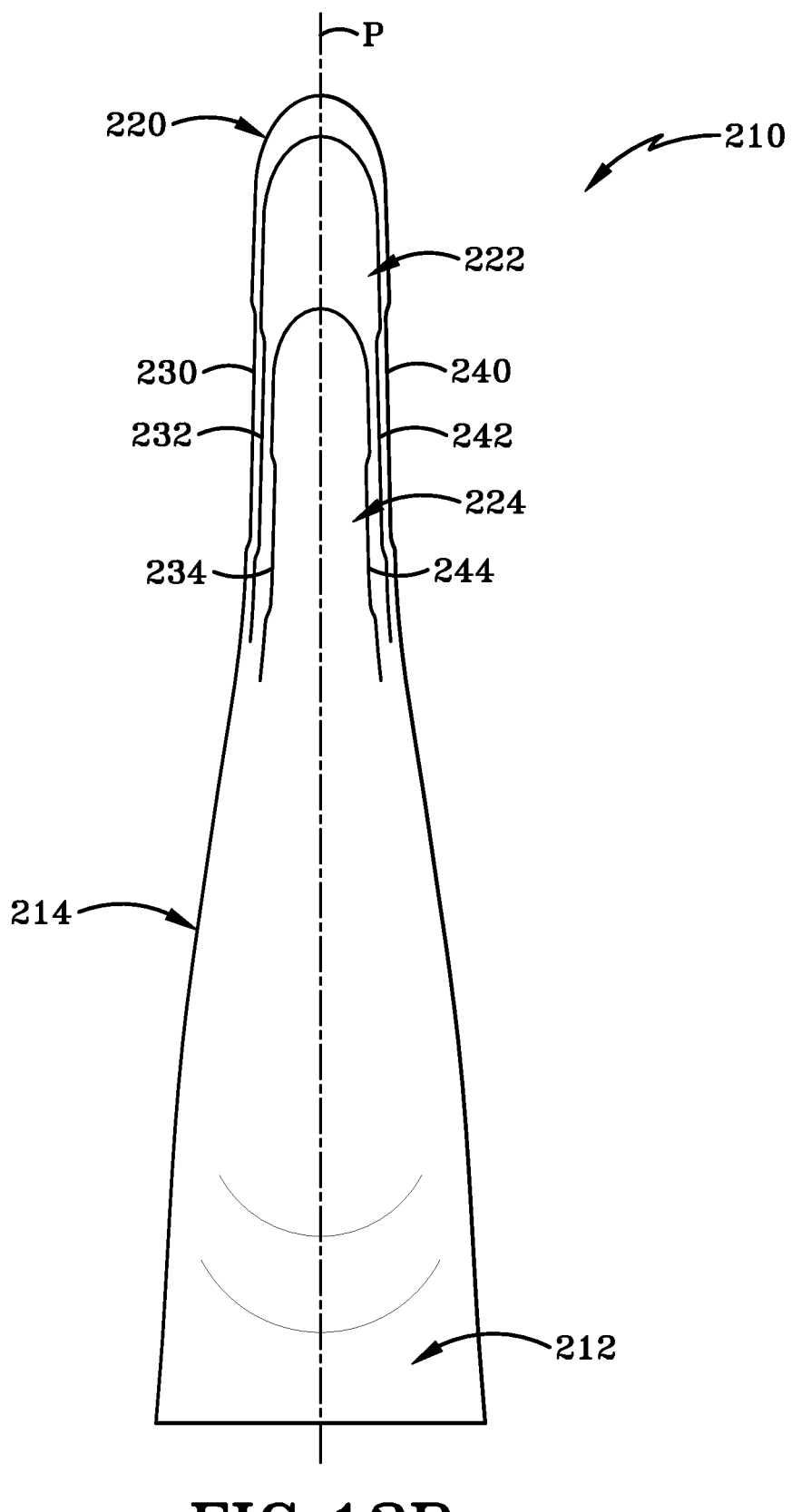
FIG. 12B is a second side elevation view of the glove of FIG. 1.

Glove 210 differs from glove 10 in that all of the digit regions 216, 218, 220, 222, and 224 are of a gradually tapering circumference from palm region 214 to a tip of the respective digit region as is illustrated in FIGS. 12A and 12B. In other words, each digit region does not include a reduced-circumference fingertip region which extends from the tip of the digit region to a flaring circumference transition portion, and then to a remaining portion of a larger circumference than the fingertip region as shown in FIGS. 3A and 3B. In particular, the digit regions of glove 210 do not have the bullet-tip shaped fingertip regions of glove 10.

Figures 13A, 13B, 13C, 13D:
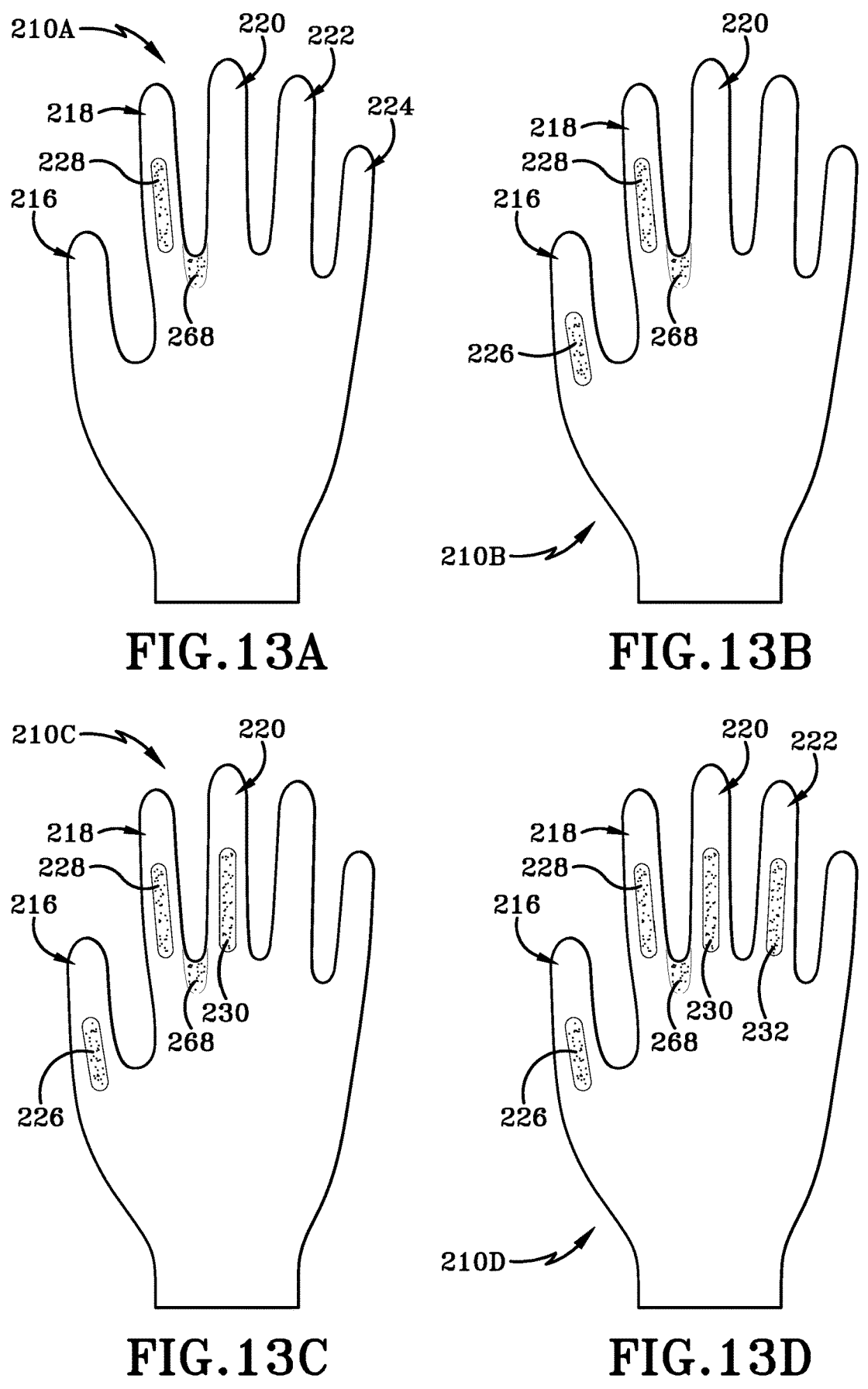
Figures 13E, 13F, 13G, 13H:
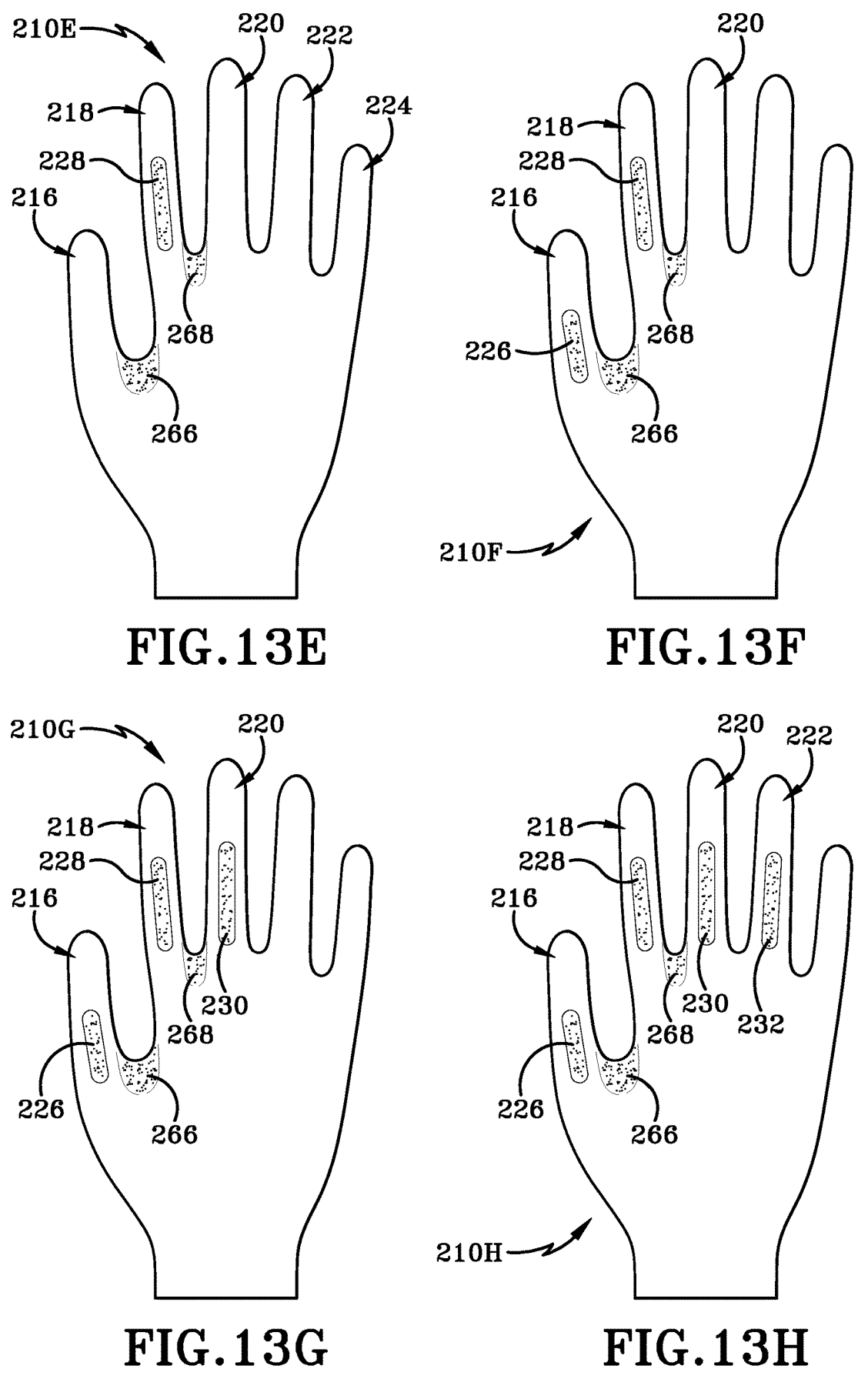
Figures 13I, 13J, 13K, 13L:
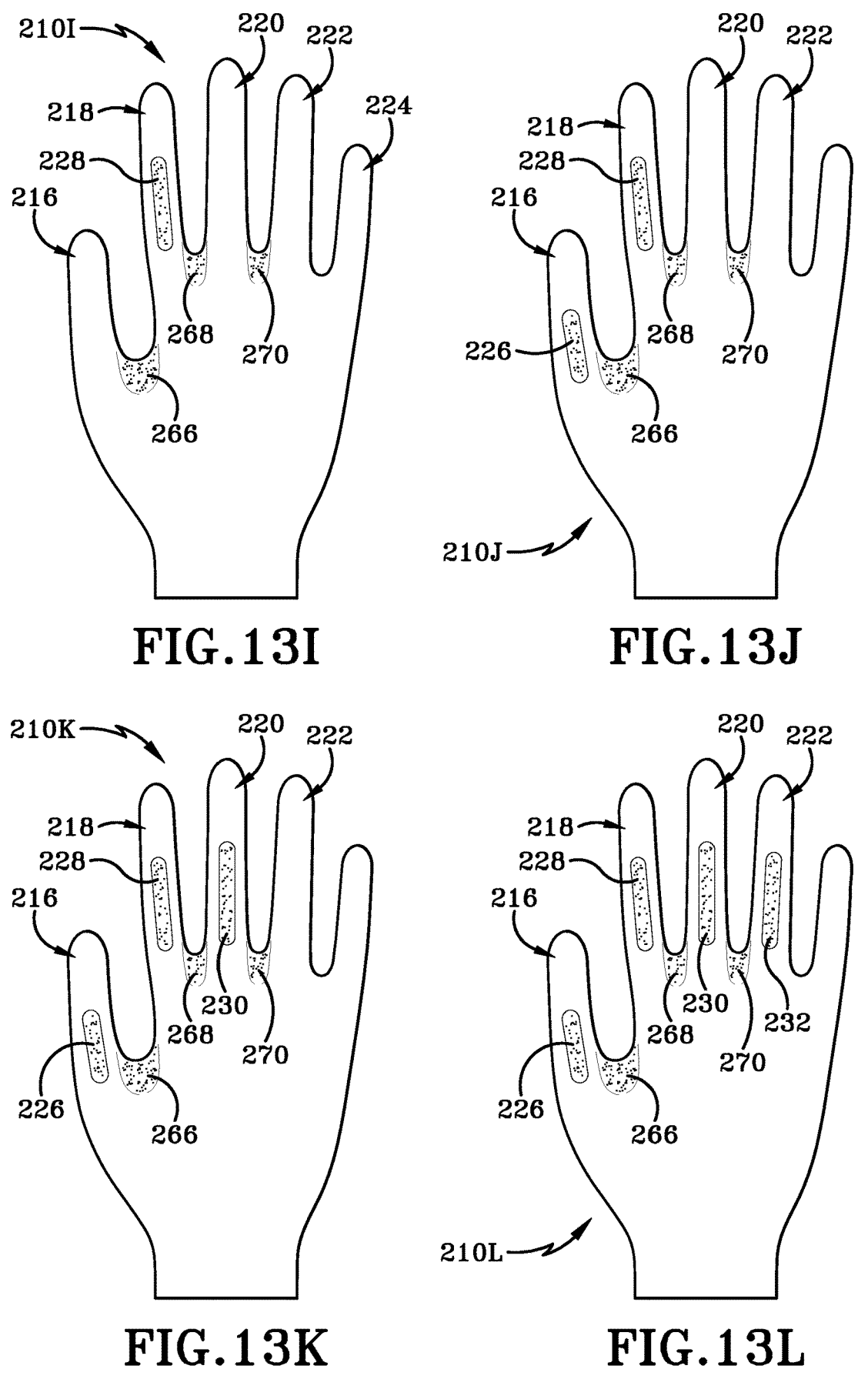
Figures 13M, 13N, 13P, 13Q:
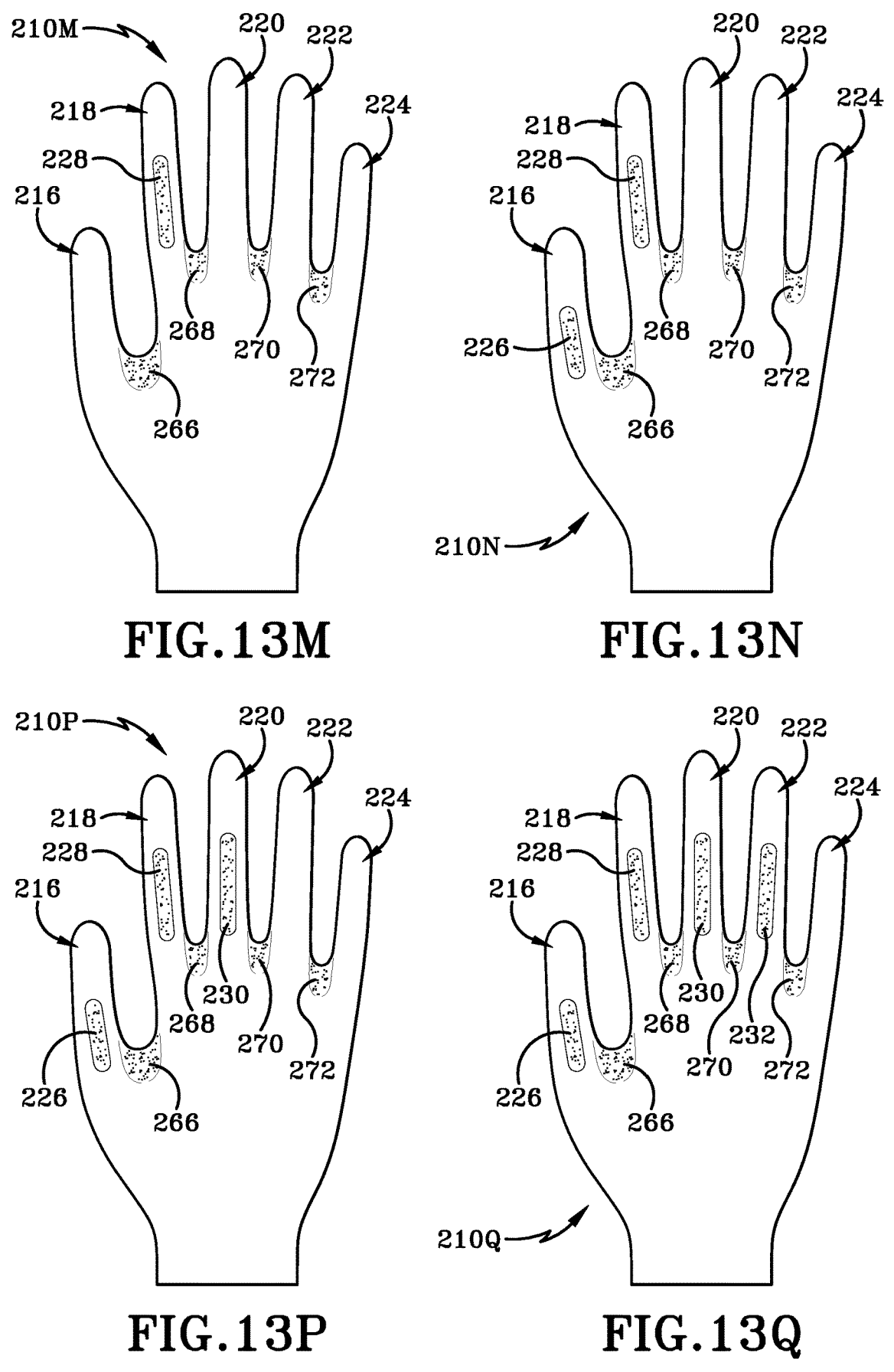

FIGS. 13A through 13Q show additional examples of the third embodiment glove. In particular, FIGS. 13A through 13Q show gloves 210A through 210Q which are substantially identical in structure and function to gloves 10A through 10Q (FIGS. 6A through 6Q) except for the difference in the fingertip regions discussed above.

FIG. 13A shows a second example of the third embodiment of glove, generally indicated as glove 210A; FIG. 13B shows a third example of the third embodiment of glove, generally indicated as glove 210B; FIG. 13C shows a fourth example of the third embodiment of glove, generally indicated as glove 210C; and FIG. 13D shows a fifth example of the third embodiment of glove, generally indicated as glove 210D. Each of the gloves 210A, 210B, 210C, and 210D has a single textured crotch area. In particular, the textured second crotch area 268 is provided on gloves 210A, 210B, 210C, and 210D. It will, however, be understood that any other single textured crotch area may be provided on these gloves 210A, 210B, 210C, and 210D instead of second crotch area 268. FIGS. 13A through 13D show gripping zones being provided on a single digit region (FIG. 13A), two digit regions (FIG. 13B), three digit regions (FIG. 13C), and four digit regions (FIG. 13D) in an identical manner and for an identical purpose to the gripping zones shown and described herein with respect to FIGS. 6A-6D.

FIG. 13E shows a sixth example of the third embodiment of glove, generally indicated as glove 210E; FIG. 13F shows a seventh example of the third embodiment of glove, generally indicated as glove 210F; FIG. 13G shows an eighth example of the third embodiment of glove, generally indicated as glove 210G; and FIG. 13H shows a ninth example of the third embodiment of glove, generally indicated as glove 210H. Each of the gloves 210E, 210F, 210G, and 210H has two textured crotch areas. In particular, the figures illustrate that the gloves include textured first crotch area 266 and second crotch area 268. It will, however, be understood that any other combination of two textured crotch areas may be provided on gloves 210E, 210F, 210J, and 210H instead of first and second crotch areas 266, 268. FIGS. 13E through 13H show gripping zones being provided on a single digit region (FIG. 13E), two digit regions (FIG. 13F), three digit regions (FIG. 13G), and four digit regions (FIG. 13H) in an identical manner and for an identical purpose to the gripping zones shown and described herein with respect to FIGS. 6E-6H.

FIG. 13I shows a tenth example of the third embodiment of glove, generally indicated as glove 210I; FIG. 13J shows an eleventh example of the third embodiment of glove, generally indicated as glove 210J; FIG. 13K shows a twelfth example of the third embodiment of glove, generally indicated as glove 210K; and FIG. 13L shows a thirteenth example of the third embodiment of glove, generally indicated as glove 210L. Each of the gloves 210I, 210J, 210K, and 210L has three textured crotch areas. In particular, the figures illustrate that the gloves include textured first crotch area 266, second crotch area 268, and third crotch area 270. It will, however, be understood that any other combination of three textured crotch areas may be provided on gloves 210I, 210J, 210K, and 210L. FIGS. 13I through 13L show gripping zones being provided on a single digit region (FIG. 13I), two digit regions (FIG. 13J), three digit regions (FIG. 13K), and four digit regions (FIG. 13L) in an identical manner and for an identical purpose to the gripping zones shown and described herein with respect to FIGS. 6I-6L.

FIG. 13M shows a fourteenth example of the third embodiment of glove, generally indicated as glove 210M; FIG. 13N shows a fifteenth example of the third embodiment of glove, generally indicated as glove 210N; FIG. 13P shows a sixteenth example of the third embodiment of glove, generally indicated as glove 210P; and FIG. 13Q shows a seventeenth example of the third embodiment of glove, generally indicated as glove 210Q. Each of the gloves 210M, 210N, 210P, and 210Q has four textured crotch areas 266-272. FIGS. 13M through 13Q show gripping zones being provided on a single digit region (FIG. 13M), two digit regions (FIG. 13N), three digit regions (FIG. 13P), and four digit regions (FIG. 13Q) in an identical manner and for an identical purpose to the gripping zones shown and described herein with respect to FIGS. 6M-6Q.

Figure 14:
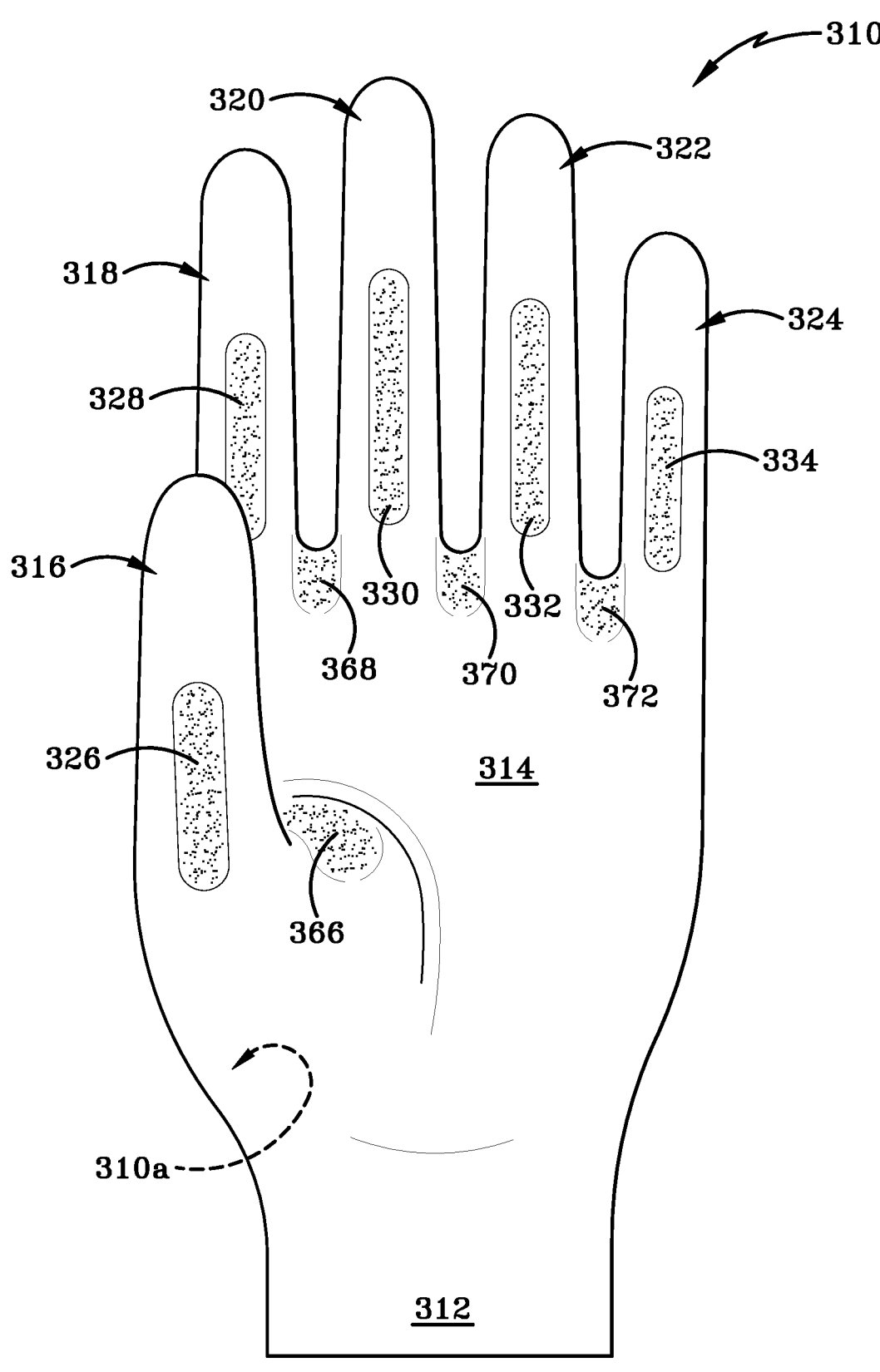
FIG. 14 is a front elevation view of a first example of a fourth embodiment of a glove in accordance with the present disclosure, wherein the first example is a hand-specific glove shown worn on a left hand of a user, showing a fingertip region on all digits regions which is of substantially a same circumference as a remaining portion of the digit region, showing at least one gripping zone on each of the digit regions, and showing textured first, second, third, and fourth crotch areas.
Figure 15:
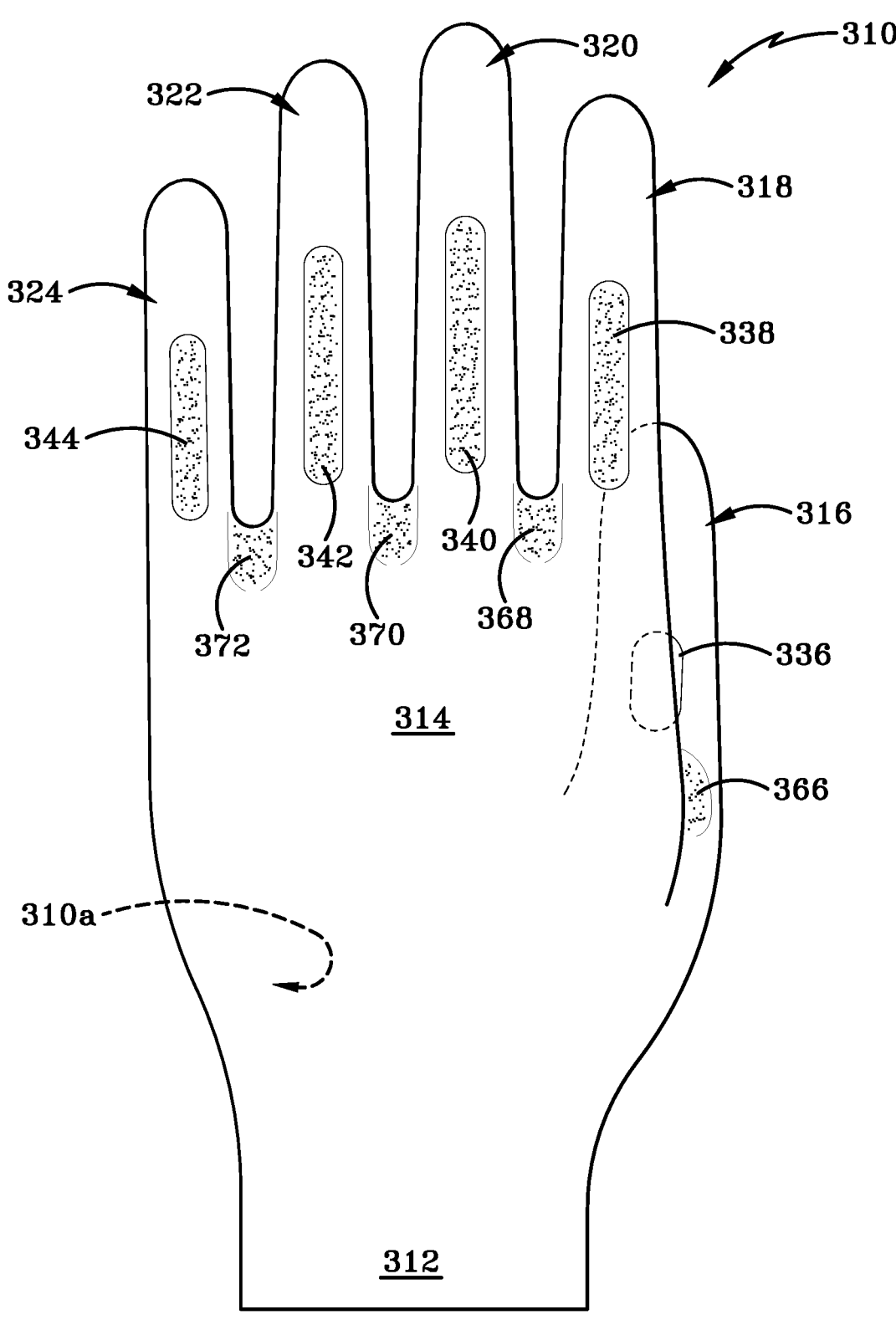
FIG. 15 is a rear elevation view of the first example of the fourth embodiment of the glove in accordance with the present disclosure illustrated in FIG. 14.

Referring now to FIGS. 14-16Q there is shown a fourth embodiment of a glove in accordance with the present disclosure. FIGS. 14 and 15 show a first example of the fourth embodiment of the glove, generally indicated at 310. Glove 310 is substantially identical in structure and function to glove 110 except that instead of each digit region comprising a reduced-circumference fingertip region, a transition portion and a remaining portion as in glove 110, each of the digit regions of glove 310 gradually tapers in circumference from the palm region 314 of the glove to the tip of the associate digit region, similar to glove 210.

Glove 310 is a hand-specific glove (illustrated to be worn on a left had of a person) and comprises a wrist region 312, palm region 314, a thumb region 316, an index finger region 318, a middle finger region 320, a ring finger region 322, and a little finger region 324. Glove 310 defines an interior cavity 310a which is configured to receive the person's hand. Thumb region 316, index finger region 318, middle finger region 320, ring finger region 322, and little finger region 324 comprise digit regions which are configured to receive an associated one of a thumb, an index finger, a middle finger, a ring finger, and a little finger of the person's hand, respectively.

In accordance with an aspect of the present disclosure, glove 310, like glove 110 is provided with at least one stay in at least one of the digit regions. FIG. 10 shows a first stay 326 provided in the front of thumb region 316, a first stay 328 provided in a front of index finger region 318, a first stay 330 provided in a front of middle finger region 320, a first stay 332 provided in a front of ring finger region 322, and a first stay 334 provided in a front of little finger region 324. First stay 326 is substantially identical in structure and function to first stay 26. Similarly, first stay 328 is substantially identical to first stay 28; first stay 330 is substantially identical to first stay 30; first stay 332 is substantially identical to first stay 32; and first stay 334 is substantially identical to first stay 34. FIG. 10A shows a second stay 336 provided in a back of thumb region 316, a second stay 338 provided in a back of index finger region 318, a second stay 340 provided in a back of middle finger region 320, a second stay 342 provided in a back of ring finger region, and a second stay 342 provided in a back of little finger region 324. Each of the second stays 336, 338, 340, 342, and 344, is substantially identical in structure and function to second stays 36, 38, 40, 42, and 44.

Glove 310 includes a textured first crotch area 366, a textured second crotch area 368, a textured third crotch area 370, and a textured fourth crotch area 372. The first, second, third and fourth crotch areas 366-372 are substantially identical in structure and function to first, second, third, and fourth crotch areas 166-172, respectively, and therefore will not be discussed in any further detail herein.

Figure 16E:
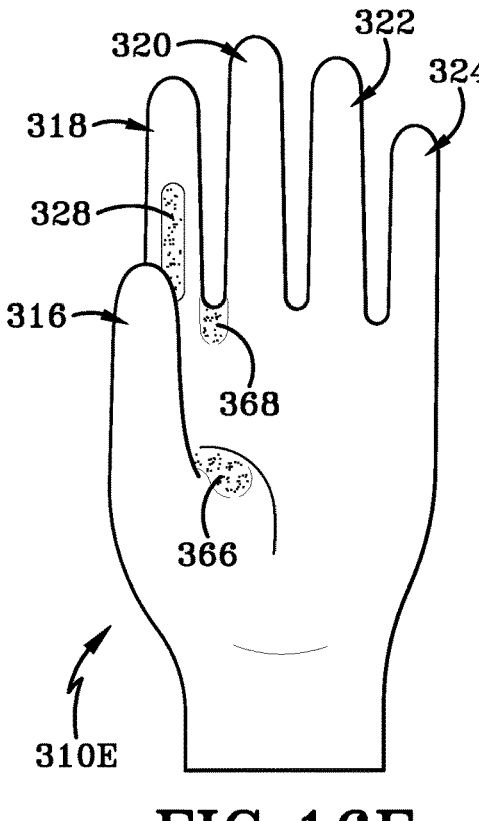
FIG. 16E is a front elevation view of a sixth example of the fourth embodiment of a glove in accordance with an aspect of the present disclosure, where the glove is a hand-specific glove having a gripping zone on only the index finger region, and showing textured first and second crotch areas.
Figure 16F:
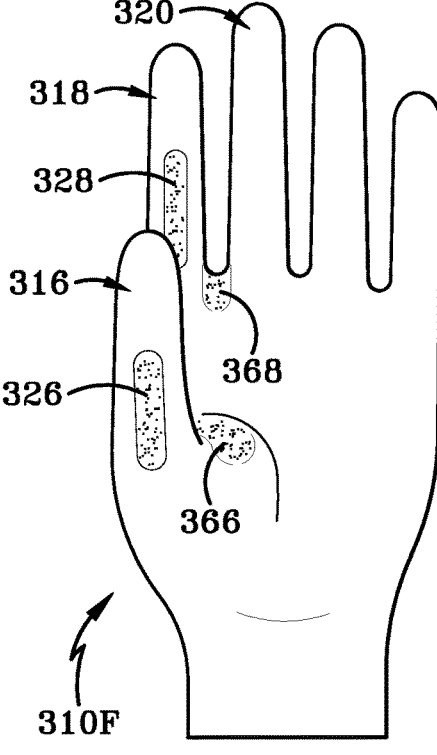
FIG. 16F is a front elevation view of a seventh example of the fourth embodiment, where the glove is a hand-specific glove having a gripping zone on each of the thumb region and index finger region, and showing textured first and second crotch areas.
Figure 16G:
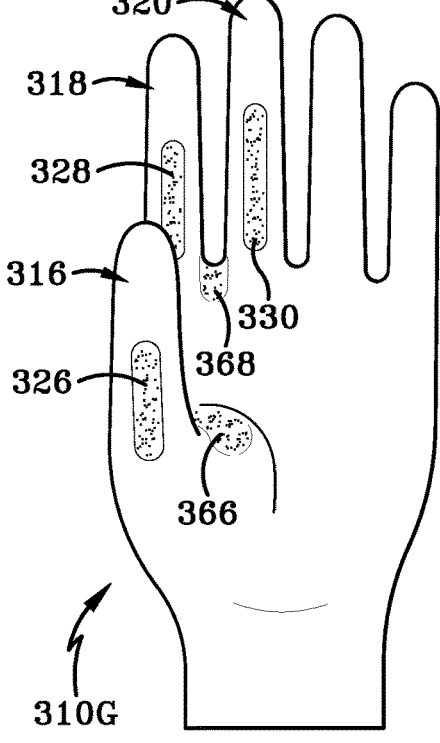
FIG. 16G is a front elevation view of an eighth example of the fourth embodiment where the glove is a hand-specific glove having a gripping zone on each of the thumb region, the index finger region and the middle finger region, and showing textured first and second crotch areas.
Figure 16H:
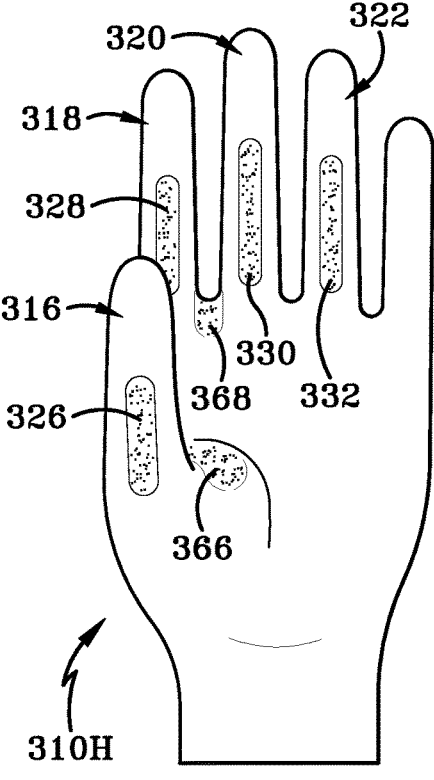
FIG. 16H is a front elevation view of a ninth example of the fourth embodiment where the glove is a hand-specific glove that has a gripping zone on each of the thumb region, the index finger region, the middle finger region, and the ring finger region, and showing textured first and second crotch areas.
Figure 16I:
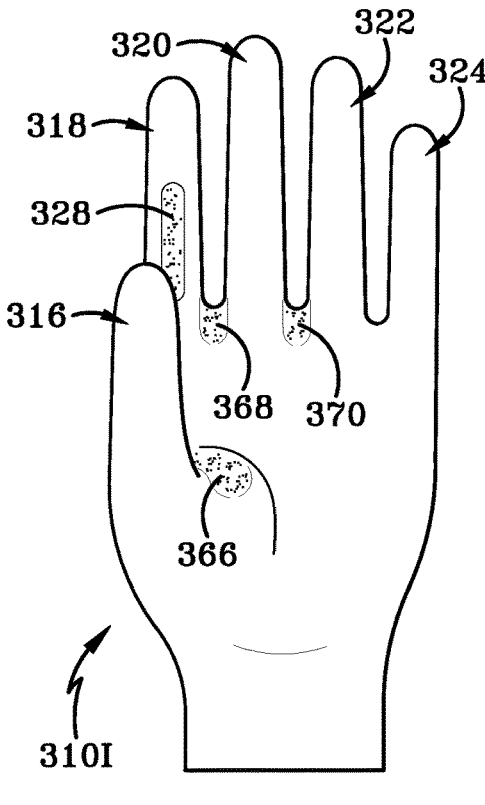
FIG. 16I is a front elevation view of a tenth example of the fourth embodiment of a glove in accordance with an aspect of the present disclosure, where the glove is a hand-specific glove having a gripping zone on only the index finger region, and showing textured first, second, and third crotch areas.
Figure 16J:
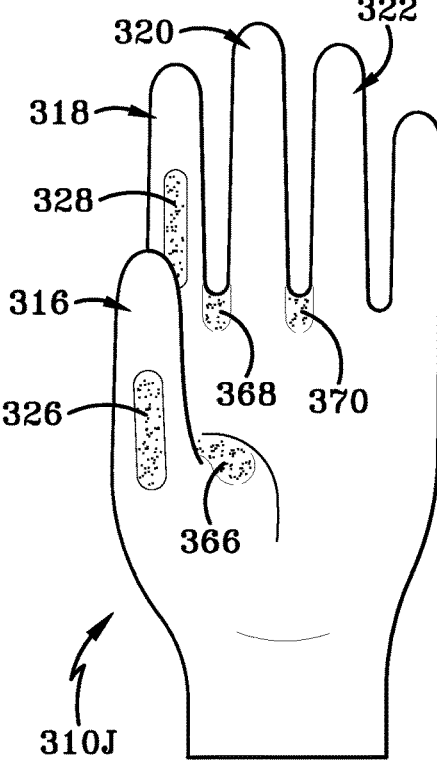
FIG. 16J is a front elevation view of an eleventh example of the fourth embodiment, where the glove is a hand-specific glove having a gripping zone on each of the thumb region and index finger region, and showing textured first, second, and third crotch areas.
Figure 16K:
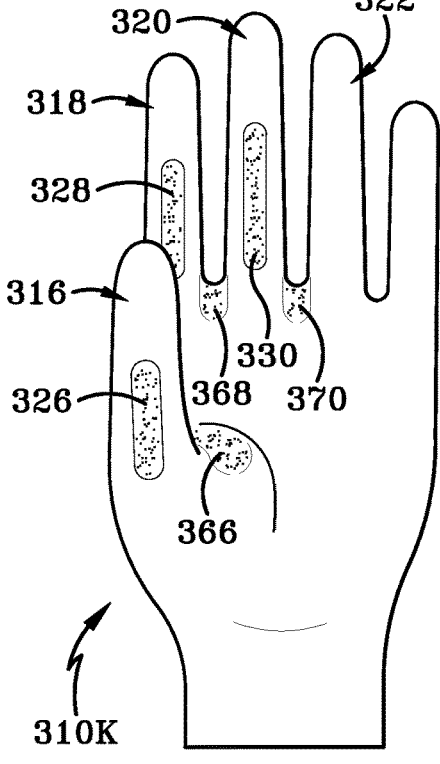
FIG. 16K is a front elevation view of a twelfth example of the fourth embodiment where the glove is a hand-specific glove having a gripping zone on each of the thumb region, the index finger region and the middle finger region, and showing textured first, second, and third crotch areas.
Figure 16L:
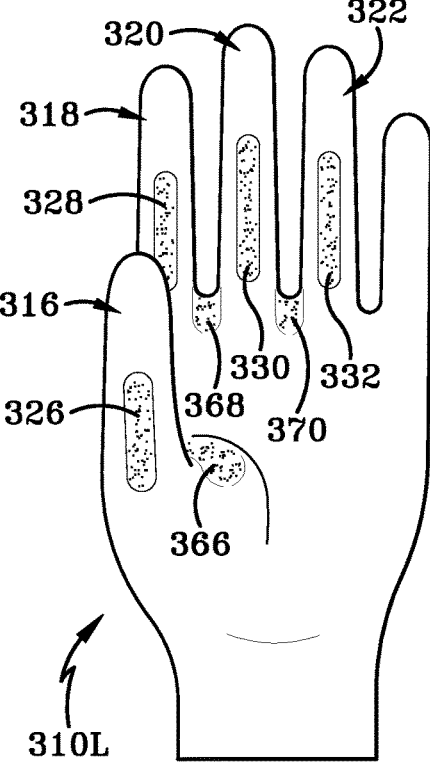
FIG. 16L is a front elevation view of a thirteenth example of the fourth embodiment where the glove is a hand-specific glove that has a gripping zone on each of the thumb region, the index finger region, the middle finger region, and the ring finger region, and showing textured first, second, and third crotch areas.
Figure 16M:
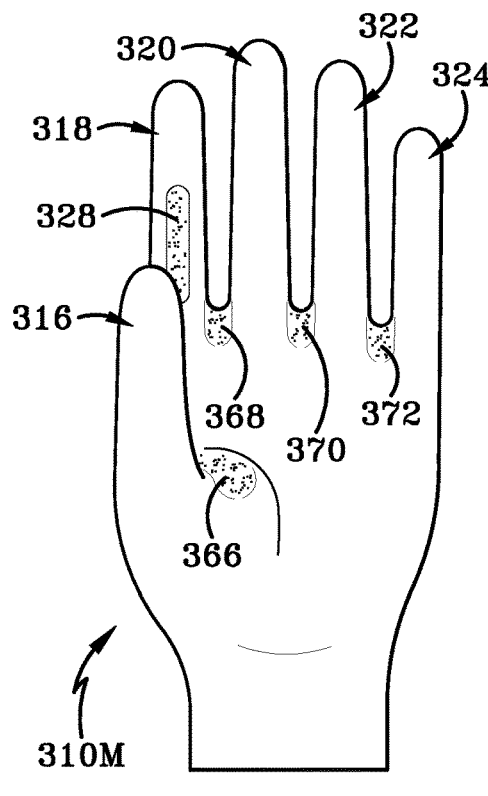
FIG. 16M is a front elevation view of a fourteenth example of the fourth embodiment of a glove in accordance with an aspect of the present disclosure, where the glove is a hand-specific glove having a gripping zone on only the index finger region, and showing textured first, second, third, and fourth crotch areas.
Figure 16N:
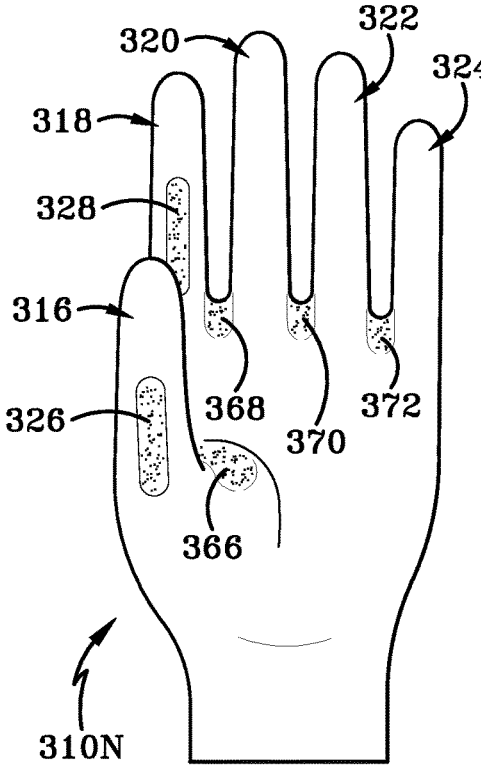
FIG. 16N is a front elevation view of a fifteenth example of the fourth embodiment, where the glove is a hand-specific glove having a gripping zone on each of the thumb region and index finger region, and showing textured first, second, third, and fourth crotch areas.
Figure 16P:
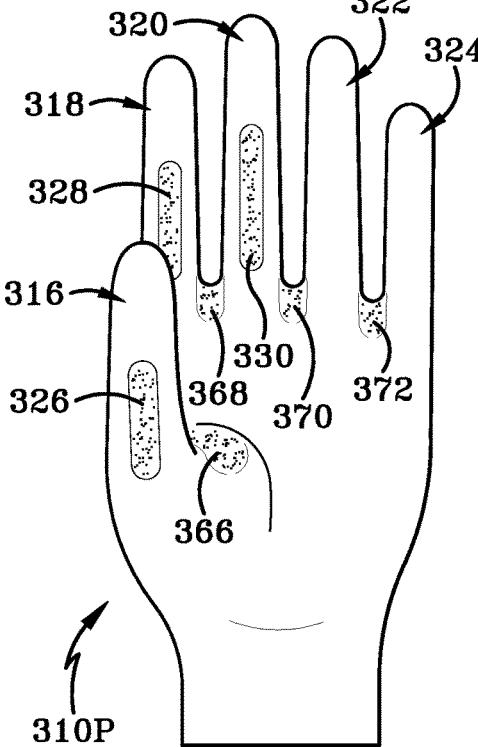
FIG. 16P is a front elevation view of a sixteenth example of the fourth embodiment where the glove is a hand-specific glove having a gripping zone on each of the thumb region, the index finger region and the middle finger region, and showing textured first, second, third, and fourth crotch areas.
Figure 16Q:
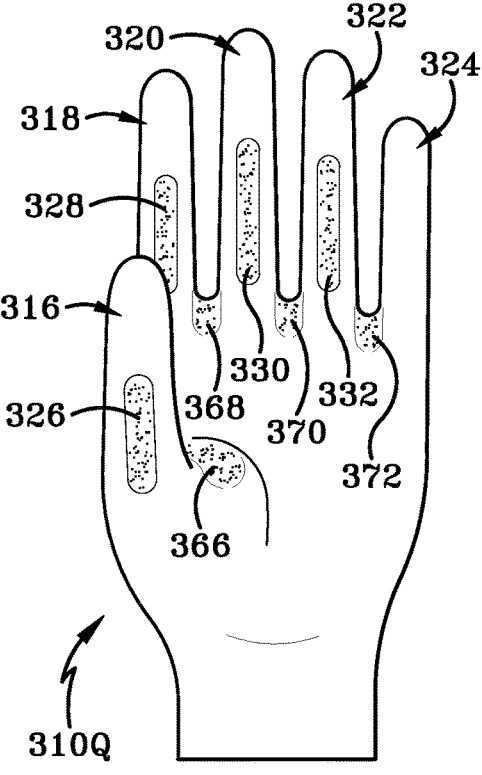
FIG. 16Q is a front elevation view of a seventeenth example of the fourth embodiment where the glove is a hand-specific glove that has a gripping zone on each of the thumb region, the index finger region, the middle finger region, and the ring finger region, and showing textured first, second, third, and fourth crotch areas.

FIGS. 16A through 16Q show additional examples of the fourth embodiment glove. FIG. 16A shows a second example of the fourth embodiment of glove, generally indicated as glove 310A; FIG. 16B shows a third example of the fourth embodiment of glove, generally indicated as glove 310B; FIG. 16C shows a fourth example of the fourth embodiment of glove, generally indicated as glove 310C; and FIG. 16D shows a fifth example of the fourth embodiment of glove, generally indicated as glove 310D. Each of the gloves 310A, 310B, 310C, and 310D has a single textured crotch area. In particular, the textured second crotch area 368 is provided on gloves 310A, 310B, 310C, and 310D. It will, however, be understood that any other single textured crotch area may be provided on these gloves 310A, 310B, 310C, and 310D instead of second crotch area 368. FIGS. 16A through 16D show gripping zones being provided on a single digit region (FIG. 16A), two digit regions (FIG. 16B), three digit regions (FIG. 16C), and four digit regions (FIG. 16D) in an identical manner and for an identical purpose to the gripping zones shown and described herein with respect to FIGS. 6A-6D.

FIG. 16E shows a sixth example of the fourth embodiment of glove, generally indicated as glove 310E; FIG. 16F shows a seventh example of the fourth embodiment of glove, generally indicated as glove 310F; FIG. 16G shows an eighth example of the fourth embodiment of glove, generally indicated as glove 310G; and FIG. 16H shows a ninth example of the fourth embodiment of glove, generally indicated as glove 310H. Each of the gloves 310E, 310F, 310G, and 310H has two textured crotch areas. In particular, the figures illustrate that the gloves include textured first crotch area 366 and second crotch area 368. It will, however, be understood that any other combination of two textured crotch areas may be provided on gloves 310E, 310F, 310J, and 310H instead of first and second crotch areas 366, 368. FIGS. 16E through 16H show gripping zones being provided on a single digit region (FIG. 16E), two digit regions (FIG. 16F), three digit regions (FIG. 16G), and four digit regions (FIG. 16H) in an identical manner and for an identical purpose to the gripping zones shown and described herein with respect to FIGS. 6E-6H.

FIG. 16I shows a tenth example of the fourth embodiment of glove, generally indicated as glove 310I; FIG. 16J shows an eleventh example of the fourth embodiment of glove, generally indicated as glove 310J; FIG. 16K shows a twelfth example of the fourth embodiment of glove, generally indicated as glove 310K; and FIG. 16L shows a thirteenth example of the fourth embodiment of glove, generally indicated as glove 310L. Each of the gloves 310I, 310J, 310K, and 310L has three textured crotch areas. In particular, the figures illustrate that the gloves include textured first crotch area 366, second crotch area 368, and third crotch area 370. It will, however, be understood that any other combination of three textured crotch areas may be provided on gloves 310I, 310J, 310K, and 310L. FIGS. 16I through 16L show gripping zones being provided on a single digit region (FIG. 16I), two digit regions (FIG. 16J), three digit regions (FIG. 16K), and four digit regions (FIG. 16L) in an identical manner and for an identical purpose to the gripping zones shown and described herein with respect to FIGS. 6I-6L.

FIG. 16M shows a fourteenth example of the fourth embodiment of glove, generally indicated as glove 310M; FIG. 16N shows a fifteenth example of the fourth embodiment of glove, generally indicated as glove 310N; FIG. 16P shows a sixteenth example of the fourth embodiment of glove, generally indicated as glove 310P; and FIG. 16Q shows a seventeenth example of the fourth embodiment of glove, generally indicated as glove 310Q. Each of the gloves 310M, 310N, 310P, and 310Q has four textured crotch areas 366-372. FIGS. 16M through 16Q show gripping zones being provided on a single digit region (FIG. 16M), two digit regions (FIG. 16N), three digit regions (FIG. 16P), and four digit regions (FIG. 16Q) in an identical manner and for an identical purpose to the gripping zones shown and described herein with respect to FIGS. 6M-6Q.

Referring now to FIGS. 17-21 there is shown a first example of a fifth embodiment of a glove in accordance with the present disclosure, generally indicated at 410. Glove 410 comprises a wrist region 412, a palm region 414, a thumb region 416, an index finger region 418, a middle finger region 420, a ring finger region 422, and a little finger region 424. Glove 410 defines an interior cavity 410a which is configured to receive a hand of a person therein. Thumb region 416, index finger region 418, middle finger region 420, ring finger region 422, and little finger region 424 comprise digit regions which are configured to receive an associated one of a thumb, an index finger, a middle finger, a ring finger, and a little finger of the person's hand, respectively. Glove 410 includes a textured first crotch area 466, a textured second crotch area 468, a textured third crotch area 470, and a textured fourth crotch area 472. Each of the crotch areas 466-472 is substantially identical in structure and function to crotch areas 66-72 and therefore will not be discussed in further detail herein.

Glove 410 as illustrated in FIGS. 17-21 is an ambidextrous glove which is substantially identical to glove 10 except for the placement of gripping zones in the form of first stays and second stays, as will be described later herein. In all other aspects, glove 410 is identical in structure and function to glove 10.

Figure 17:
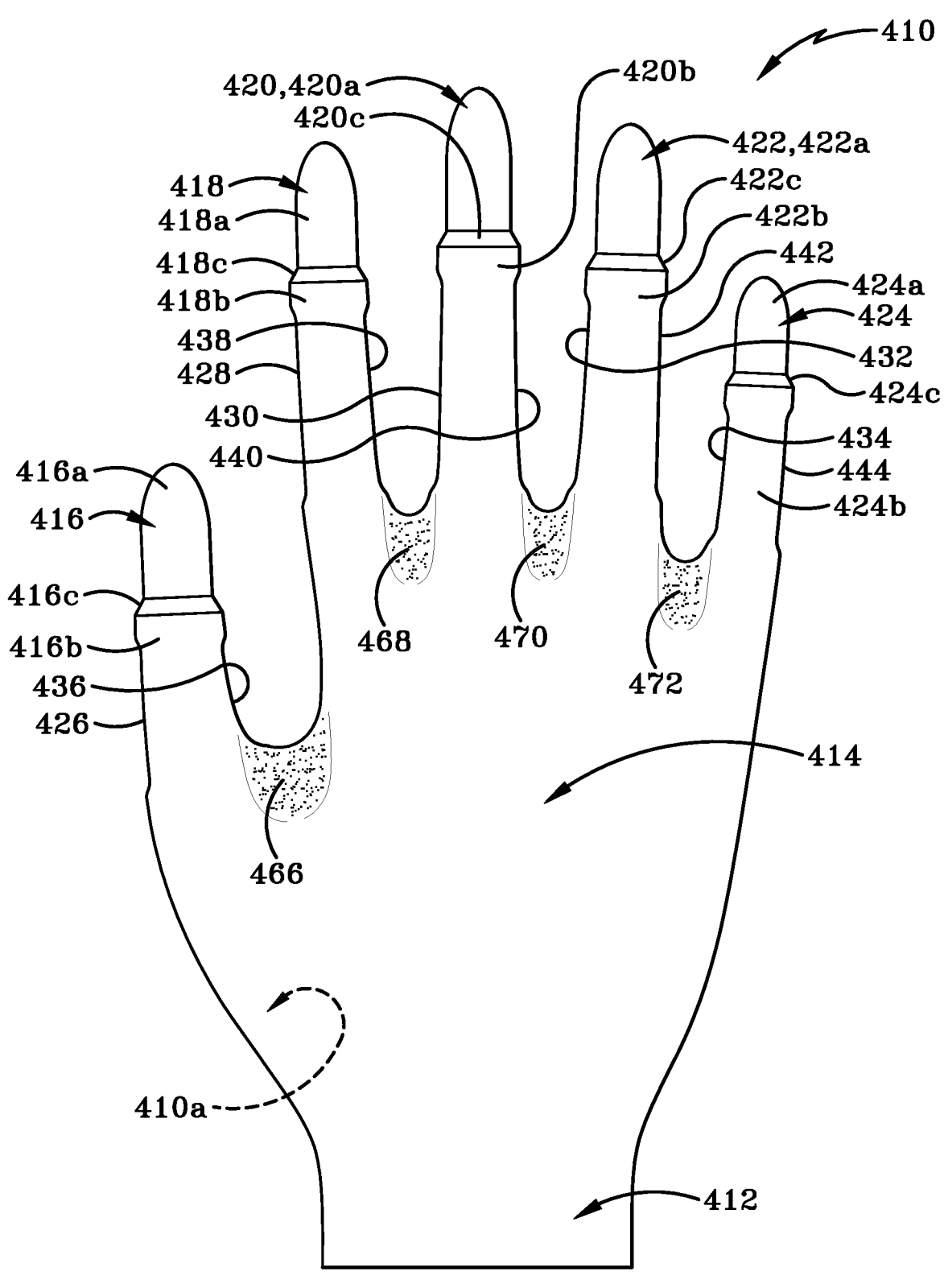
FIG. 17 is a front elevation view of a first example of a fifth embodiment of a glove in accordance with the present disclosure, wherein the first example is an ambidextrous glove shown worn on a left hand of a user, showing a reduced-circumference fingertip region on all digits regions, showing at least one gripping zone on the sides of each of the digit regions and showing textured first, second, third, and fourth crotch areas.

As illustrated in each of FIGS. 17-21, each digit region of glove 410 is comprised of a fingertip region and a remaining portion. The fingertip region originates in a tip of the respective digit region and extends downwardly towards palm region 414 for a distance. The distance is of a length such that the fingertip region will generally be located adjacent or near a first knuckle of the person's associated thumb or finger when glove 410 is worn. The remaining portion extends between the fingertip region and the palm region 414 with a tapering transition portion being located between the remaining portion and the fingertip region as described with respect to glove 10. As illustrated in FIG. 17, thumb region 416 includes a fingertip region 416a, a remaining portion 416b, and a transition portion 416c. Index finger region 418 includes a fingertip region 418a, a remaining portion 418b, and a transition portion 418c. Middle finger region 420 includes fingertip region 420a, a remaining portion 420b, and a transition portion 420c. Ring finger region 422 includes a fingertip region 422a, a remaining portion 422b, and a transition portion 422c. Little finger region 424 includes a fingertip region 424a, a remaining portion 424b, and a transition portion 424c.

FIGS. 17-21 show each of the fingertip regions 416a, 418a, 420a, 422a, and 424a are of a reduced circumference relative to the associated remaining portions 416b, 418b, 420b, 422b, and 424b. The illustrated fingertip regions 416a, 418a, 420a, 422a, and 424a are of a "bullet-tip" shape but it will be understood that other reduced-circumference configurations may be provided on the digit regions of glove 410 instead.

Figure 18:
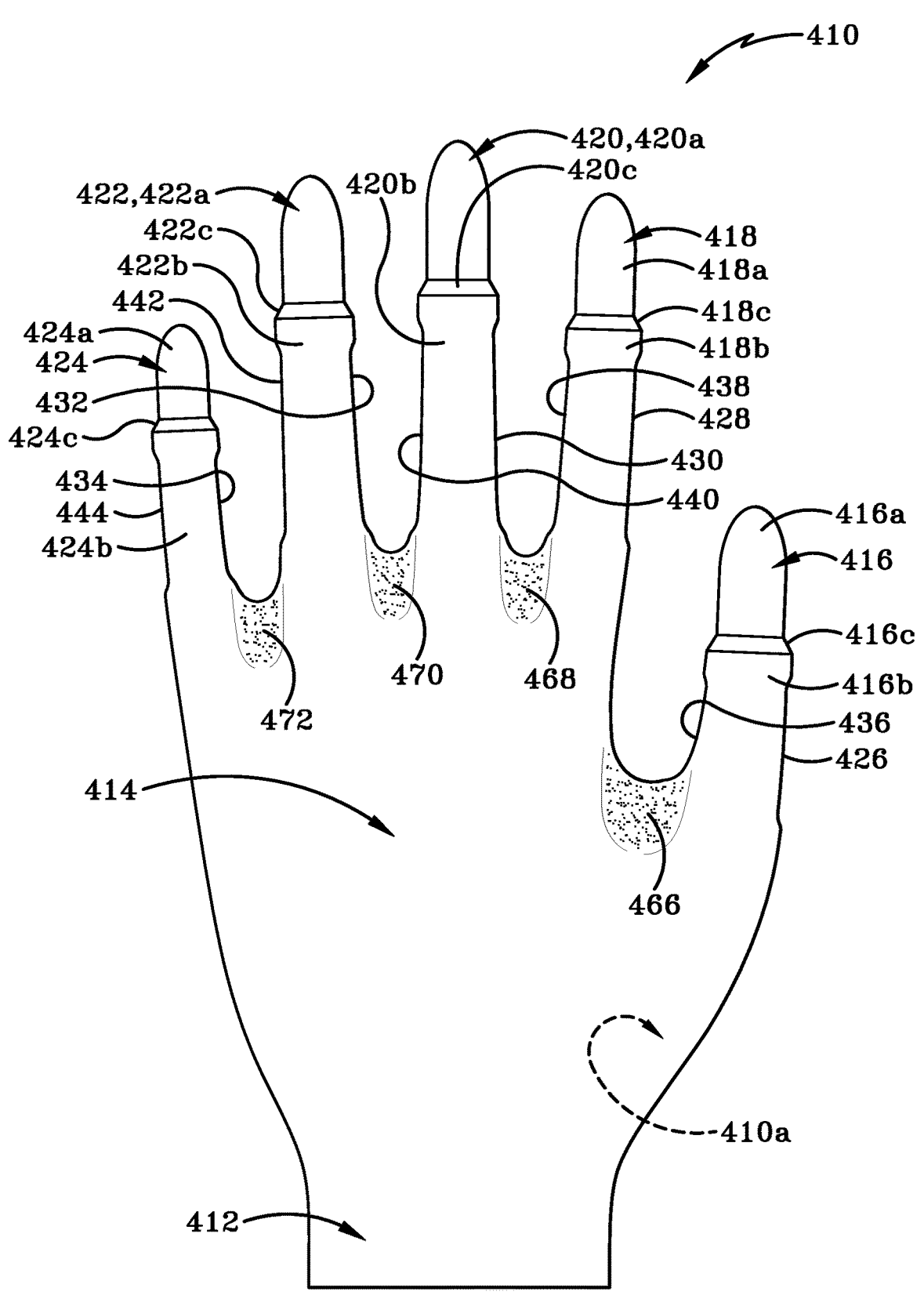
FIG. 18 is a rear elevation view of the glove illustrated in FIG. 17.
Figure 19:
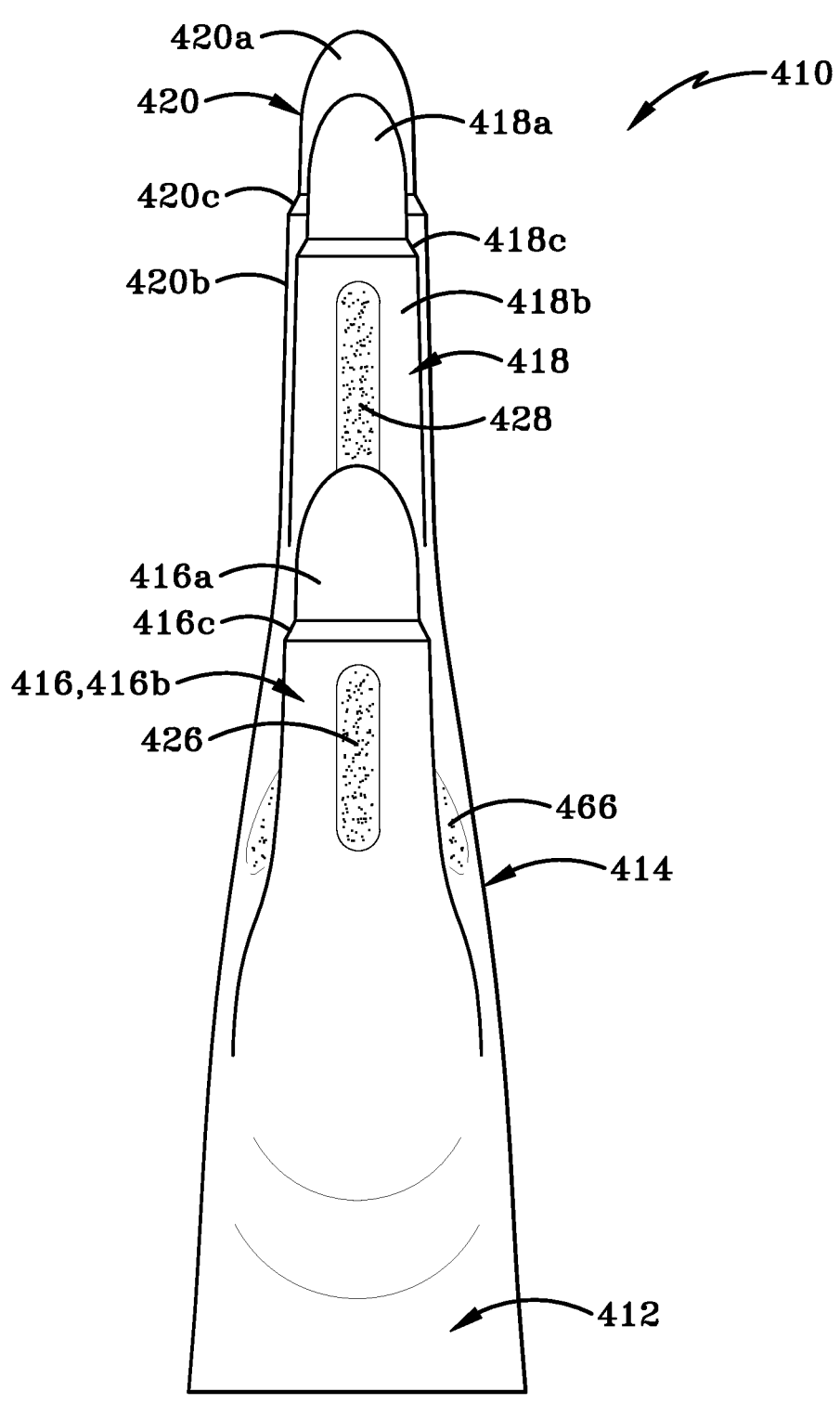
FIG. 19 is a first side elevation view of the glove of FIG. 17.
Figure 20:
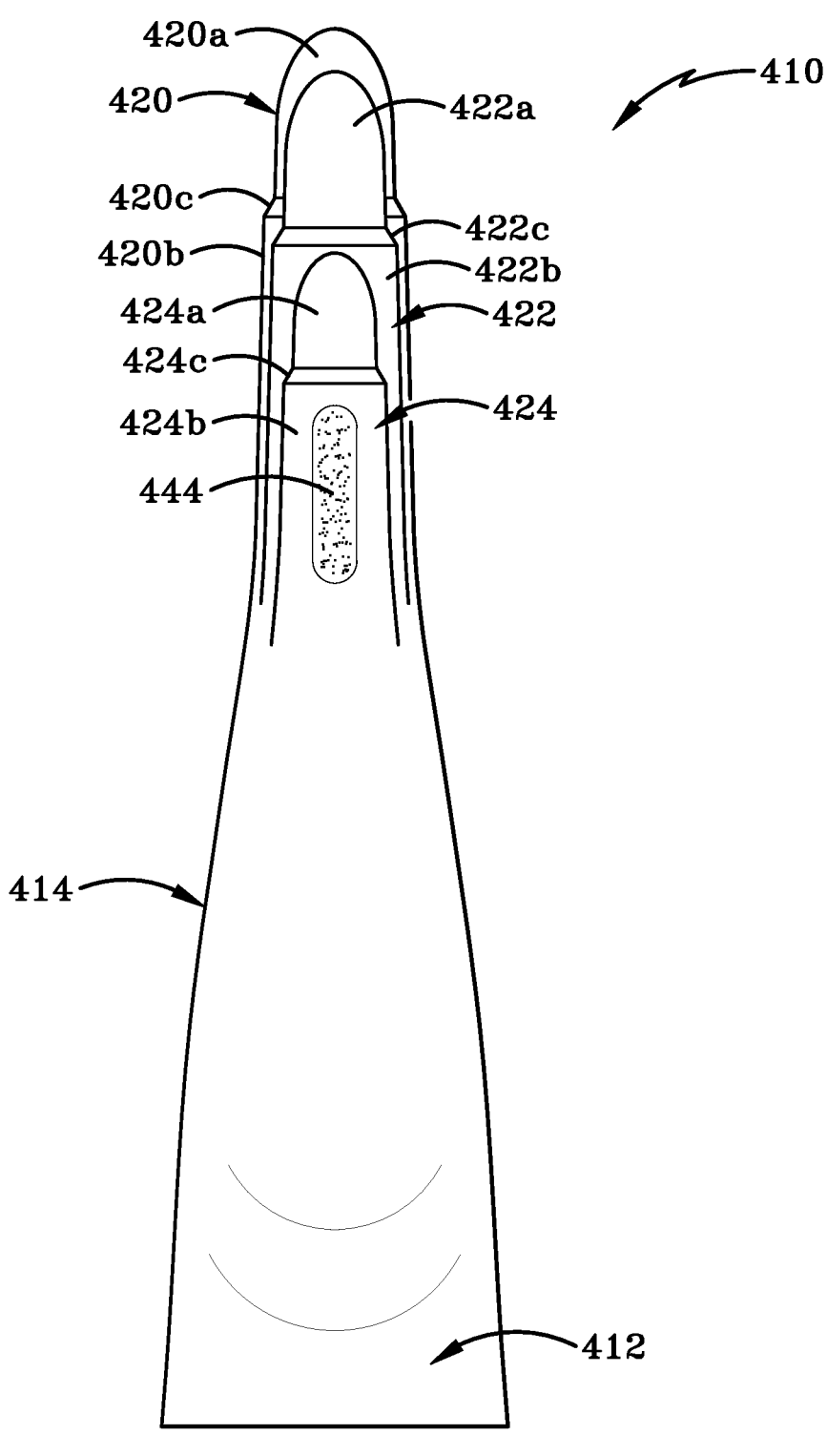
FIG. 20 is a second side elevation view of the glove of FIG. 17.

When glove 410 is worn on the left hand as illustrated in FIG. 17, the surface of the glove facing the viewer may be considered to be the "front" of the glove 410. Consequently, the surface of the wrist region 412, palm region 414, and digit regions facing the viewer of FIG. 17 may be considered to be the "front" of the wrist region 412, palm region 414, and digit regions 416, 418, 420, 422, and 424. FIG. 18 then illustrates a "back" of the glove so the surface of the wrist region 412, palm region 414, and digit regions facing the viewer of FIG. 18 are then the "back" of the wrist region 412, palm region 414, and digit regions 416, 418, 420, 422, and 424.

Although not marked up in FIGS. 17-21, it will be understood that each digit region has a front, a back, a first or left side, a second or right side, similar to the middle finger region 20 illustrated in FIGS. 5A-5E. Additionally, each digit region has an imaginary centerline identical to centerline "CL" (FIGS. 5A and 5C), an imaginary longitudinal axis identical to longitudinal axis "Y", and an imaginary midline identical to midline "ML" (FIGS. 5B and 5C). In accordance with an aspect of the present disclosure, glove 410 is provided with at least one stay in at least one of the digit regions.

FIG. 17 shows a first stay 426 provided in a first side of thumb region 416, a first stay 428 provided in a first side of index finger region 418, a first stay 430 provided in a first side of middle finger region 420, a first stay 432 provided in a first side of ring finger region 422, and a first stay 434 provided in a first side of little finger region 424. Each first stay 426, 428, 430, 432, 434 comprises an arcuate concave indentation which is formed in a section of the first side of the associated digit region. In particular, the first stay of each digit region is located in remaining portion 416b, 418b, 420b, 422b, or 424b of the respective digit region. Each first stay originates a short distance below the transition portion of the respective digit region and extends downwardly towards palm region 414, terminating a short distance above an adjacent finger crotch. For example, the first stay 430 of middle finger region 420 extends from a short distance below the transition portion 420c of middle finger region 420 and terminates a short distance above second crotch area 468. The second stay 440 of middle finger region 420 extends from a short distance below the transition portion 420 of middle finger region 420 and terminates a short distance above third crotch area 470. Second stay 440 is substantially identically configured to first stay 430 but is arranged as a mirror image of first stay 430. First stay 430 and second stay 440 are oriented substantially parallel to the imaginary longitudinal axis of the middle finger region 420, are opposed to one another and are laterally aligned with one another. First and second stays 430, 440 are located in remaining portion 420b in a position such that, when glove 410 is worn, first and second stays 430, 440 will extend from slightly below the first knuckle of the person's hand, along the sides of their middle finger, extend over the second knuckle and terminate a short distance from the finger crotch between the person's middle finger and index finger, and the person's middle finger and ring finger.

In accordance with an aspect of the present disclosure, a second stay is provided in each of the digit regions of glove 410. FIGS. 17 and 18 show a second stay 436 provided in thumb region 416, a second stay 438 provided in index finger region 418, the second stay 440 provided in middle finger region 420, a second stay 42 provided in ring finger region 422, and a second stay 444 provided in little finger region 424. Each second stay 436, 438, 440, 442, 444 comprises a concave indentation formed in the second side of the associated one of the thumb region 416, index finger region 418, middle finger region 420, ring finger region 422, and little finger region 424. By way of example, FIG. 18 shows that first stay 430 is located opposite to and laterally aligned with second stay 440 in middle finger region 420. First stay 430 and second stay 440 are oriented substantially parallel to longitudinal axis "Y" of middle finger region 420. Similarly, first stay 426 and second stay 436 are located opposite to and laterally aligned with one another, and are both oriented substantially parallel to the longitudinal axis of thumb region 416; first stay 428 and second stay 438 are located opposite to and laterally aligned with one another, and substantially parallel to the longitudinal axis of index finger region 418; first stay 432 and second stay 442 are located opposite to and laterally aligned with one another, and substantially parallel to the longitudinal axis of ring finger region 422; and first stay 434 and second stay 444 are located opposite to and laterally aligned with one another, and substantially parallel to the longitudinal axis of little finger region 424. The concavity of the first and second stays of any one of the digit regions is such that the stays open away from one another. Additionally, the concavity of the opposed first and second stays and the width between the opposed interior surfaces thereof (such as the width between first stay 430 and second stay 440 shown in FIG. 21) is reduced. In particular, the width between the first and second stays is reduced relative to the width between opposing interior surfaces of the remaining portion of the associated digit region.

Figure 21:
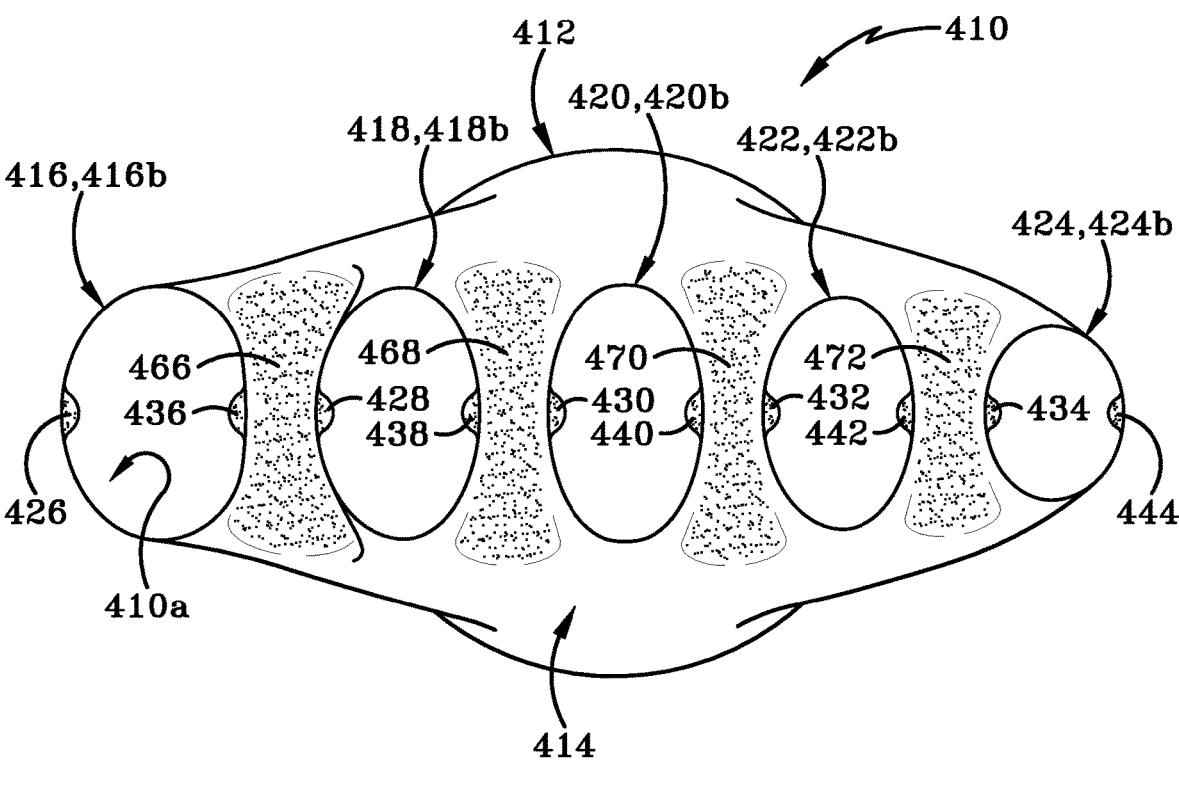
FIG. 21 is a top plan view of the glove of FIG. 17.

The concave indentation which constitutes each of the first stay and the second stay on any particular digit region only extends around part of a total circumference of the remaining portion of that particular digit region. The circumferences of the various sections of each digit region is measured oriented at ninety degrees, i.e., orthogonally, relative to the imaginary longitudinal axis of that particular digit region. For example, as shown in FIG. 21, the first stay 430 of middle finger region 420 extends for less than one quarter of the total circumference of the remaining portion 420b of the middle finger region 420. Similarly, the second stay 440 of the middle finger region 420 extends for less than one quarter of the total circumference of the remaining portion 420b thereof. FIG. 21 also shows that the concave indentations of the first stay and second stay of any particular digit region form projections which extend into the associated portion of the interior cavity 410a defined by the digit region of glove 410. The reduced width of the digit region measured between the interior surfaces of these projections of the first and second stays will bring the first stay and second stay into contact with the person's finger or thumb received in the respective digit region and will frictionally engage the same as has been described earlier herein. This frictional engagement will reduce the tendency of the digit region to slide relative to the person's finger or thumb during performance of a task while wearing glove 410.

Referring still to FIG. 21, the concave indentation which constitutes each of first stay and second stay extends around less than a quarter of the total circumference of the digit region. As a consequence, an "un-indented" section of the associated region is located between the circumferential edge of first stay and an adjacent circumferential edge of the associate second stay on each of the front and back of the digit region.

In accordance with another aspect of the present disclosure, an exterior surface of glove 410 along first stays 426, 428, 430, 432, and 434, and along second stays 436, 438, 440, 442, and 444 is textured. In one embodiment the exterior surface of the glove along the stays is micro-etched to create the texturing. In one embodiment, the micro-etching creates a sand pattern texture that occurs only on the first stays 426, 428, 430, 432, and 434 and second stays 436, 438, 440, 442, and 444. It will be understood that in other embodiments, other patterns, such as a diamond pattern or a herringbone pattern, or any other desired pattern, may be provided on the first stays and second stays by any other process.

Glove 410 is used in a substantially identical manner to glove 10 and therefore will not be described in much detail hereafter other than to state that when the appropriate digit of the person's hand is received in one of the digit regions of the glove 410 which includes first stays and second stays, the curvature of the first stays and second stays "flattens out"

(similar to what is illustrated in FIGS. 5D and 5E with respect to glove 10. The flattened out interior surface of the first stay and second stay remains in physical contact with the person's digit and helps to ensure that the associated digit region of glove 410 remains in a relatively fixed position with respect to the person's finger or thumb. In other words, the first stay and second stay help to ensure that the digit region doesn't slide longitudinally along the person's finger or thumb as they bend and flex their finger or thumb. This arrangement helps the person to retain their tactile sensitivity and dexterity even though they are wearing glove 410.

The micro-etch treatment or texturing provided on each of the first stays and second stays of glove 410 through 410D aids in improving the grip-ability of glove 410. The rest of the exterior surface of the glove other than the micro-etched first stays and second stays is smooth, i.e., free of texturing. The texturing of the stays helps a person wearing glove 410 to better grip objects in their hand. The micro-etching also strengthens the regions of the glove which include first stays 426, 428, 430, 432, 434 and second stays 436, 438, 440, 442, and 444.

Each of the first, second, third, and fourth crotch areas 466, 468, 470, and 472 are similarly micro-etched or textured to strengthen these regions of glove 410. The texturing of the crotch areas 466-472 which is located on the front and back of glove 410 also aids a person in better gripping an object or article in their hand.

Figures 22E, 22F, 22G, 22H:
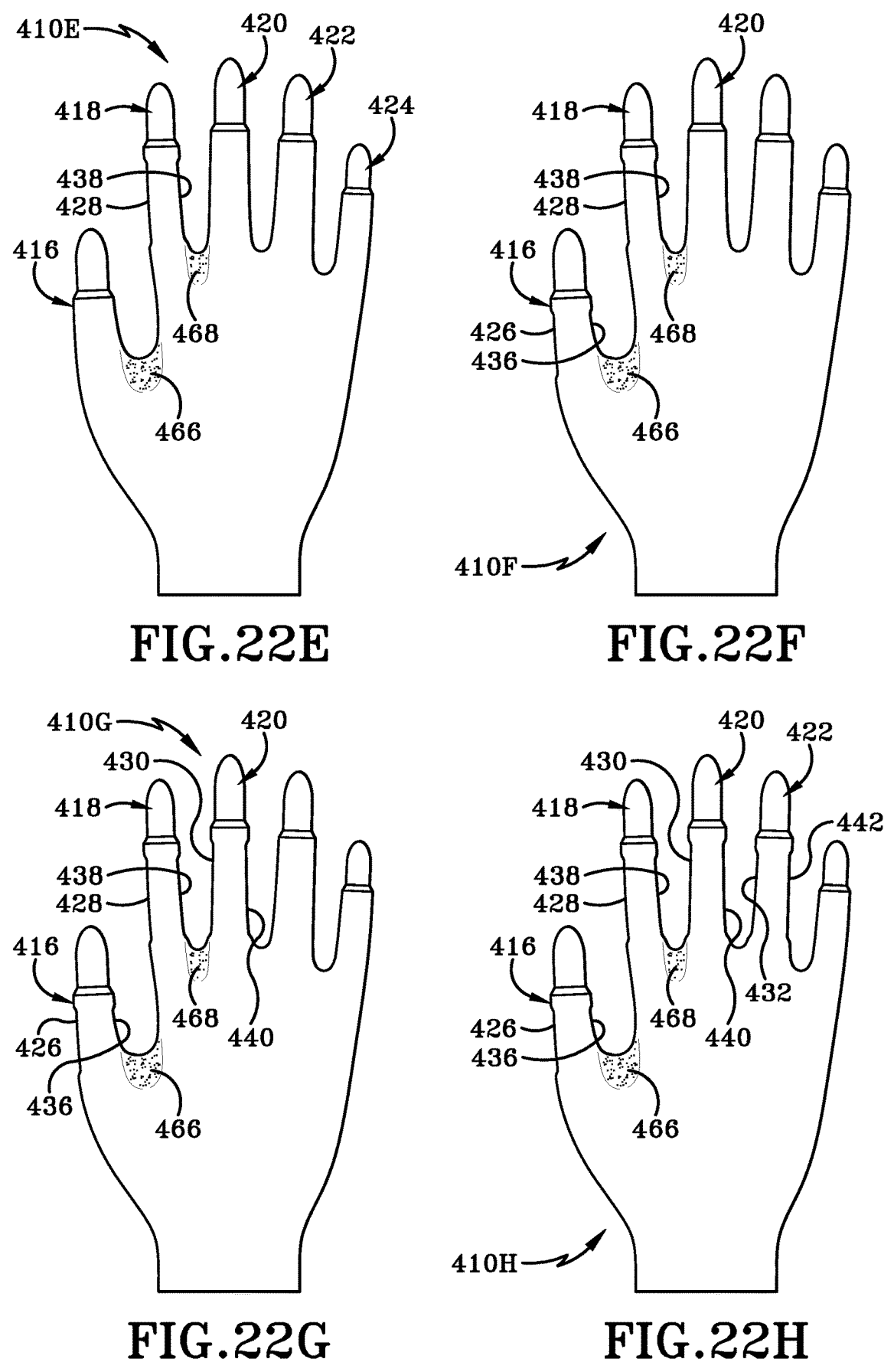
Figures 22I, 22J, 22K, 22L:
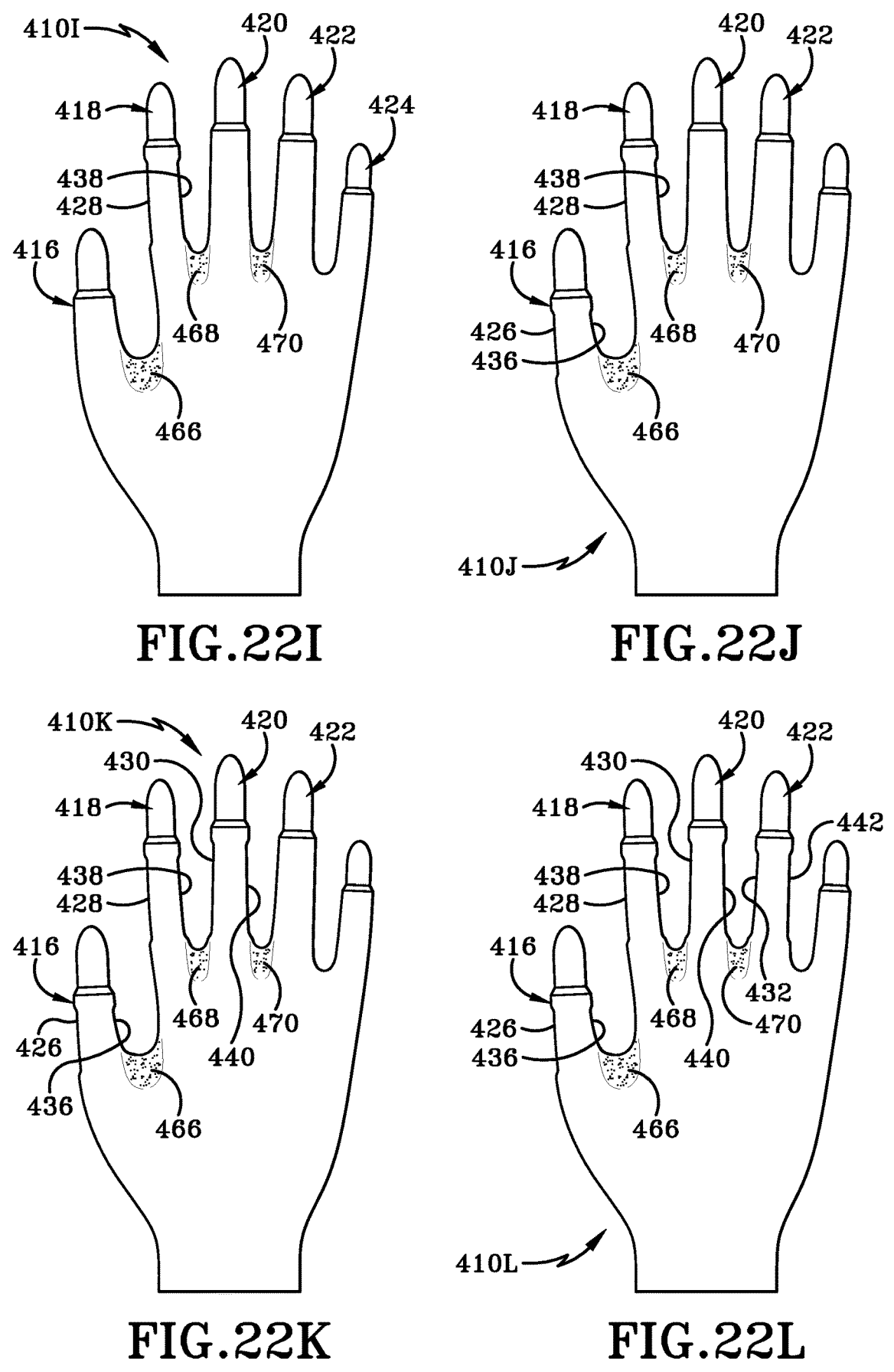
Figures 22M, 22N, 22P, 22Q:
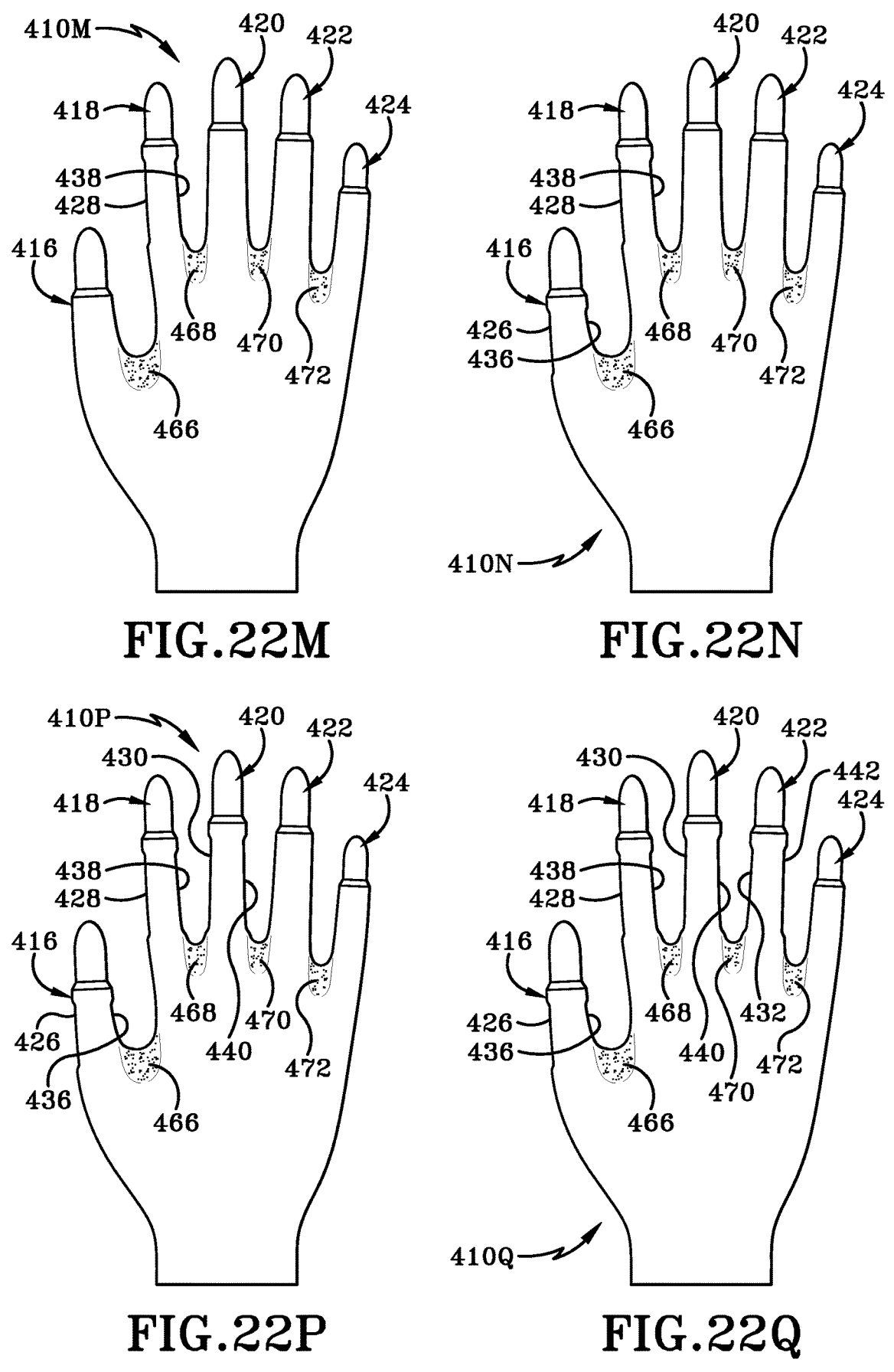

FIGS. 22A through 22Q show additional examples of the fifth embodiment glove. FIG. 22A shows a second example of the fifth embodiment of glove, generally indicated as glove 410A; FIG. 22B shows a third example of the fifth embodiment of glove, generally indicated as glove 410B; FIG. 22C shows a fourth example of the fifth embodiment of glove, generally indicated as glove 410C; and FIG. 22D shows a fifth example of the fifth embodiment of glove, generally indicated as glove 410D. Each of the gloves 410A, 410B, 410C, and 410D has a single textured crotch area. In particular, the textured second crotch area 468 is provided on gloves 410A, 410B, 410C, and 410D. It will, however, be understood that any other single textured crotch area may be provided on these gloves 410A, 410B, 410C, and 410D instead of second crotch area 468. FIGS. 22A through 22D show gripping zones being provided on a single digit region (FIG. 22A), two digit regions (FIG. 22B), three digit regions (FIG. 22C), and four digit regions (FIG. 22D) in an identical manner and for an identical purpose to the gripping zones shown and described herein with respect to the gloves shown in FIGS. 6A-6D.

FIG. 22E shows a sixth example of the fifth embodiment of glove, generally indicated as glove 410E; FIG. 22F shows a seventh example of the fifth embodiment of glove, generally indicated as glove 410F; FIG. 22G shows an eighth example of the fifth embodiment of glove, generally indicated as glove 410G; and FIG. 22H shows a ninth example of the fifth embodiment of glove, generally indicated as glove 410H. Each of the gloves 410E, 410F, 410G, and 410H has two textured crotch areas. In particular, the figures illustrate that the gloves include textured first crotch area 466 and second crotch area 468. It will, however, be understood that any other combination of two textured crotch areas may be provided on gloves 410E, 410F, 410J, and 410H instead of first and second crotch areas 466, 468. FIGS. 22E through 22H show gripping zones being provided on a single digit region (FIG. 22E), two digit regions (FIG. 22F), three digit regions (FIG. 22G), and four digit regions (FIG. 22H) in an identical manner and for an identical purpose to the gripping zones shown and described herein with respect to the gloves shown in FIGS. 6E-6H.

FIG. 22I shows a tenth example of the fifth embodiment of glove, generally indicated as glove 410I; FIG. 22J shows an eleventh example of the fifth embodiment of glove, generally indicated as glove 410J; FIG. 22K shows a twelfth example of the fifth embodiment of glove, generally indicated as glove 410K; and FIG. 22L shows a thirteenth example of the fifth embodiment of glove, generally indicated as glove 410L. Each of the gloves 410I, 410J, 410K, and 410L has three textured crotch areas. In particular, the figures illustrate that the gloves include textured first crotch area 466, second crotch area 468, and third crotch area 470. It will, however, be understood that any other combination of three textured crotch areas may be provided on gloves 410I, 410J, 410K, and 410L. FIGS. 22I through 22L show gripping zones being provided on a single digit region (FIG. 22I), two digit regions (FIG. 22J), three digit regions (FIG. 22K), and four digit regions (FIG. 22L) in an identical manner and for an identical purpose to the gripping zones shown and described herein with respect to the gloves shown in FIGS. 6I-6L.

FIG. 22M shows a fourteenth example of the fifth embodiment of glove, generally indicated as glove 410M; FIG. 22N shows a fifteenth example of the fifth embodiment of glove, generally indicated as glove 410N; FIG. 22P shows a sixteenth example of the fifth embodiment of glove, generally indicated as glove 410P; and FIG. 22Q shows a seventeenth example of the fifth embodiment of glove, generally indicated as glove 410Q. Each of the gloves 410M, 410N, 410P, and 410Q has four textured crotch areas 466-472. FIGS. 22M through 22Q show gripping zones being provided on a single digit region (FIG. 22M), two digit regions (FIG. 22N), three digit regions (FIG. 22P), and four digit regions FIG. 22Q in an identical manner and for an identical purpose to the gripping zones shown and described herein with respect to gloves shown in FIGS. 6M-6Q.

Figure 23:
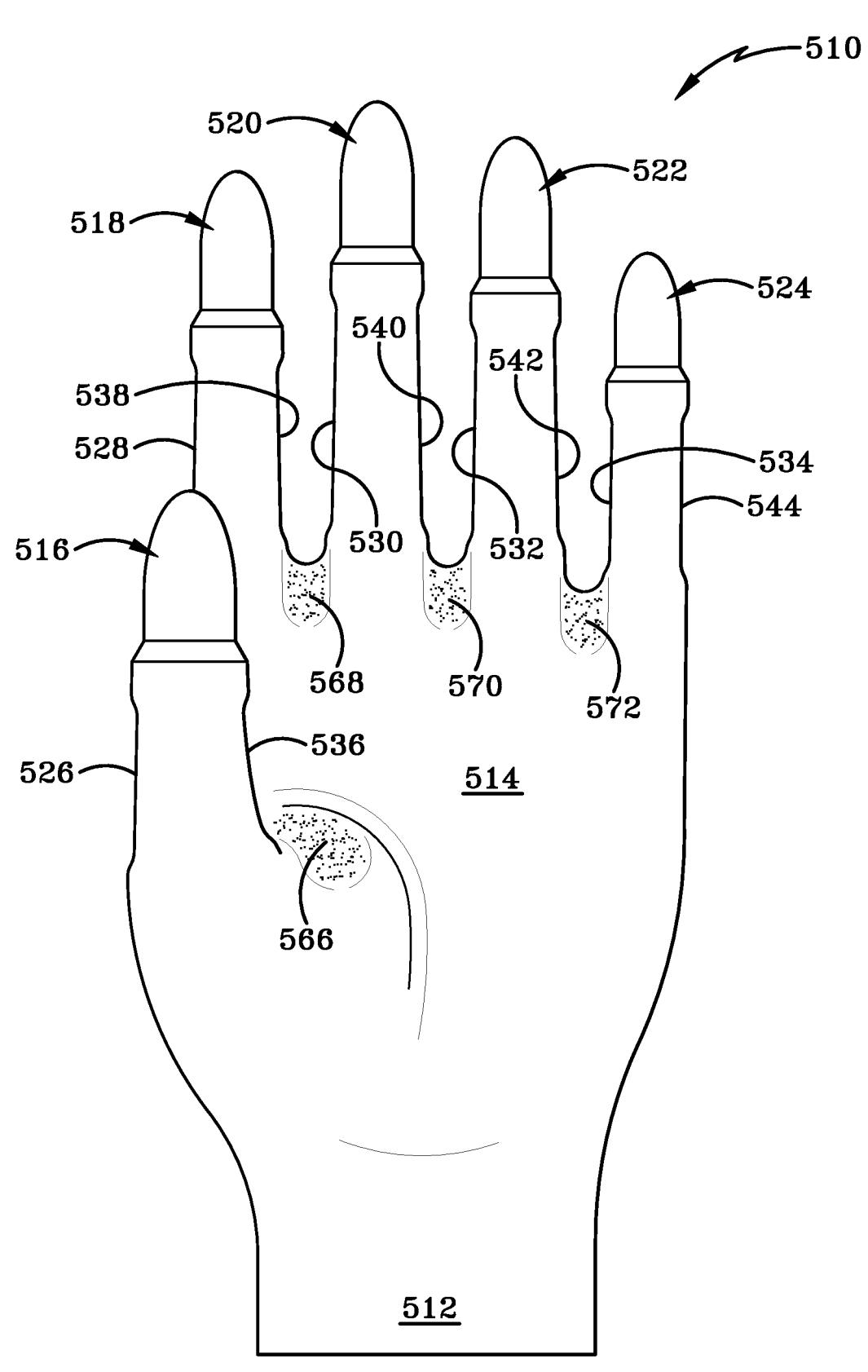
FIG. 23 is a front elevation view of a first example of a sixth embodiment of a glove in accordance with the present disclosure, wherein the first example is a hand-specific glove shown worn on a left hand of a user, showing a reduced-circumference fingertip region on all digits regions, showing at least one gripping zone on the sides of each of the digit regions, and showing textured first, second, third, and fourth crotch areas.
Figure 24:
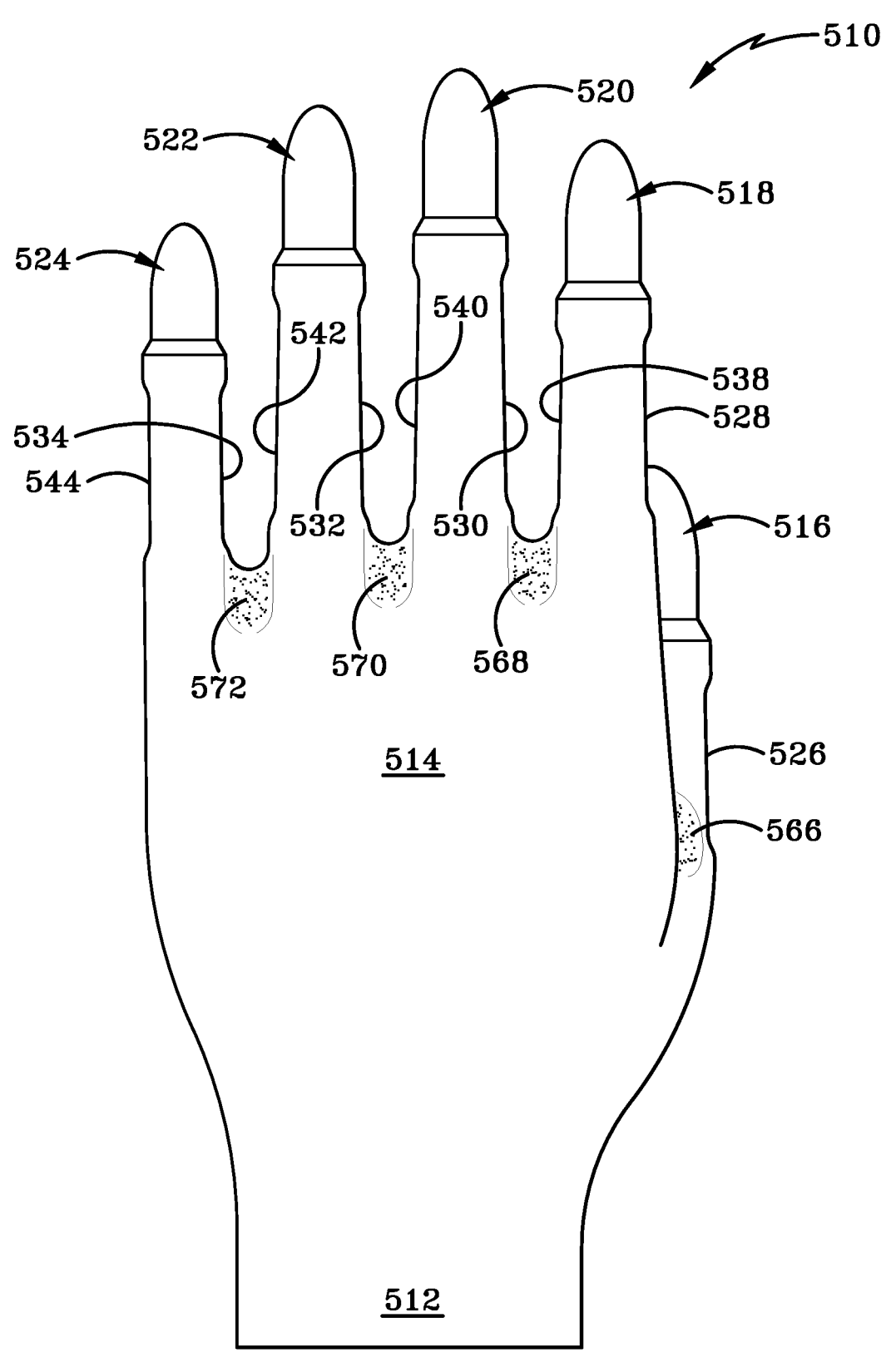
FIG. 24 is a rear elevation view of the first example of the sixth embodiment of the glove illustrated in FIG. 23.

FIGS. 23-24 show a first example of a sixth embodiment of a glove in accordance with the present disclosure, generally indicated at 510. Glove 510 is substantially identical in structure and function to glove 410 except that glove 510 is a hand-specific glove and not an ambidextrous glove like glove 410.

Glove 510 includes a wrist region 512, a palm region 514, and digit regions which extend outwardly from the palm region 514. The digit regions include a thumb region 516, an index finger region 518, a middle finger region 520, a ring finger region 522, and a little finger region 524. Apart from the glove 510 being a hand-specific glove, all of the component parts of the glove are substantially identical in structure and function to glove 410. In particular, thumb region 516 is identical to thumb region 416; index finger region 618 is identical to index finger region 418, middle finger region 520 is identical to middle finger region 420, ring finger region 522 is identical to ring finger region 422, and little finger region 524 is identical to little finger region 424. Each of these digit regions includes a fingertip region that is identical in structure and function to the associated fingertip region 416a, 418a, 420a, 422a, and 424a. Each of these digit regions includes a remaining portion that is identical in structure and function to the associated remaining portion 416b, 418b, 420b, 422b, and 424b. Each of these digit regions includes a transition portion that is identical in structure and function to the associated transition portion 416c, 418c, 420c, 422c, and 422d. For clarity of illustration none of the fingertip region, transition portion, and remaining portion have been numbered in FIGS. 23 and 24.

In accordance with an aspect of the present disclosure each of the thumb region 516, index finger region 518, middle finger region 520, ring finger region 522, and little finger region 524 includes at least one gripping zone. The at least one gripping zone comprises at least a first stay. The at least one gripping zone may further include a second stay. In particular, thumb region 516 includes a first stay 526 on a first side of thumb region 516 and a second stay 536 on the opposing second side of thumb region 516. Index finger region 518 includes a first stay 528 on a first side of index finger region 518 and a second stay 538 on a second side thereof. Middle finger region 520 includes a first stay 530 on a first side of middle finger region 520 and a second stay 540 on a second side thereof. Ring finger region 522 includes a first stay 532 on a first side of ring finger region 522 and a second stay 542 on a second side thereof. Little finger region 524 includes a first stay 534 on a first side of little finger region 524 and a second stay 544 on a second side thereof. First stays 526, 528, 530, 532, and 534 are identical in structure and function to first stays 426, 428, 430, 432, and 434. Second stays 536, 538, 540, 542, and 544 are identical in structure and function to second stays 436, 438, 440, 442, and 444. Each stay on glove 510 through 510D is provided with texturing, particularly via micro-etching. In one embodiment, the micro-etching will produce a sand pattern of texturing but it will be understood that other types of texturing and other patterns may be applied to the first and second stays on glove 510.

Glove 510 further includes a textured first crotch area 566, a textured second crotch area 568, a textured third crotch area 570, and a textured fourth crotch area 572. As with the other embodiments of the gloves disclosed herein, the texturing preferably is created through a micro-etching technique. In other embodiments, the texturing may be created in other ways and may be provided in patterns other than the sand pattern illustrated in FIGS. 23 and 24. Crotch areas 566-572 are substantially identical in all respects to crotch areas 466-472.

Figure 25A:
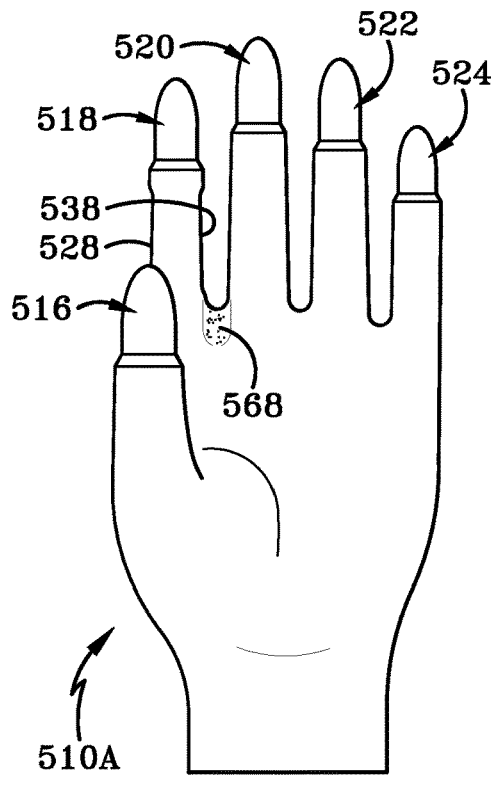
FIG. 25A is a front elevation view of a second example of the sixth embodiment of a glove in accordance with an aspect of the present disclosure, where the glove is a hand-specific glove having a gripping zone on the sides of only the index finger region, and showing a textured second crotch area.
Figure 25B:
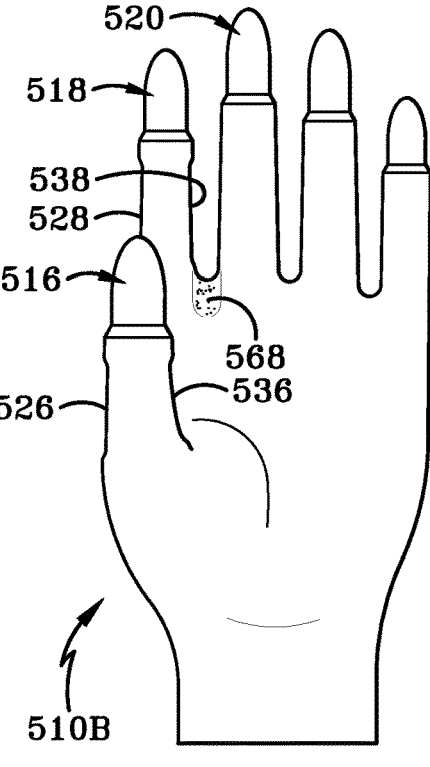
FIG. 25B is a front elevation view of a third example of the sixth embodiment, where the glove is a hand-specific glove having a gripping zone on the sides of each of the thumb region and index finger region, and showing a textured second crotch area.
Figure 25C:
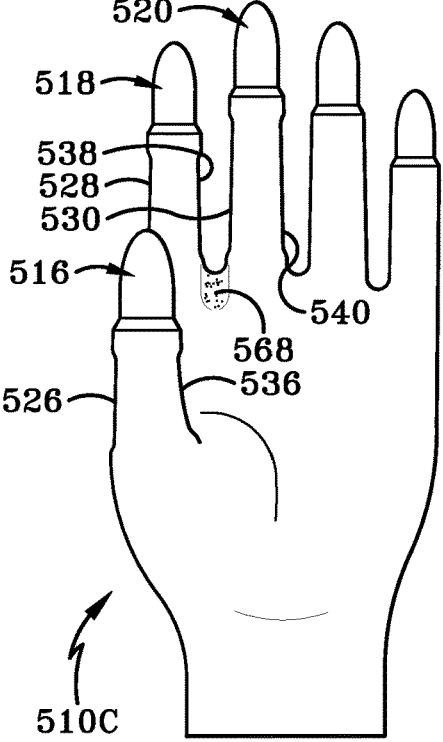
FIG. 25C is a front elevation view of a fourth example of the sixth embodiment where the glove is a hand-specific glove having a gripping zone on the sides of each of the thumb region, the index finger region and the middle finger region, and showing a textured second crotch area.
Figure 25D:
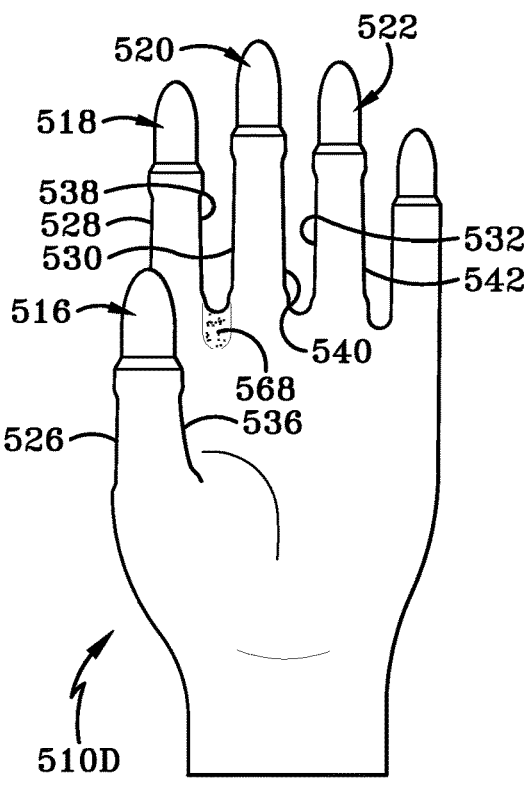
FIG. 25D is a front elevation view of a fifth example of the sixth embodiment where the glove is a hand-specific glove that has a gripping zone on the sides of each of the thumb region, the index finger region, the middle finger region, and the ring finger region, and showing a textured second crotch area.
Figure 25E:
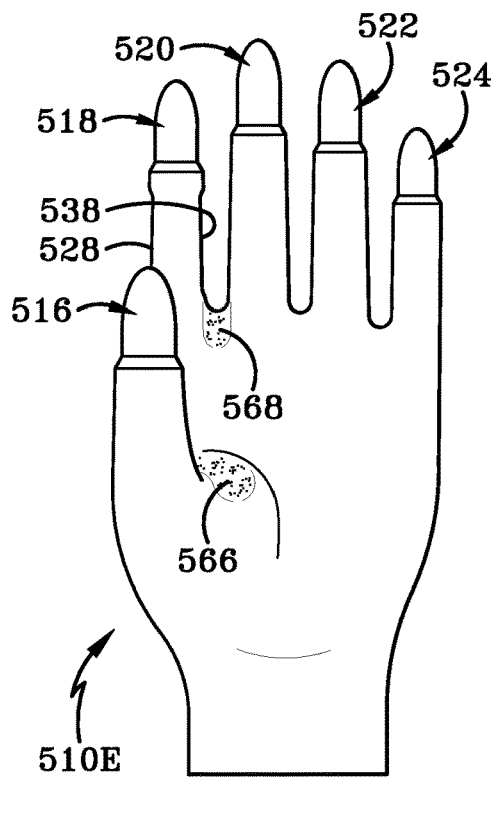
FIG. 25E is a front elevation view of a sixth example of the sixth embodiment of a glove in accordance with an aspect of the present disclosure, where the glove is a hand-specific glove having a gripping zone on the sides of only the index finger region, and showing a textured first and second crotch area.
Figure 25F:
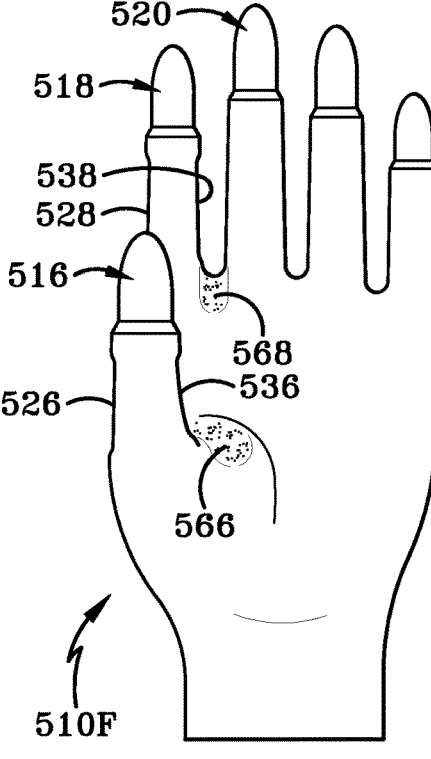
FIG. 25F is a front elevation view of a seventh example of the sixth embodiment, where the glove is a hand-specific glove having a gripping zone on the sides of each of the thumb region and index finger region, and showing a textured first and second crotch area.
Figure 25G:
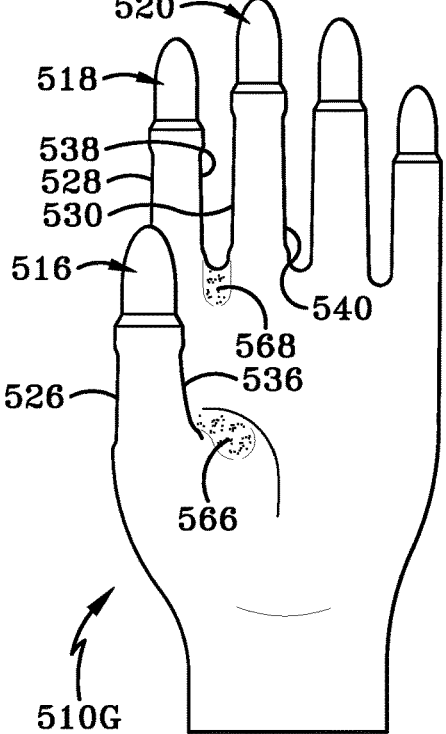
FIG. 25G is a front elevation view of an eighth example of the sixth embodiment where the glove is a hand-specific glove having a gripping zone on the sides of each of the thumb region, the index finger region and the middle finger region, and showing a textured first and second crotch area.
Figure 25H:
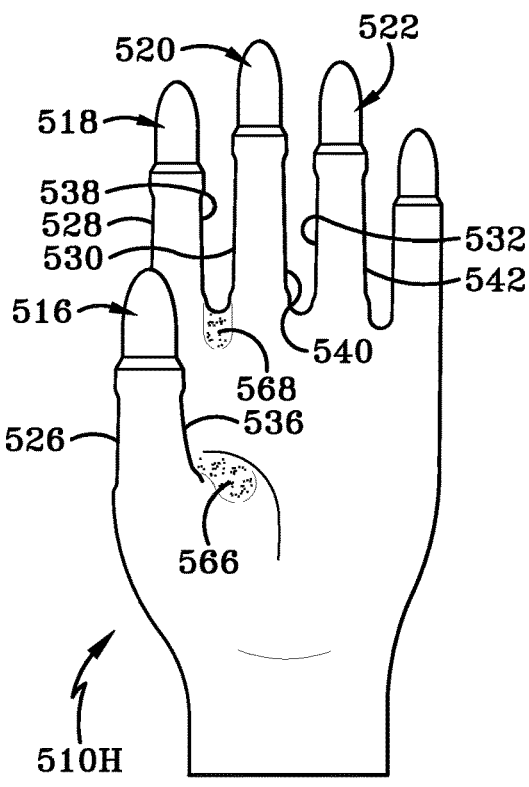
FIG. 25H is a front elevation view of a ninth example of the sixth embodiment where the glove is a hand-specific glove that has a gripping zone on the sides of each of the thumb region, the index finger region, the middle finger region, and the ring finger region, and showing a textured first and second crotch area.
Figure 25I:
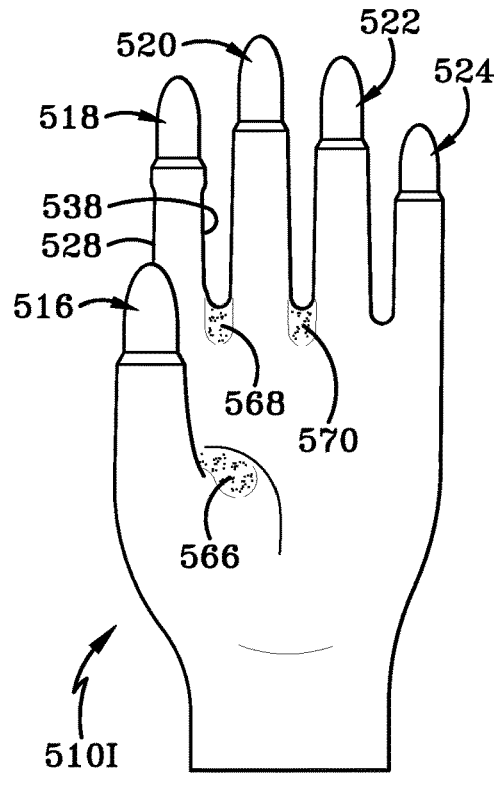
FIG. 25I is a front elevation view of a tenth example of the sixth embodiment of a glove in accordance with an aspect of the present disclosure, where the glove is a hand-specific glove having a gripping zone on the sides of only the index finger region, and showing textured first, second, and third crotch areas.
Figure 25J:
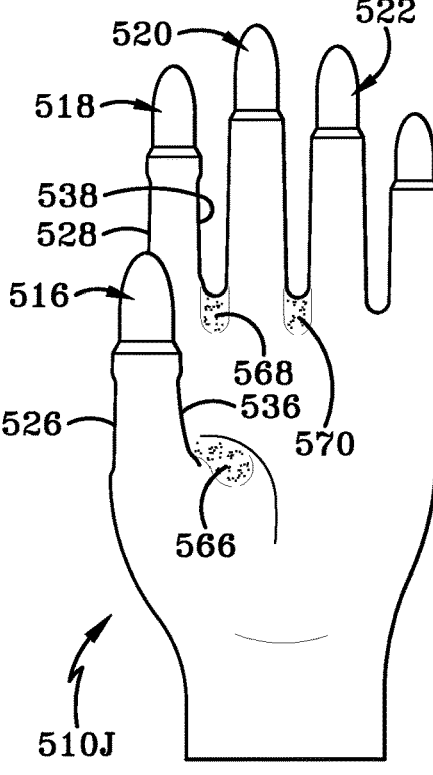
FIG. 25J is a front elevation view of an eleventh example of the sixth embodiment, where the glove is a hand-specific glove having a gripping zone on the sides of each of the thumb region and index finger region, and showing textured first, second, and third crotch areas.
Figure 25K:
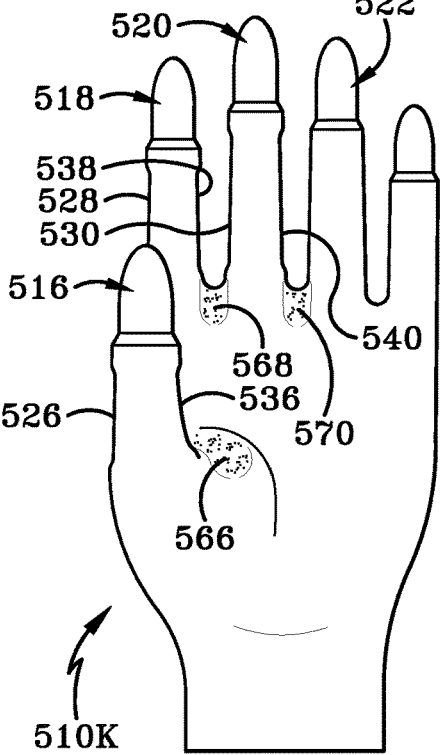
FIG. 25K is a front elevation view of a twelfth example of the sixth embodiment where the glove is a hand-specific glove having a gripping zone on the sides of each of the thumb region, the index finger region and the middle finger region, and showing textured first, second, and third crotch areas.
Figure 25L:
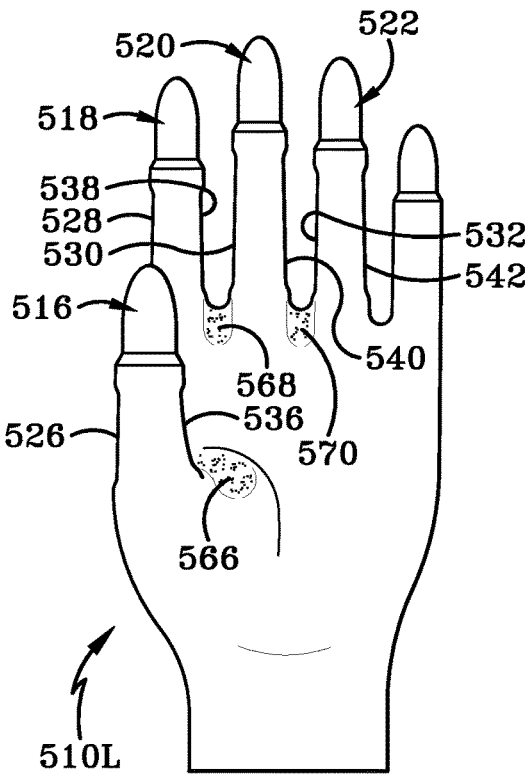
FIG. 25L is a front elevation view of a thirteenth example of the sixth embodiment where the glove is a hand-specific glove that has a gripping zone on the sides of each of the thumb region, the index finger region, the middle finger region, and the ring finger region, and showing textured first, second, and third crotch areas.
Figure 25M:
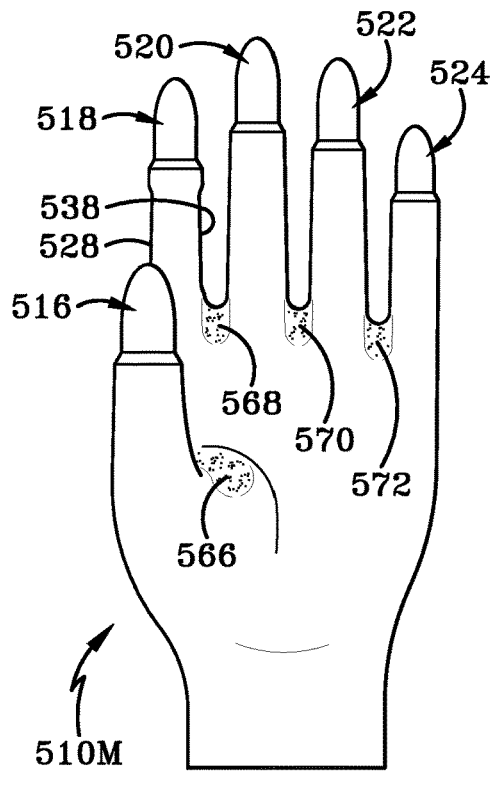
Figure 25N:
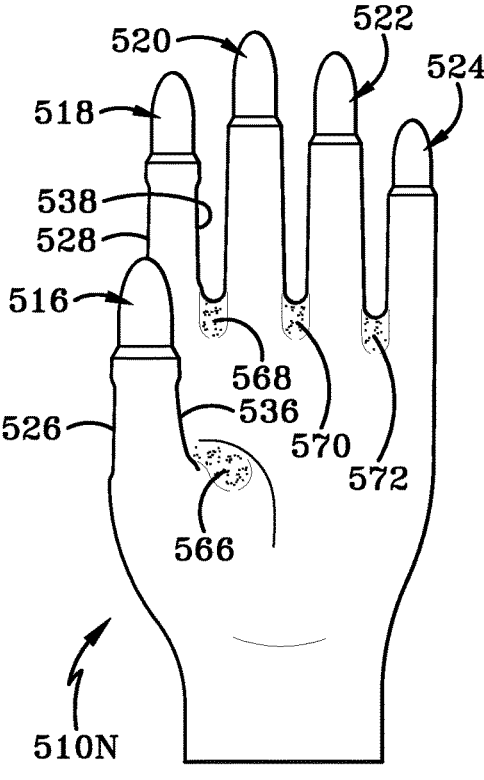
Figure 25P:
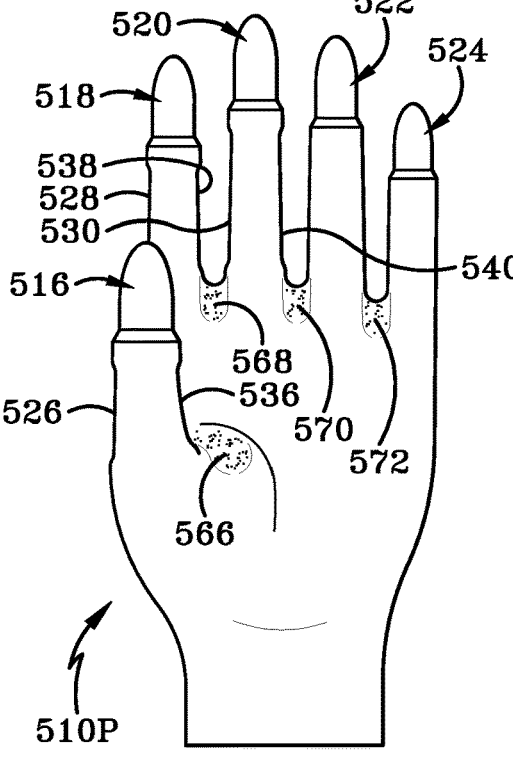
Figure 25Q:
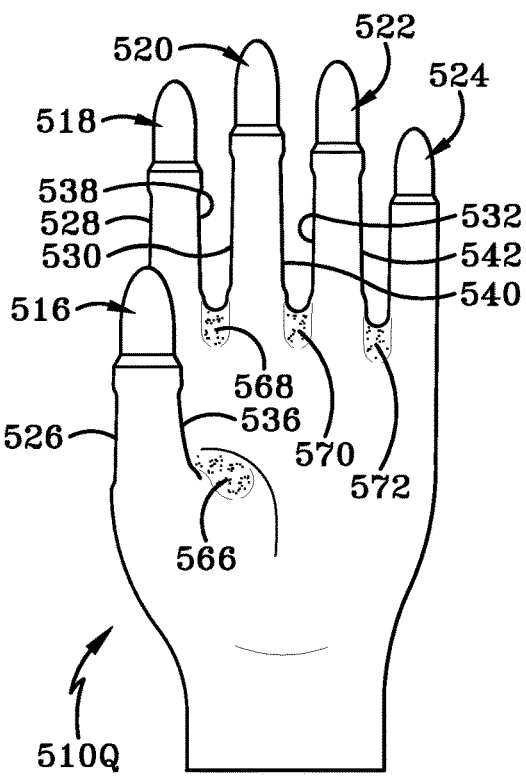

FIGS. 25A through 25Q show additional examples of the sixth embodiment glove. FIG. 25A shows a second example of the sixth embodiment of glove, generally indicated as glove 510A; FIG. 25B shows a third example of the sixth embodiment of glove, generally indicated as glove 510B; FIG. 25C shows a fourth example of the sixth embodiment of glove, generally indicated as glove 510C; and FIG. 25D shows a fifth example of the sixth embodiment of glove, generally indicated as glove 510D. Each of the gloves 510A, 510B, 510C, and 510D has a single textured crotch area. In particular, the textured second crotch area 568 is provided on gloves 510A, 510B, 510C, and 510D. It will, however, be understood that any other single textured crotch area may be provided on these gloves 510A, 510B, 510C, and 510D instead of second crotch area 568. FIGS. 25A through 25D show gripping zones being provided on a single digit region (FIG. 25A), two digit regions (FIG. 25B), three digit regions (FIG. 25C), and four digit regions (FIG. 25D) in an identical manner and for an identical purpose to the gripping zones shown and described herein with respect to the gloves shown in FIGS. 6A-6D.

FIG. 25E shows a sixth example of the sixth embodiment of glove, generally indicated as glove 510E; FIG. 25F shows a seventh example of the sixth embodiment of glove, generally indicated as glove 510F; FIG. 25G shows an eighth example of the sixth embodiment of glove, generally indicated as glove 510G; and FIG. 25H shows a ninth example of the sixth embodiment of glove, generally indicated as glove 510H. Each of the gloves 510E, 510F, 510G, and

510H has two textured crotch areas. In particular, the figures illustrate that the gloves include a textured first crotch area 566 and second crotch area 568. It will, however, be understood that any other combination of two textured crotch areas may be provided on gloves 510E, 510F, 510J, and 510H instead of first and second crotch areas 566, 568. FIGS. 25E through 25H show gripping zones being provided on a single digit region (FIG. 25E), two digit regions (FIG. 25F), three digit regions (FIG. 25G), and four digit regions (FIG. 25H) in an identical manner and for an identical purpose to the gripping zones shown and described herein with respect to the gloves shown in FIGS. 6E-6H.

FIG. 25I shows a tenth example of the sixth embodiment of glove, generally indicated as glove 510I; FIG. 25J shows an eleventh example of the sixth embodiment of glove, generally indicated as glove 510J; FIG. 25K shows a twelfth example of the sixth embodiment of glove, generally indicated as glove 510K; and FIG. 25L shows a thirteenth example of the sixth embodiment of glove, generally indicated as glove 510L. Each of the gloves 510I, 510J, 510K, and 510L has three textured crotch areas. In particular, the figures illustrate that the gloves include textured first crotch area 566, second crotch area 568, and third crotch area 570. It will, however, be understood that any other combination of three textured crotch areas may be provided on gloves 510I, 510J, 510K, and 510L. FIGS. 25I through 25L show gripping zones being provided on a single digit region (FIG. 25I), two digit regions (FIG. 25J), three digit regions (FIG. 25K), and four digit regions (FIG. 25L) in an identical manner and for an identical purpose to the gripping zones shown and described herein with respect to the gloves shown in FIGS. 6I-6L.

FIG. 25M shows a fourteenth example of the sixth embodiment of glove, generally indicated as glove 510M; FIG. 25N shows a fifteenth example of the sixth embodiment of glove, generally indicated as glove 510N; FIG. 25P shows a sixteenth example of the sixth embodiment of glove, generally indicated as glove 510P; and FIG. 25Q shows a seventeenth example of the sixth embodiment of glove, generally indicated as glove 510Q. Each of the gloves 510M, 510N, 510P, and 510Q has four textured crotch areas 566-572. FIGS. 25M through 25Q show gripping zones being provided on a single digit region (FIG. 25M), two digit regions (FIG. 25N), three digit regions (FIG. 25P), and four digit regions (FIG. 25Q) in an identical manner and for an identical purpose to the gripping zones shown and described herein with respect to gloves shown in FIGS. 6M-6Q.

Referring to FIGS. 26-27 show a first example of a seventh embodiment of a glove in accordance with the present disclosure, generally indicated at 610. Glove 610 is substantially identical in structure and function to glove 410 except that glove 610 does not include the reduced-circumference fingertip regions of glove 410 or the transition portions which flare outwardly from the fingertip regions to the remaining portion of each digit region. Instead, each digit region of glove 610 gradually tapers in circumference moving in a direction away from the palm region 614 to a tip of the associated digit region. In other words, glove 610 is substantially similar to glove 110 except for the placement of the first stays and second stays on the respective digit regions. In glove 110 the first stay and second stay of each digit region are formed respectively on the front and back of the digit region. In glove 610, a first stay is formed in the first side of each digit region and the second stay is formed in the second side thereof.

Glove 610 includes a wrist region 612, palm region 614, and digit regions which extend outwardly from the palm region 614. The digit regions include a thumb region 616, an index finger region 618, a middle finger region 620, a ring finger region 622, and a little finger region 624. In accordance with an aspect of the present disclosure each of the thumb region 616, index finger region 618, middle finger region 620, ring finger region 622, and little finger region 624 includes at least one gripping zone. The at least one gripping zone comprises at least a first stay. The at least one gripping zone may further include a second stay. In particular, thumb region 616 includes a first stay 626 on a first side of thumb region 616 and a second stay 636 on the opposing second side of thumb region 616. Index finger region 618 includes a first stay 628 on a first side of index finger region 618 and a second stay 638 on a second side thereof. Middle finger region 620 includes a first stay 630 on a first side of middle finger region 620 and a second stay 640 on a second side thereof. Ring finger region 622 includes a first stay 632 on a first side of ring finger region 622 and a second stay 642 on a second side thereof. Little finger region 624 includes a first stay 634 on a first side of little finger region 624 and a second stay 644 on a second side thereof. First stays 626, 628, 630, 632, and 634 are identical in structure and function to first stays 426, 428, 430, 432, and 434. Second stays 636, 638, 640, 642, and 644 are identical in structure and function to second stays 436, 438, 440, 442, and 444. Each stay on glove 610 through 610D is provided with texturing, particularly via micro-etching. In one embodiment, the micro-etching will produce a sand pattern of texturing but it will be understood that any other texturing pattern produces by any other means may be applied to each of the first stays and second stays on glove 610.

FIGS. 26 and 27 show that glove 610 also includes a textured first crotch area 666, a textured second crotch area 668, a textured third crotch area 670, and a textured fourth crotch area 672. Crotch areas 666 through 672 are substantially identical in all respects to crotch areas 466 through 472 and therefore will not be described in any additional detail herein.

FIGS. 28A through 28Q show additional examples of the seventh embodiment glove. FIG. 28A shows a second example of the seventh embodiment of glove, generally indicated as glove 610A; FIG. 28B shows a third example of the seventh embodiment of glove, generally indicated as glove 610B; FIG. 28C shows a fourth example of the seventh embodiment of glove, generally indicated as glove 610C; and FIG. 28D shows a fifth example of the seventh embodiment of glove, generally indicated as glove 610D. Each of the gloves 610A, 610B, 610C, and 610D has a single textured crotch area. In particular, the textured second crotch area 668 is provided on gloves 610A, 610B, 610C, and 610D. It will, however, be understood that any other single textured crotch area may be provided on these gloves 610A, 610B, 610C, and 610D instead of second crotch area 668. FIGS. 28A through 28D show gripping zones being provided on a single digit region (FIG. 28A), two digit regions (FIG. 28B), three digit regions (FIG. 28C), and four digit regions (FIG. 28D) in an identical manner and for an identical purpose to the gripping zones shown and described herein with respect to the gloves shown in FIGS. 6A-6D.

FIG. 28E shows a sixth example of the seventh embodiment of glove, generally indicated as glove 610E; FIG. 28F shows a seventh example of the seventh embodiment of glove, generally indicated as glove 610F; FIG. 28G shows an eighth example of the seventh embodiment of glove, generally indicated as glove 610G; and FIG. 28H shows a ninth example of the seventh embodiment of glove, generally indicated as glove 610H. Each of the gloves 610E, 610F, 610G, and 610H has two textured crotch areas. In particular, the figures illustrate that the gloves include a textured first crotch area 666 and second crotch area 668. It will, however, be understood that any other combination of two textured crotch areas may be provided on gloves 610E, 610F, 610J, and 610H instead of first and second crotch areas 666, 668. FIGS. 28E through 28H show gripping zones being provided on a single digit region (FIG. 28E), two digit regions (FIG. 28F), three digit regions (FIG. 28G), and four digit regions (FIG. 28H) in an identical manner and for an identical purpose to the gripping zones shown and described herein with respect to the gloves shown in FIGS. 6E-6H.

FIG. 28I shows a tenth example of the seventh embodiment of glove, generally indicated as glove 610I; FIG. 28J shows an eleventh example of the seventh embodiment of glove, generally indicated as glove 610J; FIG. 28K shows a twelfth example of the seventh embodiment of glove, generally indicated as glove 610K; and FIG. 28L shows a thirteenth example of the seventh embodiment of glove, generally indicated as glove 610L. Each of the gloves 610I, 610J, 610K, and 610L has three textured crotch areas. In particular, the figures illustrate that the gloves include textured first crotch area 666, second crotch area 668, and third crotch area 670. It will, however, be understood that any other combination of three textured crotch areas may be provided on gloves 610I, 610J, 610K, and 610L. FIGS. 28I through 28L show gripping zones being provided on a single digit region (FIG. 28I), two digit regions (FIG. 28J), three digit regions (FIG. 28K), and four digit regions (FIG. 28L) in an identical manner and for an identical purpose to the gripping zones shown and described herein with respect to the gloves shown in FIGS. 6I-6L.

FIG. 28M shows a fourteenth example of the seventh embodiment of glove, generally indicated as glove 610M; FIG. 28N shows a fifteenth example of the seventh embodiment of glove, generally indicated as glove 610N; FIG. 28P shows a sixteenth example of the seventh embodiment of glove, generally indicated as glove 610P; and FIG. 28Q shows a seventeenth example of the seventh embodiment of glove, generally indicated as glove 610Q. Each of the gloves 610M, 610N, 610P, and 610Q has four textured crotch areas 666-672. FIGS. 28M through 28Q show gripping zones being provided on a single digit region (FIG. 28M), two digit regions (FIG. 28N), three digit regions (FIG. 28P), and four digit regions (FIG. 28Q) in an identical manner and for an identical purpose to the gripping zones shown and described herein with respect to gloves shown in FIGS. 6M-6Q.

Referring to FIGS. 29-30 show a first example of an eighth embodiment of a glove in accordance with the present disclosure, generally indicated at 710. Glove 710 is substantially identical in structure and function to glove 610 except that glove 710 is a hand-specific glove instead of an ambidextrous glove. All other features of glove 710 are identical in structure and function to glove 610 and therefore will not be discussed in much detail hereafter.

Glove 710 includes a wrist region 712, palm region 714, and digit regions which extend outwardly from the palm region 714. The digit regions include a thumb region 716, an index finger region 718, a middle finger region 720, a ring finger region 722, and a little finger region 724. In accordance with an aspect of the present disclosure each of the thumb region 716, index finger region 718, middle finger region 720, ring finger region 722, and little finger region 724 includes at least one gripping zone. The at least one gripping zone comprises at least a first stay. The at least one gripping zone may further include a second stay. In particular, thumb region 716 includes a first stay 726 on a first side of thumb region 716 and a second stay 736 on the opposing second side of thumb region 716. Index finger region 718 includes a first stay 728 on a first side of index finger region 718 and a second stay 738 on a second side thereof. Middle finger region 720 includes a first stay 730 on a first side of middle finger region 720 and a second stay 740 on a second side thereof. Ring finger region 722 includes a first stay 732 on a first side of ring finger region 722 and a second stay 742 on a second side thereof. Little finger region 724 includes a first stay 734 on a first side of little finger region 724 and a second stay 744 on a second side thereof. First stays 726, 728, 730, 732, and 734 are identical in structure and function to first stays 626, 628, 630, 632, and 634. Second stays 736, 738, 740, 742, and 744 are identical in structure and function to second stays 636, 638, 640, 642, and 644.

Each stay on glove 710 through 710D is provided with texturing, particularly via micro-etching. In one embodiment, the micro-etching will produce a sand pattern of texturing but it will be understood that any other texturing pattern produces by any other means may be applied to each of the first stays and second stays on glove 710.

Glove 710 also includes a textured first crotch area 766, a textured second crotch area 768, a textured third crotch area 770, and a textured fourth crotch area 772. Crotch areas 766 through 772 are substantially identical in structure and function to crotch areas 666 through 672 and therefore won't be described in any further detail herein.

FIGS. 31A through 31Q show additional examples of the eighth embodiment glove. FIG. 31A shows a second example of the eighth embodiment of glove, generally indicated as glove 710A; FIG. 31B shows a third example of the eighth embodiment of glove, generally indicated as glove 710B; FIG. 31C shows a fourth example of the eighth embodiment of glove, generally indicated as glove 710C; and FIG. 31D shows a fifth example of the eighth embodiment of glove, generally indicated as glove 710D. Each of the gloves 710A, 710B, 710C, and 710D has a single textured crotch area. In particular, the textured second crotch area 768 is provided on gloves 710A, 710B, 710C, and 710D. It will, however, be understood that any other single textured crotch area may be provided on these gloves 710A, 710B, 710C, and 710D instead of second crotch area 768. FIGS. 31A through 31D show gripping zones being provided on a single digit region (FIG. 31A), two digit regions (FIG. 31B), three digit regions (FIG. 31C), and four digit regions (FIG. 31D) in an identical manner and for an identical purpose to the gripping zones shown and described herein with respect to the gloves shown in FIGS. 6A-6D.

FIG. 31E shows a sixth example of the eighth embodiment of glove, generally indicated as glove 710E; FIG. 31F shows a seventh example of the eighth embodiment of glove, generally indicated as glove 710F; FIG. 31G shows an eighth example of the eighth embodiment of glove, generally indicated as glove 710G; and FIG. 31H shows a ninth example of the eighth embodiment of glove, generally indicated as glove 710H. Each of the gloves 710E, 710F, 710G, and 710H has two textured crotch areas. In particular, the figures illustrate that the gloves include a textured first crotch area 766 and second crotch area 768. It will, however, be understood that any other combination of two textured crotch areas may be provided on gloves 710E, 710F, 710J, and 710H instead of first and second crotch areas 766, 768. FIGS. 31E through 31H show gripping zones being provided on a single digit region (FIG. 31E), two digit regions (FIG. 31F), three digit regions (FIG. 31G), and four digit regions (FIG. 31H) in an identical manner and for an identical purpose to the gripping zones shown and described herein with respect to the gloves shown in FIGS. 6E-6H.

FIG. 31I shows a tenth example of the eighth embodiment of glove, generally indicated as glove 710I; FIG. 31J shows an eleventh example of the eighth embodiment of glove, generally indicated as glove 710J; FIG. 31K shows a twelfth example of the eighth embodiment of glove, generally indicated as glove 710K; and FIG. 31L shows a thirteenth example of the eighth embodiment of glove, generally indicated as glove 710L. Each of the gloves 710I, 710J, 710K, and 710L has three textured crotch areas. In particular, the figures illustrate that the gloves include textured first crotch area 766, second crotch area 768, and third crotch area 770. It will, however, be understood that any other combination of three textured crotch areas may be provided on gloves 710I, 710J, 710K, and 710L. FIGS. 31I through 31L show gripping zones being provided on a single digit region (FIG. 31I), two digit regions (FIG. 31J), three digit regions (FIG. 31K), and four digit regions (FIG. 31L) in an identical manner and for an identical purpose to the gripping zones shown and described herein with respect to the gloves shown in FIGS. 6I-6L.

FIG. 31M shows a fourteenth example of the eighth embodiment of glove, generally indicated as glove 710M; FIG. 31N shows a fifteenth example of the eighth embodiment of glove, generally indicated as glove 710N; FIG. 31P shows a sixteenth example of the eighth embodiment of glove, generally indicated as glove 710P; and FIG. 31Q shows a seventeenth example of the eighth embodiment of glove, generally indicated as glove 710Q. Each of the gloves 710M, 710N, 710P, and 710Q has four textured crotch areas 766-772. FIGS. 31M through 31Q show gripping zones being provided on a single digit region (FIG. 31M), two digit regions (FIG. 31N), three digit regions (FIG. 31P), and four digit regions (FIG. 31Q) in an identical manner and for an identical purpose to the gripping zones shown and described herein with respect to gloves shown in FIGS. 6M-6Q.

Referring to FIGS. 32 and 33 show a first example of a ninth embodiment of a glove in accordance with the present disclosure, generally indicated at 810. Glove 810 is substantially identical in structure and function to glove 210 (FIGS. 11-12B) except that glove 810 has a single opposed pair of stays on thumb region 816 and two opposed pairs of stays on all other digit regions. Furthermore, at least the two opposed pair of stays on all the other digit regions are of a different size relative to the stays on glove 210 and the stays on glove 810 are placed at a different location relative to the stays on glove 210. This will be described in greater detail hereafter. All other features of glove 810 are identical in structure and function to glove 210 and therefore will not be discussed in much detail hereafter.

Glove 810 includes a wrist region 812, a palm region 814, and digit regions which extend outwardly from the palm region 814. The digit regions include a thumb region 816, an index finger region 818, a middle finger region 820, a ring finger region 822, and a little finger region 824. In accordance with an aspect of the present disclosure each of the thumb region 816, index finger region 818, middle finger region 820, ring finger region 822, and little finger region 824 includes at least one gripping zone. The at least one gripping zone comprises at least a first stay. The at least one gripping zone may further comprise a second stay. In particular, thumb region 816 includes a first stay 826 on the front of thumb region 816 and a second stay 836 on the back of thumb region 816. First stay 826 and second stay 828 are substantially identical to first stay 226 and second stay 228 on glove 210. Index finger region 818 includes a first stay

828 on the front of index finger region 818 and a second stay 838 on the back thereof. Middle finger region 820 includes a first stay 830 on the front of middle finger region 820 and a second stay 840 on the back thereof. Ring finger region 822 includes a first stay 832 on the front of ring finger region 822 and a second stay 842 on the back thereof. Little finger region 824 includes a first stay 834 on the front of little finger region 824 and a second stay 844 on the back thereof.

First stays 828, 830, 832, 834 are substantially similar in structure and function to first stays 228, 230, 232, and 234 except, as will be discussed hereafter, for the size and location of the first stays on glove 810 relative to the first stays on glove 210. Second stays 838, 840, 842, 844 are substantially similar in structure and function to second stays 238, 240, 242, and 244 except for the size and location of the second stays as will be discussed hereafter. In accordance with an aspect of the present disclosure, the location of first stays 828, 830, 832, 834 and second stays 838, 840, 842, 844 is different from the location of the first and second stays on glove 210. First stays 828, 830, 832, 834 and second stays 838, 840, 842, 844 are located a between palm region 814 and where a person's second knuckle will be positioned when glove 810 is worn. This is in contrast to glove 210 where the stays 238, 240, 242, 244, 238, 240, 242, and 242 extend from a short distance away from palm region 214, over where the second knuckle of the person's finger will be positioned when the glove is worn, and terminate a short distance from where the first knuckle of the person's finger will be positioned when glove 210 is worn. In order for first stays 828, 830, 832, 834 and second stays 838, 840, 842, 844 to be located as described, these gripping zones are shorter than the first and second stays on glove 210.

A further difference between glove 810 and glove 210 is that glove 810 further includes a second pair of gripping zones on at least the index finger region 818, middle finger region 820, ring finger region 822, and little finger region 824. As illustrated in FIGS. 32 and 33, each of the index finger region 818, middle finger region 820, ring finger region 822, and little finger region further includes a second pair of opposed gripping zones comprising a third stay provided on the front of the associated digit region and a fourth stay on the back of the associated digit region. The second pair of opposed gripping zones are spaced a distance longitudinally outwardly away from the first pair of opposed gripping zones. The second pair of opposed gripping zones will be located on the digit region between the first pair of opposed gripping zones and the tip of the digit region. In some embodiments, the second pair of opposed gripping zones will be located on the digit region between where the first knuckle and the second knuckle of the person's hand will be positioned when the glove is worn. The third and fourth stays of the second gripping zones are identical in structure and function to the first pair of gripping zones provided on index finger region 828, middle finger region 830, ring finger region 832, and little finger region 834. Third stay and fourth stay are opposed and are laterally aligned with one another. Each of the third stay and the fourth stay is substantially parallel to the longitudinal axis of the associated digit region and is textured in an identical manner to the first stay and second stay provided on the same digit region.

It will be understood that in some instances two longitudinally spaced apart pairs of gripping zones may be provided on thumb region 816 of glove 810. It is noted, however, that providing two longitudinally spaced apart pairs of gripping zones on thumb region 816 provides substantially the same benefits as providing a single pair of longer length gripping zones on thumb region 816 because a person's thumb only has a single knuckle. In other embodiments, the thumb region 816 may be free of any gripping zones.

FIG. 32 shows a third stay 848 located a distance longitudinally outwardly from the first stay 828 on index finger region 818; a third stay 850 located a distance longitudinally outwardly from first stay 830 on middle finger region 820; a third stay 852 located a distance longitudinally outwardly from first stay 832 on ring finger region 822; and a third stay 854 located a distance longitudinally outwardly from first stay 834 on little finger region 824. FIG. 33 shows a fourth stay 858 located a distance longitudinally outwardly from the second stay 838 on index finger region 818; a fourth stay 860 located a distance longitudinally outwardly from second stay 840 on middle finger region 820; a fourth stay 822 located a distance longitudinally outwardly from second stay 842 on ring finger region 822; and a fourth stay 864 located a distance longitudinally outwardly from second stay 844 on little finger region 824. Each pair of gripping zones helps to ensure there is less slippage of the glove material relative to the person's finger between the knuckles on those fingers and between the lower knuckle and the palm of the person's hand.

Glove 810 further comprises a textured first crotch area 866, a textured second crotch area 868, a textured third crotch area 870, and a textured fourth crotch area 872. Crotch areas 866 through 872 are substantially identical to crotch areas 266 through 272 and therefore will not be described in any further detail herein.

FIGS. 34A through 34Q show additional examples of the ninth embodiment glove. FIG. 34A shows a second example of the ninth embodiment of glove, generally indicated as glove 810A; FIG. 34B shows a third example of the ninth embodiment of glove, generally indicated as glove 810B; FIG. 34C shows a fourth example of the ninth embodiment of glove, generally indicated as glove 810C; and FIG. 34D shows a fifth example of the ninth embodiment of glove, generally indicated as glove 810D. Each of the gloves 810A, 810B, 810C, and 810D has a single textured crotch area. In particular, the textured second crotch area 868 is provided on gloves 810A, 810B, 810C, and 810D. It will, however, be understood that any other single textured crotch area may be provided on these gloves 810A, 810B, 810C, and 810D instead of second crotch area 868. FIGS. 34A through 34D show gripping zones being provided on a single digit region (FIG. 34A), two digit regions (FIG. 34B), three digit regions (FIG. 34C), and four digit regions (FIG. 34D). In particular, FIG. 34A shows a pair of gripping zones provided on index finger region 818; FIG. 34B shows pairs of gripping zones provided on index finger region 818 and middle finger region 820; FIG. 34C shows pairs of gripping zones provided on index finger region 818, middle finger region 820, and ring finger region 822; and FIG. 34D shows pairs of gripping zones provided on index finger region 818, middle finger region 820, ring finger region 822, and little finger region 824. Gripping zones provided on glove 810 are of the same structure and function as disclosed with respect to the other embodiments of glove discussed herein but differ only in size and placement. It will be understood that in some embodiments of the glove 810, such as gloves 810A, 810B, 810C, and 810D there may be no gripping zones on the thumb region 816. It will be understood that in other embodiments there may be two pairs of gripping zones on the thumb region 816 instead of only one gripping zone on the opposed surfaces thereof In yet other embodiments, it will be understood that digit regions other than the thumb region 816 may include only a single set of gripping zones while the other digit regions include two sets of gripping zones thereon. Any permutation or combination of single sets of gripping zones plus double sets of gripping zones may be provided on the ninth embodiment glove based on the type of function that is to be performed while wearing the gloves. As with glove 210, on glove 810 each stay is provided with texturing, particularly via micro-etching. In one embodiment, the micro-etching will produce a sand pattern of texturing. It will be understood that any other texture pattern may be applied to glove 810 in any other manner.

FIG. 34E shows a sixth example of the ninth embodiment of glove, generally indicated as glove 810E; FIG. 34F shows a seventh example of the ninth embodiment of glove, generally indicated as glove 810F; FIG. 34G shows an eighth example of the ninth embodiment of glove, generally indicated as glove 810G; and FIG. 34H shows a ninth example of the ninth embodiment of glove, generally indicated as glove 810H. Each of the gloves 810E, 810F, 810G, and 810H has two textured crotch areas. In particular, the figures illustrate that the gloves include a textured first crotch area 866 and second crotch area 868. It will, however, be understood that any other combination of two textured crotch areas may be provided on gloves 810E, 810F, 810J, and 810H instead of first and second crotch areas 866, 868. FIGS. 34E through 34H show gripping zones being provided on a single digit region (FIG. 34E), two digit regions (FIG. 34F), three digit regions (FIG. 34G), and four digit regions (FIG. 34H) in an identical manner and for an identical purpose to the gripping zones shown and described herein with respect to the gloves 810A through 810D.

FIG. 34I shows a tenth example of the ninth embodiment of glove, generally indicated as glove 810I; FIG. 34J shows an eleventh example of the ninth embodiment of glove, generally indicated as glove 810J; FIG. 34K shows a twelfth example of the ninth embodiment of glove, generally indicated as glove 810K; and FIG. 34L shows a thirteenth example of the ninth embodiment of glove, generally indicated as glove 810L. Each of the gloves 810I, 810J, 810K, and 810L has three textured crotch areas. In particular, the figures illustrate that the gloves include textured first crotch area 866, second crotch area 868, and third crotch area 870. It will, however, be understood that any other combination of three textured crotch areas may be provided on gloves 810I, 810J, 810K, and 810L. FIGS. 34I through 34L show gripping zones being provided on a single digit region (FIG. 34I), two digit regions (FIG. 34J), three digit regions (FIG. 34K), and four digit regions (FIG. 34L) in an identical manner and for an identical purpose to the gripping zones shown and described herein with respect to the gloves 810A through 810D.

FIG. 34M shows a fourteenth example of the ninth embodiment of glove, generally indicated as glove 810M; FIG. 34N shows a fifteenth example of the ninth embodiment of glove, generally indicated as glove 810N; FIG. 34P shows a sixteenth example of the ninth embodiment of glove, generally indicated as glove 810P; and FIG. 34Q shows a seventeenth example of the ninth embodiment of glove, generally indicated as glove 810Q. Each of the gloves 810M, 810N, 810P, and 810Q has four textured crotch areas 866-872. FIGS. 34M through 34Q show gripping zones being provided on a single digit region (FIG. 34M), two digit regions (FIG. 34N), three digit regions (FIG. 34P), and four digit regions (FIG. 34Q) in an identical manner and for an identical purpose to the gripping zones shown and described herein with respect to gloves 810A through 810D.

Referring to FIGS. 35 and 36 show a first example of a tenth embodiment of a glove in accordance with the present disclosure, generally indicated at 910. Glove 910 is substantially identical in structure and function to glove 810 (FIGS. 32 and 33) except that glove 910 is a hand-specific glove instead of an ambidextrous glove. All other features of glove 910 are identical in structure and function to glove 810 and therefore will not be discussed in much detail hereafter.

Glove 910 includes a wrist region 912, a palm region 914, and digit regions which extend outwardly from the palm region 914. The digit regions include a thumb region 916, an index finger region 918, a middle finger region 920, a ring finger region 922, and a little finger region 924. In accordance with an aspect of the present disclosure each of the thumb region 916, index finger region 918, middle finger region 920, ring finger region 922, and little finger region 924 includes at least one gripping zone. In particular, at least one of the digit regions includes at least two longitudinally spaced apart gripping zones. FIGS. 35 and 36 show thumb region 916 includes a first stay 926 on the front of thumb region 916 and a second stay 936 on the back of thumb region 916. Index finger region 918 includes a first stay 928 on the front of index finger region 918 and a second stay 938 on the back thereof. Middle finger region 920 includes a first stay 930 on the front of middle finger region 920 and a second stay 940 on the back thereof. Ring finger region 922 includes a first stay 932 on the front of ring finger region 922 and a second stay 942 on the back thereof. Little finger region 924 includes a first stay 934 on the front of little finger region 924 and a second stay 944 on the back thereof. First stays 926, 928, 930, 932, and 934 are identical in structure and function to first stays 826, 828, 830, 832, and 834. Second stays 936, 938, 940, 942, and 944 are identical in structure and function to second stays 836, 838, 840, 842, and 844.

In accordance with an aspect of the present disclosure, each of the index finger region 918, middle finger region 920, ring finger region 922, and little finger region 924 of glove 910 includes a second pair of opposed gripping zones. Each gripping zone comprises a third stay provided on the front of the associated digit region and a fourth stay provided on the back of the associated digit region. FIG. 35 shows a third stay 948 located a distance longitudinally outwardly from the first stay 928 on index finger region 918 moving in a direction away from palm region 910 and towards the tip of the associate digit region. FIG. 35 shows a third stay 950 located a distance longitudinally outwardly from first stay 930 on middle finger region 920; a third stay 952 located a distance longitudinally outwardly from first stay 932 on ring finger region 922; and a third stay 954 located a distance longitudinally outwardly from first stay 934 on little finger region 924. Third stays 948, 950, 952 and 954 are identical in structure and function to third stays 848, 850, 852, and 854. FIG. 36 shows a fourth stay 958 located a distance longitudinally outwardly from the second stay 938 on index finger region 918; a fourth stay 960 located a distance longitudinally outwardly from second stay 940 on middle finger region 920; a fourth stay 922 located a distance longitudinally outwardly from second stay 942 on ring finger region 922; and a fourth stay 964 located a distance longitudinally outwardly from second stay 944 on little finger region 924. Fourth stays 958, 960, 962 and 964 are identical in structure and function to fourth stays 858, 860, 862, and 864.

It should be noted that each of the first, second, third, and fourth stays provided on the digit regions of glove 910 is a longitudinally-extending concave indentation which forms a projection into the portion of the interior cavity 910a (FIG. 35) defined by the respective digit region. The projection will come into abutting physical contact with the person's finger or thumb received within any particular digit region and will thereby tend to frictionally keep the digit region of glove 910 in place on a person's thumb or finger during use, particularly over a sustained period of time.

Glove 910 includes a textured first crotch area 966, a textured second crotch area 968, a textured third crotch area 970, and a textured fourth crotch area 972. Crotch areas 966 through 972 are substantially identical to crotch areas 866 through 872 and therefore will not be described in any additional detail herein.

FIGS. 37A through 37Q show additional examples of the tenth embodiment glove. FIG. 37A shows a second example of the tenth embodiment of glove, generally indicated as glove 910A; FIG. 37B shows a third example of the tenth embodiment of glove, generally indicated as glove 910B; FIG. 37C shows a fourth example of the tenth embodiment of glove, generally indicated as glove 910C; and FIG. 37D shows a fifth example of the tenth embodiment of glove, generally indicated as glove 910D. Each of the gloves 910A, 910B, 910C, and 910D has a single textured crotch area. In particular, the textured second crotch area 968 is provided on gloves 910A, 910B, 910C, and 910D. It will, however, be understood that any other single textured crotch area may be provided on these gloves 910A, 910B, 910C, and 910D instead of second crotch area 968. FIGS. 37A through 37D show gripping zones being provided on a single digit region (FIG. 37A), two digit regions (FIG. 37B), three digit regions (FIG. 37C), and four digit regions (FIG. 37D) in an identical manner and for an identical purpose to the gripping zones shown and described herein with respect to the gloves 810A through 810D.

FIG. 37E shows a sixth example of the tenth embodiment of glove, generally indicated as glove 910E; FIG. 37F shows a seventh example of the tenth embodiment of glove, generally indicated as glove 910F; FIG. 37G shows an eighth example of the tenth embodiment of glove, generally indicated as glove 910G; and FIG. 37H shows a ninth example of the tenth embodiment of glove, generally indicated as glove 910H. Each of the gloves 910E, 910F, 910G, and 910H has two textured crotch areas. In particular, the figures illustrate that the gloves include a textured first crotch area 966 and second crotch area 968. It will, however, be understood that any other combination of two textured crotch areas may be provided on gloves 910E, 910F, 910J, and 910H instead of first and second crotch areas 966, 968. FIGS. 37E through 37H show gripping zones being provided on a single digit region (FIG. 37E), two digit regions (FIG. 37F), three digit regions (FIG. 37G), and four digit regions (FIG. 37H) in an identical manner and for an identical purpose to the gripping zones shown and described herein with respect to the gloves 810A through 810D.

FIG. 37I shows a tenth example of the tenth embodiment of glove, generally indicated as glove 910I; FIG. 37J shows an eleventh example of the tenth embodiment of glove, generally indicated as glove 910J; FIG. 37K shows a twelfth example of the tenth embodiment of glove, generally indicated as glove 910K; and FIG. 37L shows a thirteenth example of the tenth embodiment of glove, generally indicated as glove 910L. Each of the gloves 910I, 910J, 910K, and 910L has three textured crotch areas. In particular, the figures illustrate that the gloves include textured first crotch area 966, second crotch area 968, and third crotch area 970. It will, however, be understood that any other combination of three textured crotch areas may be provided on gloves

910I, 910J, 910K, and 910L. FIGS. 37I through 37L show gripping zones being provided on a single digit region (FIG. 37I), two digit regions (FIG. 37J), three digit regions (FIG. 37K), and four digit regions (FIG. 37L) in an identical manner and for an identical purpose to the gripping zones shown and described herein with respect to the gloves 810A through 810D.

FIG. 37M shows a fourteenth example of the tenth embodiment of glove, generally indicated as glove 910M; FIG. 37N shows a fifteenth example of the tenth embodiment of glove, generally indicated as glove 910N; FIG. 37P shows a sixteenth example of the tenth embodiment of glove, generally indicated as glove 910P; and FIG. 37Q shows a seventeenth example of the tenth embodiment of glove, generally indicated as glove 910Q. Each of the gloves 910M, 910N, 910P, and 910Q has four textured crotch areas 966-972. FIGS. 37M through 37Q show gripping zones being provided on a single digit region (FIG. 37M), two digit regions (FIG. 37N), three digit regions (FIG. 37P), and four digit regions (FIG. 37Q) in an identical manner and for an identical purpose to the gripping zones shown and described herein with respect to gloves 810A through 810D.

As discussed earlier herein, it will be understood that in some embodiments of the gloves shown in FIGS. 35 through 37Q there may be two longitudinally-spaced apart pairs of gripping zones on at least one, two, or three of the index finger region 918, middle finger region 920, ring finger region 922, and little finger region 922 and the thumb region 916 may include a single gripping zone thereon. In other embodiments there may be two longitudinally-spaced apart pairs of gripping zones on the thumb region 916 and one of the other digit regions may only include one pair of gripping zones thereon. Any permutation or combination of single pairs of gripping zones plus double pairs of gripping zones may be provided on the ninth embodiment glove based on the type of function that is to be performed while wearing the gloves.

Referring to FIGS. 38 and 39 show a first example of an eleventh embodiment of a glove in accordance with the present disclosure, generally indicated at 1010. Glove 1010 is substantially identical in structure and function to glove 810 (FIGS. 32-33) except that in glove 1010 the longitudinally-spaced apart pairs of gripping zones are provided on the first side and the second side of the various digit regions instead of on the front and back of those digit regions. Each gripping zone is oriented substantially parallel to the longitudinal axis of the associated digit region. Each gripping zone on glove 1010 is furthermore substantially identical in structure and function to the first stay and second stay illustrated on the various digit regions of glove 610 illustrated in FIGS. 26-27 except for the length and placement thereof. All other features of glove 1010 are identical in structure and function to glove 810 and therefore will not be discussed in much detail hereafter.

Glove 1010 includes a wrist region 1012, a palm region 1014, and digit regions which extend outwardly from the palm region 1014. The digit regions include a thumb region 1016, an index finger region 1018, a middle finger region 1020, a ring finger region 1022, and a little finger region 1024. In accordance with an aspect of the present disclosure each of the thumb region 1016, index finger region 1018, middle finger region 1020, ring finger region 1022, and little finger region 1024 includes at least one gripping zone. The at least one gripping zone comprises at least a first stay formed in the first side of the respective digit region and an opposed second stay formed in the second side of the respective digit region. In particular, thumb region 1016 includes a first stay 1026 on the first side of thumb region 1016 and a second stay 1036 on the second side of thumb region 1016. Index finger region 1018 includes a first stay 1028 on the first side of index finger region 1018 and a second stay 1038 on the second side thereof. Middle finger region 1020 includes a first stay 1030 on the first side of middle finger region 1020 and a second stay 1040 on the second side thereof. Ring finger region 1022 includes a first stay 1032 on the first side of ring finger region 1022 and a second stay 1042 on the second side thereof. Little finger region 1024 includes a first stay 1034 on the first side of little finger region 1024 and a second stay 1044 on the second side thereof.

First stays 1026, 1028, 1030, 1032, and 1034 are identical in structure and function to first stays 826, 828, 830, 832, and 834 except for their placement on the first side of the related digit region instead of on the front thereof. Second stays 1036, 1038, 1040, 1042, and 1044 are identical in structure and function to second stays 836, 838, 840, 842, and 844, except with respect to their placement on the second side of the related digit region instead of on the back thereof.

In accordance with an aspect of the present disclosure, each of the index finger region 1018, middle finger region 1020, ring finger region 1022, and little finger region 1024 includes a second pair of opposed gripping zones which is longitudinally spaced apart from the first pair of gripping zones. As discussed previously herein, the first pair of opposed gripping zones is located between the palm region of the glove and the part of the digit region which is positioned between where a second knuckle of a person's hand will be located when the glove 1010 is worn. In accordance with the present disclosure, the second pair of opposed gripping zones will be located on the digit region between the first pair of opposed gripping zones and the tip of the digit region. In some embodiments, the second pair of opposed gripping zones will be located on the digit region between where the first knuckle and the second knuckle of the person's hand will be positioned when the glove is worn. The second pair of gripping zones is identical in structure and function to the first pair of gripping zones. Each of these additional gripping zones may include a third stay provided on the first side of the associated digit region and a fourth stay on the second side of the associated digit region. Each of the third stay and the fourth stay is substantially parallel to the longitudinal axis of the associated digit region.

FIG. 38 shows a third stay 1048 located a distance longitudinally outwardly from the first stay 1028 on first side of index finger region 1018; a third stay 1050 located a distance longitudinally outwardly from first stay 1030 on the first side of middle finger region 1020; a third stay 1052 located a distance longitudinally outwardly from first stay 1032 on the first side of ring finger region 1022; and a third stay 1054 located a distance longitudinally outwardly from first stay 1034 on the first side of little finger region 1024. FIG. 39 shows a fourth stay 1058 located a distance longitudinally outwardly from the second stay 1038 on the second side of index finger region 1018; a fourth stay 1060 located a distance longitudinally outwardly from second stay 1040 on the second side of middle finger region 1020; a fourth stay 1022 located a distance longitudinally outwardly from second stay 1042 on the second side of ring finger region 1022; and a fourth stay 1064 located a distance longitudinally outwardly from second stay 1044 on the second side of little finger region 1024.

Glove 1010 includes a textured first crotch area 1066, a textured second crotch area 1068, a textured third crotch area 1070, and a textured fourth crotch area 1072. Crotch areas 1010-1072 are substantially identical in structure and function to the various crotch areas previously disclosed herein, such as crotch areas 866 through 872, and therefore will not be described in any further detail herein.

FIGS. 40A through 40Q show additional examples of the eleventh embodiment glove. FIG. 40A shows a second example of the eleventh embodiment of glove, generally indicated as glove 1010A; FIG. 40B shows a third example of the eleventh embodiment of glove, generally indicated as glove 1010B; FIG. 40C shows a fourth example of the eleventh embodiment of glove, generally indicated as glove 1010C; and FIG. 40D shows a fifth example of the eleventh embodiment of glove, generally indicated as glove 1010D. Each of the gloves 1010A, 1010B, 1010C, and 1010D has a single textured crotch area. In particular, the textured second crotch area 1068 is provided on gloves 1010A, 1010B, 1010C, and 1010D. It will, however, be understood that any other single textured crotch area may be provided on these gloves 1010A, 1010B, 1010C, and 1010D instead of second crotch area 1068. FIGS. 40A through 40D show gripping zones being provided on a single digit region (FIG. 40A), two digit regions (FIG. 40B), three digit regions (FIG. 40C), and four digit regions (FIG. 40D). In particular, FIG. 40A shows a pair of gripping zones provided on index finger region 1018; FIG. 40B shows pairs of gripping zones provided on index finger region 1018 and middle finger region 1020; FIG. 40C shows pairs of gripping zones provided on index finger region 1018, middle finger region 1020, and ring finger region 1022; and FIG. 40D shows pairs of gripping zones provided on index finger region 1018, middle finger region 1020, ring finger region 1022, and little finger region 1024. Gripping zones provided on gloves 1010A-1010D are of the same structure and function as disclosed with respect to the glove 1010. It will be understood that in some embodiments of the eleventh embodiment of the glove in accordance with the present disclosure, such as gloves 1010A, 1010B, 1010C, and 1010D there may be no gripping zones provided on the thumb region 1016. It will be understood that in other embodiments, however, there may be two pairs of gripping zones on the first and second sides of thumb region 1016. In yet other embodiments, it will be understood that digit regions other than the thumb region 1016 may include only a single set of gripping zones while the other digit regions may include two longitudinally-spaced apart sets of gripping zones thereon. Any permutation or combination of single sets of gripping zones plus double sets of gripping zones may be provided on the eleventh embodiment glove based on the type of function that is to be performed while wearing the gloves. Each stay is provided with texturing, particularly via micro-etching. In one embodiment, the micro-etching will produce a sand pattern of texturing. It will be understood that any other texture pattern may be applied to the eleventh embodiment gloves in any other manner.

FIG. 40E shows a sixth example of the eleventh embodiment of glove, generally indicated as glove 1010E; FIG. 40F shows a seventh example of the eleventh embodiment of glove, generally indicated as glove 1010F; FIG. 40G shows an eighth example of the eleventh embodiment of glove, generally indicated as glove 1010G; and FIG. 40H shows a ninth example of the eleventh embodiment of glove, generally indicated as glove 1010H. Each of the gloves 1010E, 1010F, 1010G, and 1010H has two textured crotch areas. In particular, the figures illustrate that the gloves include a textured first crotch area 1066 and second crotch area 1068. It will, however, be understood that any other combination of two textured crotch areas may be provided on gloves 1010E, 1010F, 1010J, and 1010H instead of first and second crotch areas 1066, 1068. FIGS. 40E through 40H show gripping zones being provided on a single digit region (FIG. 40E), two digit regions (FIG. 40F), three digit regions (FIG. 40G), and four digit regions (FIG. 40H) in an identical manner and for an identical purpose to the gripping zones shown and described herein with respect to the gloves 1010A through 1010D.

FIG. 40I shows a tenth example of the eleventh embodiment of glove, generally indicated as glove 1010I; FIG. 40J shows an eleventh example of the eleventh embodiment of glove, generally indicated as glove 1010J; FIG. 40K shows a twelfth example of the eleventh embodiment of glove, generally indicated as glove 1010K; and FIG. 40L shows a thirteenth example of the eleventh embodiment of glove, generally indicated as glove 1010L. Each of the gloves 1010I, 1010J, 1010K, and 1010L has three textured crotch areas. In particular, the figures illustrate that the gloves include textured first crotch area 1066, second crotch area 1068, and third crotch area 1070. It will, however, be understood that any other combination of three textured crotch areas may be provided on gloves 1010I, 1010J, 1010K, and 1010L. FIGS. 40I through 40L show gripping zones being provided on a single digit region (FIG. 40I), two digit regions (FIG. 40J), three digit regions (FIG. 40K), and four digit regions (FIG. 40L) in an identical manner and for an identical purpose to the gripping zones shown and described herein with respect to the gloves 1010A through 1010D.

FIG. 40M shows a fourteenth example of the eleventh embodiment of glove, generally indicated as glove 1010M; FIG. 40N shows a fifteenth example of the eleventh embodiment of glove, generally indicated as glove 1010N; FIG. 40P shows a sixteenth example of the eleventh embodiment of glove, generally indicated as glove 1010P; and FIG. 40Q shows a seventeenth example of the eleventh embodiment of glove, generally indicated as glove 1010Q. Each of the gloves 1010M, 1010N, 1010P, and 1010Q has four textured crotch areas 1066-1072. FIGS. 40M through 40Q show gripping zones being provided on a single digit region (FIG. 40M), two digit regions (FIG. 40N), three digit regions (FIG. 40P), and four digit regions (FIG. 40Q) in an identical manner and for an identical purpose to the gripping zones shown and described herein with respect to gloves 1010A through 1010D.

Referring to FIGS. 41-42 show a first example of a twelfth embodiment of a glove in accordance with the present disclosure, generally indicated at 1110. Glove 1110 is substantially identical in structure and function to glove 1010 (FIGS. 35-36) except that glove 1110 is a hand-specific glove instead of an ambidextrous glove. All other features of glove 1110 are identical in structure and function to glove 1010 and therefore will not be discussed in much detail hereafter.

Glove 1110 includes a wrist region 1112, a palm region 1114, and digit regions which extend outwardly from the palm region 1114. The digit regions include a thumb region 1116, an index finger region 1118, a middle finger region 1120, a ring finger region 1122, and a little finger region 1124. In accordance with an aspect of the present disclosure each of the thumb region 1116, index finger region 1118, middle finger region 1120, ring finger region 1122, and little finger region 1124 includes at least one pair of gripping zones. The at least pair of gripping zones comprises at least a first stay and an opposed second stay which are provided in the first side and second side of the various digit regions.

In particular, thumb region 1116 includes a first stay 1126 on the first side of thumb region 1116 and a second stay 1136 on the second side of thumb region 1116. Index finger region 1118 includes a first stay 1128 on the first side of index finger region 1118 and a second stay 1138 on the second side thereof. Middle finger region 1120 includes a first stay 1130 on the first side of middle finger region 1120 and a second stay 1140 on the second side thereof. Ring finger region 1122 includes a first stay 1132 on the first side of ring finger region 1122 and a second stay 1142 on the second side thereof. Little finger region 1124 includes a first stay 1134 on the first side of little finger region 1124 and a second stay 1144 on the second side thereof. First stays 1126, 1128, 1130, 1132, and 1134 are identical in structure and function to first stays 1026, 1028, 1030, 1032, and 1034. Second stays 1136, 1138, 1140, 1142, and 1144 are identical in structure and function to second stays 1036, 1038, 1040, 1042, and 1044.

In accordance with an aspect of the present disclosure, each of the index finger region 1118, middle finger region 1120, ring finger region 1122, and little finger region includes a second pair of opposed gripping zones. Each gripping zone comprises a third stay on the first side of the associated digit region and a fourth stay on the second side of the associated digit region. FIG. 41 shows a third stay 1148 located a distance longitudinally outwardly from the first stay 1128 on the first side of index finger region 1118; a third stay 1150 located a distance longitudinally outwardly from first stay 1130 on the first side of middle finger region 1120; a third stay 1152 located a distance longitudinally outwardly from first stay 1132 on the first side of ring finger region 1122; and a third stay 1154 located a distance longitudinally outwardly from first stay 1134 on the first side of little finger region 1124. Third stays 1148, 1150, 1152, and 1154 are identical in structure and function to third stays 1048, 1050, 1052, and 1054.

FIG. 41 shows a fourth stay 1158 located a distance longitudinally outwardly from the second stay 1138 on the second side of index finger region 1118; a fourth stay 1160 located a distance longitudinally outwardly from second stay 1140 on the second side of middle finger region 1120; a fourth stay 1122 located a distance longitudinally outwardly from second stay 1142 on the second side of ring finger region 1122; and a fourth stay 1164 located a distance longitudinally outwardly from second stay 1144 on the second side of little finger region 1124. Fourth stays 1158, 1160, 1162, and 1164 are identical in structure and function to fourth stays 1058, 1060, 1062, and 1064.

Glove 1110, like glove 1010 includes a textured first crotch area 1166, a textured second crotch area 1168, a textured third crotch area 1170, and a textured fourth crotch area 1172. Crotch areas 1166 through 1172 are substantially identical in structure and function to crotch areas 966 through 972 and therefore will not be described in any additional detail herein.

FIGS. 43A through 43Q show additional examples of the twelfth embodiment glove. FIG. 43A shows a second example of the twelfth embodiment of glove, generally indicated as glove 1110A; FIG. 43B shows a third example of the twelfth embodiment of glove, generally indicated as glove 1110B; FIG. 43C shows a fourth example of the twelfth embodiment of glove, generally indicated as glove 1110C; and FIG. 43D shows a fifth example of the twelfth embodiment of glove, generally indicated as glove 1110D. Each of the gloves 1110A, 1110B, 1110C, and 1110D has a single textured crotch area. In particular, the textured second crotch area 1168 is provided on gloves 1110A, 1110B,

1110C, and 1110D. It will, however, be understood that any other single textured crotch area may be provided on these gloves 1110A, 1110B, 1110C, and 1110D instead of second crotch area 1168. FIGS. 43A through 43D show gripping zones being provided on a single digit region (FIG. 43A), two digit regions (FIG. 43B), three digit regions (FIG. 43C), and four digit regions (FIG. 43D). In particular, FIG. 43A shows a pair of gripping zones provided on index finger region 1118; FIG. 43B shows pairs of gripping zones provided on index finger region 1118 and middle finger region 1120; FIG. 43C shows pairs of gripping zones provided on index finger region 1118, middle finger region 1120, and ring finger region 1122; and FIG. 43D shows pairs of gripping zones provided on index finger region 1118, middle finger region 1120, ring finger region 1122, and little finger region 1124. Gripping zones provided on gloves 1110A-1110D are of the same structure and function as disclosed with respect to the glove 1110. It will be understood that in some embodiments of the twelfth embodiment of the glove in accordance with the present disclosure, such as gloves 1110A, 1110B, 1110C, and 1110D there may be no gripping zones provided on the thumb region 1116. It will be understood that in other embodiments, however, there may be two pairs of gripping zones on the first and second sides of thumb region 1116. In yet other embodiments, it will be understood that digit regions other than the thumb region 1116 may include only a single set of gripping zones while the other digit regions may include two longitudinally-spaced apart sets of gripping zones thereon. Any permutation or combination of single sets of gripping zones plus double sets of gripping zones may be provided on the twelfth embodiment glove based on the type of function that is to be performed while wearing the gloves. Each stay is provided with texturing, particularly via micro-etching. In one embodiment, the micro-etching will produce a sand pattern of texturing. It will be understood that any other texture pattern may be applied to the twelfth embodiment gloves in any other manner.

FIG. 43E shows a sixth example of the twelfth embodiment of glove, generally indicated as glove 1110E; FIG. 43F shows a seventh example of the twelfth embodiment of glove, generally indicated as glove 1110F; FIG. 43G shows an eighth example of the twelfth embodiment of glove, generally indicated as glove 1110G; and FIG. 43H shows a ninth example of the twelfth embodiment of glove, generally indicated as glove 1110H. Each of the gloves 1110E, 1110F, 1110G, and 1110H has two textured crotch areas. In particular, the figures illustrate that the gloves include a textured first crotch area 1166 and second crotch area 1168. It will, however, be understood that any other combination of two textured crotch areas may be provided on gloves 1110E, 1110F, 1110J, and 1110H instead of first and second crotch areas 1166, 1168. FIGS. 43E through 43H show gripping zones being provided on a single digit region (FIG. 43E), two digit regions (FIG. 43F), three digit regions (FIG. 43G), and four digit regions (FIG. 43H) in an identical manner and for an identical purpose to the gripping zones shown and described herein with respect to the gloves 1110A through 1110D.

FIG. 43I shows a tenth example of the twelfth embodiment of glove, generally indicated as glove 1110I; FIG. 43J shows an eleventh example of the twelfth embodiment of glove, generally indicated as glove 1110J; FIG. 43K shows a twelfth example of the twelfth embodiment of glove, generally indicated as glove 1110K; and FIG. 43L shows a thirteenth example of the twelfth embodiment of glove, generally indicated as glove 1110L. Each of the gloves

1110I, 1110J, 1110K, and 1110L has three textured crotch areas. In particular, the figures illustrate that the gloves include textured first crotch area 1166, second crotch area 1168, and third crotch area 1170. It will, however, be understood that any other combination of three textured crotch areas may be provided on gloves 1110I, 1110J, 1110K, and 1110L. FIGS. 43I through 43L show gripping zones being provided on a single digit region (FIG. 43I), two digit regions (FIG. 43J), three digit regions (FIG. 43K), and four digit regions (FIG. 43L) in an identical manner and for an identical purpose to the gripping zones shown and described herein with respect to the gloves 1110A through 1110D.

FIG. 43M shows a fourteenth example of the twelfth embodiment of glove, generally indicated as glove 1110M; FIG. 43N shows a fifteenth example of the twelfth embodiment of glove, generally indicated as glove 1110N; FIG. 43P shows a sixteenth example of the twelfth embodiment of glove, generally indicated as glove 1110P; and FIG. 43Q shows a seventeenth example of the twelfth embodiment of glove, generally indicated as glove 1110Q. Each of the gloves 1110M, 1110N, 1110P, and 1110Q has four textured crotch areas 1166-1172. FIGS. 43M through 43Q show gripping zones being provided on a single digit region (FIG. 43M), two digit regions (FIG. 43N), three digit regions (FIG. 43P), and four digit regions (FIG. 43Q) in an identical manner and for an identical purpose to the gripping zones shown and described herein with respect to gloves 1110A through 1110D.

It will be understood that while one or more digit region in every embodiment of the glove disclosed herein is indicated as having at least one gripping zone therein which is comprised of a first stay and a second stay, in an alternative embodiment the gripping zone may comprise only one of the first stay and the second stay. For example glove 210 may include a first stay on a front of a digit region but no second stay on the back of that same digit region.

In each of the glove embodiments disclosed herein where the at least one gripping zone comprises a first stay and a second stay, those first and second stays are described as being arranged opposed to one another and laterally aligned with one another. It will be understood however, that in other embodiment the first stay and the second stay may not be laterally aligned with one another and/or the first stay and the second stay may not be opposed to one another. For example, there may be a lateral misalignment between the first stay and the second stay and/or one of the first stay and the second stay may be provided on the front or back of the associated digit region and the other of the first stay and the second stay may be provided on the first side or second side thereof.

Still further, while the first stay and second stay have been described herein as being formed on the front and back of the associated digit region or formed in the first side and second side of the associated digit region, it will be understood that in other embodiments, the first stay and second stay may be formed partially in the front or back and partially formed in the associated first side or second side.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A glove comprising:
a wrist region;
a palm region extending outwardly from the wrist region;
a plurality of digit regions extending outwardly from the palm region; and
at least one crotch area defined between two adjacent digit regions of the plurality of digit regions;
a texture provided on the at least one crotch area;
at least one stay provided on a digit region of the plurality of digit regions of the glove;
wherein the at least one stay comprises a concave indentation formed in the digit region which reduces a circumference of the digit region; and
wherein an exterior surface of the at least one stay is textured.

2. The glove according to claim 1, wherein the texture of the at least one crotch area is provided on an exterior of an arcuate surface extending between opposed side surfaces of the two adjacent digit regions.

3. The glove according to claim 1, wherein the two adjacent digit regions includes a first digit region and a second digit region, wherein the texture of the at least one crotch area extends along part of an exterior of a side surface of the first digit region and part of an exterior of a side surface of the second digit region.

4. The glove according to claim 1, wherein the texture of the at least one crotch area extends at least partially onto an exterior of a front of the palm region.

5. The glove according to claim 1, wherein the texture of the at least one crotch area extends at least partially onto an exterior of a back of the palm region.

6. The glove according to claim 1, wherein the texture is provided on the at least one crotch area through a micro-etching process.

7. The glove according to claim 1, wherein the plurality of digit regions includes a thumb region, an index finger region, a middle finger region, a ring finger region, and a little finger region; and wherein the at least one crotch area comprises a first crotch area located between the thumb region and the index finger region.

8. The glove according to claim 7, wherein the at least one crotch area includes a second crotch area located between the index finger region and the middle finger region, and wherein each of the first crotch area and the second crotch area is textured.

9. The glove according to claim 8, wherein the at least one crotch area includes a third crotch area located between the middle finger region and the ring finger region, and wherein each of the first crotch area, the second crotch area, and the third crotch area is textured.

10. The glove according to claim 9, wherein the at least one crotch area includes a fourth crotch area located between the ring finger region and the little finger region, and wherein each of the first crotch area, the second crotch area, the third crotch area, and the fourth crotch area is textured.

11. The glove according to claim 1, wherein the at least one stay is textured in a same manner as the at least one crotch area.

12. The glove according to claim 11, wherein the at least one stay and the at least one crotch area are textured through micro-etching.

13. A method comprising:

forming a glove having a wrist region, a palm region, and a plurality of digit regions, wherein adjacent digit regions of the plurality of digit regions include a crotch area;

texturing the crotch area;

forming an indentation in at least one digit region of the plurality of digit region; and reducing a circumference in the at least one digit regions, where the circumference intersects the indentation; and texturing an exterior surface of the glove along the indentation.

14. The method according to claim 13, wherein texturing the crotch area comprises micro-etching an exterior surface of the glove in the crotch area.

15. The method according to claim 13, further comprising texturing the exterior surface of the glove along the indentation, and the texturing of the crotch area is accomplished through a same process.

16. The glove according to claim 1, wherein the at least one stay comprises a first stay located on at least one a thumb region, an index finger region, a middle finger region, a ring finger region, and a little finger region.

17. The glove according to claim 16, wherein the at least one stay comprises a second stay located on at least one of a thumb region, an index finger region, a middle finger region, a ring finger region, and a little finger region.

18. The glove according to claim 17, wherein the first stay is located opposite to and laterally aligned with the second stay.

19. The glove according to claim 1, wherein the at least one stay is textured in a different manner from the at least one crotch area.

20. The glove according to claim 1, wherein an interior surface of the glove is a first color and an exterior surface of the glove is a second color, wherein the first color and second color differ from one another.

\* \* \* \* \*